United States Patent
Miura

(10) Patent No.: US 9,176,907 B2
(45) Date of Patent: Nov. 3, 2015

(54) SEMICONDUCTOR DEVICE AND DATA PROCESSING SYSTEM

(75) Inventor: Seiji Miura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1286 days.

(21) Appl. No.: 13/058,857

(22) PCT Filed: Aug. 10, 2009

(86) PCT No.: PCT/JP2009/064146
§ 371 (c)(1),
(2), (4) Date: Feb. 12, 2011

(87) PCT Pub. No.: WO2010/029830
PCT Pub. Date: Mar. 18, 2010

(65) Prior Publication Data
US 2011/0145500 A1    Jun. 16, 2011

(30) Foreign Application Priority Data
Sep. 12, 2008  (JP) .................................. 2008-234199

(51) Int. Cl.
*G06F 12/00* (2006.01)
*G06F 13/16* (2006.01)

(52) U.S. Cl.
CPC ......... *G06F 13/1689* (2013.01); *Y02B 60/1228* (2013.01)

(58) Field of Classification Search
CPC .... G06F 13/1689; G06F 13/161; G06F 3/061
USPC ........................................................ 711/167
See application file for complete search history.

(56) References Cited

U.S. PATENT DOCUMENTS

| 5,600,819 A | 2/1997 | Kamada et al. |
| 5,710,912 A * | 1/1998 | Schlansker et al. ........... 712/220 |

(Continued)

FOREIGN PATENT DOCUMENTS

| JP | 06-266615 A | 9/1994 |
| JP | 08-153169 A | 6/1996 |

(Continued)

OTHER PUBLICATIONS

Office Action dated Nov. 12, 2013, in Japanese Patent Application No. 2013-036537.

*Primary Examiner* — Larry Mackall
(74) *Attorney, Agent, or Firm* — Miles & Stockbridge P.C.

(57) ABSTRACT

A high-speed, low-cost data processing system capable of ensuring expandability of memory capacity and having excellent usability while keeping constant latency is provided. The data processing system is configured to include a data processing device, a volatile memory, and a non-volatile memory. As the data processing device, the volatile memory, and the non-volatile memory are connected in series and the number of connection signals are reduced, the speed is increased while keeping expandability of memory capacity. The data processing device measures latency and performs a latency correcting operation to keep the latency constant. When data in the non-volatile memory is transferred to the volatile memory, error correction is performed to improve reliability. The data processing system formed of these plurality of chips is configured as a data processing system module in which the chips are disposed so as to be multilayered each other and are connected by a ball grid array (BGA) or a technology of wiring these chips.

5 Claims, 46 Drawing Sheets

(56) References Cited

U.S. PATENT DOCUMENTS

| | | |
|---|---|---|
| 6,453,370 B1 | 9/2002 | Stracovsky et al. |
| 2003/0005252 A1* | 1/2003 | Wilson et al. ............... 711/167 |
| 2004/0148482 A1 | 7/2004 | Grundy et al. |
| 2006/0095671 A1 | 5/2006 | Gower et al. |
| 2006/0212661 A1 | 9/2006 | Inagaki et al. |
| 2007/0005922 A1 | 1/2007 | Swaminathan et al. |
| 2007/0271409 A1 | 11/2007 | Miura et al. |
| 2008/0034148 A1 | 2/2008 | Gower et al. |
| 2008/0115137 A1 | 5/2008 | Gower et al. |
| 2009/0119466 A1 | 5/2009 | Gower et al. |
| 2010/0131724 A1 | 5/2010 | Miura et al. |

FOREIGN PATENT DOCUMENTS

| | | |
|---|---|---|
| JP | 2002-530731 A | 9/2002 |
| JP | 2006-293969 A | 10/2006 |
| JP | 2007-310430 A | 11/2007 |
| JP | 2008-041089 A | 2/2008 |
| JP | 2008-276351 A | 11/2008 |

\* cited by examiner

*FIG. 10*

CNNTREG

| CNCT NO \ Item | VALID | ID | DEV CODE | END FLAG | |
|---|---|---|---|---|---|
| 0 | 1 | 0 | 0001_0000 | 0 | CPU_CHIP |
| 1 | 1 | 1 | 0000_0001 | 0 | DRAM |
| 2 | 1 | 2 | 0000_0010 | 0 | NOR |
| 3 | 1 | 3 | 0000_0100 | 1 | NAND |
| 4 | 0 | 0 | 0 | 0 | |
| 5 | 0 | 0 | 0 | 0 | |
| 6 | 0 | 0 | 0 | 0 | |
| 7 | 0 | 0 | 0 | 0 | |
| 8 | 0 | 0 | 0 | 0 | |

*FIG. 11*

| ID | VALID | RESQ1 |
|---|---|---|
| 0 | 1 | 24 |

| ID | VALID | RsQo | RsQp |
|---|---|---|---|
| 1 | 1 | 8 | 16 |
| 2 | 1 | 8 | 8 |
| 3 | 1 | 8 | 8 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |

*FIG. 12*

| ID | VALID | REQQ2 |
|---|---|---|
| 0 | 1 | 12 |

| ID | VALID | RqQI | RqQXI | RqQXO |
|---|---|---|---|---|
| 1 | 1 | 12 | 4 | 8 |
| 2 | 1 | 8 | 4 | 4 |
| 3 | 1 | 4 | 4 | 4 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 0 | 0 | 0 | 0 |

*FIG. 13*

| Item ID | VALID | MFLAG | LAT DMN | |
|---|---|---|---|---|
| 0 | 1 | 1 | 0 | CPU_CHIP |
| 1 | 1 | 0 | 0 | DRAM |
| 2 | 1 | 0 | 0 | NOR |
| 3 | 1 | 0 | 0 | NAND |
| 4 | 0 | 0 | 0 | |
| 5 | 0 | 0 | 0 | |
| 6 | 0 | 0 | 0 | |
| 7 | 0 | 0 | 0 | |
| 8 | 0 | 0 | 0 | |

*FIG. 14*

| Item ID | Valid | LatQue | LatBank | Lat Range | Lat TimeOut |
|---|---|---|---|---|---|
| 0 | 1 | 0 | 0 | 0 | 0 |
| 1 | 1 | 6 | 8 | 1 | 60 |
| 2 | 1 | 10 | 12 | 1 | 100 |
| 3 | 1 | 14 | 16 | 1 | 140 |
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 0 | 0 | 0 | 0 | 0 |

*FIG. 15*

M0TREG

| Item TIMING | Valid | CYCLES |
|---|---|---|
| tm0RCD | 1 | 8 |
| tm0RC | 1 | 30 |
| tm0RRD | 1 | 4 |
| tm0RAS | 1 | 22 |
| tm0RP | 1 | 8 |
| tm0RFC | 1 | 60 |

*FIG. 16*

M1TREG

| TIMING \ Item | Valid | CYCLES |
|---|---|---|
| tm1RCD | 1 | 16 |
| tm1RC | 1 | 60 |
| tm1RRD | 1 | 8 |
| tm1RAS | 1 | 44 |
| tm1RP | 1 | 16 |

*FIG. 17*

M2TREG

| TIMING \ Item | Valid | CYCLES |
|---|---|---|
| tm2RCD | 1 | 10000 |
| tm2RC | 1 | 10062 |
| tm2RRD | 1 | 16 |
| tm2RAS | 1 | 10046 |
| tm2RP | 1 | 32 |

FIG. 18

OMDREG

| Item ID | Valid | OPMODE |
|---|---|---|
| 0 | 1 | 3 |
| 1 | 1 | 3 |
| 2 | 1 | 3 |
| 3 | 1 | 3 |
| 4 | 0 | 0 |
| 5 | 0 | 0 |
| 6 | 0 | 0 |
| 7 | 0 | 0 |
| 8 | 0 | 0 |

FIG. 19A

Read

| CHNNEL HIT/MISS | CHANNEL HIT | CHANNEL MISS (Clean) | | | |
|---|---|---|---|---|---|
| BANK HIT/MISS | Don't Care | PAGE HIT | | PAGE MISS (Clean) | |
| BANK STATE | Don't Care | OPEN | CLOSE | OPEN | CLOSE |
| CMD FLOW | RD1 | RD2 | AC<br>▼<br>RD2 | PRE<br>▼<br>AC<br>▼<br>RD2 | AC<br>▼<br>RD2 |

FIG. 19B

Write

| CHNNEL HIT/MISS | CHANNEL HIT | CHANNEL MISS (Clean) | | | |
|---|---|---|---|---|---|
| BANK HIT/MISS | Don't Care | PAGE HIT | | PAGE MISS (Clean) | |
| BANK STATE | Don't Care | OPEN | CLOSE | OPEN | CLOSE |
| CMD FLOW | WT1 | WT2 | AC<br>▼<br>WT2 | PRE<br>▼<br>AC<br>▼<br>WT2 | AC<br>▼<br>WT2 |

*FIG. 39A* *FIG. 39B*
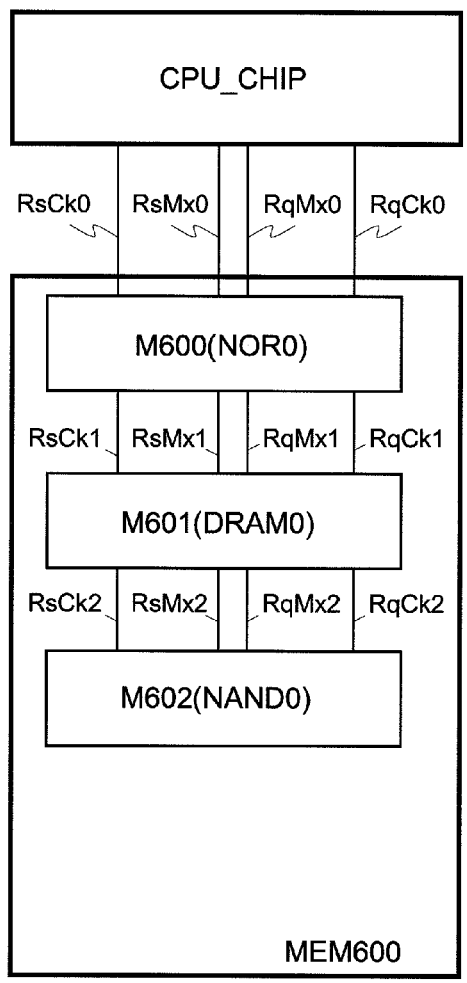
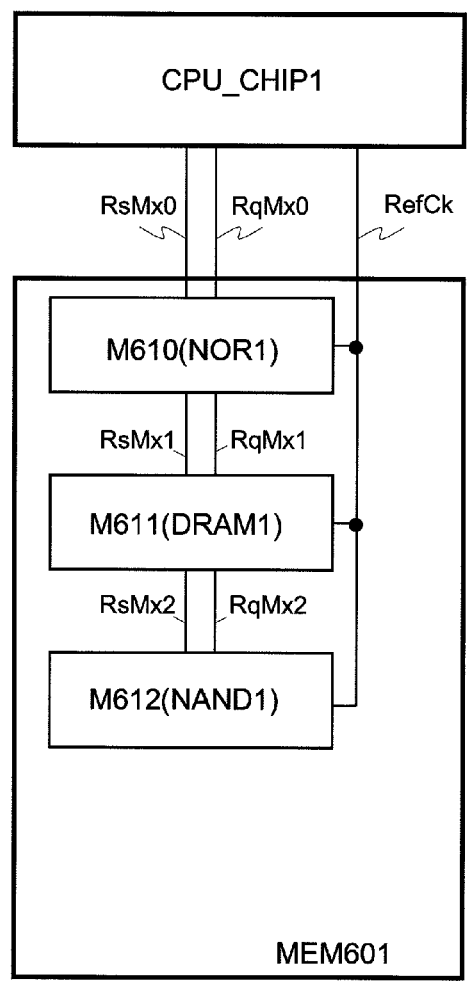

FIG. 41A
FIG. 41B
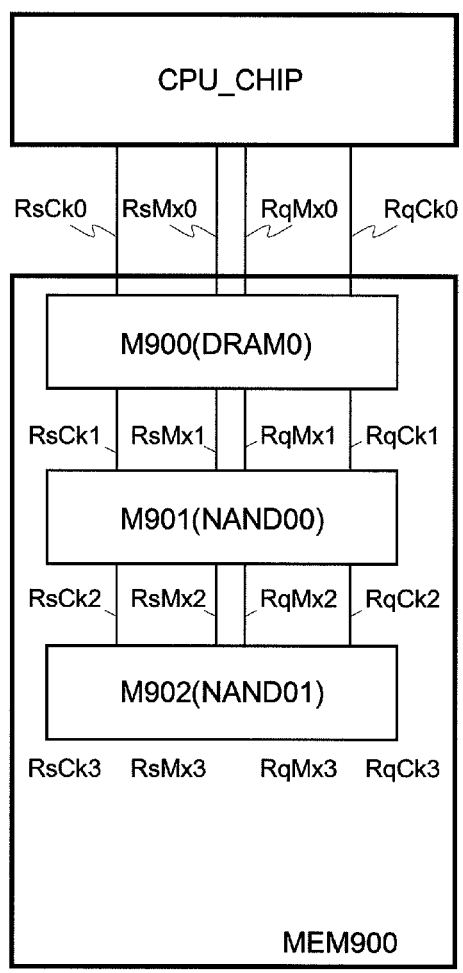
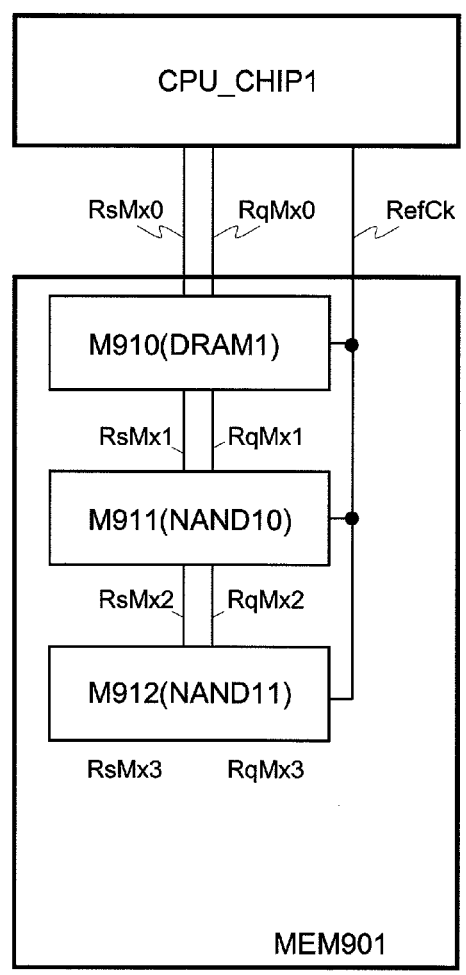

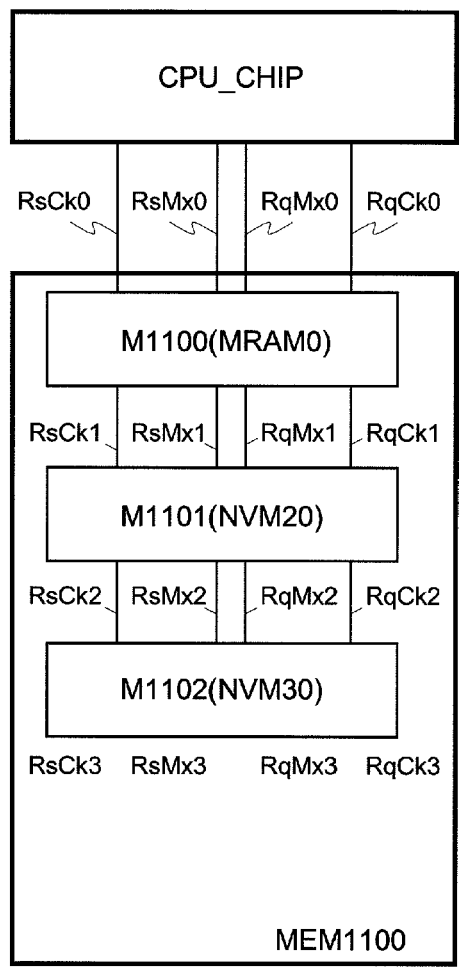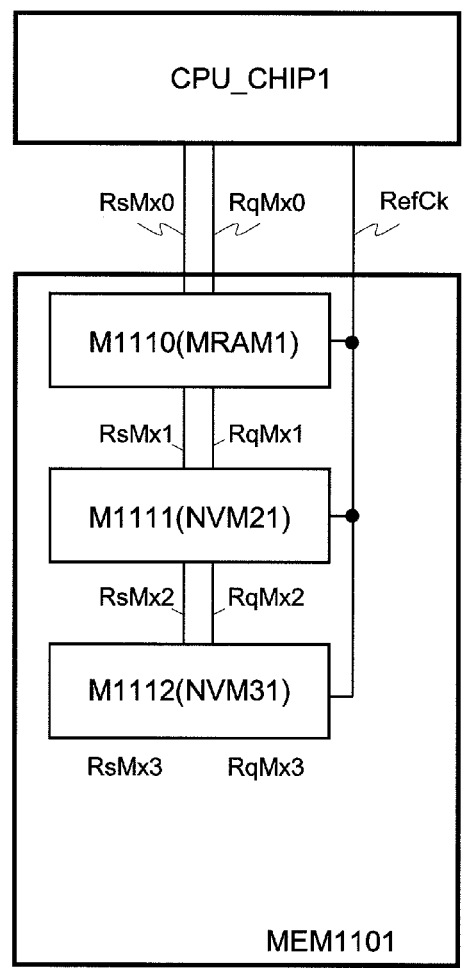
FIG. 43A
FIG. 43B

SEMICONDUCTOR DEVICE AND DATA PROCESSING SYSTEM

TECHNICAL FIELD

The present invention relates to technologies for semiconductor devices and, in particular, to technology effectively applied to a data processing system including a non-volatile memory and a data processing device, and a method of controlling a memory module.

BACKGROUND ART

Problems to be Solved by the Invention

In recent years, as shown in Patent Document 1, in order to decrease the number of signals between a data processing device and memories, to improve an operating frequency, and to increase a data transfer speed, a data processing system is suggested, in which a data processing device and a plurality of memories are connected in series. Specifically, each memory has request queues retaining requests transmitted from the data processing device and response queues retaining responses to the data processing device. The response queues include a response queue retaining a response from its own memory and a response queue retaining a response from a memory on a subsequent stage. The responses retained in these response queues are subjected to arbitration at an internal arbitration circuit, and the responses are transmitted to a memory on a preceding stage or the data processing device.

PRIOR ART DOCUMENT

Patent Document

Patent Document 1: Japanese Patent Application Laid-Open Publication No. 2007-310430

SUMMARY OF THE INVENTION

Prior to the present application, the inventor of the present application has studied a data processing system including a mobile phone, a data processing device, a flash memory, and a random access memory.

The mobile phone includes a data processing device and a memory, such as a NOR flash memory, an SRAM, a DRAM, or a NAND flash memory. In the NOR flash memory, an operating system, a communication control program, and a reproducing program for music and moving images are mainly stored. In the NAND flash memory, music data and moving image data are mainly stored.

To execute the communication control program, the data processing device reads an instruction for communication control stored in the NOR flash memory for communication control. That is, it has been found out that random reading of instructions from the NOR flash memory frequently occurs. To operate the program for communication control at a high speed, latency until one data reading ends is important. Also, to reproduce music and moving images, the data processing device reads a reproducing program for music and moving images from the NOR flash memory, and further transfers music data and moving image data from a NAND flash memory to a DRAM, thereby reproducing the music and moving images. In this reproduction of music and moving images, it has been found out that sequential reading of data from the NAND flash memory and writing and reading data from the DRAM occur frequently. For this reproduction of music and moving images, data transfer performance is important.

Therefore, in order to efficiently execute these plurality of programs in a mobile phone, it is important to shorten the latency and increase the data transfer speed.

Studies have been conducted on the case where a data processing system having the above-described memories connected in series as described in Patent Document 1. Specifically, studies have been conducted on the case where a data processing system having a data processing device and a memory 1, a memory 2, and a memory 3 connected in series. In the case of the data processing system with these memories connected in series, to the memory 2, a response from the memory 3 on a subsequent stage is input. Therefore, the memory 2 conducts arbitration between a response from its own memory 2 and a response from the memory 3 on the subsequent stage for transmission to the memory 1, causing a shift in latency. Furthermore, to the memory 1, responses from the memory 2 and the memory 3 from the subsequent stage are input. Therefore, the memory 1 is required to conduct arbitration between a response from its own memory 1 and the responses from the memory 2 and memory 3 on the subsequent stage for transmission of a response to the data processing device, further disadvantageously causing an increase in latency shift, and it has been found out that an advance in performance of the mobile phone cannot be supported.

Therefore, a preferred aim of the present invention is to provide a high-speed, low-cost data processing system capable of ensuring expandability of memory capacity and having excellent usability while decreasing the number of signal wirings between the data processing device and the memories and between memories and keeping a data read latency constant for each memory.

Means for Solving the Problems

Typical means of the present invention are as follows.

First, the present invention includes a request transmitting circuit issuing an access request to outside, a response receiving circuit receiving a response to the access request issued from the request transmitting circuit from outside, and a measuring circuit measuring a response time from a time of the access request issued from the request transmitting circuit to a time when the response receiving circuit receives the response to the access request.

Also, the present invention includes a request transmitting circuit issuing an access request to outside, a response receiving circuit receiving a response to the access request issued from the request transmitting circuit from outside, and a measuring circuit measuring a time elapsed from the access request, wherein, when the request transmitting circuit issues a first access request, the request transmitting circuit retains a first predicted time of response in a register and causes the first predicted time of response stored in the register to reflect the time measured by the measuring circuit and, when issuing a second access request subsequent to the first access request, compares a predicted time of response for the second access request and the first predicted time of response stored in the register to control a timing of issuing the second access request.

Furthermore, a data processing system includes a data storage device including a plurality of memories connected in series and a data processing device outputting an access request to the data storage device, wherein the plurality of memories are connected in series each other via a request interface circuit and a response interface circuit; and the data processing device includes a request transmitting circuit issuing an access request, a response receiving circuit receiving a response to the access request issued from the request transmitting circuit from the data storage device, and a measuring circuit measuring a response time from a time of the access request issued from the request transmitting circuit to a time when the response receiving circuit receives the response to the access request.

Effects of the Invention

According to the present invention, a data processing system capable of ensuring expandability of memory capacity at a high speed and low cost keeping a data read latency constant, and having excellent usability can be achieved.

BRIEF DESCRIPTIONS OF THE DRAWINGS

FIG. 10 is a diagram showing an example of setting values of a connection register (CNNREG);

FIG. 11 is a diagram showing an example of setting values of a response queue register (ResQREG);

FIG. 12 is a diagram showing an example of setting values of a request queue register (ReqQREG);

FIG. 13 is a diagram showing an example of setting values of a latency domain register (LTDREG);

FIG. 14 is a diagram showing an example of setting values of a latency register (LTREG);

FIG. 15 is a diagram showing an example of setting values of a timing register (M0TREG);

FIG. 16 is a diagram showing an example of setting values of a timing register (M1TREG);

FIG. 17 is a diagram showing an example of setting values of a timing register (M2TREG);

FIG. 18 is a diagram showing an example of setting values of a memory control mode register (OMDREG);

FIG. 19 is a diagram showing one example of requests to be outputted by a memory control circuit to each memory;

FIG. 39 is a configuration diagram of a data processing system to which the present invention is applied;

FIG. 41 is a configuration diagram of a data processing system to which the present invention is applied;

FIG. 43 is a configuration diagram of a data processing system to which the present invention is applied;

BEST MODE FOR CARRYING OUT THE INVENTION

In the following, embodiments of the present invention will be described in detail with reference to the attached drawings. In the embodiments, circuit elements configuring each block are not particularly restrictive, but are formed on one semiconductor substrate, such as single-crystal silicon, by integrated circuit technology, such as that of a known CMOS (complementary MOS transistor). Also, specific numerical values are those used for describing the present invention unless otherwise mentioned, which are not particularly restrictive.

(First Embodiment)

A data processing system which is a first embodiment to which the present invention is applied will be described with reference to FIGS. 1 to 30.

Figure 1:
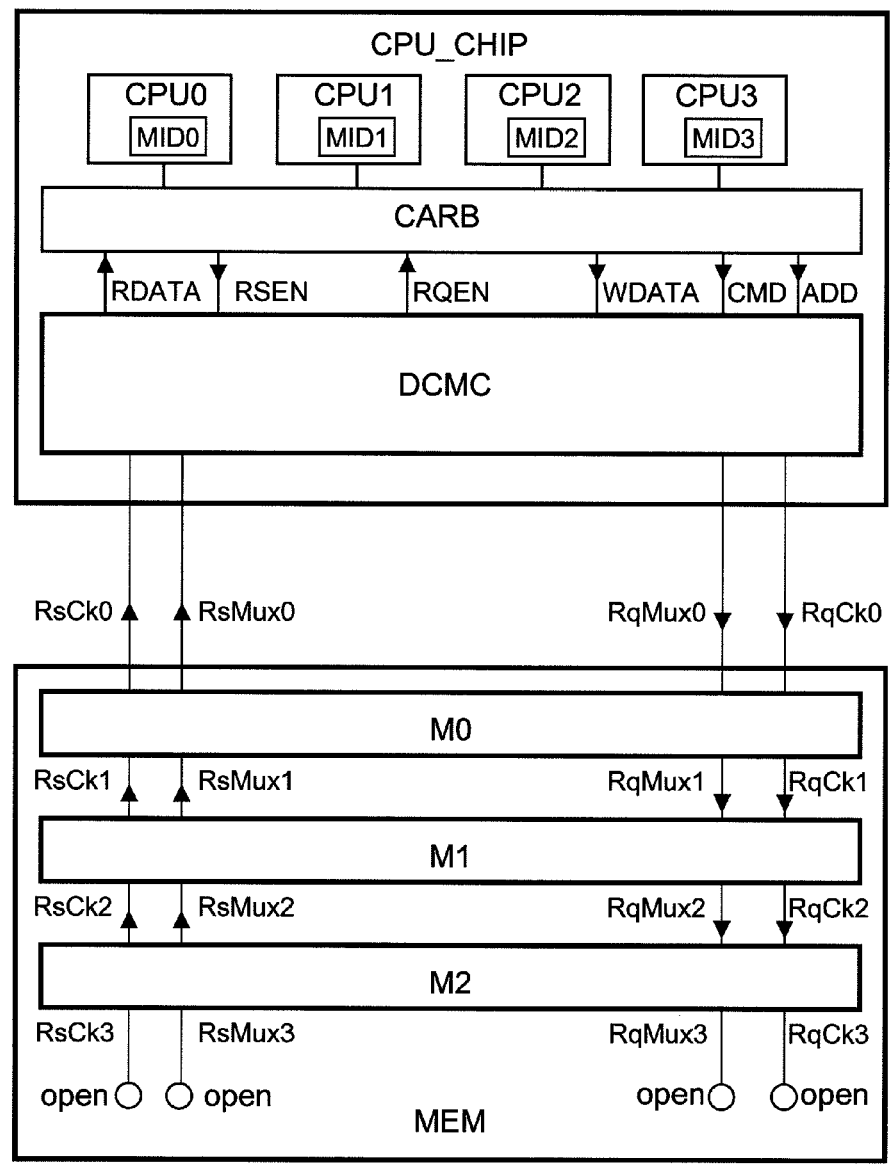
FIG. 1 is a diagram showing one example of structure of a data processing system to which the present invention is applied.
Figure 2:
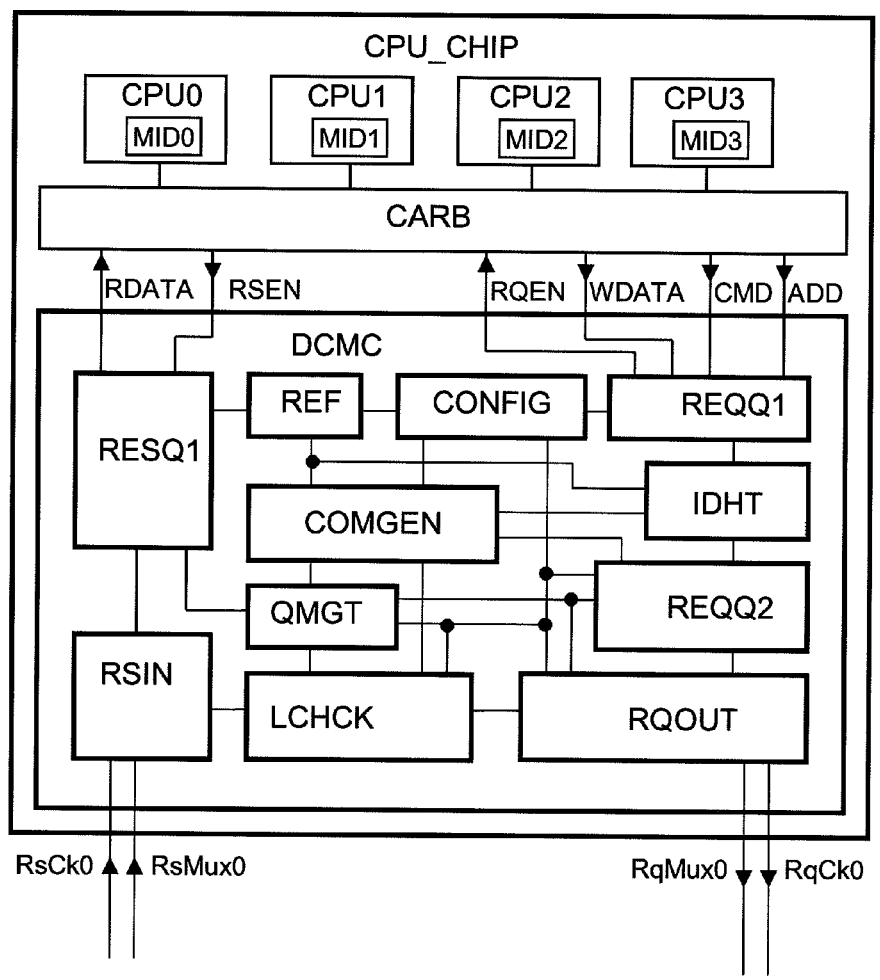
FIG. 2 is a diagram showing one example of structure of a data processing device configuring the data processing system to which the present invention is applied.

FIG. 1 is a block diagram showing one example of a configuration of a data processing system formed of a data processing device CPU_CHIP and a memory module MEM according to the first embodiment to which the present invention is applied. Also, FIG. 2 is a block diagram showing one example of a configuration of the data processing device CPU_CHIP. Each component will be described below.

The data processing device CPU_CHIP includes data processing circuits CPU0, CPU1, CPU2, and CPU3, an arbitration circuit CARB, and a memory control circuit DCMC. The memory module MEM includes memory devices (memories) M0, M1, and M2. In addition, the data processing device CPU_CHIP and the memories M0, M1, and M2 are connected in series. The data processing circuit CPU0 mounts a master number register MID0, the data processing circuit CPU1 mounts a master number register MID1, the data processing circuit CPU2 mounts a master number register MID2, and the data processing circuit CPU3 mounts a master number register MID3.

The memory control circuit DCMC includes a configuration circuit CONFIG, a request queue REQQ1, a hit determination circuit IDHT, a request queue REQQ2, a command generation circuit COMGEN, a request output circuit RQOUT, a refresh request circuit REF, a queue management circuit QMGT, a latency adjustment circuit LCHCK, a response input circuit RSIN, and a response queue RESQ1. Also, the configuration circuit CONFIG includes, although not shown, a queue register QREG, a latency register LTREG, a latency domain register LTDREG, a timing register M0TREG regarding the memory M0, a timing register M0TREG regarding the memory M1, a timing register M2TREG regarding the memory M2, an operation mode register OMDREG, and a connection register CNNREG.

The data processing circuits CPU0, CPU1, CPU2, and CPU3 read an OS, an application program, and data to be processed by the OS and application program from the memory module MEM by way of the arbitration circuit CARB and the memory control circuit DCMC for execution.

In the request queue REQQ1 and the request queue REQQ2, a read request, a write request, and others issued from the data processing circuits CPU0 to CPU3 are stored, and, in the response queue RESQ1, an OS, an application program, data, and others read from the memory module MEM are stored.

The hit determination circuit IDHT determines whether data targeted by a read request and a write request from the data processing circuits CPU0 to CPU3 is present in a response queue of each of the memories M0 to M2 or in an activated page for each memory bank (hereinafter, referred to as "hit determination"). For this purpose, the hit determination circuit IDHT associates an address corresponding to a request from any of the data processing circuits CPU0 to CPU3 with a bank address BAdd, a page address PAdd, and a column address CAdd of each memory configuring the memory module MEM. Also, in the hit determination circuit IDHT, a bank address, a page address, and a column address are stored for each response queue whose data is stored among response queues included in each memory. Furthermore, in the hit determination circuit IDHT, a bank address and a page address are retained for each active page for each memory bank among memory banks included in each memory.

The memory module MEM includes the memories M0, M1, and M2. Also, the data processing device CPU_CHIP and the memories M0, M1, and M2 are connected in series. The memory M0 is a volatile memory, and may be a memory formed on one semiconductor substrate or a memory having a plurality of memory chips integrated thereon. Also, the memories M1 and M2 are non-volatile memories, and may be memories formed on one semiconductor substrate or memories having a plurality of memory chips integrated thereon. Here, typical volatile memories include a dynamic random access memory DRAM, a pseudo-static random access memory PSRAM using a dynamic random access memory cell as a memory array, and a static random access memory SRAM using static random access memory cells. In the present invention, any volatile memory cell can be used. In the present embodiment, an example of using a dynamic random access memory cell as a memory array will be described. As a non-volatile memory, a ROM (read only memory), an EEPROM (electrically erasable and programmable ROM), a flash memory, a phase-change memory PCM, a magnetic random access memory MRAM, a resistive random access memory ReRAM, and others can be used. In the present embodiment, descriptions will be made with a flash memory as an example. Also, typical flash memories include a NOR flash memory, an AND flash memory, a NAND flash memory, and an ORNAND flash memory. In the present embodiment, any flash memory can be used.

Furthermore, typical flash memories include a flash memory using a binary memory cell SLC that can store data of one bit in a memory cell and a multivalued flash memory MLC that can store data of two bits or more in a memory cell. In the present embodiment, any of these flash memories can be used.

In the present embodiment, descriptions will be made with a NOR flash memory using a binary memory cell SLC and a NAND flash memory using a binary memory cell SLC as an example. A typical volatile memory for use as the memory M0 is a dynamic random access memory using dynamic memory cells, and has a storage capacity of approximately 1 Gbit. The memory M0 is used, although not particularly limited to this, as a temporary work memory for executing an application program in the data processing device CPU_CHIP. As a typical flash memory for use as the memory M1, a NOR flash memory cell is used, and has a large storage capacity of about 1 Gbit. In the memory M1, an OS, a boot program, a boot device ID value, configuration data and an application program of the memory module MEM, and others to be executed on the data processing device CPU_CHIP are stored, although the case is not particularly limited thereto. As a typical flash memory for use as the memory M2, a NAND flash memory cell is used, and has a storage capacity of about 16 Gbit. In the memory M2, audio data, still image data, moving image data, and others for playback, sound-recording, and video-recording in the data processing device CPU_CHIP are mainly stored, although the case is not particularly limited thereto.

In the memories M0, M1, and M2, an initializing circuit INIT is provided. Immediately after powering on, each initializing circuit INIT initializes the memory. In a request queue control circuit RqCT of the memories M0, M1, and M2, an ID register IDR is provided, having stored therein an identification number ID of each memory. Immediately after powering on, initialization is first performed by the initializing circuit INIT, and the identification numbers ID of the memories M0, M1, and M2 are next determined by the data processing device CPU_CHIP and the identification numbers ID are stored in the ID registers in the respective memories.

The memories M0, M1, and M2 each have a boot device identifying signal Bsig and, when this boot device identifying signal Bsig is grounded (gnd), it indicates that that memory is a boot device having stored therein a boot program for performing an operation immediately after powering on. When the boot device identifying signal Bsig is connected to a power supply (vdd), it indicates that that memory is not a boot device. It is assumed in the present embodiment that the memory M1 is a boot device and the memories M0 and M2 are not set as boot devices. Also, with the boot device identifying signal Bsig, it is possible to program which memory is set as a boot device.

As a clock mode for connecting the memories M0, M1, and M2 in series for operation, there are a common clock scheme, a source synchronous clock scheme, an embedded clock scheme, and others, and any of the clock schemes can be used in the present invention. In the present embodiment, descriptions will be made with an operation in a source synchronous clock scheme as an example.

RqCk0, RqCk1, and RqCk2 are request clocks, and RsCk0, RsCk1, and RsCk2 are response clocks. RqMux0, RqMux1, and RqMux2 are request signals, and RsMux0, RsMux1, and RsMux2 are response signals. Requests transmitted by way of these request signals include, although not particularly limited to them, a common request portion CMNREQF of four bytes and a variable request portion VBREQ of 36 bytes at maximum, and are multiplexed and transmitted in synchronization with the respective request clocks RqCk0, RqCk1, and RqCk2.

The common request portion CMNREQF includes a request start flag ReqStFlag, an identification number ID, an instruction, a master number MID, a variable portion request length VREQL, and a request number ReqN, and the variable request portion VBREQF includes an address of four bytes and write data of 32 bytes at maximum. The variable portion request length VREQL represents a length of the variable request portion VBREQF in bytes.

Responses by way of the response signals RsMux0, RsMux1, and RsMux2 include, although not particularly limited to this, a common response portion CMNRESF of four bytes and read data of 32 bytes at maximum, and are multiplexed and transmitted in synchronization with respective response clocks RsCk0, RsCk1, and RsCk2.

The common response portion CMNRESF includes a response start flag ResStFlag, an identification number ID, an instruction, a master number MID, a read data length RDL, and a response number ResN. The read data length RDL represents a length of the read data in bytes.

The master number indicates from which data processing circuit the request came from among the data processing circuits CPU0, CPU1, CPU2, and CPU3, and each master number corresponds to a value set at a relevant one of the master number registers MID0, MID1, and MID2. Also, when the request start flag indicates High, this indicates a start of that request. The identification number ID value is an identification number that identifies any of the memories M0, M1, and M2. The request number is an identification number of the request itself. The request length indicates a length of the multiplexed request. Also, when the response start flag indicates High, it indicates a start of that response. The identification number ID value is an identification number that identifies any of the memories M0, M1, and M2. The response number is an identification number of the response itself. The response length indicates a length of the multiplexed response.

<Description of Memory M0>

Figure 3:
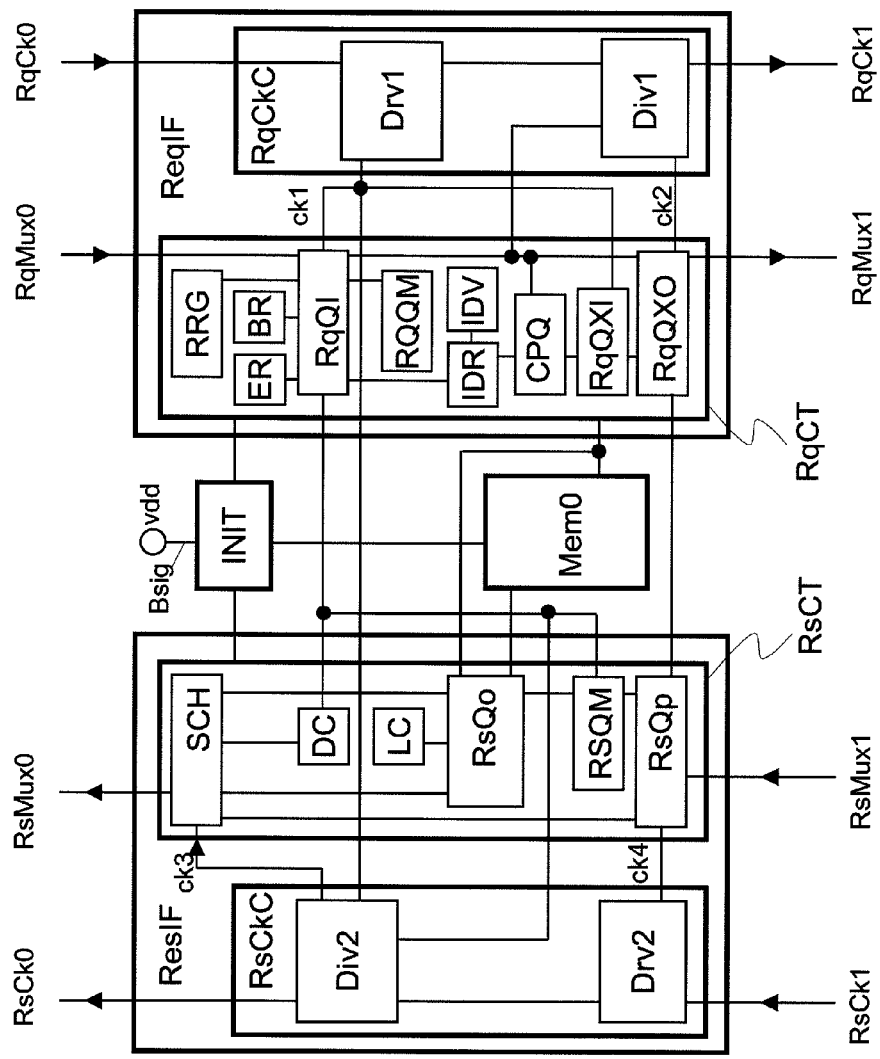
FIG. 3 is a diagram showing one example of a configuration of a memory.

FIG. 3 depicts an example of a configuration diagram of the memory M0. The memory M0 includes a request interface circuit ReqIF, a response interface circuit ResIF, an initialization circuit INIT, and a memory circuit Mem0. The request interface circuit ReqIF includes a request clock control circuit RqCkC and a request queue control circuit RqCT. The request clock control circuit RqCkC includes a clock driver Drv1 and a clock frequency divider circuit Div1.

The request queue control circuit RqCT includes a request queue circuit RqQI, a request queue circuit RqQXI, a request queue circuit RqQXO, an ID register circuit IDR, an ID comparator circuit CPQ, a response priority setting register RRG, a request queue check circuit RQQM, an ID valid bit IDV, a boot device flag register BR, and an end (terminal) device flag register ER.

The request queue circuit RqQI includes, although not particularly limited to this, eight request queues, the request queue circuit RqQXI includes four request queues, and the request queue circuit RqQXO includes four request queues.

The response interface circuit ResIF includes a response clock control circuit RsCkC and a response queue control circuit RsCT. The response clock control circuit RsCkC includes a clock driver Drv2 and a clock frequency divider circuit Div2. The response queue control circuit RsCT includes a response queue circuit RsQo, a response queue circuit RsQp, a response queue check circuit RSQM, a response schedule circuit SCH, a latency record register LC, and a device code register DC. The response queue circuit RsQo includes, although not particularly limited to this, four response queues, and the response queue circuit RsQp includes eight response queues.

The memory circuit Mem0 is a volatile memory and a dynamic random access memory using a dynamic random access memory cell. The initialization circuit INIT initializes the memory M0 upon starting power supply to the memory M0. The request clock control circuit RqCkC passes a clock input from the clock signal RqCk0 via an internal clock ck1 to the request queue control circuit RqCT and the response clock control circuit RsCkC. Also, the request clock control circuit RqCkC outputs a clock input from the request clock signal RqCk0 via the clock driver Drv1 and the clock frequency divider circuit Div1 by way of the clock signal RqCk1. Also, the request clock control circuit RqCkC can decrease a clock frequency of a clock signal ck2 and the request clock RqCk1, stop a clock, or re-operate a clock, according to an instruction input by way of the request signal RqMux0.

The response clock control circuit RsCkC outputs a clock input from the internal clock signal ck1 to the response queue control circuit RsCT by way of an internal clock ck3. Also, the response clock control circuit RsCkC outputs a clock input from the internal clock signal ck1 from the clock signal RsCk0 via a clock frequency divider circuit Div2. Furthermore, the response clock control circuit RsCkC outputs a clock input from the clock signal RsCk1, via the clock driver Div2 from a clock signal ck4 to the response queue control circuit RsCT. Still further, the response clock control circuit RsCkC can decrease a clock frequency of the response clock RsCk0, stop a clock, and further re-operate a clock, according to an instruction input by way of the request signal RqMux0.

The request queue circuit RqQI stores, by way of a request signal RqMux0, a request being multiplexed with an ID value, a request number ReqN, an instruction, an address, write data, or others and input to the memory M0, generates a response number ResN identical to the request number ReqN, and transmits the generated number to the response queue control circuit RsCT.

The ID register circuit IDR has an identification number ID value of the memory M0 stored therein, and the ID comparator circuit CPQ compares the ID value stored in the request queue circuit RqQI and the identification number ID value stored in the ID register circuit IDR. The request queue circuit RqQXI and the request queue circuit RqQXO have stored therein a request transferred from the request queue circuit RqQI.

The response queue circuit RsQo stores data read from the memory circuit Mem0 of the memory M0, an ID value read from the ID register circuit IDR, and a response number ResN. The response queue circuit RsQp stores, by way of a response signal RsMux1, an input ID value, the response number ResN, read data, and error data and status data.

The response schedule circuit SCH determines a response priority between a response stored in the response queue circuit RsQo and a response stored in the response queue circuit RsQp, and performs arbitration for outputting a response with a higher priority from the response signal RsMux0. Examples of a control scheme of determining a response priority include, although not particularly limited to this, a fixed priority scheme and a variable priority scheme. According to the scheme set in the response priority setting register circuit RRG, the response schedule circuit SCH determines a priority of the response. In the fixed priority scheme, possible settings are a setting that prioritizes a response in the response queue circuit RsQp over a response in the response queue circuit RsQo included in each memory and a setting that prioritizes a response in the response queue circuit RsQo over a response in the response queue circuit RsQp. Also, in the variable priority scheme, priorities of a response in the response queue circuit RsQp and a response in the response queue circuit RsQo included in each memory can be changed in a round robin scheme.

<Memory Circuit Mem0>

Figure 4:
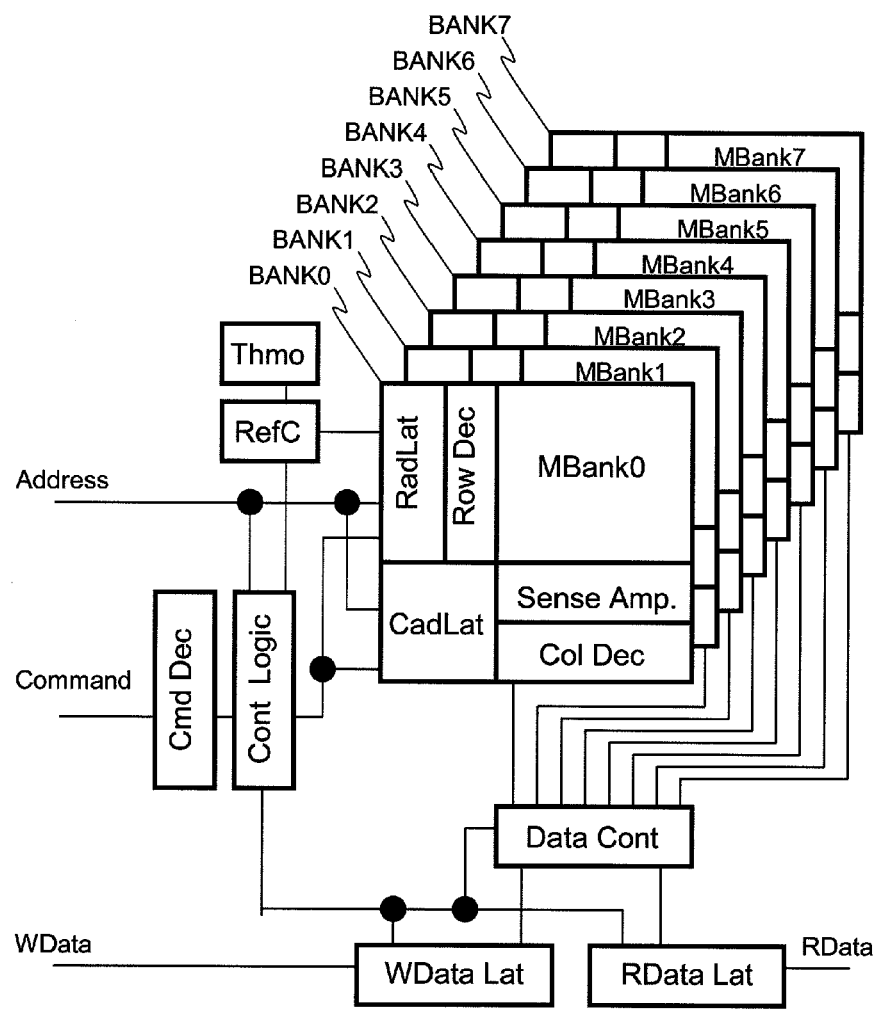
FIG. 4 is a diagram showing one example of a circuit block of a memory circuit mounted in the memory.

FIG. 4 is an exemplary circuit block diagram of the memory circuit Mem0 included in the memory M0. The memory circuit Mem0 includes a command decoder Cmd Dec, a control circuit Cont Logic, a refresh counter RefC, a thermometer Thmo, a write data buffer WData Lat, a read data buffer RData Lat, a data control circuit Data Cont, and memory banks BANK0 to BANK7. Also, each of the memory banks BANK0 to BANK7 includes a row address buffer RadLat, a column address buffer CadLat, a row decoder RowDec, a column decoder ColDec, a sense amplifier SenseAmp, and a relevant one of memory circuits MBank0 to MBank7. The structure of these elements is identical to that of a well-known dynamic random access memory, and thus it will not be described in detail herein.

<Description of the Memory M1>

Figure 5:
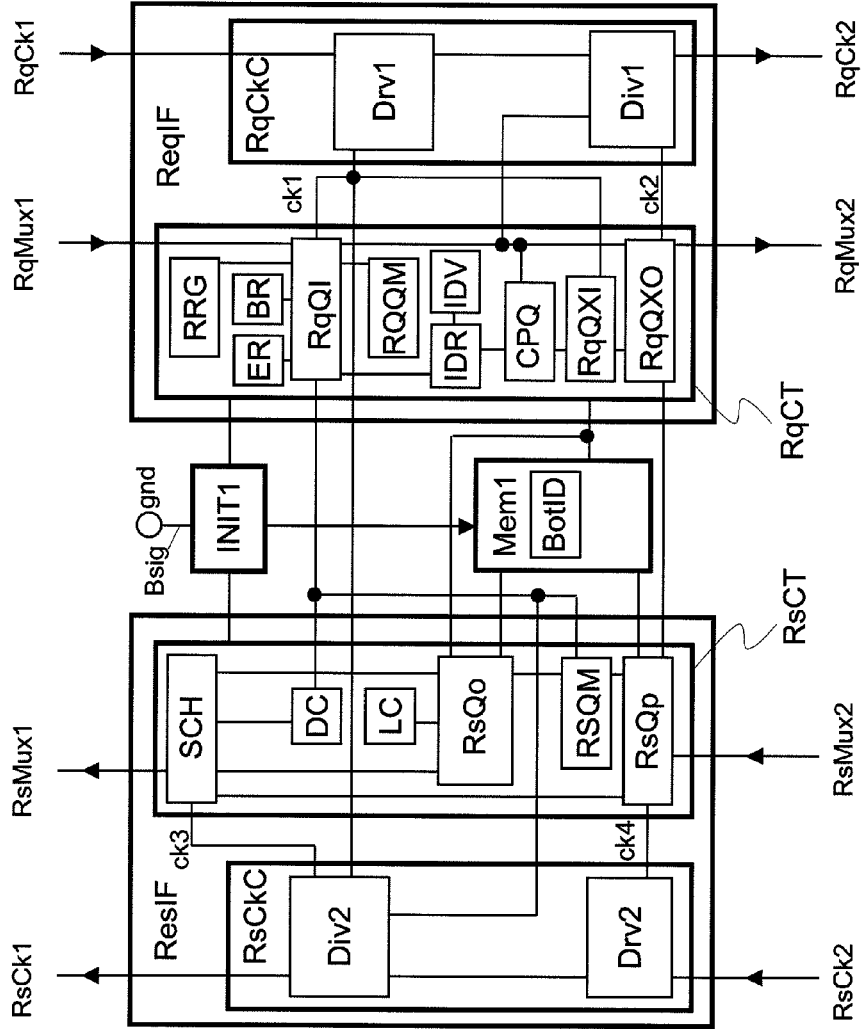
FIG. 5 is a diagram showing one example of structure of the memory.

FIG. 5 is an exemplary structural diagram of the memory M1.

A difference from the memory M0 illustrated in FIG. 3 is that the memory circuit Mem1 is a non-volatile memory and is a NOR flash memory using a NOR flash memory cell. Therefore, in the memory circuit Mem1, a boot device ID value BotID is stored. The circuits configuring the memory M1 and their operations other than the memory circuit Mem1 and the initialization circuit INIT1 are equivalent to those of the memory M0 of FIG. 3.

<Memory Circuit Mem1>

Figure 6:
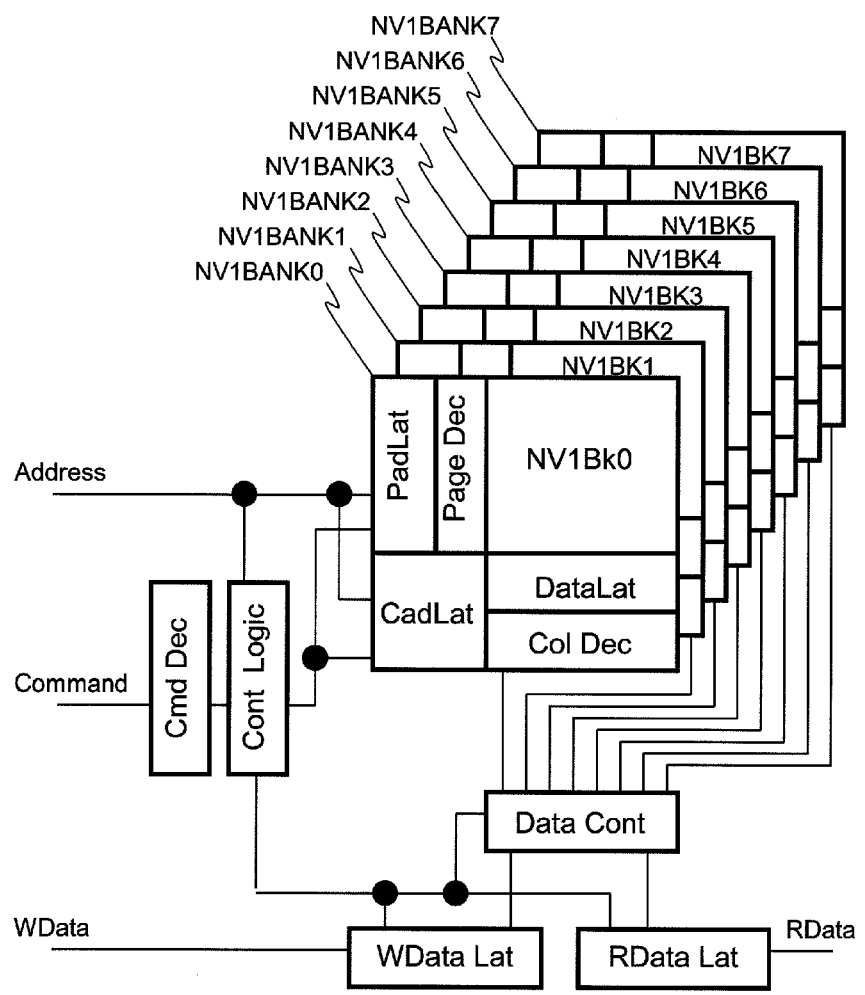
FIG. 6 is a diagram showing one example of a circuit block of the memory circuit mounted on the memory.

FIG. 6 is an example of a circuit block diagram of the memory circuit Mem1 mounted by the memory M1. The memory circuit Mem1 includes a command decoder Cmd Dec, a control circuit Cont Logic, a write data buffer WData Lat, a read data buffer RData Lat, a data control circuit Data Cont, and memory banks NV1BANK0 to NV1BANK7. Also, each of the memory banks NV1BANK0 to NV1BANK7 includes a page address buffer PadLat, a column address buffer CadLat, a page decoder Page Dec, a column decoder ColDec, a data buffer DataLat, and (a relevant one of) memory array circuits NV1Bk0 to NV1Bk7.

An example of a read operation of the memory circuit Mem1 will be described. When a request ReqACID2SEQ15 including a bank active instruction AC, a bank address of 7 and a page address of 5 is stored in the request queue RqQXI of the memory M1, the bank active instruction AC is transmitted from a command signal Command, and the bank address of 7 and the page address of 5 are transmitted to the memory circuit Mem1 from an address signal Address. In the command decoder CmdDec, the bank active instruction BA is decoded, the memory bank NV1BANK7 is selected by the control circuit Cont Logic, and the page address of 5 is stored in the page address buffer PadLat of the memory bank NV1BANK7 and is input to the page decoder Page Dec. Then, a memory cell connected to the page address of 5 in the memory array circuit NV1Bk7 is activated, and data of one kByte, although the data is not particularly limited thereto, is transferred to the data buffer Data Lat.

Next, when an eight-byte data read instruction RD8, the bank address of 7, and a column address of 64 are stored in the request queue RqQXI of the memory M1, the eight-byte data read instruction RD8 is transmitted from the command signal Command and the bank address of 7 and a column address of 63 are transmitted to the memory circuit Mem1 from the address signal Address. The command decoder Cmd Dec decodes the eight-byte data read instruction RD8, the memory bank NV1BANK7 is selected by the control circuit Cont Logic, and the column address of 63 is stored in the column address buffer CadLat of the memory bank NV1BANK7 and is input to the column decoder Col Dec.

Then, with the column address of 64 being taken as a start address, data of eight bytes is read from the data buffer DataLat, and is transferred via the data control circuit Data Cont to the read data buffer RData Lat for storage. Then, the read data of eight bytes is transferred to the response queue circuit RsQo.

Next, an example of a write operation of the memory circuit Mem1 will be described. The Request queue RqQXI of the memory M1 stores an eight-byte data write instruction WT8, a bank address of 7, and a column address of 128, and the eight-byte data write instruction WT8 is transmitted from the command signal Command, the bank address of 7 and a column address of 127 are transmitted from an address signal Address, and eight-byte data is transmitted from a write data signal WData to the memory circuit Mem1.

The command decoder CmdDec decodes the eight-byte data write instruction WT8, the memory bank NV1BANK7 is selected by the control circuit Cont Logic, and the column address of 128 is stored in the column address buffer CadLat of the memory bank NV1BANK7 and is input to the column decoder Col Dec. Also, by the control circuit Cont Logic, the write data of eight bytes is stored into the write data buffer WData Lat.

Then, with the column address of 128 being taken as a start address, the data of eight bytes is transferred from the write data buffer WData Lat via the data control circuit Data Cont to the data buffer DataLat in the memory bank NV1BANK7 and is written in the memory array circuit NV1Bk7.

Since each of the memory banks NV1BANK0 to NV1BANK7 operates independently, a read operation and a write operation can be performed simultaneously between different banks, thereby achieving a higher speed.

<Description of Memory M2>

Figure 7:
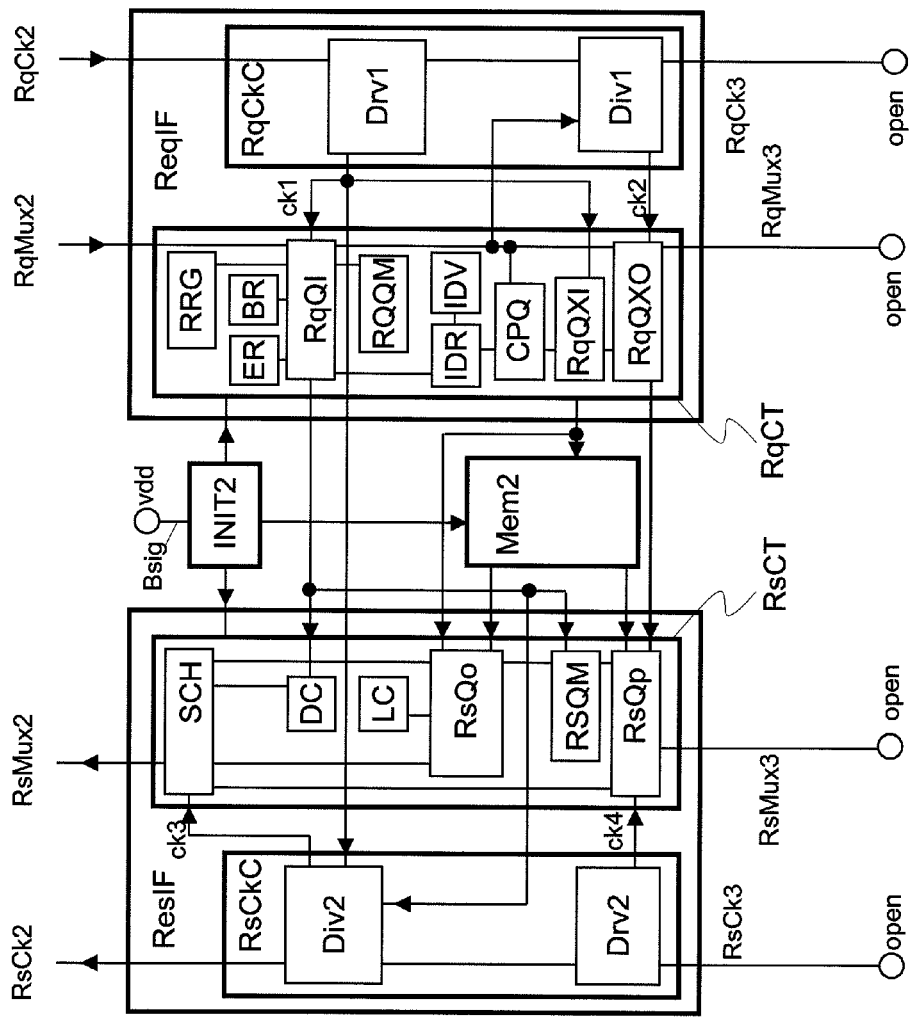
FIG. 7 is a diagram showing one example of a configuration of the memory.

FIG. 7 is an example of a configuration diagram of the memory M2. A difference from the memories M0 and M1 illustrated in FIGS. 3 and 5 is that the memory circuit Mem2 is a non-volatile memory and is a NAND flash memory using a NAND flash memory cell. The circuits configuring the memory M2 and their operations other than the memory circuit Mem2 and the initialization circuit INIT2 are equivalent to those of the memory M0 of FIG. 3 and the memory M1 of FIG. 5. That is, as the circuits other than the initialization circuits INIT, INT1, and INT2 and the memory circuits Mem0, Mem1, and Mem2, common circuits can be used among the memories M0 to M2.

<Memory Circuit Mem2>

Figure 8:
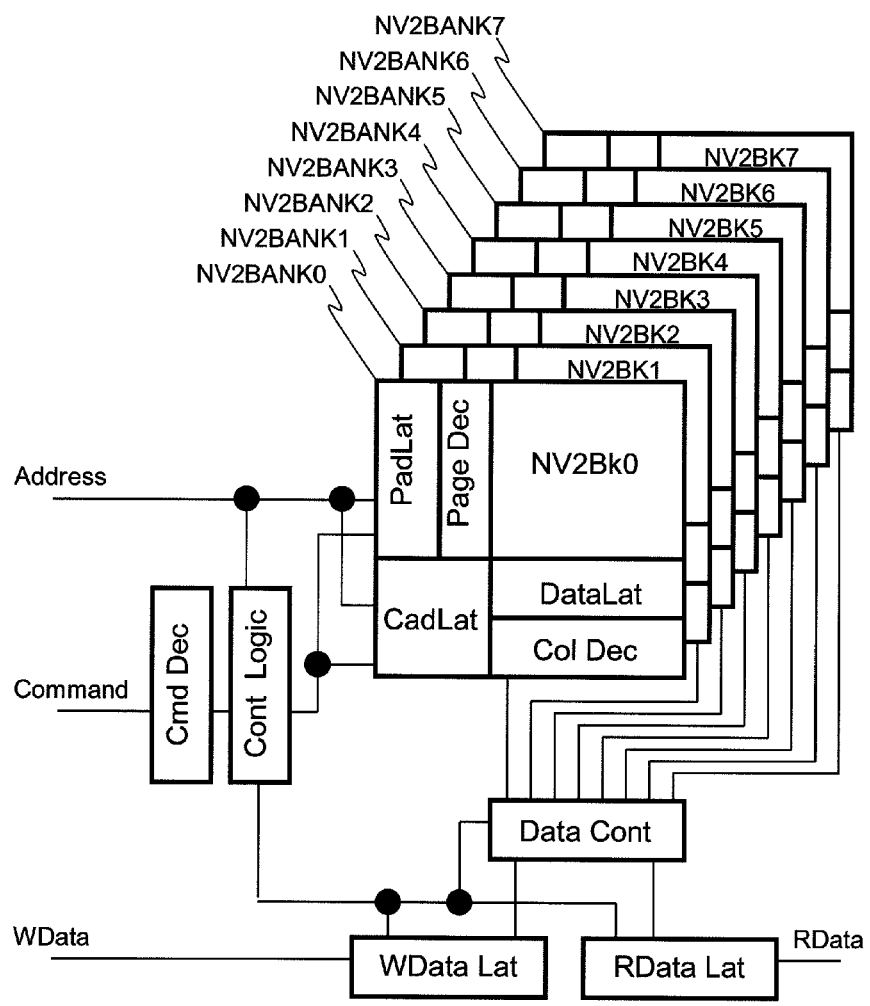
FIG. 8 is a diagram showing one example of a circuit block of the memory circuit mounted in the memory.

FIG. 8 is an example of a circuit block diagram of the memory circuit Mem2 mounted in the memory M2. The memory circuit Mem2 includes a command decoder Cmd Dec, a control circuit Cont Logic, a write data buffer WData Lat, a read data buffer RData Lat, a data control circuit Data Cont, and memory banks NV1BANK0 to NV1BANK7. Also, each of the memory banks NV1BANK0 to NV1BANK7 includes a page address buffer PadLat, a column address buffer CadLat, a page decoder PageDec, a column decoder Col Dec, a data buffer DataLat, and memory array circuits NV2Bk0 to NV2Bk7.

An example of a read operation of the memory circuit Mem2 is described. When a request ReqACID3SEQ15 including a bank active instruction AC, a bank address of 7 and a page address of 5 is stored in the request queue RqQXI of the memory M2, the bank active instruction AC is transmitted from a command signal Command and the bank address of 7 and the page address of 5 are transmitted from an address signal Address, to the memory circuit Mem2. In the command decoder CmdDec, the bank active instruction BA is decoded, the memory bank NV1BANK7 is selected by the control circuit Cont Logic, and the page address of 5 is stored in the page address buffer PadLat of the memory bank NV1BANK7 and is input to the page decoder Page Dec. Then, a memory cell connected to the page address of 5 in the memory array circuit NV1BANK7 is activated, and data of one kilobyte, although the data is not particularly limited thereto, is transferred to the data buffer DataLat.

Next, when an eight-byte data read instruction RD8, the bank address of 7, and a column address of 64 are stored in the request queue RqQXI of the memory M2, the eight-byte data read instruction RD8 is transmitted from the command signal Command and the bank address of 7 and a column address of 63 are transmitted from the address signal Address to the memory circuit Mem2. The command decoder Cmd Dec decodes the eight-byte data read instruction RD8, the memory bank NV1BK7 is selected by the control circuit Cont Logic, and the column address of 63 is stored in the column address buffer CadLat of the memory bank NV1BK7 and is input to the column decoder Col Dec.

Then, with the column address of 64 being taken as a start address, data of eight bytes is read from the data buffer DataLat, and is transferred via the data control circuit DataCont to the read data buffer RData Lat for storage. Then, the read data of eight bytes is transferred to the response queue circuit RsQo.

Next, an example of a write operation of the memory circuit Mem2 is described. The Request queue RqQXI of the memory M2 stores an eight-byte data write instruction WT8, a bank address of 7, and a column address of 128. The eight-byte data write instruction WT8 is transmitted from the command signal Command, the bank address of 7 and a column address of 127 are transmitted from the address signal Address, and eight-byte data is transmitted from a write data signal WData, to the memory circuit Mem2. The command decoder Cmd Dec decodes the eight-byte data write instruction WT8, the memory bank NV1BANK7 is selected by the control circuit Cont Logic, and the column address of 128 is stored in the column address buffer CadLat of the memory bank NV1BANK7 and is input to the column decoder Col Dec. Also, by the control circuit Cont Logic, the write data of eight bytes is stored into the write data buffer WData Lat.

Then, with the column address of 128 being taken as a start address, the data of eight bytes is transferred from the write data buffer WData Lat via the data control circuit Data Cont to the data buffer DataLat in the memory bank NV2BANK7 and is written in the memory array circuit NV2Bk7. Since each of the memory banks NV2BANK0 to NV2BANK7 operates independently, a read operation and a write operation can be performed simultaneously between different banks, thereby achieving a higher speed.

In the following, the operations of the data processing system will be described. First, the operations upon powering on and immediately after powering on will be described.

<Initial Sequence Upon Powering on>

Figure 9:
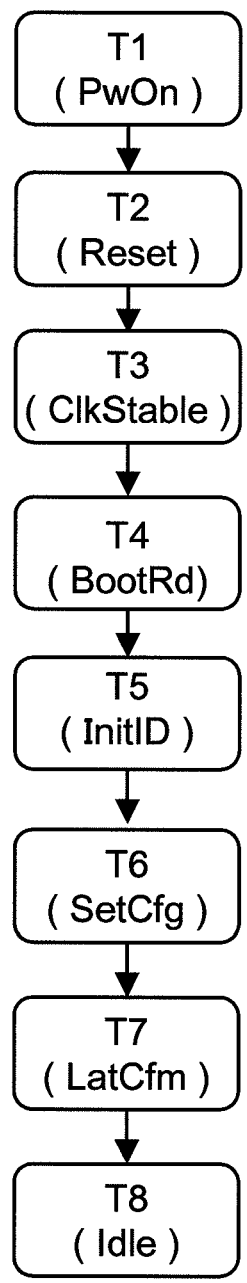
FIG. 9 is a diagram showing an example of an operation when powering on the data processing system to which the present invention is applied.

First, an example of an operation of the data processing system upon powering on will be described with reference to FIGS. 1 to 9. FIG. 9 illustrates an example of an initial sequence upon powering on of the data processing system. During a period T1 (PwON), the data processing device CPU_CHIP and the memories M0, M1, and M2 in the memory module MEM are powered on. During a period T2 (Reset), a reset is performed. Resetting methods may be, although not particularly limited to this, a method of automatically resetting in each built-in circuit, a method of performing a resetting operation by having a reset signal of a reset terminal provided outside, and a method of resetting by inputting a reset instruction from the data processing device CPU_CHIP via request signals RqMux0, RqMux1, and RqMux2 to the memories M0, M1, and M2.

During the reset period of T2 (Reset), the internal states of the data processing device CPU_CHIP and the memories M0, M1, and M2 are initialized. An example is shown below. The data processing device CPU_CHIP initializes all registers in the configuration circuit CONFIG. Also, 0 is set to the master number register MID0 included in the data processing circuit CPU0, 1 is set to the master number register MID1 included in the data processing circuit CPU1, 2 is set to the master number register MID2 included in the data processing circuit CPU2, and 3 is set to the master number register MID3 included in the data processing circuit CPU3.

Also, the data processing device CPU_CHIP initializes the memory maps managed by itself. Targets for setting include, although not particularly limited to this, a boot program area, a configuration area, a program area, a copy area, a work area, a data area, and an IO device area; and the boot program area and the program area are assigned to the memory M1, the copy area and the work area are assigned to the memory M0, the data area is assigned to the memory M2, and the configuration area is assigned to the configuration circuit CONFIG.

In the memory M0, its own initializing circuit INIT initializes its own request queue control circuit RqCT, response queue control circuit RqCt, request control circuit RqCkc, response clock control circuit RsCkC, clock frequency divider circuits Div1 and Div2, and memory circuit Mem0. In the memory M0, since the boot device identifying signal Bsig is connected to the power source vdd, it is identified that the memory M0 itself is not a boot device, and 0 is set to the boot device flag register BR. Next, initialization is performed so that the ID value included in the ID register IDR is set at 0 and the ID valid bit IDV is set at Low. Regarding response priorities of the response arbitration circuit included in the response queue control circuit RqCT, initialization is performed in a manner such that the response priority of the memory M0 is set at 1, the response priority of the memory M1 is set at 2, and the response priority of the memory M2 is set at 3. Initialization is performed in a manner such that a dividing ratio between the clock frequency divider circuits Div1 and Div2 is set at 1. Furthermore, as RgEn1, RsMux1, and RqCk1 are not being opened (open), the memory M1 recognizes that it is not a memory at the last end among the memories in series connection, and sets 0 to the end device flag register ER. Finally, the memory M0 initializes its own device code register DC at 0001 in hexadecimal notation.

In the memory M1, its own initializing circuit INIT initializes its own request queue control circuit RqCT, response queue control circuit RqCT, request control circuit RqCkc, response clock control circuit RsCkC, clock frequency dividing circuits Div1 and Div2, and memory circuit Mem1. In the memory M1, since the boot device identifying signal Bsig is connected to the power supply, it is recognized that the memory M1 itself is a boot device, and 1 is set to the boot device flag register BR. Furthermore, a boot device ID value of 2 retained in its own memory circuit Mem1 is set to the ID register IDR, and the ID valid bit IDV is set at High. Next, regarding response priorities of the response arbitration circuit included in the response queue control circuit RqCT of the memory M1, the response priority of the memory M1 is set at 1, and the response priority of the memory M2 is set at 2. A dividing ratio between the clock frequency divider circuits Div1 and Div2 is set at 1.

Furthermore, as RgEn2, RsMux2, and RqCk2 are not being opened (open), the memory M2 recognizes that it is not a memory at the last end among the memories in series connection, and sets 0 to the end device flag register ER. Finally, the memory M1 initializes its own device code register DC at 0010 in hexadecimal notation.

In the memory M2, its own initializing circuit INIT initializes its own request queue control circuit RqCT, response queue control circuit RqCT, request control circuit RqCkc, response clock control circuit RsCkC, clock frequency dividing circuits Div1 and Div2, and memory circuit Mem2. In the memory M2, since the boot device identifying signal Bsig is connected to the power supply, it is recognized that the memory M2 itself is not a boot device, and 0 is set to the boot device flag register BR. Furthermore, initialization is performed so that the ID value included in the ID register IDR is set at 0 and the ID valid bit IDV is set at Low. Regarding response priorities of the response arbitration circuit included in the response queue control circuit RqCT of the memory M2, initialization is performed in a manner such that the response priority of the memory M2 is set at 1. A dividing ratio between the clock frequency divider circuits Div1 and Div2 is set at 1. Furthermore, as RgEn3, RsMux3, and RqCk3 are being opened (open), the memory M2 recognizes that it is a memory at the last end among the memories in series connection, and sets 1 to the end device flag register ER. Finally, the memory M2 initializes its own device code register M2CREG at 0100 in hexadecimal notation.

During a period T3 (ClkStable) after the reset period of T2 (Reset) ends, a signal connection is checked over the data processing device CPU_CHIP and the memories M0, M1, and M2. First, from the data processing device CPU_CHIP, a request clock RqCk0 is input to the memory M0, and is output by way of the clock driver Drv1 of the memory M0 to the clock frequency divider circuit Div1 and to the clock frequency divider circuit Div2 as a clock signal ck1. The clock input to the clock frequency divider circuit Div1 is output from the clock signal ck2 by way of the request clock RqCk1 to the memory M1. Also, the clock input to the clock frequency divider circuit Div2 of the memory M0 is output from the clock signal ck3, and is also output by way of a response clock RsCk0 to the data processing device CPU_CHIP.

In the memory M1, a request clock RqCk1 is input from the memory M0, and is output by way of the clock driver Drv1 of the memory M1 to the clock frequency divider circuit Div1 and to the clock frequency divider circuit Div2 as a clock signal ck1. The clock input to the clock frequency divider circuit Div1 is output from the clock signal ck2 by way of the request clock RqCk2 to the memory M2. Also, the clock input to the clock frequency divider circuit Div2 of the memory M2 is output from the clock signal ck3, and is also output by way of a response clock RsCk1 to the memory M0. The clock input to the clock driver Drv2 of the memory M0 by way of the response clock RsCk1 is output to the clock signal ck4.

In the memory M2, a request clock RqCk2 is input from the memory M1, and is output by way of the clock driver Drv1 of the memory M2 to the clock frequency divider circuit Div1 and to the clock frequency divider circuit Div2 as a clock signal ck1. The clock input to the clock frequency divider circuit Div1 is output from the clock signal ck2 by way of the request clock RqCk3 to the memory M2. Also, the clock input to the clock frequency divider circuit Div2 of the memory M2 is output from the clock signal ck3, and is also output by way of a response clock RsCk2 to the memory M1. The clock input to the clock driver Drv2 of the memory M1 by way of the response clock RsCk2 is output to the clock signal ck4.

During a period T4 (BootRd) after the period T3 ends, the data processing device CPU_CHIP reads a boot program stored in the memory M1. The boot program includes a device code of each memory, a program BTP0 for booting the data processing device CPU_CHIP, a program for assigning an identification number ID to each memory, a program for setting values to various registers in the configuration circuit, and values to be set to these registers.

An example of an operation of reading the boot program will be described below. First, the data processing device CPU_CHIP reads and checks the identification number ID value of the memory that retains the boot program. To check the value of the identification number ID value of the memory that retains the boot program, the data processing circuit CPU0 in the data processing device CPU_CHIP synchronizes a request RqBRDID0SEQ0 with a clock signal RqCK0, the request being multiplexed with an identification number ID value of 0, a request number ReqN value of 0, a master number MID value of 0, a request length, and a boot device identification number read instruction BRD, and then transfers the request to the memory M0.

The memory M0 stores the request RqBRDID0SEQ0 from the data processing device CPU_CHIP in its own request queue control circuit RqCT. With the boot device identification number read instruction BRD included in the request RqBRDID0SEQ0, the memory M0 checks the value of its own boot device flag register BR. Since the value of the boot device flag register BR indicates 0, the memory M0 is not a boot device. Then, the memory M0 transfers the request RqBRDID0SEQ0 by way of the request signal RqMux1 to the memory M1.

The memory M1 stores the request RqBRDID0SEQ0 from the memory M0 in its own request queue control circuit RqCT. With the boot device identification number read instruction BRD included in the request RqBRDID0SEQ0, the memory M1 checks the value of its own boot device flag register BR. Since the value of the boot device flag register BR indicates 1, the memory M1 is a boot device. Then, the memory M1 reads its own ID register IDR value of 2, and transmits a response RsBRDID2SEQ0 to the response queue control circuit RsCT, the request including a response start flag, an identification number ID value of 2 (a value equal to the ID register value of 2), the boot device identification number read instruction BRD, a master number MID value of 0, a request length, and a response number ResN value of 0 (a value equal to the request number ReqN value of 0).

Next, the response queue control circuit RsCT of the memory M1 outputs the response RsBRDID2SEQ0 by way of the response signal RsMux1 to the memory M0. The memory M0 receives the response RsBRDID2SEQ0, and outputs the response to the data processing device CPU_CHIP. The data processing device CPU_CHIP receives the response RsBRDID2SEQ0 and, based on the identification number ID value of 2 and the boot device identification number read instruction BRD included in the response RsBRDID2SEQ0, confirms that the identification number ID value of the memory that retains the boot program is 2.

Next, the data processing circuit CPU0 in the data processing device CPU_CHIP reads the boot program from the memory with the identification number ID value of 2. First, by way of the request signal RqMux0, a request RqACID2SEQ1 being multiplexed with a request start flag, an identification number ID value of 2, a request number ReqN value of 1, a master number MID value of 0, a request length, a bank active instruction BA, a bank address BK0, and a page address Page0 is synchronized with the clock signal RqCK0, and is then transferred to the memory M0.

Subsequently, by way of the request signal RqMux0, a request RqRD32ID2SEQ2 being multiplexed with a request start flag, an identification number ID value of 2, a request number ReqN value of 2, a master number MID value of 0, a request length, a 32-byte read instruction RD32, a bank address BK0, and a column address Col is synchronized with the clock signal RqCK0, and is then transferred to the memory M0.

The memory M0 sequentially stores the requests RqACID2SEQ1 and RqRD32ID2SEQ2 from the data processing device CPU_CHIP in its own request queue control circuit RqCT. Since its own ID valid bit indicates Low, the memory M0 determines that the requests RqACID2SEQ1 and RqRD32ID2SEQ2 are not directed to itself, and then sequentially transfers these requests by way of the request signal RqMux1 to the memory M1.

The memory M1 stores the requests RqACID2SEQ1 and RqRD32ID2SEQ2 from the memory M0 in its own request queue control circuit RqCT. The request queue control circuit RqCT of the memory M1 compares the ID value of 2 included in the request RqACID2SEQ1 and its own ID register value of 2. Since these values match, the request queue control circuit RqCT transmits a request ReqBA1 to the memory circuit Mem1. In the memory circuit Mem1, one page (1 Kbyte, although it is not particularly limited thereto) of the boot program specified with the bank active instruction BA, the bank address BK0, the page address Page0 in the request RqACID2SEQ1 is transferred to the data buffer DataLat.

The request queue control circuit RqCT of the memory M1 compares the ID value of 2 included in the request RqRD32ID2SEQ2 and its own ID register value of 2. Since these values match, the request queue control circuit RqCT transmits the request RqRD32ID2SEQ2 to the memory Mem1. From the memory circuit Mem1 of the memory M1, the boot program in the data buffer DataLat is read based on the read instruction RD32, the bank address BK0, and the column address Col included in the request RqRD32ID2SEQ2, and a response RsRDID2SEQ2 including this read boot program, a response start flag, the identification number ID value of 2, the read instruction RD32, the master number MID0, the request length, and the response number ResN value of 2 is transferred to the response queue control circuit RsCT. The response queue control circuit RsCT of the memory M1 outputs a response RsRD32ID2SEQ2 by way of the response signal RsMux0 to the memory M0. The memory M0 receives the response RsRD32ID2SEQ2 for output to the data processing device CPU_CHIP.

The data processing device CPU_CHIP stores the RsRD32ID2SEQ2 in the response queue RsQ. Based on the ID value of 2 and the read instruction RD32 included in the response RsRD32ID2SEQ2, it can be known that the boot program has been transmitted from the memory M1.

During a period T5 (InitID) after the period T4 ends, the data processing device CPU_CHIP boots itself with the boot program, next assigns an ID number to each of the memories M0, M1, and M2, and next assigns a memory map to the memory module MEM.

First, an example of an operation of the data processing device CPU_CHIP providing an identification number ID to each memory according to the boot program will be described. By way of the request signal RqMux0, the data processing device CPU_CHIP transfers a request RqSETID1SEQ3 to the memory M0, the request including and being multiplexed with a request start flag, an identification number ID value of 1, a request number ReqN value of 3, a master number MID value of 0, a request length, and an ID setting instruction SETID.

In the memory M0, since the ID valid bit IDV indicates Low, provision of an identification number ID is not yet started. Thus, the memory M0 sets an identification number ID value of 1 to the ID register IDR based on the identification number ID value of 1 and the ID setting instruction SETID, and sets the ID valid bit IDV at High. Having the ID valid bit ID being set at High indicates that provision of an identification number ID has been completed. Upon completion of the provision of an identification number ID to itself, the memory M0 confirms that the end device flag register ER value indicates 0, and outputs a response RsSETID1SEQ3 by way of the response signal RsMux0 to the data processing device CPU_CHIP, the response being multiplexed with a response start flag, an identification number ID value of 1 of the memory M0, an ID setting instruction SETID, a data processing device CPU_CHIP, a master number MID value of 0, a request length, a response number ResN value of 3, a device code register DC value (0001 in hexadecimal notation), a boot device flag register BR value of 0, an end device flag register ER value of 0, and data of completion of ID number provision.

The data processing device CPU_CHIP receives the response RsSETID1SEQ3 and, from the ID value of 1 of the memory M0, the ID setting instruction SETID, the device code register DC value (0001 in hexadecimal notation), and the data of completion of ID number provision included in this response RsSETID1SEQ3, finds that provision of an identification number ID to the memory M0 has been completed. Also, from the fact that the boot device flag register BR value included in the response RsSETID1SEQ3 indicates 0, the data processing device CPU_CHIP finds that the memory M0 is not a boot device and, from the fact that the end device flag register ER value indicates 0, the data processing device CPU_CHIP finds that the memory M0 is not the last end memory. Furthermore, the data processing device CPU_CHIP sets, to the connection register CNNREG of the configuration circuit CONFIG, the identification number ID value of 1 and the device code register DC value (0001 in hexadecimal notation) of the memory M0, the boot device data BOOTDEV value of 0, and the end device register END-FLAG value of 0.

Next, by way of the request signal RqMux0, the data processing device CPU_CHIP transfers a request RqSETID2SEQ4 to the memory M0, the request including and being multiplexed with a request start flag, an identification number ID value of 2, a request number ReqN value of 4, a master number MID value of 0, a request length, and an ID setting instruction SETID. The memory M0 compares the identification number ID value of 1 retained in its own ID register IDR and the identification number ID number value of 2 included in the request RqSETID2SEQ4; and, since these ID number values do not match, the memory M0 transfers the request RqSETID2SEQ4 to the memory M1. Since the ID valid bit IDV indicates High, the memory M1 compares the identification number ID value of 2 retained in its own ID register IDR and the identification number ID value of 2 included in the request RqSETID2SEQ4. Since these ID number values match, the memory M1 outputs a response RsSETID2SEQ4 to the memory M0 by way of the response signal RsMux1, the request being multiplexed with a response start flag, an identification number ID value of 2 of the memory M1, a master number MID value of 0, a request length, a response number ResN value of 4, a device code register DC value (0010 in hexadecimal notation), a boot device flag register BR value of 1, an end device flag register ER value of 0, and data of completion of ID number provision. The memory M0 transfers the response RsSETID2SEQ4 by way of the response signal RsMux0 to the data processing device CPU_CHIP.

The data processing device CPU_CHIP receives the response RsSETID2SEQ4 and, based on the identification number ID value of 2 of the memory M1, the ID setting instruction SETID, the device code register DC value (0010 in hexadecimal notation), and the ID number provision-completed data included in this response RsSETID2SEQ4, finds that provision of an identification number ID to the memory M1 has been completed. Also, based on the fact that the boot device flag register BR value included in the response RsSETID2SEQ4 indicates 1, the data processing device CPU_CHIP finds that the memory M1 is a boot device and, based on the fact that the end device flag register ER value indicates 0, finds that the memory M1 is not the last end memory. Furthermore, the data processing device CPU_CHIP sets, to the connection register CNNREG of the configuration circuit CONFIG, the identification number ID value of 2 and the device code register M1CREG value (0010 in hexadecimal notation) of the memory M1, the boot device data BOOTDEV value of 1, and the end device register END-FLAG value of 0.

Next, by way of the request signal RqMux0, the data processing device CPU_CHIP transfers a request RqSETID3SEQ5 to the memory M0, the request including and being multiplexed with a request start flag, an identification number ID value of 3, a request number ReqN value of 5, a master number MID value of 0, a request length, and an ID setting instruction SETID. The memory M0 compares the identification number ID value of 1 retained in its own ID register IDR and the identification number ID number value of 3 included in the request RqSETID3SEQ5. Since these values do not match, the memory M0 transfers the request RqSETID3SEQ5 to the memory M1. The memory M1 compares the identification number ID value of 2 retained in its own ID register IDR and the identification number ID value of 3 included in the request RqSETID3SEQ5. Since these values do not match, the memory M1 transfers the request RqSETID3SEQ5 to the memory M2. In the memory M2, since the ID valid bit IDV indicates Low, an identification number ID is not yet provided. Thus, the memory M2 sets an ID number of 3 to the ID register IDR of the memory M2 based on the identification number ID value of 3 and the ID setting instruction SETID included in the request RqSETID3SE5, so that the ID valid bit IDR is set at High.

Upon completion of the provision of an identification number ID to itself, the memory M2 confirms that the end device flag register ER value indicates 1, the memory M2 outputs a response RsSETID3SEQ5 to the memory M1 by way of the response signal RqMux2, the response being multiplexed with a response start flag, an identification number ID value of 3 of the memory M2, a master number MID value of 0, a request length, a response number ResN value of 5, a device code register DC value (0100 in hexadecimal notation), a boot device flag register BR value of 0, an end device flag register ER value of 1, and identification number ID provision-completed data. The memory M1 receives the response RsSETID3SEQ5, and outputs the response RsSETID3SEQ4 to the memory M0 by way of the response signal RsMux1. The memory M0 receives the response RsSETID3SEQ5, and transfers the response RsSETID3SEQ5 by way of the response signal RsMux0 to the data processing device CPU_CHIP.

The data processing device CPU_CHIP receives the response RsSETID3SEQ5, receives the ID value of 3 of the memory M2, the ID setting instruction SETID, the device code register DC value (0100 in hexadecimal notation), the end device flag register ER value of 1, and the data of completion of ID number provision included in this response RsSETID3SEQ5, and finds that the provision of an identification number ID to the memory M2 has been completed. Furthermore, based on the fact that the boot device flag register BR value indicates 0, the data processing device CPU_CHIP finds that the memory M2 is not a boot device and, upon receiving the end device flag register ER value of 1, finds that the memory M2 is a memory device at the last end. Still further, the data processing device CPU_CHIP sets, to the connection register CNNREG of the configuration circuit CONFIG, the identification number ID value of 3 and the device code register DC value (0100 in hexadecimal notation) of the memory M2, the boot device data BOOTDEV value of 0, and the end device register ENDFLAG value of 1. Finally, according to the boot program, a memory map is assigned to the memory module MEM.

During a period T6 (SetCfg) after the period T5 ends, the data processing device CPU_CHIP sets values to various registers in the configuration circuit CONFIG of the memory control circuit DCMC according to the boot program. In the queue register QREG, the numbers of request queues REQQ1, REQQ2, and response queues RESQ1 of the memory control circuit DCMC are set. Furthermore, in the queue register QREG, the number of queues in the request queue circuit RqQI, the number of queues in the request queue circuit RqQXI, the number of queues in the request queue circuit RqQXO, the number of queues in the response queue circuit RsQo, and the number of queues in the response queue circuit RsQp, and others of each memory are set. In the latency domain register LTDREG, ID value data and others of the memory whose latency is managed by the data processing device CPU_CHIP are set. In the timing register M0TREG regarding the memory M0, timing data between requests for operating the memory M0 and others are set. In the timing register M1TREG regarding the memory M1, timing data between requests for operating the memory M1 and others are set. In the timing register M2TREG regarding the memory M2, timing data between requests for operating the memory M2 and others are set. In the operation mode register OMDREG, which mode, a bank open mode or a bank close mode, the memories M0, M1, and M2 are operated in is set.

During a period T7 (LatCfm) after the period T6 ends, the data processing device CPU_CHIP checks read latency of the memories M0, M1, and M2 according to the boot program. An example of an operation will be described below. First, a latency check operation of the memory M0 will be described. By way of the request signal RqMux0, the data processing device CPU_CHIP transfers a request ReqLatm1 to the memory M0, the request including and being multiplexed with a request start flag, an ID value of 1, a request number value of 0, a master number of 0, a request length, and a latency check instruction. Simultaneously, when this request ReqLatm1 is issued, the latency adjustment circuit LCHCK starts measuring latency.

The memory M0 compares its own ID number of 1 and the ID number of 1 included in the request ReqLatm1. Since these values match, the memory M0 outputs a response RsLATID1SEQ5 by way of the response signal RsMux1, the response being multiplexed with a response start flag, the ID value of 1 of the memory M0, a response number of 0, the master number of 0, a response length, and a latency measurement code LC value (1001 in hexadecimal notation).

The response input circuit RSIN of the data processing device CPU_CHIP receives the response RsLATID1SEQ5, and transmits to the latency adjustment circuit LCHCK the ID value of 1 of the memory M0, the response number of 0, the master number of 0, and the latency measurement code (1001 in hexadecimal notation) included in this response RsLATID1SEQ5. Then, the latency adjustment circuit LCHCK completes measurement of latency, and establishes an actually-measured latency value Latm1. Next, the latency adjustment circuit LCHCK finds a difference LatDiff between this actually-measured latency value Latm1 and a latency value Latexp1 of the memory M0 set in the latency register LTREG. When this difference LatDiff indicates 0, a latency value Latexp1 is not updated, and when this difference LatDiff does not indicate 0, the latency value of the memory M0 set in the latency register LTREG is updated to the actually-measured latency value Latm1. A latency check operation of the memories M1 and M2 are performed in the same manner as the latency check operation of the memory M0 described above.

During a period T8 (Idle) onward after the period T7 ends, the memory module MEM is in an idle state, being in a state of waiting for a request from the data processing device CPU_CHIP. In this manner, by performing an operation of checking the series connection immediately after powering on, it is possible to confirm that the memories are reliably connected to each other. Furthermore, by explicitly specifying a boot device and automatically providing an identification number ID to each memory, it is possible to easily connect memories as many as required and to enhance the memory capacity. Furthermore, by actually measuring each memory and updating the latency register LTREG with this actually-measured latency value, the data processing device CPU_CHIP can perform control by using correct latency and achieve low latency and a high-speed data transfer.

<Register Setting: Connection Register CNNREG>

FIG. 10 depicts an example of setting values to the connection register CNNREG set in an initial sequence upon powering on. In the connection register CNNREG, a connection order number CNCT NO, a valid signal VALID, identification numbers ID of the data processing device CPU_CHIP and each memory, a device code DEV CODE, a boot device data BOOTDEV, and a last end memory device data ENDFLAG are set, although the case is not particularly limited thereto. When the valid signal VALID indicates 1, the device code DEV CODE, the boot device data BOOTDEV, and the last end memory device data ENDFLAG are valid. When the signal indicates 0, they are invalid. The connection order number CNCT NO can have 0 to 8 and, the larger the number is, the farther the connection position with respect to the data processing device CPU_CHIP is. The device code DEV CODE indicates a number unique to the device. Also, an identification number ID value corresponding to boot device data BOOTDEV of 1 is an identification number ID value of the memory storing the boot program. Also, an ID value corresponding to last end memory device data ENDFLAG of 1 is an identification number ID value of the memory at the last end. In a connection number CNCT NO of 0, an identification number ID value of 0 and a device code DEV CODE value 0001_0000 (in hexadecimal notation) of the data processing device CPU_CHIP, and a boot device data BOOTDEV value of 0 and the last end memory device data ENDFLAG value of 0 are registered. Also, in a connection number CNCT NO of 1, an identification number ID value of 1 and a device code DEV CODE value 0000_0001 (in hexadecimal notation) of the memory M0, and a boot device data BOOTDEV value of 0 and the last end memory device data ENDFLAG value of 0 are registered. Furthermore, in a connection number CNCT NO of 2, an identification number ID value of 2 and a device code DEV CODE value 0000_0010 (in hexadecimal notation) of the memory M1, and a boot device data BOOTDEV value of 1 and the last end memory device data ENDFLAG value of 0 are registered. Still further, in a connection number CNCT NO of 3, an identification number ID value of 3 and a device code DEV CODE value 0000_0100 (in hexadecimal notation) of the memory M2, and a boot device data BOOTDEV value of 0 and the last end memory device data ENDFLAG value of 1 are registered. This means that, as a connection mode, a series connection is made in a sequence in which the memory M0 is connected next to the data processing device CPU_CHIP, the memory M1 is connected next to the memory M0, and the memory M2 is connected next to the memory M1. Also, this means that the identification number ID value of the data processing device CPU_CHIP is set at 0, the identification number ID value of the memory M0 is set at 1, the identification number ID value of the memory M1 is set at 2, and the identification number ID value of the memory M2 is set at 3. In this manner, by using the connection register CNNREG, the data processing device CPU_CHIP can manage which memory corresponds to which identification number and in which order the memories are connected, and thus reliability of the data processing system of the present invention can be maintained and also, in the data processing system of the present invention, if an error occurs, a process of recovering from the error can be quickly performed. Moreover, not only in an initial sequence upon powering on but also upon connection of a new removable memory card, storage device, or others, the data processing device CPU_CHIP can set a new ID to update the connection register CNNREG.

<Register Setting: Queue Register QREG>

FIGS. 11 and 12 illustrate an example of setting values to the queue register QREG set in the initial sequence upon powering on. In the queue register QREG, a response queue register ResQREG and a request queue register ReqQREG are present, although the case is not particularly limited thereto, and, in each register, the numbers of request queues and response queues included in the data processing device CPU_CHIP and each memory corresponding to the identification numbers ID of the data processing device CPU_CHIP and each memory are retained. FIG. 11 illustrates an example of setting values to the response queue register ResQREG. FIG. 12 illustrates an example of setting values of the request queue register ReqQREG.

As request queues of each of the memories M0, M1, and M2, there are a request queue RqQI for receiving a request from the data processing device CPU_CHIP or any of the memories at the previous stage, an inner request queue RqQXI required for performing its own inner operation, and an external request queue RqQXO required for transmitting a request received by itself to a memory at the following stage. Also, as response queues of each of the memories M0, M1, and M2, there are an inner response queue RsQo required for receiving a response with respect to its own inner operation and an outer response queue RsQp required for receiving a response from any of the memories.

The data processing device CPU_CHIP has a request queue REQQ2 for transmitting a request to any of the memories M0, M1, and M2 and a response queue RESQ1 for receiving a response from any of the memories M0, M1, and M2. First, the response queue register ResQREG will be described. The response queue register ResQREG has, although not particularly limited to this, identification number ID values of 0 to 8. When the valid signal VALID indicates 1, the number of response queues RsQo and the number of response queues RsQp corresponding to the identification number ID value are valid. When the signal indicates 0, they are invalid. An identification number ID value of 0 indicates the identification number of the data processing device CPU_CHIP, an identification number ID value of 1 indicates the identification number of the memory M0, an identification number ID value of 2 indicates the identification number of the memory M1, and an identification number ID value of 3 indicates the identification number of the memory M2. In the present embodiment, the response queue RESQ1 of the data processing device CPU_CHIP is set at 24. The number of response queues RsQo of the memory M0 is set at 8, and the number of response queues RsQp thereof is set at 16. The number of response queues RsQo of the memory M1 is set at 8, and the number of response queues RsQp thereof is set at 8. The number of response queues RsQo of the memory M2 is set at 8, and the number of response queues RsQp thereof is set at 8.

Next, the request queue register ReqQREG will be described. In the present embodiment, the request queue register ReqQREG has identification number ID values of 0 to 8. When the valid signal VALID indicates 1, the number of request queues RqQI, the number of request queues RqQXI, and the number of request queues RqQXO corresponding to the identification number ID value are valid, and, when the signal indicates 0, they are invalid. An identification number ID value of 0 indicates the identification number of the data processing device CPU_CHIP, an identification number ID value of 1 indicates the identification number of the memory M0, an identification number ID value of 2 indicates the identification number of the memory M1, and an identification number ID value of 3 indicates the identification number of the memory M2. The number of request queues REQQ2 of the data processing device CPU_CHIP is set at 12. The number of request queues RqQI of the memory M0 is set at 12, the number of request queues RqQXI of the memory M0 is set at 4, and the number of request queues RqQXO of the memory M0 is set at 8. The number of request queues RqQI of the memory M1 is set at 8, the number of request queues RqQXI of the memory M1 is set at 4, and the number of request queues RqQXO of the memory M1 is set at 4. The number of request queues RqQI of the memory M2 is set at 4, the number of request queues RqQXI the memory M2 is set at 4, and the number of request queues RqQXO the memory M2 is set at 4. Also, based on the structure of the memory module MEM, the data processing device CPU_CHIP can update the response queue register ResQREG and the request queue register ReqQREG to optimum values.

The data processing device CPU_CHIP can update the response queue register ResQREG and the request queue register ReqQREG. By using the response queue register ResQREG and the request queue register ReqQREG, the data processing device CPU_CHIP manages the number of request queues REQQ2 and the number of response queues RESQ1 provided to the data processing device CPU_CHIP itself, and manages the number of request queues RqQI, the number of request queues RqQXI, the number of request queues RqQXO, the number of response queues RsQo, and the number of response queues RsQp included in each memory. In order to allow these queues to be optimally used, each memory is controlled to achieve a high-speed and low-latency data transfer. Note that a method of using these queues and each memory control will be described later. Also, not only in an initial sequence upon powering on but also upon connection of a new memory device, memory card, storage device, or others, the data processing device CPU_CHIP can set the new number of request queues or response queues described above with respect to a new identification number ID, and can update the response queue register ResQREG and the request queue register ReqQREG. Moreover, the number of request queues and the number of response queues described above are preferably determined so as to ensure the performance of the data processing system of the present invention.

<Register Setting: Latency Domain Register LTDREG>

FIG. 13 shows an example of setting values to the set latency domain register LTDREG in an initial sequence upon powering on. In the latency domain register LTDREG, a valid signal VALID, a master flag MFLAG corresponding to the data processing device CPU_CHIP or each of the memories, and latency domain data LAT DMN are set, although the case is not particularly limited thereto. When the valid signal VALID indicates 1, the master flag MFLAG and the latency domain data LAT DMN corresponding to the identification number ID value are valid, and, when the signal indicates 0, they are invalid. When the master flag MFLAG indicates 1, the corresponding device, such as the data processing device CPU_CHIP or any of the memories, is a master device, and, when the master flag MFLAG indicates 0, the device corresponding to the identification number ID is a slave device. In the latency domain data LAT DMN, the identification number ID value of the master device is set, indicating which master device controls which slave device to manage latency. In the present embodiment, the latency domain register LTDREG has identification number ID values of 0 to 8. An identification number ID value of 0 indicates the identification number of the data processing device CPU_CHIP, with the master flag MFLAG value being set at 1 and the latency domain data LAT DMN value being set at 0. An identification number ID value of 1 indicates the identification number of the memory M0, with the master flag MFLAG value being set at 0 and the latency domain data LAT DMN value being set at 0. An identification number ID value of 2 indicates the identification number of the memory M1, with the master flag MFLAG value being set at 0 and the latency domain data LAT DMN value being set at 0. An identification number ID value of 3 indicates the identification number of the memory M2, with the master flag MFLAG being set at 0 and the latency domain data LAT DMN value being set at 0.

According to the latency domain register LTDREG, it can be found that the data processing device CPU_CHIP becomes a master device, controls the memories M0, M1, and M2 as slave devices, and manages latency. In this manner, in the latency domain register LTDREG, a master device and slave devices to be controlled by the master device can be specified, and therefore, even when a plurality of master devices, such as data processing devices CPU_CHIP, are connected in series to slave devices, such as the memories M0, M1, and M2, it is possible to appropriately control the slave devices and manage latency. Also, not only in an initial sequence upon powering on but also upon connection of a new memory, memory card, storage device, such as SSD (Solid State Drive) and HDD (Hard Disk Drive), or others, the data processing device CPU_CHIP can set a new ID, and can update the latency domain register LTDREG.

<Register Setting: Latency Register LTREG>

FIG. 14 shows an example of setting values to the set latency register LTREG in an initial sequence upon powering on. In the latency register LTREG, a valid signal Valid, a latency LatQue, a latency LatBank, an allowable latency LatRange, and a timeout latency LatTimeOut corresponding to the identification numbers ID of the data processing device CPU_CHIP and each of the memories, are set. When the valid signal Valid indicates 1, the latency LatQue, the latency LatBank, the allowable latency LatRange, and the timeout latency LatTimeOut corresponding to the identification number ID are valid, and, when the signal indicates 0, they are invalid. The latency LatQue indicates a read latency from the time when data is directly read from the response queue RsQo in a memory upon a read request from the data processing device CPU_CHIP to the time when the read data reaches the data processing device CPU_CHIP. Also, the latency LatBank indicates a read latency from the time when data is read from the memory bank of a memory upon a read request from the data processing device CPU_CHIP to the time when the read data reaches the data processing device CPU_CHIP. Furthermore, the allowable latency LatRange indicates an allowable value of a difference between the latency LatQue or the latency LatBank and a read latency LatMrs actually measured by the latency adjustment circuit LCHCK. When the read data upon the read request from the data processing device CPU_CHIP is not input in the data processing device CPU_CHIP and the time exceeds the timeout latency LatTimeOut, the latency adjustment circuit LCHCK determines as timeout. An identification number ID value of 0 indicates the identification number of the data processing device CPU_CHIP. As a master device, the data processing device CPU_CHIP controls each memory; and therefore, the latency LatQue value is set at 0, the latency LatBank value is set at 0,  the allowable latency LatRange value is set at 0, and the timeout latency LatTimeOut value is set at 0. An identification number ID value of 1 indicates the identification number of the memory M0. In the present embodiment, the latency LatQue value is set at 6, the latency LatBank value is set at 8, the allowable latency LatRange value is set at 1, and the timeout latency LatTimeOut value is set at 60. An identification number ID value of 2 indicates the identification number of the memory M1, and, in the present embodiment, the latency LatQue value is set at 10, the latency LatBank value is set at 12, the allowable latency LatRange value is set at 1, and the timeout latency LatTimeOut value is set at 100. An identification number ID value of 3 indicates the identification number of the memory M2. In the present embodiment, the latency LatQue value is set at 14, the latency LatBank value is set at 16, the allowable latency LatRange value is set at 1, and the timeout latency LatTimeOut value is set at 140.

The data processing device CPU_CHIP actually measures latency of each memory by the latency adjustment circuit LCHCK, and compares this actually-measured latency LatMrs and the latency LatQue, the latency LatBank, the allowable latency LatRange, and the timeout latency LatTimeOut set in the latency register LTREG. Furthermore, by using these comparison results, each memory is controlled, thereby achieving a low-latency and high-speed data transfer. Also, not only in an initial sequence upon powering on but also upon connection of a new memory device, memory card, storage device, or others, the data processing device CPU_CHIP can set the above-described latency LatQue, latency LatBank, allowable latency LatRange, and timeout latency LatTimeOut for the new ID, and can update the latency register LTREG. Moreover, not only in an initial sequence upon powering on but also upon connection of a new memory, memory card, storage device, such as SSD (Solid State Drive) and HDD (Hard Disk Drive), or others, the data processing device CPU_CHIP can set a new ID, and further can newly measure a latency and set the measurement value to the latency register LTREG for updating.

<Register Setting: Timing Register M0TREG>

FIG. 15 depicts an example of setting values to the timing register M0TREG regarding the memory M0 being set in an initial sequence upon powering on. In the timing register M0TREG, timing data for the data processing device CPU_CHIP to control the memory M0 and a valid signal Valid are set. When the valid signal Valid indicates 1, the timing data for controlling the memory M0 is valid, and, when the signal indicates 0, the timing data is invalid. In the timing register M0TREG, tm0RCD (a minimum time interval between a bank active instruction and a read and write instructions), tm0RC (a minimum time interval between a bank active instruction and a read and write instruction in the same bank), tm0RRD (a minimum time interval between bank active instructions in different banks), tm0RAS (a minimum time interval between a bank active instruction and a pre-charge instruction in the same bank), tm0RP (a minimum time interval between a bank active instruction and a pre-charge instruction in the same bank), tm0RFC (refresh cycle minimum time), and others are set. Each minimum time interval is represented as the number of clock cycles of an operating clock of the data processing device CPU_CHIP. 8 in clock cycles is set to tm0RCD, 30 in clock cycles is set to tm0RC, 4 in clock cycles is set to tm0RRD, 22 in clock cycles is set to tm0RAS, 8 in clock cycles is set to tm0RP, and 60 in clock cycles is set to tm0RFC.

<Register Setting: Timing Register M1TREG>

FIG. 16 shows an example of setting values to the timing register M1TREG regarding the memory M1 being set in an initial sequence upon powering on. In the timing register M1TREG, timing data for the data processing device CPU_CHIP to control the memory M1 and a valid signal Valid are set. When the valid signal Valid indicates 1, the timing data for controlling the memory M1 is valid, and, when the signal indicates 0, the timing data is invalid. In the timing register M1TREG, tm1RCD (a minimum time interval between a bank active instruction and a read and write instructions), tm1RC (a minimum time interval between a bank active instruction and a read and write instruction in the same bank), tm1RRD (a minimum time interval between bank active instructions in different banks), tm1RAS (a minimum time interval between a bank active instruction and a pre-charge instruction in the same bank), tm1RP (a minimum time interval between a pre-charge instruction and a bank active instruction in the same bank), and others are set. Each minimum time interval is represented as the number of clock cycles of an operating clock of the data processing device CPU_CHIP. In the present embodiment, 16 in clock cycles is set to tm1RCD, 60 in clock cycles is set to tm1RC, 8 in clock cycles is set to tm1RRD, 44 in clock cycles is set to tm1RAS, and 16 in clock cycles is set to tm1RP.

<Register Setting: Timing Register M2TREG>

FIG. 17 depicts an example of setting values to the timing register M2TREG regarding the set memory M2 in an initial sequence upon powering on. In the timing register M2TREG, timing data for the data processing device CPU_CHIP to control the memory M2 and a valid signal Valid are set. When the valid signal Valid indicates 1, the timing data for controlling the memory M2 is valid, and, when the signal indicates 0, the timing data is invalid. In the timing register M2TREG, tm2RCD (a minimum time interval between a bank active instruction and a read and write instruction), tm2RC (a minimum time interval between bank active instructions in the same bank), tm2RRD (a minimum time interval between a bank active instruction and a read and write instruction in different banks), tm2RAS (a minimum time interval between a bank active instruction and a pre-charge instruction in the same bank), tm2RP (a minimum time interval between a pre-charge instruction and a bank active instruction in the same bank), and others are set. In the present embodiment, each minimum time interval is represented as the number of clock cycles of an operating clock of the data processing device CPU_CHIP. 10000 in clock cycles is set to tm2RCD, 10062 in clock cycles is set to tm2RC, 16 in clock cycles is set to tm2RRD, 10046 in clock cycles is set to tm2RAS, and 32 in clock cycles is set to tm2RP.

Also, when the valid signal Valid of the timing data tm2RCD indicates 0, the bank active instruction is completed, and a signal indicating command enable allowing a next read and write instructions to be input is issued from the memory M2, and is input via the memory M1 and the memory M0 to the data processing device CPU_CHIP.

<Register Setting: Operation Mode Register OMDREG>

FIG. 18 shows an example of setting values to the memory control mode register OMDREG set in an initial sequence upon powering on. In the memory control mode register OMDREG, a valid signal Valid and control mode data OPMODE corresponding to each of the identification numbers of the data processing device CPU_CHIP and each memory are set. When the valid signal Valid indicates 1, the control mode data OPMODE corresponding to the identification number ID is valid, and, when the signal indicates 0, the data is invalid. As a control method of the data processing device CPU_CHIP to control each memory, three types of control modes can be set: a channel control mode, a bank open mode, and a bank close mode.

When the control mode data OPMODE indicates 1, this means that a bank close mode is set; when the data indicates 2, this means that a bank open mode is set; and when the data indicates 3, this means that a channel control mode is set. The bank close mode is a control method without using the response queue RsQo of each memory and the sense amplifier SenseAmp or the data buffer DataLat for each memory bank in the memory as a cache memory. When the bank close mode is set by the control mode data OPMODE, the memory control circuit DCMC always causes the sense amplifier SenseAmp and the data buffer DataLat for each memory bank of the memory to be deactivated after data read or write (page close). The bank open mode is a control method using the sense amplifier SenseAmp or the data buffer DataLat for each memory bank in the memory as a cache memory. When the bank open mode is set by the control mode data OPMODE, the memory control circuit DCMC always causes the sense amplifier SenseAmp and the data buffer DataLat for each memory bank of the memory to be activated after data read or write, and keeps retaining the data in the sense amplifier SenseAmp and the data buffer DataLat (page open).

The hit determination circuit IDHT determines whether data for a read and write request from any of the data processing circuits CPU0 to CPU3 is present in the sense amplifier SenseAmp or the data buffer DataLat for each memory bank (page hit determination). In the case of page hit, data can be read from the sense amplifier SenseAmp or the data buffer DataLat without an access to the memory array circuit. Therefore, data can be read with low power and low latency and at a high speed.

The channel control mode is a control method using the response queue RsQo of each memory and the sense amplifier SenseAmp or the data buffer DataLat for each memory bank in the memory as a cache memory. When the channel control mode is set by the control mode data OPMODE, the memory control circuit DCMC always causes the sense amplifier SenseAmp and the data buffer DataLat for each memory bank of the memory to be activated after data read or write (page open). The hit determination circuit IDHT of the memory control circuit DCMC determines whether data for a read and write request from any of the data processing circuits CPU0 to CPU3 is present in the response queue RsQo of each memory (channel hit determination), and further determines whether the data is present in the sense amplifier SenseAmp and the data buffer DataLat for each memory bank (page hit determination). In the case of channel hit, data can be directly read from the response queue RsQo without an access to the sense amplifier SenseAmp or the data buffer DataLat, and therefore, data can be further read with low power and low latency and at a high speed. These control modes correspond to applications operable on the data processing device CPU_CHIP, and any of these control modes is preferably set.

In the present embodiment, an identification number ID value of 1 indicates the identification number of the memory M0, and the control mode data OPMODE is set at the channel control mode. That is, this means that the data processing device CPU_CHIP controls the memory M0 in the channel control mode. An identification number ID value of 2 indicates the identification number of the memory M1, and the control mode data OPMODE is set at the channel control mode. That is, this means that the data processing device CPU_CHIP controls the memory M1 in the channel control mode. An identification number ID value of 3 indicates the identification number of the memory M2, and the control mode data OPMODE is set at the channel control mode. That is, this means that the data processing device CPU_CHIP controls the memory M2 in the channel control mode. Also, not only in an initial sequence upon powering on but also upon connection of a new memory, removable memory card, storage device, or others, the data processing device CPU_CHIP can set the control mode data OPMODE for a new ID, and can update the operation mode register OMDRE.

<Hit Determination Operation>

FIG. 19 depicts an example of a read request to be output from the memory control circuit DCMC to each memory based on the results of hit determination performed by the hit determination circuit IDHT when the data processing device CPU_CHIP controls the memories M0, M1, and M2 in the channel control mode. When the determination result at the hit determination circuit IDHT indicates channel hit (CHANNEL HIT), independent to a page hit determination result, the memory control circuit DCMC outputs a request including a read instruction RD for reading data from the response queue RsQo. When the determination result at the hit determination circuit IDHT indicates channel miss (CHANNEL MISS) and page hit (PAGE HIT) occurs with the page of the memory bank in an open state (OPEN), the memory control circuit DCMC outputs a request including a read instruction RD2 for reading data from the sense amplifier SenseAmp or the data buffer DataLat. The data read from the sense amplifier SenseAmp or the data buffer DataLat is transferred to the response queue RsQo, and is finally transferred to the data processing device CPU_CHIP.

When the determination result at the hit determination circuit IDHT indicates channel miss (CHANNEL MISS) and page hit (PAGE HIT) occurs with the page of the memory bank in a close state (CLOSE), the memory control circuit DCMC activates the memory bank, and outputs a request including a bank active instruction for opening a page. Next, a request including a read instruction RD2 for reading data from the sense amplifier SenseAmp or the data buffer DataLat is output. The data read from the sense amplifier SenseAmp or the data buffer DataLat is transferred to the response queue RsQo, and is finally transferred to the data processing device CPU_CHIP.

When the determination result at the hit determination circuit IDHT indicates channel miss (CHANNEL MISS) and page miss (PAGE MISS) occurs with the page of the memory bank in an open state (OPEN), the memory control circuit DCMC first deactivates the memory bank, and outputs a request including a pre-charge instruction for closing the page. Next, the memory bank is activated, and a request including a bank active instruction for opening a page is output. Next, a request including a read instruction RD2 for reading data from the sense amplifier SenseAmp and/or the data buffer DataLat is output. The data read from the sense amplifier SenseAmp and/or the data buffer DataLat is transferred to the response queue RsQo, and is finally transferred to the data processing device CPU_CHIP.

When the determination result at the hit determination circuit IDHT indicates channel miss (CHANNEL MISS) and page miss (PAGE MISS) occurs with the page of the memory bank in a close state (CLOSE), the memory control circuit DCMC first activates the memory bank, and outputs a request including a bank active instruction for opening a page. Next, a request including a read instruction RD2 for reading data from the sense amplifier SenseAmp and/or the data buffer DataLat is output. The data read from the sense amplifier SenseAmp or the data buffer DataLat is transferred to the response queue RsQo, and is finally transferred to the data processing device CPU_CHIP.

In the foregoing, an example of the request for reading data to be output by the memory control circuit DCMC to each memory has been described, and it is needless to say that a similar operation is performed for writing data. In this manner, when control is performed in the channel control mode, not only the sense amplifier SenseAmp and/or the data buffer DataLat for each memory bank in each memory but also the response queue RsQo of each memory is used as a cache memory. Therefore, the cache memory size can be increased, a hit rate of the cache memory can be increased, and each memory can be operated with low latency and low power and at high speed.

<Description of Memory Map>

Figure 20:
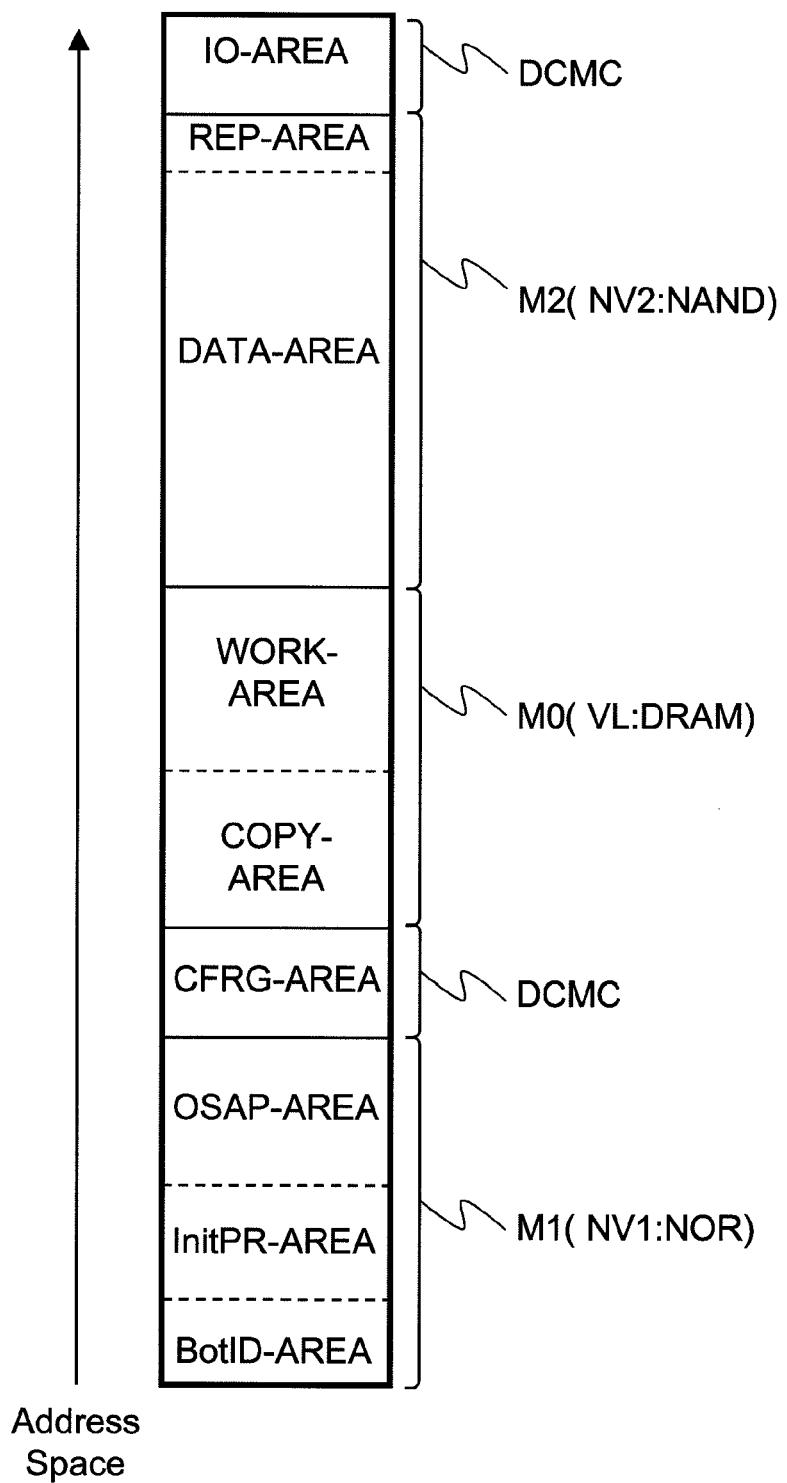
FIG. 20 is a diagram showing an example of a memory map with respect to a memory module managed by the data processing device.

FIG. 20 shows an example of a memory map for the memory module MEM managed by the data processing device CPU_CHIP. In the present embodiment, descriptions will be made regarding a typical memory map with a memory module having a storage area of the memory M0 of 1 Gbit, a recording area of the memory M1 of 1 Gbit, and a storage area of the memory M2 of 16 Gbit+512 Mbit (an area of 512 Mbit is a replacement area) being taken as an example, although the case is not particularly limited thereto.

In the present embodiment, the memory M0 is a volatile memory, and is a dynamic random access memory using a dynamic random access memory cell, with a read time on the order of 15 ns. Also, the memory M1 is a non-volatile memory, and is a NOR flash memory using a NOR flash memory cell, with a read time on the order of 80 ns. The memory M2 is a non-volatile memory, and is a NAND flash memory using a NAND flash memory cell, with a read time on the order of 25 usec.

The memory control circuit DCMC is divided into a configuration area and an IO area. The configuration area includes, although not particularly limited to this, addresses corresponding to registers, such as the queue register QREG, the latency register LTREG, and the latency domain register LTDREG of the configuration circuit CONFIG of the memory control circuit DCMC, the timing register M0TREG regarding the memory M0, the timing register M0TREG regarding the memory M1, the timing register M2TREG regarding the memory M2, the control mode register OMDREG, and the IO register.

The IO area is an area for accessing a removable memory module, such as a memory card or SSD (Solid State Drive), including a plurality of flash memories and a controller. The memory M1 is divided into a boot device ID storage area BotID-AREA, an initial program area InitPR-AREA, and a program storage area OSAP-AREA. In the boot device ID storage area BotID-AREA, ID data of the boot device is stored. In a last end device ID storage area EndID-AREA, ID data of a last end memory device regarding the serially-connected memory module MEM. In the initial program area InitPR-AREA, the boot program is stored. In the program storage area OSAP-AREA, an operating system, an application program, and others are stored. The memory M0 is divided into a copy area COPY-AREA and a work area WORK-AREA. The work area WORK-AREA is used as a work memory at the time of program execution, and the copy area COPY-AREA is used as a memory for copying a program or data from the memories M1 and M2. The memory M2 is divided into a data area DATA-AREA and a replacement area REP-AREA. In the data area DATA-AREA, data, such as music data, audio data, moving image data, and still image data, are stored.

Also, in the flash memory, reliability is decreased as rewriting is repeated, thereby infrequently causing data written at the time of writing to become different data at the time of reading or to become unable to be written at the time of rewriting. The replacement area REP-AREA is provided to replace such faulty data into a new area. The size of the replacement area REP-AREA is preferably determined so as to ensure reliability assured by the memory M2.

<Operation Immediately after Powering on>

Next, data transfer from the memory M1 to the data processing device CPU_CHIP immediately after powering on will be described. After powering on, the data processing device CPU_CHIP sets its own boot device ID register BotID at 2. The memory M1 reads the ID data of the boot device of 2 from the boot device ID storage area BotID-AREA, and sets its own ID register at 2. In this manner, the boot device is established in the memory M1. Next, to read the boot program and the last end memory device ID data stored in the memory M1 as the boot device, the data processing device CPU_CHIP transmits the ID number of the memory M1 of 2 and a read instruction to the memory module MEM.

According to the ID number of 2 and the read instruction, the memory module MEM reads the boot program from the initial program area InitPR-AREA of the memory M1 for transmission to the data processing device CPU_CHIP. In this manner, with the ID of the boot device being initialized immediately after powering on, the boot device in the memory module MEM achieved by series connection of memories can be specified. With the number of connection signals between the data processing device CPU_CHIP and the memory module MEM being significantly reduced, the data processing device CPU_CHIP can quickly and reliably read the boot program from the boot device to start up the data processing device CPU_CHIP and the memory module MEM.

<Description of Data Copy Operation>

A data read time of the memory M0 is significantly shorter as compared with a data read time of the memory M2. Thus, if necessary image data is transferred in advance from the memory M2 to the memory M0, a high-speed image processing can be performed in the data processing device CPU_CHIP. An example of data transfer from the memory M2 to the memory M0 when the ID register values of the memories M0, M1, and M2 are set at 1, 2, and 3, respectively, will be described although the case is not particularly limited thereto.

To read data from the data area DATA-AREA of the memory M2, the data processing device CPU_CHIP transmits the identification number ID of the memory M2 of 3 and a data read instruction for one page (data of 512 Bytes+ECC code of 16 Bytes) data to the memory module MEM. According to the ID number of 3 and the data read instruction for one page, the memory module MEM reads data for one page from the data area DATA-AREA of the memory M2, adds a recognition ID of 3, and then transmits it to the data processing device CPU_CHIP.

In the data processing device CPU_CHIP, an error detection is performed on the data for one page transmitted from the memory M2. If there is no error, for data transfer of the data for one page to the copy area COPY-AREA of the memory M0, the data processing device CPU_CHIP transmits the ID number of the memory M0 of 1, a data write instruction for one page, and data to the memory module MEM.

After a correction if there is an error, for data transfer of the data for one page to the copy area COPY-AREA of the memory M0, the data processing device CPU_CHIP transmits the ID number of the memory M0 of 1 and a data write instruction for one page to the memory module MEM. According to the ID number of 1 and the data write instruction for one page, the memory module MEM writes the data for one page in the copy area COPY-AREA of the memory M0.

Next, descriptions will be made regarding data transfer from the memory M0 to the memory M2 when image data is written at a high speed from the data processing device CPU_CHIP to the memory M0 and this image data is stored in the memory M2 as required. To read data from the copy area COPY-AREA of the memory M0, the data processing device CPU_CHIP transmits the identification number ID value of the memory M0 of 1 and a data read instruction for one page (512 Bytes) to the memory module MEM. According to the identification number ID value of 1 and the data read instruction for one page, the memory module MEM reads the data for one page from the copy area COPY-AREA of the memory M0, adds an identification number ID value of 1, and then transmits the data to the data processing device CPU_CHIP. For data transfer of the data for one page transmitted from the memory M0 to the data area DATA-AREA of the memory M2, the data processing device CPU_CHIP transmits the identification number ID value of the memory M2 of 3 and a data write instruction for one page and data to the memory module MEM.

When the memory module MEM transmits the identification number ID value of 3 and the data write instruction for one page to the memory M2 by way of the memories M0 and M1, the memory M2 writes the data for one page in its own data area DATA-AREA. The memory M2 checks whether data write has been successful. If successful, the write process ends. If write has failed, the memory M2 transmits the identification number ID value of 3 and write error data, notifying the data processing device CPU_CHIP via the memory M1 and the memory M0 of a write error. Upon receiving the identification number ID value of 3 and the write error data, for writing at a new address in the replacement area REP-AREA provided in advance to the memory M2, the data processing device CPU_CHIP transmits the identification number ID value of the memory M2 of 3 and a data write instruction for one page to the memory module MEM. When the memory module MEM transmits the identification number ID value of 3 and the data write instruction for one page by way of the memories M0 and M1 to the memory M2, the memory M2 writes the data for one page in its own replacement area REP-AREA. Also, when a replacement process is performed, the data processing device CPU_CHIP retains and manages a faulty address and address data indicating on which address the replacement process has been performed for the faulty address.

As described above, by allocating an area in the memory as an area in which part of data in the memory M2 can be copied and transferring data from the memory M2 to the memory M0 in advance, the data of the memory M2 can be read at a speed equivalent to that of the memory M0, thereby allowing a high-speed processing in the data processing device CPU_CHIP. Also, when data is to be written in the memory M2, the data is once written in the memory M0, and then can be written back to the memory M2 as required, and therefore, the speed of data writing can also be increased. Furthermore, error detection and correction are performed upon reading from the memory M2, and a replacement process is performed on a faulty address where writing has not been correctly performed upon writing, and therefore, high reliability can be maintained.

<Description of Request Issuing Operation of Memory Control Circuit DCMC>

Figure 21A:
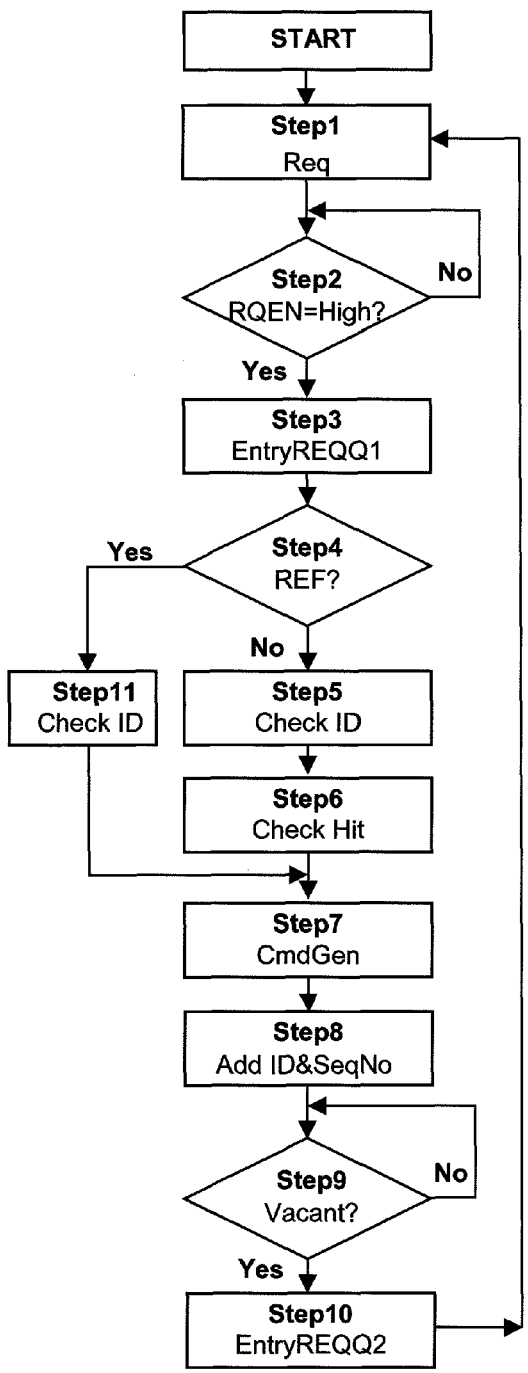
FIG. 21 is a flowchart showing an example of an operation until the memory control circuit issues a request to the memory module.
Figure 21B:
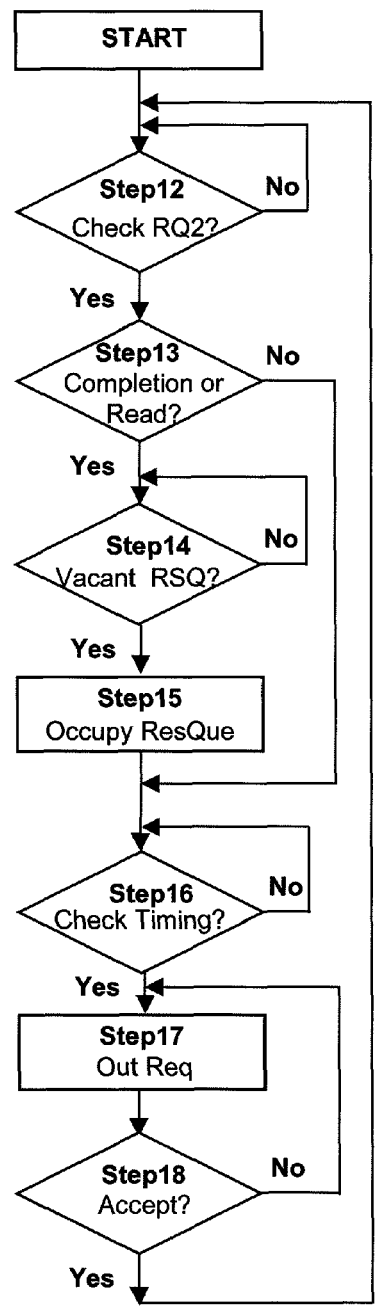

FIGS. 21A and 21B show flowcharts showing one example of operation until the memory control circuit DCMC issues a request to the memory module MEM. FIG. 21A is a flowchart of one example of operation until a request is taken as an entry in the request queue REQQ2, and FIG. 21B is a flowchart showing one example of operation until the request taken as an entry in the request queue REQQ2 is issued to the memory module MEM. Also, the operations in FIG. 21A and FIG. 21B are performed independently. To execute an application, the data processing circuits CPU0, CPU1, CPU2, and CPU3 issue a read request and a write request to the memory module MEM via the memory controller DCMC. Here, descriptions will be made regarding an example of operation of the memory controller DCMC when the data processing circuit CPU2 issues to the memory controller DCMC a read request for reading data of 32 B from the memory M1 of the memory module MEM.

A read request ReadReq32M1 for reading data of 32 B from the command signal CMD by way of the arbitration circuit CARB and an address RAddM1 from the address signal ADD are transmitted to the request queue REQQ1 (FIGS. 21A and 21B: Step1). The request queue REQQ1 includes a plurality of request queues. When a request queue in a vacant state for receiving a request is present, a request enable signal RQEN indicates High and, when a request queue in a vacant state is not present, the request enable signal RQEN indicates Low.

When the request enable signal REQEN indicates Low (FIGS. 21A and 21B: Step 2), the read request ReadReq32M1 and the address RAddM1 from the data processing circuit CPU2 are not stored in the request queue REQQ1. When the request enable signal REQEN indicates High (FIGS. 21A and 21B: Step 2), the read request ReadReq32M1 and the address RAddM1 are stored in the request queue REQQ1 (FIGS. 21A and 21B: Step 3).

Next, the hit determination circuit IDHT checks whether a refresh request RefM0 from the refresh request circuit REF is present (FIGS. 21A and 21B: Step 4). When the refresh request is present, this refresh request RefM0 is prioritized, and its identification number ID is determined (FIGS. 21A and 21B: Step11). From the setting value of the configuration circuit CONFIG, this refresh request RefM0 is a refresh request to the memory M0, and therefore the identification number ID is determined as 1. When there is no refresh request RefM0, the identification number ID for the read request ReadReq32M1 and the address RAddM1 stored in the request queue REQQ1 are determined (FIGS. 21A and 21B: Step 5). The hit determination circuit IDHT compares the address RAddM1 and the address value of the memory map for the memory module MEM shown in FIG. 20 to determine the identification number ID, although the case is not particularly limited thereto. Since the address RAddM1 is an address in the program storage area OSAP-AREA, the identification number ID is determined as 2, and the read request ReadReq32M1 is determined as a request to the memory M1, although the case is not particularly limited thereto.

Next, the hit determination circuit IDHT performs a page address hit determination on an address RAddM1 regarding the read request ReadReq32M1 to the memory M1 (FIGS. 21A and 21B: Step 6). A method of the page address hit determination will be described below. To perform a channel hit determination and a page hit determination, the hit determination circuit IDHT mounts the following three functions.

(1) The hit determination circuit IDHT associates a bank address EBAdd, a page address EPAdd, and a column address ECAdd of each memory with the address regarding a request from the data processing circuits CPU0 to CPU3 to each memory.

(2) The hit determination circuit IDHT retains the bank address EBAdd, the page address EPAdd, and the column address ECAdd to data in the response queue RsQo included in each memory.

(3) The hit determination circuit IDHT retains, per each memory bank of each memory, a valid signal Valid indicating that the memory bank is active and the latest page address PAdd activated, and transmits them to the command generation circuit COMGEN. When a bank activating signal AValid indicates High, that means that the memory bank is activated. When the signal indicates Low, the memory bank is deactivated.

The hit determination circuit IDHT extracts a bank address EBAddM1 in the address RAddM1 and a page address EPAddM1 and a column address ECAddM1 regarding the read request ReadReq32M1 to the memory M1.

Next, the hit determination circuit IDHT performs a channel hit determination and a page hit determination. In the channel hit determination, the bank address EBAdd, the page address EPAdd, and the column address ECAdd for the data in the response queue RsQo included in the memory M1, and the bank address EBAddM1, the page address EPAddM1, and the column address ECAddM1 extracted by the hit determination circuit IDHT are compared (FIGS. 21A and 21B: Step 6). When all of these addresses match, channel hit is determined, and, when these addresses do not match, channel miss is determined (FIGS. 21A and 21B: Step 6). Next, a page address value PAddM1 corresponding to the memory bank of the memory M1 specified with the bank address EBAddM1 and the page address EPAddM1 are compared (FIGS. 21A and 21B: Step 6). When the page address value PAddM1 and the page address EPAddM1 match, page hit is determined, and. when the page address value PAddM1 and the page address EPAddM1 do not match, page address miss is determined (FIGS. 21A and 21B: Step 6).

Next, the command generation circuit COMGEN receives the read request ReadReq32M1 to the memory M1 and the address RAddM1, the hit determination result and the bank activating signal AValid value, and the determined identification number ID value of 2 from the hit determination circuit IDHT, and creates an instruction to the memory M1 and an address (FIGS. 21A and 21B: Step 7).

When the determination result indicates channel hit, data required for the data processing circuit CPU2 is present in the response queue RsQo of the memory M1 for which channel hit is determined, and the data can be directly read from this response queue RsQo; therefore, a read instruction RD32, and a response queue number RsQNo and a column address ECAddM1 corresponding thereto are generated (FIGS. 21A and 21B: Step 7). The response queue RsQo includes a plurality of responses, which are managed by the hit determination circuit IDHT of the memory control circuit DCMC by using a response queue number for identifying each response queue. When the determination result indicates channel miss and also page hit and the bank activating signal AValid indicates High, data required for the data processing circuit CPU2 is present in the data buffer DataLat of the memory bank of the memory M1 for which page address hit is determined, and the data can be directly read from this data buffer DataLat; therefore, a read instruction RD32, and a bank address EBAddM1 and a column address ECAddM1 corresponding thereto are generated (FIGS. 21A and 21B: Step 7). When the determination result indicates channel miss and page miss and the bank activating signal AValid indicates High, data required for the data processing circuit CPU2 is not present in the data buffer DataLat of the memory bank of the memory M1 for which page address miss is determined. Therefore, it is required to invalidate this data buffer DataLat, transfer new data to the data buffer DataLat, and read the data from the data buffer DataLat. Thus, to invalidate the data in the data buffer DataLat of the memory bank of the memory M1 specified with the bank address EBAddM1, a pre-charge instruction Pre and a bank address EBAddM1 are first generated (FIGS. 21A and 21B: Step 7).

Next, to transfer new data to the data buffer DataLat, a bank active instruction AC and a bank address EBAddM1 and a page address EPAddM1 are generated. Finally, to read data of 32 bytes from the data buffer DataLat, a read instruction RD32 and a column address ECAddM1 are generated (FIGS. 21A and 21B: Step 7). Also, when a request including the pre-charge instruction Pre and the bank address EBAddM1 is output from the memory control circuit DCMC to the memory module MEM, the bank activating signal AValid corresponding to the memory bank of the memory M1 specified with the bank address EBAddM1 is updated to Low and is retained. Also, when a request including the bank active instruction AC, the bank address EBAddM1, and the page address EPAddM1 is output from the memory control circuit DCMC to the memory module MEM, the bank activating signal AValid corresponding to the memory bank of the memory M1 specified with the bank address EBAddM1 is updated to High and is retained. Furthermore, the page address value PAddM1 is updated to a new page address EPAddM1 and is retained.

When the determination result indicates channel miss and page miss and the bank activating signal AValid indicates Low, the data buffer DataLat of the memory bank of the memory M1 for which page address miss is determined has already been in a deactivated state. Therefore, to transfer new data to the data buffer DataLat, a bank active instruction AC and a bank address EBAddM1 and a page address EPAddM1 are generated. Finally, to read data of 32 bytes from the data buffer DataLat, a read instruction RD32 and a column address ECAddM1 are generated (FIGS. 21A and 21B: Step 7). Also, when a request including the bank active instruction AC and the bank address EBAddM1 and the page address EPAddM1 is output from the memory control circuit DCMC to the memory module MEM, the bank active signal AValid corresponding to the memory bank of the memory M1 specified with the bank address EBAddM1 is updated to High and is retained, and further, the page address value PAddM1 is updated to a new page address EPAddM1 and is retained.

When the determination result indicates channel miss and page address hit and the bank activating signal AValid indicates Low, the data buffer DataLat of the memory bank of the memory M1 for which page address hit is determined has already been in a deactivated state. Therefore, to transfer new data to the data buffer DataLat, a bank active instruction ACm1 and a bank address EBAddM1 and a page address EPAddM1 are generated. Finally, to read data of 32 bytes from the data buffer DataLat, a read instruction RD32 and a column address ECAddM1 are generated (FIGS. 21A and 21B: Step 7). Also, when a request including the bank active instruction AC and the bank address EBAddM1 and the page address EPAddM1 is output from the memory control circuit DCMC to the memory module MEM, the bank activating signal AValid corresponding to the memory bank of the memory M1 specified with the bank address EBAddM1 is updated to High and is retained. Furthermore, to a request including an instruction generated by the command generation circuit COMGEN, and the response queue number RsQNo and the address (bank address, page address, and column address), and write data, the command generation circuit COMGEN adds, although not particularly limited to, a request start flag ReqStFlag, an identification number ID, a request number ReqN, a master number MID, a variable portion request length VREQL, and others, and reconstructs the request in the order of, although not particularly limited to, the request start flag ReqStFlag, the identification number ID, the instruction, the master number MID, the variable portion request length, the request number ReqN, the address (bank address, page address, and column address), and then the write data.

The request start flag ReqStFlag, the identification number ID, the instruction, the master number MID, the variable portion request length VREQL, and the request number ReqN are a common request portion CMNREQF as a common structure for any request, with a fixed request length of four bytes, although not limited thereto. Also, the address (bank address, page address, and column address) and the write data are in a variable request portion VBREQF with its request length varied depending on the instruction, and, by the variable request length VREQL, the request length is indicated. When the request start flag ReqStFlag indicates High, that means that a request is started. When the request start flag ReqStFlag indicates Low, that means that no request has yet generated. The request number ReqN is a number for identifying a request reconstructed by the command generation circuit COMGEN, and is added as being counted up one by one, starting from 0 until 255. Also, the variable portion request length VREQL indicates the length of the request in bytes.

Here, descriptions will be made regarding a request reconstruction on a request including: the bank active instruction AC and the read instruction RD32 generated by the command generation circuit COMGEN; and the addresses for these instructions, when the determination result indicates channel miss and page address hit and the bank activating signal AValid indicates Low.

First, addition of the identification number ID and the request number ReqN will be described. By the command generation circuit COMGEN, a request including the bank active instruction AC without requiring a completion notification and the bank address EBAddM1 and the page address EPAddM1 is regenerated in the order of a request start flag ReqStFlag value of 1, an identification number ID value of 2, the bank active instruction AC without requiring a completion notification, a master number MID value of 2, a variable portion request length VREQL value of 3, a request number ReqN value of 10, and the address (bank address and page address), and is retained as a bank active request ReqACID2Seq10 (FIGS. 21A and 21B: Step 8). Also, this bank active request ReqACID2Seq10 is a request without requiring a completion notification. Then, a request including the read instruction RD32 for 32-byte data and the column address ECAddM1 is regenerated in the order of a request start flag ReqStFlag value of 1, an identification number ID value of 2, the read instruction RD32, a master number MID value of 2, a variable portion request length VREQL value of 3, a request number ReqN value of 11, the address (bank address and column address), and a read data size RSIZE value of 32, and is retained as a read request ReqRD32ID2Seq11 (FIGS. 21A and 21B: Step 8).

The request queue REQQ2 includes a plurality of request queues, and, when a request queue in a vacant state for receiving a request is not present (FIGS. 21A and 21B: Step 9), no request is stored in the request queue REQQ2, and the circuit waits until a request queue in a vacant state is generated. When a request queue in a vacant state is present (FIGS. 21A and 21B: Step 9), the active request ReqACID2Seq10 and the read request ReqRD32ID2Seq11 are stored in the request queue REQQ2 (FIGS. 21A and 21B: Step 10).

The request output circuit RQOUT is a circuit that receives a setting value of the timing register M0REG regarding the memory M0 in the configuration circuit CONFIG, a setting value of the timing register M1TREG regarding the memory M1 therein, and a setting value of the timing register M2TREG regarding the memory M2 therein and, according to these timing setting values, the request output circuit RQOUT issues the request transmitted from the request queue REQQ2 to each memory of the memory module MEM. Also, when issuing a request requiring a completion notification to a specific memory in the memory module MEM, the request output circuit RQOUT issues the next request to that memory after the data processing device CPU_CHIP receives a completion notification from that memory. More specifically, when issuing a request requiring a completion notification to the memory M2 in the memory module MEM, the request output circuit RQOUT issues the next request to the memory M2 after the data processing device CPU_CHIP receives a completion notification from the memory M2. Furthermore, needless to say, while the data processing device CPU_CHIP waits for a completion notification from the memory M2, the request output circuit RQOUT can issue a request to other memory M0 or M1.

First, the request output circuit RQOUT checks whether a request is retained in the request queue REQQ2 (FIGS. 21A and 21B: Step12). When a request is retained in the request queue REQQ2, it is checked to see whether that request is a read request or a request requiring a completion notification (FIGS. 21A and 21B: Step13).

The active request ReqACID2Seq10 is a request not requiring a completion notification or a read request, and therefore, since the identification number ID value of the active request ReqACID2Seq10 indicates 2, the request output circuit RQOUT checks timing data set in the timing register M1TREG regarding the memory M1 to determine whether the active request ReqACID2Seq10 can be issued (FIGS. 21A and 21B: Step16).

Next, when the active request ReqACID2Seq10 is in an issuable state, the request output circuit RQOUT immediately issues the active request ReqACID2Seq10 to the memory module MEM (FIGS. 21A and 21B: Step17). When a request queue in a vacant state is not present in the request queue circuit RqQI of the memory M0, the issued active request ReqACID2Seq10 cannot be received by the memory M0. In this manner, when the issued active request ReqACID2Seq10 cannot be received by the memory M0, the memory M0 transmits a response ResNoAccID2Seq10 including data indicative of reception-impossible data NOACC to the response input circuit RSIN of the memory control circuit DCMC via the response signal RsMux0 immediately after the active request ReqACID2Seq10 is issued (FIGS. 21A and 21B: Step18). The response ResNoAccID2Seq10 includes a response start flag ResStFlag value of 1, an identification number ID value of 2, a bank active instruction ACm1, a master number MID value of 2, a response number ResN value of 10 (a value equal to a request number ReqN value of 10), and the reception-impossible data NOACC. The response input circuit RSIN transmits the input response ResNoAccID2Seq10 to the request output circuit RQOUT. Based on the identification number ID value of 2, the bank active instruction AC, the master number MID value of 2, the response number ResN value of 10, and the reception-impossible data NOACC included in the response ResNoAccID2Seq10, the request output circuit RQOUT again issues an active request ReqACID2Seq10 (FIGS. 21A and 21B: Step17). When the issued active request ReqACID2Seq10 is received by the memory M0, a response including data of reception-impossible data NOACC from the memory M0 is not transmitted (FIGS. 21A and 21B: Step 18).

After the active request ReqACID2Seq10 is issued and is then received by the memory M0, the request output circuit RQOUT checks to see whether a request is retained in the request queue REQQ2 (FIGS. 21A and 21B: Step12). When a request is retained in the request queue REQQ2, it is checked to see whether that request is a read request or a request requiring a completion notification (FIGS. 21A and 21B: Step13). Since the request ReqRD32ID2Seq11 is a read request, the request output circuit RQOUT checks to see whether an unreserved response queue in a vacant state is present among the plurality of response queues included in the response queue RESQ1 by way of the queue management circuit QMGT (FIGS. 21A and 21B: Step14).

When an unreserved response queue in a vacant state is not present in the response queue RESQ1, the circuit waits until an unreserved response queue in a vacant state occurs (FIGS. 21A and 21B: Step14). When an unreserved response queue in a vacant state is present in the response queue RESQ1, the identification number ID value of 2 and the request number ReqN value of 11 in the read request ReqRD32ID2Seq11 are copied by way of the queue management circuit QMGT to part of the response queue in a vacant state of the response queue RESQ1 to reserve and allocate in advance the response queue in a vacant state required for receiving a response corresponding to the read request ReqRD32ID2Seq11 (FIGS. 21A and 21B: Step15).

The queue management circuit QMGT manages the number of response queues in the response queue circuit RESQ1 included in the memory control circuit DCMC, the number of unreserved response queues in a vacant state therein, the number of reserved response queues in vacant state therein, and the number of response queues in an occupied state in which responses have already been stored. Furthermore, the queue management circuit QMGT manages the number of response queues in the response queue circuit RsQo and the response queue circuit RsQp included in the memories M0, M1, and M2, the number of unreserved response queues in a vacant state therein, the number of reserved response queues in a vacant state therein, and the number of response queues in an occupied state in which responses have already been stored therein.

When an unreserved response queue in a vacant state is allocated in advance, the queue management circuit QMGT decrements the number of unreserved response queues in a vacant state in the response queue RESQ1 by 1, and increments the number of reserved response queues in a vacant state therein by 1, although not particularly limited thereto. Furthermore, the queue management circuit QMGT decrements the number of unreserved response queues in a vacant state in the response queue circuit RsQo corresponding to the identification number ID value of 2 by 1, increments the number of reserved response queues in a vacant state by 1, decrements the number of unreserved response queues in a vacant state in the response queue circuit RsQp of the memory M0 corresponding to the identification number ID value of 1 by 1, and increments the number of reserved response queues in a vacant state by 1 (FIGS. 21A and 21B: Step14).

Since the identification number ID value of the read request ReqRD32ID2Seq11 indicates 2, the request output circuit RQOUT checks timing data set in the timing register M1TREG regarding the memory M1 to determine whether the read request ReqRD32ID2Seq11 can be issued (FIGS. 21A and 21B: Step16). Next, when the read request ReqRD32ID2Seq11 is in an issuable state, the request output circuit RQOUT notifies the latency adjustment circuit LCHCK of the issuance of the read request ReqRD32ID2Seq11, and issues the read request ReqRD32ID2Seq11 to the memory module MEM (FIGS. 21A and 21B: Step17).

Upon receiving a notification of the issuance of the read request ReqRD32ID2Seq11 from the request output circuit RQOUT, the latency adjustment circuit LCHCK starts measuring latency. When a request queue in a vacant state is not present in the request queue circuit RqQI of the memory M0, the issued read request ReqRD32ID2Seq11 cannot be received by the memory M0. In this manner, when the issued read request ReqRD32ID2Seq11 cannot be received by the memory M0, the memory M0 transmits a response ResNoAccID2Seq11 including data indicative of reception-impossible data NOACC to the response input circuit RSIN of the memory control circuit DCMC via the response signal RsMux0 immediately after the read request ReqRD32ID2Seq11 is issued (FIGS. 21A and 21B: Step18).

The response ResNoAccID2Seq11 includes a response start flag ResStFlag value of 1, an identification number ID value of 2, a read instruction RD32, a master number MID value of 2, a response number ResN value of 11 (a value equal to a request number ReqN value of 11), and the reception-impossible data NOACC. The response input circuit RSIN transmits the input response ResNoAccID2Seq11 to the request output circuit RQOUT. Based on the identification number ID value of 2, the read instruction RD32, the master number MID value of 2, the response number ResN value of 11, and the reception-impossible data NOACC, the request output circuit RQOUT notifies the latency adjustment circuit LCHCK of re-issuance of a read request ReqRD32ID2Seq11, and issues the read request ReqRD32ID2Seq11 to the memory module MEM (FIGS. 21A and 21B: Step17).

Upon receiving a notification of re-issuance of the read request ReqRD32ID2Seq11 from the request output circuit RQOUT, the latency adjustment circuit LCHCK invalidates all values of latency measured so far, and again starts measuring latency from the beginning. When the issued read request ReqRD32ID2Seq11 is received by the memory M0, a response including data of reception-impossible data NOACC from the memory M0 is not transmitted (FIGS. 21A and 21B: Step18).

When a response ResRD32ID2Seq11 including the read data for the request ReqRD32ID2Seq11 is input to the response input circuit RSIN of the memory control circuit DCMC and is stored in the response queue RESQ1, the queue management circuit QMGT calculates the number of response queues in an occupied state having responses stored therein in the response queue RESQ1, the number of unreserved response queues in a vacant state in the response queue RESQ1, and the number of reserved response queues in a vacant state for updating.

Furthermore, when the response ResRD32ID2Seq11 stored in the response queue RESQ1 is transmitted to the data processing circuit CPU2, the queue management circuit QMGT deletes the response ResRD32ID2Seq11 retained in the response queue RESQ1, and again calculates the number of response queues in an occupied state having responses stored therein in the response queue RESQ1, the number of unreserved response queues in a vacant state in the response queue RESQ1, and the number of reserved response queues in a vacant state for updating.

Next, an example of operation when an active request ReqACwithCompletionID3Seq10 requiring a completion notification and a read request ReqRD32ID3Seq11 are retained in the request queue REQQ2 will be described. The active request ReqACwithCompletionID3Seq10 includes a request start flag ReqStFlag value of 1, an identification number ID value of 3, a bank active instruction ACwithCompletion requiring a completion notification, a master number MID value of 2, a variable portion request length VREQL value of 3, a request number ReqN value of 10, and an address (bank address and page address). The read request ReqRD32ID3Seq11 includes a request start flag ReqStFlag value of 1, an identification number ID value of 3, a read instruction RD32, a master number MID value of 2, a variable portion request length VREQL value of 3, a request number ReqN value of 11, an address (bank address and column address), and read data size RSIZE value of 32.

First, the request output circuit RQUT checks whether a request is retained in the request queue REQQ2 (FIGS. 21A and 21B: Step12). When a request is retained in the request queue REQQ2, it is checked to see whether that request is a read request or a request requiring a completion notification (FIGS. 21A and 21B: Step13).

Since the active request ReqACwithCompletionID3Seq10 is a request requiring a completion notification, the request output circuit RQUT checks to see by way of the queue management circuit QMGT whether an unreserved response queue in a vacant state is present among the plurality of response queues included in the response queue RESQ1 (FIGS. 21A and 21B: Step14).

When an unreserved response queue in a vacant state is not present in the response queue RESQ1, the circuit waits until an unreserved response queue in a vacant state is generated (FIGS. 21A and 21B: Step14). When an unreserved response queue in a vacant state is present in the response queue RESQ1, the identification number ID value of 3 and the request number ReqN value of 10 in the active request ReqACwithCompletionID3Seq10 are copied by way of the queue management circuit QMGT to part of the response queues in a vacant state of the response queue RESQ1 to reserve and allocate in advance the response queue in a vacant state required for receiving a response ACwithCompletionResID3Seq10 including completion notification data for the active request ReqACwithCompletionID3Seq10 (FIGS. 21A and 21B: Step15).

Since the identification number ID value of the active request ReqACwithCompletionID3Seq10 indicates 3, the request output circuit RQOUT checks timing data set in the timing register M2TREG regarding the memory M2 to determine whether the active request ReqACwithCompletionID3Seq10 can be issued (FIGS. 21A and 21B: Step16).

Next, when the active request ReqACwithCompletionID3Seq10 is in an issuable state, the request output circuit RQUT immediately issues the active request ReqACwithCompletionID3Seq10 to the memory module MEM (FIGS. 21A and 21B: Step17).

When a request queue in a vacant state is not present in the request queue circuit RqQI of the memory M0, the issued active request ReqACwithCompletionID3Seq10 can not be received by the memory M0. In this manner, when the issued active request ReqACID2Seq10 cannot be received by the memory M0, the memory M0 transmits a response ResNoAccID3Seq10 including data indicative of reception-impossible data NOACC to the response input circuit RSIN of the memory control circuit DCMC via the response signal RsMux0 immediately after the active request ReqACwithCompletionID3Seq10 is issued (FIGS. 21A and 21B: Step18). The response ResNoAccID3Seq10 includes a response start flag ResStFlag value of 1, an identification number ID value of 3, a bank active instruction ACwithCompletion, a master number MID value of 3, a response number ResN value of 10 (a value equal to a request number ReqN value of 10), and the reception-impossible data NOACC. The response input circuit RSIN transmits the input response ResNoAccID3Seq10 to the request output circuit RQOUT. Based on the identification number ID value of 3, the bank active instruction ACwithCompletion, the master number MID value of 3, the response number ResN value of 10, and the reception-impossible data NOACC included in the response ResNoAccID3Seq10, the request output circuit RQOUT again issues an active request ReqACwithCompletionID3Seq10 (FIGS. 21A and 21B: Step17). When the issued active request ReqACwithCompletionID3Seq10 is received by the memory M0, a response including data of reception-impossible data NOACC from the memory M0 is not transmitted (FIGS. 21A and 21B: Step18).

After the active request ReqACwithCompletionID3Seq10 is issued and is then received by the memory M0, the request output circuit RQOUT checks to see whether a request is retained in the request queue REQQ2 (FIGS. 21A and 21B: Step12). When a request is retained in the request queue REQQ2, it is checked to see whether that request is a read request or a request requiring a completion notification (FIGS. 21A and 21B: Step13). Since the request ReqRD32ID3Seq11 is a read request, the request output circuit RQOUT checks to see whether an unreserved response queue in a vacant state is present among the plurality of response queues included in the response queue RESQ1 by way of the queue management circuit QMGT (FIGS. 21A and 21B: Step14).

When an unreserved response queue in a vacant state is not present in the response queue RESQ1, the circuit waits until an unreserved response queue in a vacant state is generated (FIGS. 21A and 21B: Step14). When an unreserved response queue in a vacant state is present in the response queue RESQ1, the identification number ID value of 3 and the request number ReqN value of 11 in the read request ReqRD32ID3Seq11 are copied by way of the queue management circuit QMGT to part of the response queues in a vacant state of the response queue RESQ1 to reserve and allocate in advance the response queue in a vacant state required for receiving a response corresponding to the read request ReqRD32ID3Seq11 (FIGS. 21A and 21B: Step15).

Since the identification number ID value of the read request ReqRD32ID3Seq11 indicates 3, the request output circuit RQOUT checks to see whether the response ACwithCompletionResID3Seq10 including completion notification data for the active request ReqACwithCompletionID3Seq10 to the memory M2 is input to the response input circuit RSIN and is retained in the response queue RESQ1 (FIGS. 21A and 21B: Step16).

When the response ACwithCompletionResID3Seq10 is retained in the response queue RESQ1, the request output circuit RQOUT notifies the latency adjustment circuit LCHCK that the read request ReqRD32ID3Seq11 is to be issued, and issues the read request ReqRD32ID3Seq11 to the memory module MEM (FIGS. 21A and 21B: Step17). Furthermore, the request output circuit RQOUT notifies the queue management circuit QMGT of the issuance of the read request ReqRD32ID3Seq11 to the memory module MEM. Then, the queue management circuit QMGT deletes the response ACwithCompletionResID3Seq10 retained in the response queue RESQ1, and again calculates the number of response queues in an occupied state having responses stored therein in the response queue RESQ1, the number of unreserved response queues in a vacant state, and the number of reserved response queues in a vacant state for updating.

Upon receiving the notification of issuance of the read request ReqRD32ID3Seq11 from the request output circuit RQOUT, the latency adjustment circuit starts measuring latency. When a request queue in a vacant state is not present in the request queue circuit RqQI of the memory M0, the issued read request ReqRD32ID3Seq11 can not be received by the memory M0. In this manner, when the issued read request ReqRD32ID3Seq11 cannot be received by the memory M0, the memory M0 transmits a response ResNoAccID3Seq11 including data indicative of reception-impossible data NOACC to the response input circuit RSIN of the memory control circuit DCMC via the response signal RsMux0 immediately after the read request ReqRD32ID3Seq11 is issued (FIGS. 21A and 21B: Step18).

The response ResNoAccID3Seq11 includes a response start flag ResStFlag value of 1, an identification number ID value of 3, a read instruction RD32, a master number MID value of 3, a response number ResN value of 11 (a value equal to a request number ReqN value of 11), and the reception-impossible data NOACC. The response input circuit RSIN transmits the input response ResNoAccID3Seq11 to the request output circuit RQOUT. Based on the identification number ID value of 3, the read instruction RD32, the master number MID value of 3, the response number ResN value of 11, and the reception-impossible data NOACC included in the response ResNoAccID3Seq11, the request output circuit RQOUT notifies the latency adjustment circuit LCHCK of re-issuance of a read request ReqRD32ID3Seq11, and issues the read request ReqRD32ID3Seq11 to the memory module MEM (FIGS. 21A and 21B: Step17).

Upon receiving a notification of re-issuance of the read request ReqRD32ID3Seq11 from the request output circuit RQOUT, the latency adjustment circuit LCHCK invalidates all values of latency measured so far, and again starts measuring latency from the beginning. When the issued read request ReqRD32ID3Seq11 is received by the memory M0, a response including data of reception-impossible data NOACC from the memory M0 is not transmitted (FIGS. 21A and 21B: Step18).

<Data Transfer Between Data Processing Device CPU_CHIP and Memory Module MEM>

Data transfer between the data processing device CPU_CHIP and the memory module MEM is described by using FIG. 1 to FIG. 8 and FIG. 22 to FIG. 23.

Figure 22:
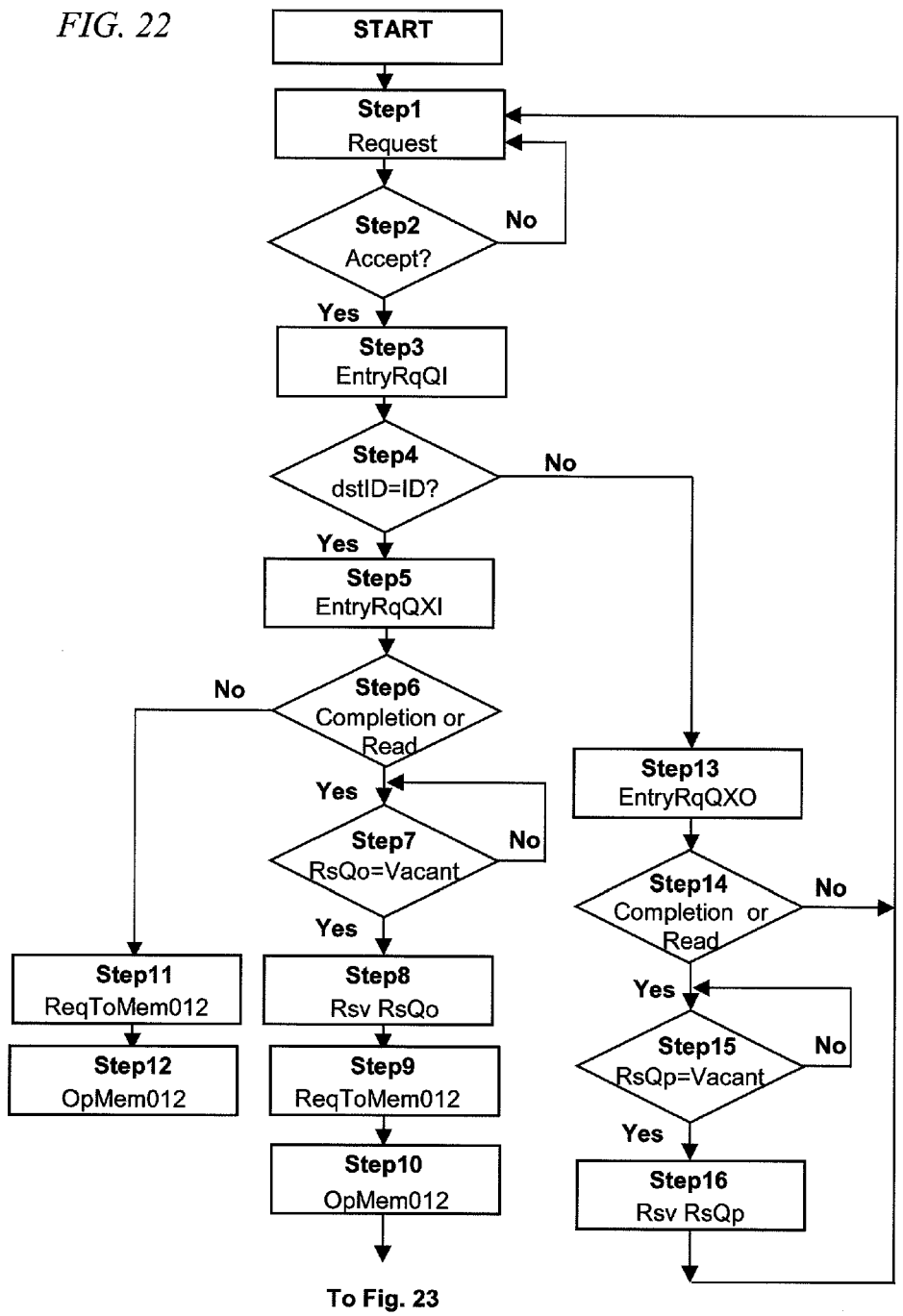
FIG. 22 is a flowchart showing an example of an operation responsive to a request from the data processing device to the memory module.
Figure 23:
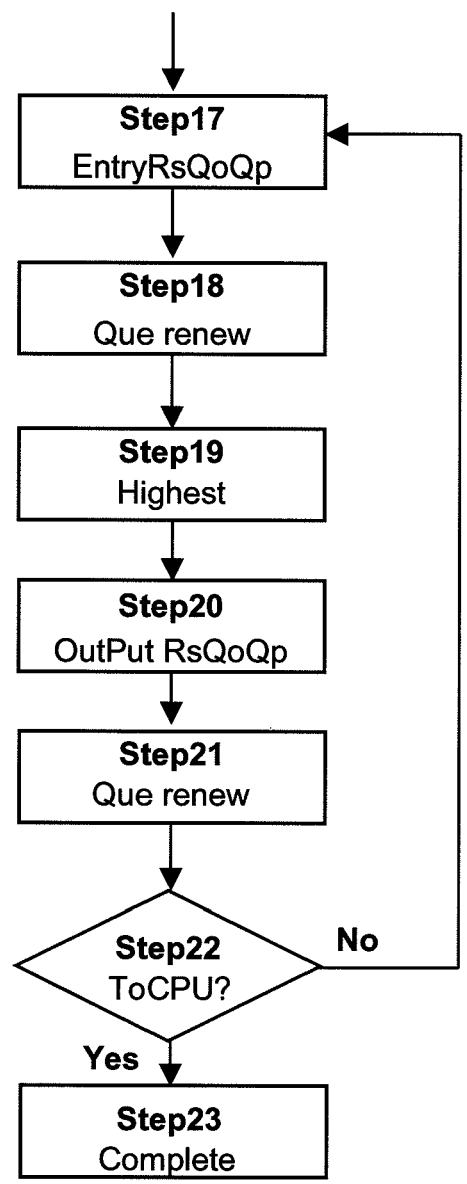
FIG. 23 is a flowchart showing an example of an operation responsive to a response from the memory module to the data processing device.

FIG. 22 is a flowchart of an example of operation on a request from the data processing device CPU_CHIP to the memory module MEM. FIG. 23 is a flowchart of an example of operation on a response from the memory module MEM to the data processing device CPU_CHIP.

Before describing the operation of the present embodiment, the state of each register and others to be a premise of the operation will be first described. The ID register IDR values of the memories M0, M1, and M2 are set at 1, 2, and 3, respectively. Each register in the configuration circuit CONFIG is set at a value shown in FIG. 10 to FIG. 18. The number of request queues of the request queue circuit REQQ2 of the memory control circuit DCMC is 12, and these request queues are all in a vacant state. Also, the number of response queues of the response queue circuit RESQ1 of the memory control circuit DCMC is 24, and these response queues are all in a vacant state. Furthermore, the number of request queues of the request queue circuit RqQI of the memory M0 is 12, the number of request queues of the request queue circuit RqQXI is 4, and the number of request queues of the request queue circuit RqQXO is 8, and these request queues are all in a vacant state. Also, the number of response queues of the response queue circuit RsQo of the memory M0 is 8, and the number of response queues of the response queue circuit RsQp thereof is 16, and these response queues are all in a vacant state. Still further, the number of request queues of the request queue circuit RqQI of the memory M1 is 8, the number of request queues of the request queue circuit RqQXI is 4, and the number of request queues of the request queue circuit RqQXO is 4, and, in these request queues, no request is entered. Also, the number of response queues in the response queue circuit RsQo of the memory M1 is 8, and the number of response queues in the response queue circuit RsQp thereof is 8, and these response queues are all in a vacant state. Still further, the number of request queues of the request queue circuit RqQI of the memory M2 is 4, the number of request queues of the request queue circuit RqQXI is 4, and the number of request queues of the request queue circuit RqQXO is 4, and, in these request queues, no request is entered. Also, the number of response queues in the response queue circuit RsQo of the memory M2 is 8, and the number of response queues in the response queue circuit RsQp thereof is 8, and these response queues are all in a vacant state. Also, all memory banks of the memories M0, M1, and M2 are inactive. Furthermore, a request to any of the memories M0, M1, and M2 is a request from the data processing circuit CPU3 of the data processing device CPU_CHIP. A request from the data processing device CPU_CHIP to any of the memories M0, M1, and M2 includes a common request portion CMNREQF of four bytes and a variable request portion VBREQF of 36 bytes at maximum. The common request portion CMNREQF includes a request start flag ReqStFlag, an identification number ID, an instruction, a master number MID, a variable portion request length VREQL, and a request number ReqN. The variable request portion VBREQF includes an address of four bytes and write data of 32 bytes at maximum. The variable portion request length VREQL represents the length of the variable request portion VBREQF in bytes. One request queue included in each of the memories M0, M1, and M2 can store therein four bytes of common request portion CMNREQF and 36 bytes at maximum of the variable request portion VBREQF. Also, a response from any of the memories M0, M1, and M2 to the data processing device CPU_CHIP includes a common response portion CMNRESF of four bytes and read data of 32 bytes at maximum. The common response portion CMNRESF includes a response start flag ResStFlag, an identification number ID, an instruction, a master number MID, a read data length RDL, and a response number ResN. The read data length RDL represents the length of the read data in bytes. One response queue included in each of the memories M0, M1, and M2 can store therein the common response portion CMNRESF of four bytes and the read data of 32 bytes at maximum.

First, data transfer from the data processing device CPU_CHIP to the memory M0 is described. The memory control circuit DCMC of the data processing device CPU_CHIP synchronizes a request ReqACID1SEQ15 with the clock signal RqCK0 for transfer to the memory M0, the request being multiplexed with a request start flag ReqStFlag value of 1, an identification number ID value of 1, a bank active instruction AC without requiring completion notification data, a master number MID value of 3 (a master number ID of the data processing circuit CPU3), a variable portion request length VREQL value of 4, a request number ReqN value of 15, a bank address of BK0, and a row address of Row63, by way of the request signal RqMux0 (FIG. 22: Step1).

When the request ReqACID1SEQ15 is input to the memory M0, the queue check circuit RQQM checks to see whether a request queue in a vacant state is present in the request queue circuit RqQI (FIG. 22: Step 2). When a request queue in a vacant state is present in the request queue circuit RqQI, the memory M0 stores the request ReqACID1SEQ15 from the data processing device CPU_CHIP to the request queue of its own request queue circuit RqQI (FIG. 22: Step 3). Also, when a request queue in a vacant state is not present in the request queue circuit RqQI, the request ReqACID1SEQ15 cannot be received by the memory M0, and therefore, the memory M0 transmits a response ResNoAccID1Seq15 including data indicative of reception-impossible data NOACC to the response input circuit RSIN of the memory control circuit DCMC via the response signal RsMux0 immediately after the request ReqACID1SEQ15 is issued.

The response ResNoAccID1Seq15 includes a response start flag ResStFlag value of 1, an identification number ID value of 1, a bank active instruction AC, a master number MID value of 3, a response number ResN value of 15 (a value equal to a request number ReqN value of 15), and reception-impossible data NOACC. The response input circuit RSIN transmits the input response ResNoAccID1Seq15 to the request output circuit RQOUT. Based on the identification number ID value of 1, the bank active instruction AC, the master number MID value of 3, the response number ResN value of 15, and the reception-impossible data NOACC included in the response ResNoAccID1Seq15, the request output circuit RQOUT again issues a request ReqACID1SEQ15 (FIG. 22: Step1).

Then, the ID comparator circuit CPQ compares the ID value of 1 included in the request ReqACID1SEQ15 entered in the request queue of the request queue circuit RqQI and the ID value of 1 retained in the ID register circuit IDR (FIG. 22: Step 4). Since the comparison result reveals a match, the request ReqACID1SEQ15 is transferred to the request queue circuit RqQXI (FIG. 22: Step5). Next, the request queue circuit RqQXI checks to see whether the stored request includes a read instruction or a request requiring completion notification data (FIG. 22: Step 6). Since the request ReqACID1SEQ15 does not include a read instruction and is a request not requiring completion notification data, the request queue circuit RqQXI transfers the stored request ReqACID1SEQ15 to the memory circuit Mem0 (FIG. 22: Step11). The memory circuit Mem0 operates according to the request ReqACID1SEQ15 (FIG. 22: Step12). Specifically, the command decoder CmdDec of the memory circuit Mem0 decodes the bank active instruction BA, the memory bank BANK0 is selected by the control circuit Cont Logic, and a row address of 63 is stored in the row address buffer RadLat of the memory bank BANK0 and is input to the row decoder RowDec. Then, the memory cell connected to the row address of 63 in the memory circuit MBank0 is activated, and data for one kByte is transferred to the sense amplifier SenseAmp (FIG. 22: Step12).

According to the value of tm0RCD (a minimum time interval between a bank active instruction and a read and write instruction) of 8 set in the timing register M0TREG, after eight clock cycles onward after transfer of the request ReqACID1SEQ15, the memory control circuit DCMC of the data processing device CPU_CHIP performs an operation for transferring a request ReqRD32ID1SEQ16 including a read instruction RD32 for data of 32 bytes to the memory M0 (the ReqRD32ID1SEQ16 request includes a request start flag ReqStFlag value of 1, an identification number ID value of 1, a read instruction RD32 for data of 32 bytes, a master number MID value of 3 (master number ID of the data processing circuit CPU3), a variable portion request length VREQL value of 4, a request number ReqN value of 16, and a bank address of BK0 and a column address of Col32).

First, the request output circuit RQOUT of the memory control circuit DCMC checks to see whether an unreserved response queue in a vacant state is present in the response queue RESQ1, and, when a response queue in a vacant state is present, the identification number ID value of 1 and the response number ResN value of 16 equal to the request number ReqN value of 16 in the request ReqRD32ID1SEQ16 are copied to this response queue in a vacant state to reserve and allocate in advance the response queue in a vacant state required for receiving the response ResRD32ID1SEQ16 corresponding to the request ReqRD32ID1SEQ16. Next, the request output circuit RQOUT synchronizes ReqRD32ID1SEQ16 with the clock signal RqCK0 by way of the request signal RqMux0 and transfers the same to the memory M0 (FIG. 22: Step1). Also, the request output circuit RQOUT transfers the identification number ID value of 1 and the request number ReqN value of 16 in the request ReqRD32ID1SEQ16 to the latency adjustment circuit LCHCK for retaining. Next, simultaneously with the transfer of the request ReqRD32ID1SEQ16, the latency adjustment circuit LCHCK starts measuring latency regarding the response ResRD32ID1SEQ16 corresponding to the request ReqRD32ID1SEQ16 (FIG. 22: Step 2).

When the request ReqRD32ID1SEQ16 is input to the memory M0, the queue check circuit RQQM checks to see whether a request queue in a vacant state is present in the request queue circuit RqQI (FIG. 22: Step 2). When a request queue in a vacant state is present in the request queue circuit RqQI, the memory M0 stores the request ReqRD32ID1SEQ16 from the data processing device CPU_CHIP in the request queue of its own request queue circuit RqQI (FIG. 22: Step 3).

Also, when a request queue in a vacant state is not present in the request queue circuit RqQI, the request ReqRD32ID1SEQ16 cannot be received by the memory M0, and therefore, the memory M0 transmits a response ResNoAccID1Seq16 including data indicative of reception-impossible data NOACC to the response input circuit RSIN of the memory control circuit DCMC via the response signal RsMux0 immediately after the request ReqRD32ID1SEQ16 is issued. The response ResNoAccID1Seq16 includes a response start flag ResStFlag value of 1, an identification number ID value of 1, a read instruction RD, a master number MID value of 3, a response number ResN value of 16 (a value equal to the request number ReqN value of 16), and the reception impossible data NOACC. The response input circuit RSIN transmits the input response ResNoAccID1Seq16 to the request output circuit RQOUT. Based on the identification number ID value of 1, the read instruction RD, the master number MID value of 3, the response number ResN value of 16, and the reception impossible data NOACC included in the response ResNoAccID1Seq16, the request output circuit RQOUT notifies the latency adjustment circuit LCHCK of re-issuance of the request ReqRD32ID1SEQ16, and issues the request ReqRD32ID1SEQ16 (FIG. 22: Step1).

Upon receiving a notification of re-issuance of the request ReqRD32ID1SEQ16 from the request output circuit RQOUT, the latency adjustment circuit LCHCK invalidates all values of latency measured so far, and again starts measuring latency from the beginning. Then, the ID comparator circuit CPQ compares the ID value of 1 included in the request ReqRD32ID1SEQ16 entered in the request queue of the request queue circuit RqQI and the ID value of 1 retained in the ID register circuit IDR (FIG. 22: Step 4). Since the comparison result reveals a match, the request ReqRD32ID1SEQ16 is transferred to the request queue circuit RqQXI (FIG. 22: Step 5).

Next, the request queue circuit RqQXI checks to see whether the stored request includes a read instruction or is a request requiring completion notification data (FIG. 22: Step 6). Since the request ReqRD32ID1SEQ16 includes a read instruction, the request queue circuit RqQXI checks to see whether an unreserved response queue in a vacant state is present in the response queue circuit RsQo (FIG. 22: Step 7). When an unreserved response queue in a vacant state is not present in the response queue circuit RsQo, the request queue circuit RqQXI suspends the transfer of the request ReqRD32ID1SEQ16 until an unreserved response queue in a vacant state is generated. When an unreserved response queue in a vacant state is present in the response queue circuit RsQo, the request queue circuit RqQXI copies the identification number ID value of 1 and the request number ReqN value of 16 in the request ReqRD32ID1SEQ16 to the unreserved response queue in a vacant state in the response queue circuit RsQo to reserve and allocate in advance the response queue in a vacant state required for receiving read data from the memory circuit Mem0 corresponding to the request ReqRD32ID1SEQ16 (FIG. 22: Step 8).

Also, the queue check circuit RSQM of the memory M0 manages the number of response queues in the response queue circuit RsQo and the response queue circuit RsQp of the memory M0, the number of unreserved response queues in a vacant state therein, the number of reserved response queues in a vacant state therein, and the number of response queues in an occupied state having responses already stored therein. When the request queue circuit RqQXI reserves an unreserved response queue in a vacant state in the response queue circuit RsQo, the queue check circuit RSQM calculates the number of unreserved response queues in a vacant state in the response queue circuit RsQo and the number of reserved response queues in a vacant state for updating (FIG. 22: Step 8).

Next, the request queue circuit RqQXI transfers the stored request ReqRD32ID1SEQ16 to the memory circuit Mem0 (FIG. 22: Step 9). The memory circuit Mem0 operates according to the request ReqRD32ID1SEQ16 (FIG. 22: Step10). Specifically, the read instruction RD32 for data of 32 bytes is transmitted from the command signal Command and the bank address of 0 and the column address of 32 are transmitted from the address signal Address, to the memory circuit Mem0.

The command decoder CmdDec decodes the read instruction RD 32 for data of 32 bytes, the memory bank MBANK0 is selected by the control circuit Cont Logic, and the column address of 32 is stored in the column address buffer CAddLat of the memory bank MBANK0 and is input to the column decoder ColDec. Then, with the column address of 32 being taken as a start address, 32 bytes of data is read from the sense amplifier SenseAmp, and is stored in the read data buffer RDataLat via the data control circuit DataCont (FIG. 22: Step10). Then, to 32 bytes of data read from the read data buffer RDataLat, a common response portion CMNRESF is added, including a response start flag ResStFlag value of 1, an identification number ID value of 1 (a value equal to the ID register value of 1), a read instruction RD32 for data of 32 bytes, a master number MID value of 3, a read data length RDL value of 32, and a response number ResN value of 16 (a value equal to the request number ReqN value of 16), and the result is entered, as the response ResRD32ID1SEQ16, the reserved response queue in a vacant state of the response queue RsQo in the response queue control circuit RsCT (FIG. 23: Step17).

When the response ResRD32ID1SEQ16 is entered to the response queue circuit RsQo of the memory M0, the queue check circuit RSQM of the memory M0 calculates the number of response queues in an occupied state having responses already stored therein in the response queue circuit RsQo, the number of reserved response queues in a vacant state, and the number of unreserved response queues in a vacant state for updating (FIG. 23: Step18). Next, the response schedule circuit SCH determines response priorities on the responses being entered to the response queue circuit RsQo and the response queue circuit RsQp (FIG. 23: Step19). Since only the response ResRD32ID1SEQ16 is present in the response queue circuit RsQo and the response queue circuit RsQp, the response ResRD32ID1SEQ16 has the highest response priority (FIG. 23: Step19). Therefore, the response schedule circuit SCH transmits the response ResRD32ID1SEQ16 to the data processing device CPU_CHIP by way of the response signal RsMux0 (FIG. 23: Step 20).

The memory control circuit DCMC allocates in advance a response queue in a vacant state for receiving the response ResRD32ID1SEQ16 in the response queue RESQ1, and therefore the response ResRD32ID1SEQ16 is stored in the response queue RESQ1.

When the response ResRD32ID1SEQ16 in the response queue circuit RsQo of the memory M0 is transmitted to the data processing device CPU_CHIP, the queue check circuit RSQM calculates the number of response queues in an occupied state having responses already stored therein in the response queue circuit RsQo, the number of reserved response queues in a vacant state, and the number of unreserved response queues in a vacant state for updating (FIG. 23: Step 21). Also, when the response ResRD32ID1SEQ16 in the response queue circuit RsQo of the memory M0 is transmitted to the data processing device CPU_CHIP (FIG. 23: Step 22), data transfer between the data processing device CPU_CHIP and the memory M0 is completed (FIG. 23: Step 23).

Also, when the response ResRD32ID1SEQ16 in the response queue circuit RsQo of the memory M0 is transmitted to the data processing device CPU_CHIP, the response input circuit RSIN of the memory control circuit DCMC receives the response ResRD32ID1SEQ16, extracts the identification number ID value of 1 and the response number ResN value of 16 included in the response ResRD32ID1SEQ16, and then transmits the values to the latency adjustment circuit LCHCK. Based on these identification number ID value of 1 and response number ResN value of 16, the latency adjustment circuit LCHCK finds that the response ResRD32ID1SEQ16 for the request ResRD32ID1SEQ16 has returned, and then ends latency measurement. The latency adjustment circuit LCHCK compares the latency measurement result and a latency LatBank value of eight clock cycles corresponding to the identification number ID value of 1 set in the latency register LTREG in the configuration circuit CONFIG. As a result of the comparison, when a difference therebetween exceeds an allowable range, the latency adjustment circuit LCHCK performs a latency correcting operation so that a measured latency for an upcoming read request is equal to the value of the latency LatBank value of eight clock cycles. Also, as a result of the comparison, when the difference therebetween is within the allowable range, the latency adjustment circuit LCHCK does not perform a latency correcting operation. The latency correcting operation will be described later.

Furthermore, when the response ResRD32ID1SEQ16 is stored in the response queue RESQ1, the queue management circuit QMGT calculates again the number of response queues in an occupied state having responses stored therein in the response queue RESQ1, and the number of unreserved response queues in a vacant state and the number or reserved response queues in a vacant state in the response queue RESQ1 for updating.

Still further, when the response ResRD32ID1SEQ16 stored in the response queue RESQ1 is transmitted to the data processing circuit CPU3, the queue management circuit QMGT deletes the response ResRD32ID1SEQ16 retained in the response queue RESQ1, and calculates again the number of response queues in an occupied state having responses stored therein in the response queue RESQ1, and the number of unreserved response queues in a vacant state and the number or reserved response queues in a vacant state in the response queue RESQ1 for updating.

Next, an example of data transfer between the data processing device CPU_CHIP and the memory M1 will be described. By way of the request signal RqMux0, the memory control circuit DCMC of the data processing device CPU_CHIP synchronizes a request ReqACID2SEQ15 with a clock signal RqCK0 for transfer to the memory M0, the request being multiplexed with a request start flag ReqStFlag value of 1, an identification number ID value of 2, a bank active instruction AC not requiring a completion notification, a master number MID value of 3 (a master number ID of the data processing circuit CPU3), a variable portion request length VREQL value of 4, a request number ReqN value of 15, a bank address BK of 0, a page address Row of 63 (FIG. 22: Step1). When the request ReqACID2SEQ15 is input to the memory M0, the queue check circuit RQQM checks to see whether a request queue in a vacant state is present in the request queue circuit RqQI (FIG. 22: Step 2). When a request queue in a vacant state is present in the request queue circuit RqQI, the memory M0 stores the request ReqACID2SEQ15 from the data processing device CPU_CHIP in the request queue of its own request queue circuit RqQI (FIG. 22: Step 3). Also, when a request queue in a vacant state is not present in the request queue circuit RqQI, the request ReqACID2SEQ15 cannot be received by the memory M0, and therefore, the memory M0 transmits a response ResNoAccID2Seq15 including reception-impossible data NOACC to the response input circuit RSIN of the memory control circuit DCMC via the response signal RsMux0 immediately after the request ReqACID2SEQ15 is issued. The response ResNoAccID2Seq15 includes a response start flag ResStFlag value of 1, an identification number ID value of 2, a bank active instruction AC, a master number MID value of 3, a response number ResN value of 15, (a value equal to the request number ReqN value of 15), and the reception-impossible data NOACC.

The response input circuit RSIN transmits the input response ResNoAccID2Seq15 to the request output circuit RQOUT. Based on the identification number ID value of 2, the bank active instruction AC, the master number MID value of 3, the response number ResN value of 15, and the reception-impossible data NOACC included in the response ResNoAccID2Seq15, the request output circuit RQOUT issues again the request ReqACID2SEQ15 (FIG. 22: Step1). Then, the ID comparator circuit CPQ compares the ID value of 2 included in the request ReqACID2SEQ15 entering the request queue of the request queue circuit RqQI and the ID value of 1 retained in the ID register circuit IDR (FIG. 22: Step 4). Since the comparison result reveals unlatch, the request ReqACID2SEQ15 is transferred to the request queue circuit RqQXO (FIG. 22: Step13).

Next, the request queue circuit RqQXO checks to see whether the stored request includes a read instruction or is a request requiring completion notification data (FIG. 22: Step14). Since the request ReqACID2SEQ15 does not include a read instruction and further is a request without requiring completion notification data, the memory M0 transfers the request ReqACID2SEQ15 by way of the request signal RqMux1 to the memory M1 (FIG. 22: Step1). When the request ReqACID2SEQ15 is input to the memory M1, the queue check circuit RQQM of the memory M1 checks to see whether a request queue in a vacant state is present in the request queue circuit RqQI (FIG. 22: Step 2).

When a request queue in a vacant state is present in the request queue circuit RqQI, the memory M1 stores the request ReqACID2SEQ15 from the memory M0 in the request queue of its own request queue circuit RqQI (FIG. 22: Step 3). Also, when a request queue in a vacant state is not present in the request queue circuit RqQI of the memory M1, the request ReqACID2SEQ15 cannot be received by the memory M1. Therefore, the memory M1 transmits the response ResNoAccID2Seq15 including reception-impossible data NOACC to the memory M0 via the response signal RsMux1 immediately after the request ReqACID2SEQ15 is issued.

Based on the identification number ID value of 2, the bank active instruction AC, the master number MID value of 3, the response number ResN value of 15, and the reception-impossible data NOACC included in the response ResNoAccID2Seq15, the memory M0 issues again a request ReqACID2SEQ15 (FIG. 22: Step1).

Then, the ID comparator circuit CPQ of the memory M1 compares the ID value of 2 included in the request ReqACID2SEQ15 entered to the request queue of the request queue circuit RqQI and the identification value of 2 retained in the ID register circuit IDR (FIG. 22: Step 4). Since the comparison result reveals a match, the request ReqACID2SEQ15 is transferred to the request queue circuit RqQXI (FIG. 22: Step5). Next, the request queue circuit RqQXI checks to see whether the stored request includes a read instruction or is a request requiring completion notification data (FIG. 22: Step 6). Since the request ReqACID2SEQ15 does not include a read instruction and further is a request not requiring completion notification data, the request queue circuit RqQXI transfers the stored request ReqACID2SEQ15 ReqACID2SEQ15 to the memory circuit Mem1 (FIG. 22: Step11). The memory circuit Mem1 operates according to the request ReqACID2SEQ15 (FIG. 22: Step12). Specifically, the command decoder CmdDec of the memory circuit Mem1 decodes the bank active instruction BA, the memory bank NV1BANK0 is selected by the control circuit Cont Logic, and the page address of 63 is stored in the page address buffer PadLat of the memory bank NV1BANK0 for input to the page decoder PageDec. Then, the memory cell connected to the page address of 63 in the memory array circuit NV1Bk0 is activated, and 1 kByte of data is transferred to the data buffer DataLat, although not particularly limited thereto (FIG. 22: Step12).

According to a value of tm1RCD (a minimum time interval between a bank active instruction and a read and write instruction) of 16 set in the timing register M1TREG, the memory control circuit DCMC of the data processing device CPU_CHIP performs an operation for transferring a request ReqRD32ID2SEQ16 (including a request start flag ReqSt-Flag value of 1, an identification number ID value of 2, a read instruction RD32 of data of 32 bytes, a master number MID value of 3 (a master number ID of the data processing circuit CPU3), a variable portion request length VREQL value of 4, a request number ReqN value of 16, and a bank address BK0 and a column address of Col32) including the read instruction RD32 of data of 32 bytes to the memory M0 after 16 clock cycle after the request ReqACID2SEQ15 is transferred.

First, to part of the response queues in a vacant state in the response queue RESQ1, the identification number ID value of 2 in the request ReqRD32ID2SEQ16 and a response number ResN value of 16 equal to the request number ReqN value of 16 are copied to allocate in advance the response queue in a vacant state required for receiving a response ResRD32ID2SEQ16 corresponding to the request ReqRD32ID2SEQ16.

Next, the request output circuit RQOUT synchronizes ReqRD32ID2SEQ16 with the clock signal RqCK0 by way of the request signal RqMux0 for transfer to the memory M0 (FIG. 22: Step1). Also, the request output circuit RQOUT transfers the identification number ID value of 2 and the request number ReqN value of 16 in the request ReqRD32ID2SEQ16 to the latency adjustment circuit LCHCK for retaining. Next, simultaneously with the transfer of the request ReqRD32ID2SEQ16, the latency adjustment circuit LCHCK starts measuring latency regarding the response ResRD32ID2SEQ16 corresponding to the request ReqRD32ID2SEQ16 (FIG. 22: Step1). When the request ReqRD32ID2SEQ16 is input to the memory M0, the queue check circuit RQQM checks to see whether a request queue in a vacant state is present in the request queue circuit RqQI (FIG. 22: Step 2).

When a request queue in a vacant state is present in the request queue circuit RqQI, the memory M0 stores the request ReqRD32ID2SEQ16 from the data processing device CPU_CHIP in the request queue of its own request queue circuit RqQI (FIG. 22: Step 3). Also, when a request queue in a vacant state is not present in the request queue circuit RqQI, the request ReqRD32ID2SEQ16 cannot be received by the memory M0, and therefore, the memory M0 transmits a response ResNoAccID2Seq16 including data indicative of reception-impossible data NOACC to the response input circuit RSIN of the memory control circuit DCMC via the response signal RsMux0 immediately after the request ReqRD32ID2SEQ16 is issued.

The response input circuit RSIN transmits the input response ResNoAccID2Seq16 to the request output circuit RQOUT. Based on the identification number ID value of 2, the read instruction RD, the master number MID value of 3, the response number ResN value of 16, and the reception-impossible data NOACC included in the response ResNoAccID2Seq16, the request output circuit RQOUT notifies again the latency adjustment circuit LCHCK of issuance of the request ReqRD32ID2SEQ16, and issues the request ReqRD32ID2SEQ16 (FIG. 22: Step1).

Then, the ID comparator circuit CPQ of the memory M0 compares the ID value of 2 included in the request ResNoAccID2Seq16 entered to the request queue of the request queue circuit RqQI and the ID value of 1 retained in the ID register circuit IDR (FIG. 22: Step 4). Since the comparison result reveals unlatch, the request ReqRD32ID2SEQ16 is transferred to the request queue circuit RqQXO (FIG. 22: Step13). Next, the request queue circuit RqQXO checks to see whether the request ReqRD32ID2SEQ16 is a request including a read instruction or a request requiring completion notification data (FIG. 22: Step14). Since the request ReqRD32ID2SEQ16 includes a read instruction, the request queue circuit RqQXO checks to see whether an unreserved response queue in a vacant state is present in the response queue circuit RsQp (FIG. 22: Step15). When a response queue in a vacant state is not present in the response queue circuit RsQp, the circuit waits until an unreserved response queue in a vacant state occurs.

When an unreserved response queue in a vacant state is present in the response queue circuit RsQp, the request queue circuit RqQXO copies the identification number ID value of 2 and the request number ReqN value of 16 in the request ReqRD32ID2SEQ16 to the unreserved response queue in a vacant state in the response queue circuit RsQp to reserve and allocate in advance the response queue in a vacant state required for receiving the response ResRD32ID2SEQ16 corresponding to the request ReqRD32ID2SEQ16 (FIG. 22: Step16). When the request queue circuit RqQXO reserves an unreserved response queue in a vacant state in the response queue circuit RsQp, the queue check circuit RSQM calculates the number of unreserved response queues in a vacant state and the number of reserved response queues in a vacant state in the response queue circuit RsQo for updating (FIG. 22: Step16).

Next, the memory M0 transfers the request ReqRD32ID2SEQ16 by way of the request signal RqMux1 to the memory M1 (FIG. 22: Step1). When the request ReqRD32ID2SEQ16 is input to the memory M1, the queue check circuit RQQM of the memory M1 checks to see whether a request queue in a vacant state is present in the request queue circuit RqQI (FIG. 22: Step 2). When a request queue in a vacant state is present in the request queue circuit RqQI of the memory M1, the memory M1 stores the request ReqRD32ID2SEQ16 from the memory M0 in the request queue of its own request queue circuit RqQI (FIG. 22: Step 3).

Also, when a request queue in a vacant state is not present in the request queue circuit RqQI of the memory M1, the request ReqRD32ID2SEQ16 cannot be received by the memory M1, and therefore, the memory M1 transmits a response ResNoAccID2Seq16 including data indicative of data reception-impossible data NOACC to the memory M0 via the response signal RsMux1 immediately after the request ReqRD32ID2SEQ16 is issued. Based on the identification number ID value of 2, the read instruction RD32, the master number MID value of 3, the response number ResN value of 16, and the reception-impossible data NOACC included in the response ResNoAccID2Seq16, the memory M0 issues again the request ReqRD32ID2SEQ16 (FIG. 22: Step1). Then, the ID comparator circuit CPQ of the memory M1 compares the ID value of 2 included in the request ReqRD32ID2SEQ16 entered to the request queue of the request queue circuit RqQI and the ID value of 2 retained in the ID register circuit IDR (FIG. 22: Step 4).

Since the comparison result reveals a match, the request ReqRD32ID2SEQ16 is transferred to the request queue circuit RqQXI (FIG. 22: Step 5). Next, the request queue circuit RqQXI checks to see whether the stored request ReqRD32ID2SEQ16 is a request including a read instruction or a request requiring completion notification data (FIG. 22: Step 6). Since the request ReqRD32ID2SEQ16 includes a read instruction, the request queue circuit RqQXI checks to see whether an unreserved response queue in a vacant state is present in the response queue circuit RsQo (FIG. 22: Step 7). When an unreserved response queue in a vacant state is not present in the response queue circuit RsQo, the request queue circuit RqQXI suspends the transfer of the request ReqRD32ID2SEQ16 until an unreserved response queue in a vacant state is generated. When an unreserved response queue in a vacant state is present in the response queue circuit RsQo, the request queue circuit RqQXI copies the identification number ID value of 2 and the request number ReqN value of 16 in the request ReqRD32ID2SEQ16 to the unreserved response queue in a vacant state in the response queue circuit RsQo to reserve and allocate in advance the response queue in a vacant state required for receiving read data from the memory circuit Mem1 corresponding to the request ReqRD32ID2SEQ16 (FIG. 22: Step 8).

When the request queue circuit RqQXI reserves an unreserved response queue in a vacant state in the response queue circuit RSQo, the queue check circuit RSQM calculates the number of unreserved response queues in a vacant state and the number of reserved response queues in a vacant state in the response queue circuit RsQo for updating (FIG. 22: Step 8). Next, the request queue circuit RqQXI transfers the stored request ReqRD32ID2SEQ16 to the memory circuit Mem1 (FIG. 22: Step 9). The memory circuit Mem1 operates according to the request ReqRD32ID2SEQ16 (FIG. 22: Step10). Specifically, the 32-byte data read instruction RD32 is transmitted from the command signal Command and the bank address 0 and the column address 32 are transmitted from the address signal Address, to the memory circuit Mem1. The command decoder CmdDec decodes the 32-byte data read instruction RD32, the memory bank NV1BANK0 is selected by the control circuit Cont Logic, and the column address of 32 is stored in the column address buffer CAddLat of the memory bank NV1BANK0 for input to the column decoder ColDec.

Then, with the column address of 32 being taken as a start address, 32 bytes of data is read from the data buffer DataLat of the memory bank NV1BANK0, and is stored in the read data buffer RDataLat via the data control circuit DataCont. Then, to 32 bytes of data read from the read data buffer RDataLat, a common response portion CMNRESF including a response start flag ResStFlag value of 1, an identification number ID value of 2 (a value equal to an ID register value of 2), a read instruction RD32 for data of 32 bytes, a master number MID value of 3 (the master number ID of the data processing circuit CPU3), a read data length RDL value of 32, and a response number ResN value of 16 (a value equal to a request number ReqN value of 16) is added, and the data of 32 byte is entered to the response queue of the response queue circuit RsQo in the response queue control circuit RsCT as a response ResRD32ID2SEQ16 (FIG. 23: Step17).

When the response ResRD32ID2SEQ16 is entered to the response queue circuit RsQo of the memory M1, the queue check circuit RSQM of the memory M1 calculates the number of response queues in an occupied state having responses already stored therein, and the number of reserved response queues in a vacant state and the number of unreserved response queues in a vacant state in the response queue circuit RsQo for updating (FIG. 23: Step18). Next, the response schedule circuit SCH of the memory M1 determines response priorities on the responses being entered to the response queue circuit RsQo and the response queue circuit RsQp (FIG. 22: Step19). Since only the response ResRD32ID2SEQ16 is entered in the response queue circuit RsQo and the response queue circuit RsQp, the response ResRD32ID2SEQ16 has the highest response priority (FIG. 23: Step 19). Therefore, the response schedule circuit SCH transmits the response ResRD32ID2SEQ16 to the memory M0 by way of the response signal RsMux1 (FIG. 23: Step 20).

Then, the queue check circuit RSQM of the memory circuit M1 calculates again the number of response queues in an occupied state having responses already stored therein, and the number of reserved response queues in a vacant state and the number of unreserved response queues in a vacant state in the response queue circuit RsQo for updating (FIG. 23: Step 21). Also, before being transmitted to the data processing device CPU_CHIP (FIG. 23: Step 22), the response ResRD32ID2SEQ16 in the response queue circuit RsQo of the memory M1 is transferred to the response queue circuit RsQp of the memory M0 (FIG. 23: Step17).

Since the memory M0 has allocated in advance a response queue in a vacant state for receiving the response ResRD32ID2SEQ16 in the response queue circuit RsQp, the response ResRD32ID2SEQ16 is stored in the response queue circuit RsQp of the memory M0 (FIG. 23: Step17). When the response ResRD32ID2SEQ16 is entered to the response queue circuit RsQo of the memory M0, the queue check circuit RSQM of the memory M0 calculates the number of response queues in an occupied state having responses already stored therein, and the number of reserved response queues in a vacant state and the number of unreserved response queues in a vacant state in the response queue circuit RsQo for updating (FIG. 23: Step18). Next, the response schedule circuit SCH of the memory M0 determines response priorities on the responses entered to the response queue circuit RsQo and the response queue circuit RsQp (FIG. 23: Step19). Since only the response ResRD32ID2SEQ16 is entered in the response queue circuit RsQo and the response queue circuit RsQp, the response ResRD32ID2SEQ16 has the highest response priority (FIG. 23: Step19), and therefore, the response schedule circuit SCH transmits the response ResRD32ID2SEQ16 to the data processing device CPU_CHIP by way of the response signal RsMux0 (FIG. 23: Step 20). When the response ResRD32ID2SEQ16 in the response queue circuit RsQp of the memory M0 is completely transmitted to the data processing device CPU_CHIP, the queue check circuit RSQM calculates the number of response queues in an occupied state having responses already stored therein, and the number of reserved response queues in a vacant state and the number of unreserved response queues in a vacant state in the response queue circuit RsQp for updating (FIG. 23: Step 21).

Since the data processing device CPU_CHIP has allocated in advance a response queue in a vacant state for receiving the response ResRD32ID2SEQ16 in the response queue circuit RsQp, the response ResRD32ID2SEQ16 is stored in the response input circuit RSIN. When the response ResRD32ID2SEQ16 in the response queue circuit RsQo of the memory M0 is transmitted to the data processing device CPU_CHIP (FIG. 23: Step 22), data transfer between the data processing device CPU_CHIP and the memory M0 is completed (FIG. 23: Step 23). Upon receiving the response ResRD32ID2SEQ16, the response input circuit RSIN of the memory control circuit DCMC extracts the identification number ID value of 2 and the response number ResN value of 16 included in the response ResRD32ID2SEQ16 for transmission to the latency adjustment circuit LCHCK. Based on these identification number ID value of 2 and response number ResN value of 16, the latency adjustment circuit LCHCK finds that the response ResRD32ID2SEQ16 for the request ReqRD32ID2SEQ16 has returned, and ends latency measurement.

The latency adjustment circuit LCHCK compares the latency measurement result and a latency LatBank value of 12 clock cycles corresponding to the identification number ID value of 2 set in the latency register LTREG in the configuration circuit CONFIG. As a result of the comparison, when a difference therebetween exceeds an allowable range, the latency adjustment circuit LCHCK performs a latency correcting operation so that a measured latency for an upcoming read request is equal to the value of latency LatBank value of 12 clock cycles. Also, as a result of the comparison, when the difference therebetween is within the allowable range, the latency adjustment circuit LCHCK does not perform a latency correcting operation.

Also, when the response ResRD32ID2SEQ16 is stored in the response queue RESQ1, the queue management circuit QMGT calculates again the number of response queues in an occupied state having responses stored therein in the response queue RESQ1, and the number of unreserved response queues in a vacant state and the number of reserved response queues in a vacant state in the response queue RESQ1 for updating.

Furthermore, when the response ResRD32ID2SEQ16 stored in the response queue RESQ1 is transmitted to the data processing circuit CPU3, the queue management circuit QMGT deletes the response ResRD32ID2SEQ16 retained in the response queue RESQ1, and calculates again the number of response queues in an occupied state having responses stored therein in the response queue RESQ1, and the number of unreserved response queues in a vacant state and the number of reserved response queues in a vacant state in the response queue RESQ1 for updating.

Next, an example of data transfer between the data processing device CPU_CHIP and the memory M2 will be described. By way of the request signal RqMux0, before transmitting a request ReqACwithCompletionID3SEQ15 requiring a completion notification to the memory M0, the request being multiplexed with a request start flag ReqStFlag value of 1, an identification number ID value of 3, a bank active instruction ACwithCompletion requiring a completion notification, a master number MID value of 3 (a master number ID of the data processing circuit CPU3), a variable portion request length VREQL value of 4, a request number ReqN value of 15, a bank address of BK0, and a page address of Row63, the memory control circuit DCMC of the data processing device CPU_CHIP copies the identification number ID value of 3 and the response number ResN value of 15 equal to the request number ReqN value of 15 in the request ReqACwithCompletionID3SEQ15 to part of the response queue in a vacant state in the response queue RESQ1, and allocates in advance a response queue in a vacant state required for receiving a response ResACwithCompletionID3SEQ15 including completion notification data corresponding to the request ReqACwithCompletionID3SEQ15.

Next, the memory control circuit DCMC synchronizes the request ReqACwithCompletionID3SEQ15 with the clock signal RqCK0 for transfer to the memory M0 (FIG. 22: Step1). When the request ReqACwithCompletionID3SEQ15 is input to the memory M0, the queue check circuit RQQM checks to see whether a request queue in a vacant state is present in the request queue circuit RqQI (FIG. 22: Step 2). When a request queue in a vacant state is present in the request queue circuit RqQI, the memory M0 stores the request ReqACwithCompletionID3SEQ15 from the data processing device CPU_CHIP in the request queue of its own request queue circuit RqQI (FIG. 22: Step 3). Also, when a request queue in a vacant state is not present in the request queue circuit RqQI, the request ReqACwithCompletionID3SEQ15 cannot be received by the memory M0. Therefore, the memory M0 transmits a response ResNoAccID3Seq15 including data indicative of reception-impossible data NOACC to the response input circuit RSIN of the memory control circuit DCMC via the response signal RsMux0 immediately after the request ReqACwithCompletionID3SEQ15 is issued. The response ResNoAccID3Seq15 includes a response start flag ResStFlag value of 1, an identification number ID value of 3, a bank active instruction ACwithCompletion, a master number MID value of 3, a response number ResN value of 15, (a value equal to the request number ReqN value of 15), and the reception-impossible data NOACC.

The response input circuit RSIN transmits the input response ResNoAccID3Seq15 to the request output circuit RQOUT. Based on the identification number ID value of 3, the bank active instruction ACwithCompletion, the master number MID value of 3, the response number ResN value of 15, and the reception-impossible data NOACC included in the response ResNoAccID3Seq15, the request output circuit RQOUT issues again the request ReqACwithCompletionID3SEQ15 (FIG. 22: Step1).

Then, the ID comparator circuit CPQ of the memory M0 compares the ID value of 3 included in the request ReqACwithCompletionID3SEQ15 entered to the request queue of the request queue circuit RqQI and the ID value of 1 retained in the ID register circuit IDR (FIG. 22: Step 4). Since the comparison result reveals unlatch, the request ReqACwithCompletionID3SEQ15 is transferred to the external request queue circuit RqQXO (FIG. 22: Step13). Next, the request queue circuit RqQXO checks to see whether the stored request ReqACwithCompletionID3SEQ15 is a request including a read instruction or a request requiring completion notification data (FIG. 22: Step14).

Since the request ReqACwithCompletionID3SEQ15 includes the bank active instruction ACwithCompletion requiring completion notification, the request queue circuit RqQXO checks to see whether an unreserved response queue in a vacant state is present in the response queue circuit RsQp (FIG. 22: Step15). When an unreserved response queue in a vacant state is not present in the response queue circuit RsQp, the circuit waits until an unreserved response queue in a vacant state is generated.

When an unreserved response queue in a vacant state is present in the response queue circuit RsQp, the request queue circuit RqQXO copies the identification number ID value of 3 and the request number ReqN value of 15 in the request ReqACwithCompletionID3SEQ15 to the unreserved response queue in a vacant state in the response queue circuit RsQp to reserve and allocate in advance the response queue in a vacant state required for receiving the response ResACwithCompletionID3SEQ15 including completion notification data corresponding to the request ReqACwithCompletionID3SEQ15 (FIG. 22: Step16). When the request queue circuit RqQXO reserves an unreserved response queue in a vacant state of the response queue circuit RsQp, the queue check circuit RSQM calculates the number of response queues in an occupied state having responses already stored therein, and the number of unreserved response queues in a vacant state and the number of reserved response queues in a vacant state in the response queue circuit RsQp for updating (FIG. 22: Step16).

Next, by way of the request signal RqMux1, the memory M0 transfers the request ReqACwithCompletionID3SEQ15 to the memory M1 (FIG. 22: Step1). When the request ReqACwithCompletionID3SEQ15 is input to the memory M1, the queue check circuit RQQM of the memory M1 checks to see whether a request queue in a vacant state is present in the request queue circuit RqQI (FIG. 22: Step 2). When a request queue in a vacant state is present in the request queue circuit RqQI of the memory M1, the memory M1 stores the request ReqACwithCompletionID3SEQ15 from the memory M0 in the request queue of its own request queue circuit RqQI (FIG. 22: Step 3).

Also, when a request queue in a vacant state is not present in the request queue circuit RqQI of the memory M1, the request ReqACwithCompletionID3SEQ15 cannot be received by the memory M1. Therefore, the memory M1 transmits a response ResNoAccID3Seq15 including data indicative of reception-impossible data NOACC to the memory M0 via the response signal RsMux1 immediately after the request ReqACwithCompletionID3SEQ15 is issued. Based on the identification number ID value of 3, the bank active instruction ACwithCompletion, the master number MID value of 3, the response number ResN value of 15, and the reception-impossible data NOACC included in the response ResNoAccID3Seq15, the memory M0 issues again the request ReqACwithCompletionID3SEQ15 to the memory M1 (FIG. 22: Step1). Then, the ID comparator circuit CPQ of the memory M1 compares the ID value of 3 included in the request ReqACwithCompletionID3SEQ15 being entered in the request queue of its own request queue circuit RqQI and the ID value of 2 retained in the ID register circuit IDR (FIG. 22: Step 4).

Since the comparison result reveals that the values are unmatched, the request ReqACwithCompletionID3SEQ15 is transferred to the request queue circuit RqQXO (FIG. 22: Step13). Next, the request queue circuit RqQXO checks to see whether the stored request ReqACwithCompletionID3SEQ15 includes a read instruction or an instruction requiring a completion notification (FIG. 22: Step14).

Since the request ReqACwithCompletionID3SEQ15 includes the bank active instruction ACwithCompletion requiring a completion notification, the request queue circuit RqQXO checks to see whether an unreserved response queue in a vacant state is present in the response queue circuit RsQp (FIG. 22: Step15). When an unreserved response queue in a vacant state is not present in the response queue circuit RsQp, the circuit waits until an unreserved response queue in a vacant state is generated.

When an unreserved response queue in a vacant state is present in the response queue circuit RsQp, the request queue circuit RqQXO copies the identification number ID value of 3 and the request number ReqN value of 15 in the request ReqACwithCompletionID3SEQ15 to the unreserved response queue in a vacant state in the response queue circuit RsQp to reserve and allocate in advance the response queue in a vacant state required for receiving the response ResACwithCompletionID3Seq15 including the completion notification data corresponding to the request ReqACwithCompletionID3SEQ15 (FIG. 22: Step16).

When the request queue circuit RqQX reserves an unreserved response queue in a vacant state of the response queue circuit RsQp, the queue check circuit RSQM calculates the number of response queues in an occupied state having responses already stored therein, and the number of unreserved response queues in a vacant state and the number of reserved response queues in a vacant state in the response queue circuit RsQp for updating (FIG. 22: Step16).

Next, by way of the request signal RqMux2, the memory M1 transfers the request ReqACwithCompletionID3SEQ15 to the memory M2 (FIG. 22: Step1). When the request ReqACwithCompletionID3SEQ15 is input to the memory M2, the queue check circuit RQQM of the memory M2 checks to see whether a request queue in a vacant state is present in the request queue circuit RqQI (FIG. 22: Step 2). When a request queue in a vacant state is present in the request queue circuit RqQI of the memory M2, the memory M2 stores the request ReqACwithCompletionID3SEQ15 from the memory M0 in the request queue of its own request queue circuit RqQI (FIG. 22: Step 3).

Also, when a request queue in a vacant state is not present in the request queue circuit RqQI of the memory M2, the request ReqACwithCompletionID3SEQ15 cannot be received by the memory M2. Therefore, the memory M2 transmits a response ResNoAccID3Seq15 including data indicative of reception-impossible data NOACC to the memory M1 via the response signal RsMux2 immediately after the request ReqACwithCompletionID3SEQ15 is issued. Based on the identification number ID value of 3, the bank active instruction ACwithCompletion, the master number MID value of 3, the response number ResN value of 15, and the reception-impossible data NOACC included in the response ResNoAccID3Seq15, the memory M1 issues again the request ReqACwithCompletionID3SEQ15 to the memory M2 (FIG. 22: Step1).

Then, the ID comparator circuit CPQ of the memory M2 compares the ID value of 3 included in the request ReqACwithCompletionID3SEQ15 entering the request queue of request queue circuit RqQI and the ID value of 3 retained in the ID register circuit IDR (FIG. 22: Step 4). Since the comparison result reveals a match, the request ReqACwithCompletionID3SEQ15 is transferred to the request queue circuit RqQXI (FIG. 22: Step5). Next, the request queue circuit RqQXI checks to see whether the stored request includes a read instruction or an instruction requiring a completion notification (FIG. 22: Step 6). Since the request ReqACwithCompletionID3SEQ15 includes the bank active instruction ACwithCompletion requiring a completion notification, the request queue circuit RqQXI checks to see whether an unreserved response queue in a vacant state is present in the response queue circuit RsQo (FIG. 22: Step 7). When an unreserved response queue in a vacant state is not present in the response queue circuit RsQo, the request queue circuit RqQXI suspends the transfer of the request ReqACwithCompletionID3SEQ15 until an unreserved response queue in a vacant state is generated. When an unreserved response queue in a vacant state is present in the response queue circuit RsQo, the request queue circuit RqQXI copies the identification number ID value of 3 and the request number ReqN value of 15 in the request ReqACwithCompletionID3SEQ15 to the unreserved response queue in a vacant state in the response queue circuit RsQo to reserve and allocate in advance the response queue in a vacant state required for receiving the response ResACwithCompletionID3SEQ15 including completion notification data corresponding to the request ReqACwithCompletionID3SEQ15 (FIG. 22: Step 8).

When the request queue circuit RqQXI reserves an unreserved response queue in a vacant state in the response queue circuit RSQo, the queue check circuit RSQM calculates the number of response queues in an occupied state having responses already stored therein, and the number of unreserved response queues in a vacant state and the number of reserved response queues in a vacant state in the response queue circuit RsQo for updating (FIG. 22: Step 8).

Next, the request queue circuit RqQXI transfers the stored request ReqACwithCompletionID3SEQ15 to the memory circuit Mem2 (FIG. 22: Step11). The memory circuit Mem1 operates according to the request ReqACwithCompletionID3SEQ15 (FIG. 22: Step12). Specifically, the command decoder CmdDec of the memory circuit Mem2 decodes the bank active instruction AcwithCompletion, the memory bank NV2BANK0 is selected by the control circuit Cont Logic, and the page address of 63 is stored in the page address buffer PadLat of the memory bank NV2BANK0 for input to the page decoder PageDec. Then, the memory cell connected to the page address of 63 in the memory array circuit NV2Bk0 is activated, and 1 kByte of data is transferred to the data buffer DataLat after 25 μsec, although not particularly limited thereto (FIG. 22: Step12). When 1 kByte of data is transferred to the data buffer DataLat, to completion notification data Completion indicating that the bank active instruction ACwithCompletion has been completed, a common response portion CMNRESF including a response start flag ResStFlag value of 1, an identification number ID value of 3 (a value equal to an ID register IDR value of 3), the bank active instruction ACwithCompletion, a master number MID value of 3 (the master number ID of the data processing circuit CPU3), and a response number ResN value of 15 (a value equal to a request number ReqN value of 15) is added, and entered to the response queue of the response queue circuit RsQo in the response queue control circuit RsCT as a response ResACwithCompletionID3SEQ15 (FIG. 23: Step17).

When the response ResACwithCompletionID3SEQ15 is entered to the response queue circuit RsQo of the memory M2, the queue check circuit RSQM of the memory M2 calculates the number of response queues in an occupied state having responses already stored therein, and the number of reserved response queues in a vacant state and the number of unreserved response queues in a vacant state in the response queue circuit RsQo for updating (FIG. 23: Step18). Next, the response schedule circuit SCH of the memory M2 determines response priorities on the responses being entered to the response queue circuit RsQo and the response queue circuit RsQp (FIG. 23: Step19). Since only the response ResACwithCompletionID3SEQ15 is present in the response queue circuit RsQo and the response queue circuit RsQp, the response ResACwithCompletionID3SEQ15 has the highest response priority (FIG. 23: Step19), and therefore, the response schedule circuit SCH transmits the response ResACwithCompletionID3SEQ15 to the memory M1 by way of the response signal RsMux2 (FIG. 23: Step 20). When the response ResACwithCompletionID3SEQ15 in the response queue circuit RsQo of the memory M2 is transmitted to the memory M1, the queue check circuit RSQM of the memory M1 calculates the number of response queues in an occupied state having responses already stored therein, and the number of reserved response queues in a vacant state and the number of unreserved response queues in a vacant state in the response queue circuit RsQo for updating (FIG. 23: Step 21).

The memory M1 has allocated in advance the response queue in a vacant state for receiving the response ResACwithCompletionID3SEQ15 from the memory M2 in the response queue circuit RsQp, and, before being transmitted to the data processing device CPU_CHIP (FIG. 23: Step 22), the response is transferred to the response queue circuit RsQp of the memory M1 (FIG. 23: Step17).

When the response ResACwithCompletionID3SEQ15 is entered to the response queue circuit RsQp of the memory M1, the queue check circuit RSQM of the memory M1 calculates the number of response queues in an occupied state having responses already stored therein, and the number of reserved response queues in a vacant state and the number of unreserved response queues in a vacant state in the response queue circuit RsQp for updating (FIG. 23: Step18). Next, the response schedule circuit SCH of the memory M1 determines response priorities on the responses entering the response queue circuit RsQo and the response queue circuit RsQp (FIG. 23: Step 19). Since only the response ResACwithCompletionID3SEQ15 is entered in the response queue circuit RsQo and the response queue circuit RsQp, the response ResACwithCompletionID3SEQ15 has the highest response priority (FIG. 23: Step 19). Therefore, the response schedule circuit SCH transmits the response ResACwithCompletionID3SEQ15 to the memory M0 from the response signal RsMux1 (FIG. 23: Step 20).

When the response ResACwithCompletionID3SEQ15 in the response queue circuit RsQo of the memory M1 is transmitted to the memory M0, the queue check circuit RSQM of the memory M0 calculates the number of response queues in an occupied state having responses already stored therein, and the number of reserved response queues in a vacant state and the number of unreserved response queues in a vacant state in the response queue circuit RsQo for updating (FIG. 23: Step 21).

The memory M0 has allocated in advance a response queue in a vacant state for receiving the response ResACwithCompletionID3SEQ15 from the memory M1 in the response queue circuit RsQp, and, before being transmitted to the data processing device CPU_CHIP (FIG. 23: Step 22), the response ResACwithCompletionID3SEQ15 is transferred to the response queue circuit RsQp of the memory M0 (FIG. 23: Step17). When the response ResACwithCompletionID3SEQ15 is entered to the response queue circuit RsQp of the memory M0, the queue check circuit RSQM of the memory M0 calculates the number of response queues in an occupied state having responses already stored therein, and the number of reserved response queues in a vacant state and the number of unreserved response queues in a vacant state in the response queue circuit RsQp for updating (FIG. 23: Step18). Next, the response schedule circuit SCH of the memory M0 determines response priorities on the responses being entered to the response queue circuit RsQo and the response queue circuit RsQp (FIG. 23: Step19). Since only the response ResACwithCompletionID3SEQ15 is entered in the response queue circuit RsQo and the response queue circuit RsQp, the response ResACwithCompletionID3SEQ15 has the highest response priority (FIG. 23: Step19), and therefore, the response schedule circuit SCH transmits the response ResACwithCompletionID3SEQ15 to the data processing device CPU_CHIP by way of the response signal RsMux0 (FIG. 23: Step 20).

When the response ResACwithCompletionID3SEQ15 in the response queue circuit RsQp of the memory M0 is completely transmitted to the data processing device CPU_CHIP, the queue check circuit RSQM of the memory M0 calculates the number of response queues in an occupied state having responses already stored therein, and the number of reserved response queues in a vacant state and the number of unreserved response queues in a vacant state in the response queue circuit RsQp for updating (FIG. 23: Step 21).

Since the data processing device CPU_CHIP has allocated in advance a response queue in a vacant state for receiving the response ResACwithCompletionID3SEQ15 in the response queue circuit RESQ1, the response ResACwithCompletionID3SEQ15 is input to the response input circuit RSIN of the data processing device CPU_CHIP, and is stored in the response queue circuit RESQ1 (FIG. 23: Step 22 and Step 23).

Upon receiving the response ResACwithCompletionID3SEQ15, the response input circuit RSIN of the memory control circuit DCMC extracts the identification number ID value of 3 and the response number ResN value of 15 and the completion notification data Completion included in the response ResACwithCompletionID3SEQ15 for transmission to the request output circuit RQOUT. Based on these identification number ID value of 3, response number ResN value of 15, and completion notification data Completion, the request output circuit RQOUT confirms that the request ReqACwithCompletionID3SEQ15 has been completed.

After confirming that the request ReqACwithCompletionID3SEQ15 has been completed, the request output circuit RQOUT performs an operation for transferring a request ReqRD32ID3SEQ16 (including a request start flag ReqStFlag value of 1, an identification number ID value of 3, a read instruction RD32 for data of 32 bytes, a master number MID value of 3 (the master number ID of the data processing circuit CPU3), a variable portion request length VREQL value of 4, a request number ReqN value of 16, and a bank address of BK0 and a column address of Col32) including a read instruction RD32 of data of 32 bytes to the memory M0.

First, to part of the response queues in a vacant state in the response queue RESQ1, the identification number ID value of 3 and a response number ResN value of 16 equal to the request number ReqN value of 16 in the request ReqRD32ID3SEQ16 are copied to allocate in advance a response queue in a vacant state required for receiving a response ResRD32ID3SEQ16 corresponding to the request ReqRD32ID3SEQ16.

Next, the request output circuit RQOUT synchronizes ReqRD32ID3SEQ16 with the clock signal RqCK0 by way of the request signal RqMux0 for transfer to the memory M0 (FIG. 22: Step1). Also, the request output circuit RQOUT transfers the identification number ID value of 3 and the request number ReqN value of 16 in the request ReqRD32ID3SEQ16 to the latency adjustment circuit LCHCK for retaining. Next, simultaneously with the transfer of the request ReqRD32ID3SEQ16, the latency adjustment circuit LCHCK starts measuring latency regarding the response ResRD32ID3SEQ16 corresponding to the request ReqRD32ID3SEQ16 (FIG. 22: Step1).

Also, when the request output circuit RQOUT notifies the queue management circuit QMGT that the read request ReqRD32ID3Seq16 has been issued to the memory M0, the queue management circuit QMGT deletes the response ResACwithCompletionID3Seq15 retained in the response queue RESQ1, and calculates again the number of response queues in an occupied state having responses stored therein, and the number of unreserved response queues in a vacant state and the number of reserved response queues in a vacant state in the response queue RESQ1 for updating.

When the request ReqRD32ID3SEQ16 is input to the memory M0, the queue check circuit RQQM checks to see whether a request queue in a vacant state is present in the request queue circuit RqQI (FIG. 22: Step 2). When a request queue in a vacant state is present in the request queue circuit RqQI, the memory M0 stores the request ReqRD32ID3SEQ16 from the data processing device CPU_CHIP in the request queue of its own request queue circuit RqQI (FIG. 22: Step 3). Also, when a request queue in a vacant state is not present in the request queue circuit RqQI, the request ReqRD32ID3SEQ16 cannot be received by the memory M0, and therefore, the memory M0 transmits a response ResNoAccID3Seq16 including data indicative of reception-impossible data NOACC to the response input circuit RSIN of the memory control circuit DCMC via the response signal RsMux0 immediately after the request ReqRD32ID3SEQ16 is issued.

The response input circuit RSIN transmits the input response ResNoAccID3SEQ16 to the request output circuit RQOUT. The request output circuit RQOUT notifies the latency adjustment circuit LCHCK that the request ReqRD32ID3SEQ16 is issued again based on the identification number ID value of 3, the read instruction RD32, the master number MID value of 3, the response number ResN value of 16, and the reception-impossible data NOACC included in the response ResNoAccID1Seq16, and issues the request ReqRD32ID3SEQ16 (FIG. 22: Step1).

Then, the ID comparator circuit CPQ of the memory M0 compares the ID value of 3 included in the request ReqRD32ID3SEQ16 entering the request queue of the request queue circuit RqQI and the ID value of 1 retained in the ID register circuit IDR (FIG. 22: Step 4). Since the comparison result reveals that the values are unmatched, the request ReqRD32ID3SEQ16 is transferred to the request queue circuit RqQXO (FIG. 22: Step13). Next, the request queue circuit RqQXO checks to see whether the request ReqRD32ID3SEQ16 includes a read instruction or an instruction requiring a completion notification (FIG. 22: Step14). Since the request ReqRD32ID3SEQ16 includes a read instruction, the request queue circuit RqQXO checks to see whether an unreserved response queue in a vacant state is present in the response queue circuit RsQp (FIG. 22: Step15). When an unreserved response queue in a vacant state is not present in the response queue circuit RsQp, the circuit waits until an unreserved response queue in a vacant state is generated.

When an unreserved response queue in a vacant state is present in the response queue circuit RsQp, the request queue circuit RqQXO copies the identification number ID value of 3 and the request number ReqN of 16 in the request ReqRd32ID3SEQ16 to the unreserved response queue in a vacant state in the response queue circuit RsQp to reserve and allocate in advance a response queue in a vacant state required for receiving the response ResRD32ID3SEQ16 corresponding to the request ReqRD32ID3SEQ16 (FIG. 22: Step16). When the request queue circuit RqQXO reserves an unreserved response queue in a vacant state in the response queue circuit RsQp, the queue check circuit RSQM calculates the number of response queues in an occupied state having responses stored therein in the response queue circuit RsQp, and the number of unreserved response queues in a vacant state and the number of reserved response queues in a vacant state in the response queue circuit RsQp for updating (FIG. 22: Step16).

Next, the memory M0 transfers the request ReqRD32ID3SEQ16 to the memory by way of the request signal RqMux1 (FIG. 22: Step1). When the request ReqRD32ID3SEQ16 is input to the memory M1, the queue check circuit RQQM of the memory M1 checks to see whether a request queue in a vacant state is present in the request queue circuit RqQI (FIG. 22: Step 2). When a request queue in a vacant state is present in the request queue circuit RqQI of the memory M1, the memory M1 stores the request ReqRD32ID3SEQ16 from the memory M0 in the request queue of its own request queue circuit RqQI (FIG. 22: Step 3).

Also, when a request queue in a vacant state is not present in the request queue circuit RqQI of the memory M1, the request ReqRD32ID3SEQ16 cannot be received by the memory M1, and therefore, the memory M1 transmits a response ResNoAccID3Seq16 including data indicative of reception-impossible data NOACC to the memory M0 via the response signal RsMux1 immediately after the request ReqRD32ID3SEQ16 is issued. Based on the identification number ID value of 3, the read instruction RD32, the master number MID value of 3, the response number ResN value of 16, and the reception-impossible data NOACC included in the response ResNoAccID3Seq16, the memory M0 issues again the request ReqRD32ID3SEQ16 (FIG. 22: Step1). Then, the ID comparator circuit CPQ of the memory M1 compares the ID value of 3 included in the request ReqRD32ID2SEQ16 entering the request queue of the request queue circuit RqQI and the ID value of 2 retained in the ID register circuit IDR (FIG. 22: Step 4). Since the comparison result reveals that the values are unmatched, the request ReqRD32ID3SEQ16 is transferred to the request queue circuit RqQXO (FIG. 22: Step13). Next, the request queue circuit RqQXO checks to see whether the request ReqRD32ID3SEQ16 includes a read instruction or an instruction requiring a completion notification (FIG. 22: Step14). Since the request ReqRD32ID3SEQ16 includes a read instruction, the request queue circuit RqQXO checks to see whether an unreserved response queue in a vacant state is present in the response queue circuit RsQp (FIG. 22: Step15). When an unreserved response queue in a vacant state is not present in the response queue circuit RsQp, the circuit waits until an unreserved response queue in a vacant state is generated.

When an unreserved response queue in a vacant state is present in the response queue circuit RsQp, the request queue circuit RqQXO copies the identification number ID value of 3 and the request number ReqN value of 16 in the request ReqRD32ID3SEQ16 to the response queue in a vacant state in the response queue circuit RsQp to reserve and allocate in advance a response queue in a vacant state for receiving a response ResRD32ID3SEQ16 corresponding to the request ReqRD32ID3SEQ16 (FIG. 22: Step16). When the request queue circuit RqQXO reserves the unreserved response queue in a vacant state in the response queue circuit RsQp, the queue check circuit RSQM calculates the number of response queues in an occupied state having responses stored therein in the response queue circuit RsQp, and the number of unreserved response queues in a vacant state and the number of reserved response queues in a vacant state in the response queue circuit RsQp for updating (FIG. 22: Step16). Next, the memory M1 transfers the request ReqRD32ID3SEQ16 to the memory M2 by way of the request signal RqMux1 (FIG. 22: Step1). When the request ReqRD32ID3SEQ16 is input to the memory M2, the queue check circuit RQQM of the memory M2 checks to see whether a request queue in a vacant state is present in the request queue circuit RqQI (FIG. 22: Step 2). When a request queue in a vacant state is present in the request queue circuit RqQI of the memory M2, the memory M2 stores the request ReqRD32ID2SEQ16 from the memory M1 in the request queue of its own request queue circuit RqQI (FIG. 22: Step 3).

When a request queue in a vacant state is not present in the request queue circuit RqQI of the memory M2, the request ReqRD32ID2SEQ16 cannot be received by the memory M1, and therefore, the memory M2 transmits a response ResNoAccID2Seq16 including data indicative of reception-impossible data NOACC to the memory M1 via the response signal RsMux1 immediately after the request ReqRD32ID2SEQ16 is issued. Based on the identification number ID value of 2, the read instruction RD32, the master number MID value of 3, the response number ResN value of 16, and the reception-impossible data NOACC included in the response ResNoAccID2Seq16, the memory M1 issues again the request ReqRD32ID2SEQ16 (FIG. 22: Step1). Then, the ID comparator circuit CPQ of the memory M2 compares the ID value of 2 included in the request ReqRD32ID2SEQ16 being entered to the request queue of the request queue circuit RqQI and the ID value of 2 retained in the ID register circuit IDR (FIG. 22: Step 4).

Since the comparison result reveals a match, a request ReqRD32ID3SEQ16 is transferred to the request queue circuit RqQXI (FIG. 22: Step 5). Next, the request queue circuit RqQXI checks to see whether the stored request ReqRD32ID3SEQ16 includes a read instruction or an instruction requiring completion notification data (FIG. 22: Step 6). Since the request ReqRD32ID3SEQ16 includes a read instruction, the request queue circuit RqQXI checks to see whether an unreserved response queue in a vacant state is present in the response queue circuit RsQo (FIG. 22: Step 7). When an unreserved response queue in a vacant state is not present in the response queue circuit RsQo, the request queue circuit RqQXI suspends the transfer of the request ReqRD32ID3SEQ16 until an unreserved response queue in a vacant state is generated. When an unreserved response queue in a vacant state is present in the response queue circuit RsQo, the request queue circuit RqQXI copies the identification number ID value of 3 and the request number ReqN value of 16 in the request ReqRD32ID3SEQ16 to the unreserved response queue in a vacant state of the response queue circuit RsQo to reserve and allocate in advance a response queue in a vacant state required for receiving read data from the memory circuit Mem2 corresponding to the request ReqRD32ID3SEQ16 (FIG. 22: Step 8).

When the request queue circuit RqQXI reverses an unreserved response queue in a vacant state in the response queue circuit RsQo, the queue check circuit RSQM calculates the number of response queues in an occupied state having responses stored therein in the response queue circuit RsQo, and the number of unreserved response queues in a vacant state and the number of reserved response queues in a vacant state in the response queue circuit RsQo for updating (FIG. 22: Step 8).

Next, the request queue circuit RqQXI transfers the stored request ReqRD32ID3SEQ16 to the memory circuit Mem1 (FIG. 22: Step 9). The memory circuit Mem2 operates according to the request ReqRD32ID3SEQ16 (FIG. 22: Step10). Specifically, the 32-byte data read instruction RD32 is transmitted from the command signal Command and the bank address of 0 and the column address of 32 are transmitted from the address signal Address, to the memory circuit Mem2. The command decoder CmdDec decodes the 32-byte data read instruction RD32, the memory bank NV2BANK0 is selected by the control circuit Cont Logic, and the column address of 32 is stored in the column address buffer CAddLat of the memory bank NV2BANK0 for input to the column decoder ColDec.

Then, with the column address of 32 being taken as a start address, 32 bytes of data is read from the data buffer DataLat of the memory bank NV2BANK0, and is stored in the read data buffer RDataLat via the data control circuit DataCont. Then, to 32 bytes of data read from the read data buffer RDataLat, a common response portion CMNRESF including a response start flag ResStFlag value of 1, an identification number ID value of 3 (a value equal to an ID register value of 3), a read instruction RD32 for data of 32 bytes, a master number MID value of 3 (the master number ID of the data processing circuit CPU3), a read data length RDL value of 32, and a response number ResN value of 16 (a value equal to a request number ReqN value of 16) is added, and the data is entered to the response queue of the response queue circuit RsQo in the response queue control circuit RsCT as a response ResRD32ID3SEQ16 (FIG. 23: Step17).

When the response ResRD32ID3SEQ16 is entered to the response queue circuit RsQo of the memory M2, the queue check circuit RSQM of the memory M2 calculates the number of response queues in an occupied state having responses already stored therein, and the number of reserved response queues in a vacant state and the number of unreserved response queues in a vacant state in the response queue circuit RsQo for updating (FIG. 23: Step18). Next, the response schedule circuit SCH of the memory M2 determines response priorities on the responses entering the response queue circuit RsQo and the response queue circuit RsQp (FIG. 22: Step19). Since only the response ResRD32ID3SEQ16 is present in the response queue circuit RsQo and the response queue circuit RsQp, the response ResRD32ID3SEQ16 has the highest response priority (FIG. 23: Step19). Therefore, the response schedule circuit SCH transmits the response ResRD32ID3SEQ16 to the memory M1 by way of the response signal RsMux1 (FIG. 23: Step 20). Then, the queue check circuit RSQM of the memory M2 calculates the number of response queues in an occupied state having responses already stored therein, and the number of reserved response queues in a vacant state and the number of unreserved response queues in a vacant state in the response queue circuit RsQo for updating (FIG. 23: Step 21).

Since the memory M1 has allocated in advance a response queue in a vacant state for receiving the response ResRD32ID3SEQ16 in the response queue circuit RsQp, before being transmitted to the data processing device CPU_CHIP (FIG. 23: Step 22), the response ResRD32ID3SEQ16 is transferred to the response queue circuit RsQp of the memory M1 (FIG. 23: Step17). When the response ResRD32ID3SEQ16 is entered to the response queue circuit RsQp of the memory M1, the queue check circuit RSQM of the memory M1 calculates the number of response queues in an occupied state having responses already stored therein, and the number of reserved response queues in a vacant state and the number of unreserved response queues in a vacant state in the response queue circuit RsQp for updating (FIG. 23: Step18). Next, the response schedule circuit SCH of the memory M1 determines response priorities on the responses entering the response queue circuit RsQo and the response queue circuit RsQp (FIG. 23: Step19). Since only the response ResRD32ID3SEQ16 is present in the response queue circuit RsQo and the response queue circuit RsQp, the response ResRD32ID3SEQ16 has the highest response priority (FIG. 23: Step19). Therefore, the response schedule circuit SCH transmits the response ResRD32ID3SEQ16 to the memory M0 from the response signal RsMux1 (FIG. 23: Step 20). Then, the queue check circuit RSQM of the memory M1 calculates the number of response queues in an occupied state having responses already stored therein, and the number of reserved response queues in a vacant state and the number of unreserved response queues in a vacant state in the response queue circuit RsQp for updating (FIG. 23: Step 21).

Since the memory M0 allocates in advance a response queue in a vacant state for receiving the response ResRD32ID3SEQ16 in the response queue circuit RsQp, before being transmitted to the data processing device CPU_CHIP (FIG. 23: Step 22), the response ResRD32ID3SEQ16 is transferred to the response queue circuit RsQp of the memory M0 (FIG. 23: Step17).

When the response ResRD32ID3SEQ16 enters the response queue circuit RsQp of the memory M0, the queue check circuit RSQM of the memory M0 calculates the number of response queues in an occupied state having responses already stored therein, and the number of reserved response queues in a vacant state and the number of unreserved response queues in a vacant state in the response queue circuit RsQp for updating (FIG. 23: Step18). Next, the response schedule circuit SCH of the memory M0 determines response priorities on the responses entering the response queue circuit RsQo and the response queue circuit RsQp (FIG. 23: Step19). Since only the response ResRD32ID3SEQ16 is present in the response queue circuit RsQo and the response queue circuit RsQp, the response ResRD32ID3SEQ16 has the highest response priority (FIG. 23: Step19). Therefore, the response schedule circuit SCH transmits the response ResRD32ID3SEQ16 to the data processing device CPU_CHIP by way of the response signal RsMux0 (FIG. 23: Step 20).

When the response ResRD32ID3SEQ16 in the response queue circuit RsQp of the memory M0 is transmitted to the data processing device CPU_CHIP, the queue check circuit RSQM of the memory M0 calculates the number of response queues in an occupied state having responses already stored therein, and the number of reserved response queues in a vacant state and the number of unreserved response queues in a vacant state in the response queue circuit RsQp for updating (FIG. 23: Step 21).

Since the data processing device CPU_CHIP allocates in advance a response queue in a vacant state for receiving the response ResRD32ID3SEQ16 in the response queue circuit RESQ1, the response ResRD32ID3SEQ16 from the memory M0 is stored in the response queue circuit RESQ1 via the response input circuit RSIN, and the data transfer between the data processing device CPU_CHIP and the memory M2 is completed (FIG. 23: Step 22 and Step 23). Upon receiving the response ResRD32ID3SEQ16, the response input circuit RSIN of the memory control circuit DCMC extracts the identification number ID value of 3 and the response number ResN value of 16 included in the response ResRD32ID3SEQ16, and sends them to the latency adjustment circuit LCHCK. Based on these identification number ID value of 3 and response number ResN value of 16, the latency adjustment circuit LCHCK finds that the response ResRD32ID3SEQ16 for the request ReqRD32ID3SEQ16 has returned, and ends latency measurement.

The latency adjustment circuit LCHCK compares the latency measurement result and the latency LatBank value of 16 clock cycles corresponding to the identification number ID value of 3 set in the latency register LTREG in the configuration circuit CONFIG. As a result of comparison, when a difference therebetween exceeds an allowable range LatRange value, the latency adjustment circuit LCHCK performs a latency correcting operation so that a measured latency for an upcoming read request is equal to the value of latency LatBank value of 16 clock cycles. Also, as a result of the comparison, when the difference therebetween is within the allowable range, the latency adjustment circuit LCHCK does not perform a latency correcting operation.

Also, when the response ResRD32ID3SEQ16 is stored in the response queue RESQ1, the queue management circuit QMGT calculates again the number of response queues in an occupied state having responses stored therein in the response queue RESQ1, and the number of unreserved response queues in a vacant state and the number or reserved response queues in a vacant state in the response queue RESQ1 for updating.

Furthermore, when the response ResRD32ID3SEQ16 stored in the response queue RESQ1 is transmitted to the data processing circuit CPU3, the queue management circuit QMGT deletes the response ResRD32ID3SEQ16 retained in the response queue RESQ1, and calculates again the number of response queues in an occupied state having responses stored therein in the response queue RESQ1, and the number of unreserved response queues in a vacant state and the number or reserved response queues in a vacant state in the response queue RESQ1 for updating.

As described above, with the identification number ID and the request number being added to a request, the request can be reliably transferred from the data processing device CPU_CHIP to each memory. Also, with the identification number ID and the response number being added to a response, it can be confirmed that data transfer from each memory has been performed correctly. With series connection of the data processing device CPU_CHIP and the memories M0, M1, and M2, the data processing device CPU_CHIP can perform a desired process with a reduced number of connection signals. Also, for the data processing device CPU_CHIP to read data from the memory module MEM, when the request ReqRD including a read instruction is transferred from the data processing device CPU_CHIP to the memory M0, a response queue in a vacant state that has not been reserved yet is reserved in advance in the response queue RESQ1 of the data processing device CPU_CHIP, thereby allocating a response queue in a vacant state required for receiving a response ResRD for the request ReqRD. Also, when the memory M0 transfers the request ReqRD to the memory M1, an unreserved response queue in a vacant state is reserved in advance in the response queue ResQp of the memory M0, thereby allocating a response queue in a vacant state required for receiving the response ResRD for the request ReqRD. Also, when the memory M1 transfers the request ReqRD to the memory M2, an unreserved response queue in a vacant state is reserved in advance in the response queue ResQp of the memory M1, thereby allocating a response queue in a vacant state required for receiving the response ResRD for the request ReqRD. By carrying out such an operation, the data processing system of the present embodiment can always allocate a response queue in a vacant state required for transferring the response ResRD for the request ReqRD from the data processing device CPU_CHIP, and the response ResRD is transferred to the data processing device CPU_CHIP with the shortest latency.

Furthermore, by actually measuring latency and comparing with an expectation value of latency, it is possible to determine whether the data processing system of the present embodiment normally operates. Furthermore, when a difference between the actually-measured value of latency and the expectation value of latency exceeds an allowable range, a latency correcting operation is performed, thereby causing the system to always operate with low latency within the allowable range.

<Read and Write Operations>

Figure 24:
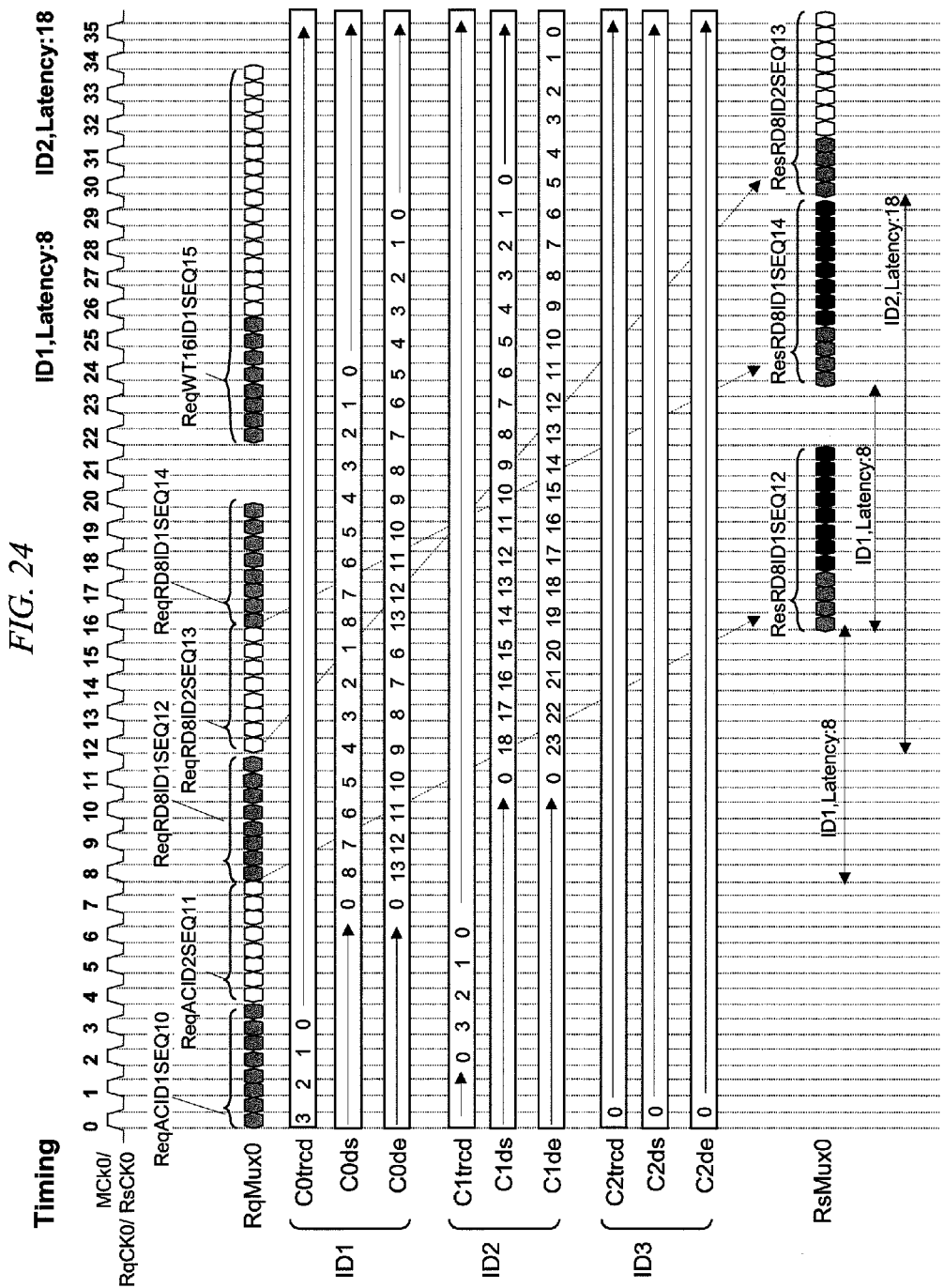
FIG. 24 is a diagram showing one example of operation waveforms of the data processing system to which the present invention is applied.

FIG. 24 shows an example of operation waveforms regarding an operation of reading data from the memory M0 and the memory M1 and an operation of writing data into the memory M0 when the latency LatBank value of the memory M0 in the latency register LTREG of the memory control circuit DCMC is set at 8, the latency LatBank value of the memory M1 is set at 18, and the latency LatBank value of the memory M2 is set at 28; and the tm0RCD value of the timing register M0TREG regarding the memory M0 is set at 3, the tm1RCD value of the timing register M1TREG regarding the memory M1 is set at 3, and the tm2RCD value of the timing register M2TREG regarding the memory M2 is set at 1000. Also shown is an example of operation waveforms when actually-measurement latency for a request from the memory control circuit DCMC is equal to the latency LatBank set in the latency register LTREG and a latency correcting operation is not performed.

The request output circuit RQOUT is mounts a counter C0*ds* and a counter C0*de* regarding the memory M0, a counter C1*ds* and a counter C1*de* regarding the memory M1, and a counter C2*ds* and a counter C2*de* regarding the memory M2. The counter C0*ds* is a counter for indicating a latency RTlat0 at the beginning of a response to a request including a read instruction to the memory M0, the response being input to the memory control circuit DCMC by way of the response signal RsMux0, and the counter C0*de* is a counter for indicating a latency RBlat0 at the ending of a response to a request including a read instruction to the memory M0, the response being input to the memory control circuit DCMC by way of the response signal RsMux0. That is, a period from a counter C0*ds* value to a counter C0*de* value represents a relative time frame m0RsDr in which a response to a request including a read instruction to the memory M0 appears on the response signal RsMux0.

Also, to the counters C0*ds* and C0*de*, the request output circuit RQOUT transfers a request including a read instruction to the memory M0, and also sets an initial latency Tlat0 at the beginning of the response and an initial latency RBlat0 at the ending of the response to each counter, and later the value set in each of the counters C0*ds* and C0*de* is decremented by 1 at the rising edge of the clock RqCK0 to update a relative time frame m0RsDr in which a response appears on the response signal RsMux0. The counter C1*ds* is a counter for indicating a latency Rtlat1 at the beginning of a response to a request including a read instruction to the memory M1, the response being input to the memory control circuit DCMC by way of the response signal RsMux0, and the counter C1*de* is a counter for indicating a latency Rblat1 at the ending of a response to a request including a read instruction to the memory M1, the response being input to the memory control circuit DCMC by way of the response signal RsMux0. That is, a period from a counter C1*ds* value to a counter C1*de* value represents a relative time frame m1RsDr in which a response to a request including a read instruction to the memory M1 appears on the response signal RsMux0.

Furthermore, to the counters C1*ds* and C1*de*, the request output circuit RQOUT transfers a request including a read instruction to the memory M1, and also sets an initial latency Tlat1 at the beginning of the response and an initial latency Rblat1 at the ending of the response to each counter, and later the value set in each of the counters C1*ds* and C1*de* is decremented by 1 at the rising edge of the clock RqCK0 to update a relative time frame m1RsDr appearing on the response signal RsMux0. The counter C2*ds* is a counter for indicating a latency Rtlat2 at the beginning of a response to a request including a read instruction to the memory M2, the response being input to the memory control circuit DCMC by way of the response signal RsMux0, and the counter C2*de* is a counter for indicating a latency Rblat2 at the ending of a response to a request including a read instruction to the memory M2, the response being input to the memory control circuit DCMC by way of the response signal RsMux0. That is, a period from a counter C2*ds* value to a counter C2*de* value represents a relative time frame m2RsDr in which a response to a request including a read instruction to the memory M2 appears on the response signal RsMux0.

Still further, to the counters C2*ds* and C2*de*, the request output circuit RQOUT transfers a request including a read instruction to the memory M2, and also sets an initial latency Tlat2 at the beginning of the response and an initial latency Rblat2 at the ending of the response to each counter. Later, the value set in each of the counters C2*ds* and C2*de* is decremented by 1 at the rising edge of the clock RqCK0 to update a relative time frame m2RsDr appearing on the response signal RsMux0. The counter C0*ds* and the counter C0*de* are initialized to 0 by the data processing circuit CPU0 at the time of a power-up sequence, although the case is not particularly limited thereto.

The request output RQOUT of the memory control circuit DCMC synchronizes a request ReqACID1SEQ10 to the memory M0 with the clock signal RqCK0 by way of the request signal RqMux0 for transfer to the memory M0. The request ReqACID1SEQ10 includes a request start flag ReqStFlag value of 1, an identification number ID value of 1, a bank active instruction AC, a master number MID value of 3, a variable portion request length VREQL value of 4, a request number ReqN value of 10, a bank address of BK0, and a page address of Row63.

To transfer a request including a read and write instruction to the memory M0 after the request ReqACID1SEQ10 to the memory M0 including the bank active instruction AC is transferred, a time interval trcd0 of a tm0RCD value of three clock cycles at minimum is required. A counter C0*trcd* of the memory M0 in the request output circuit RQOUT is a counter for checking this time interval trcd0. The counter C0*trcd* is initialized by the data processing circuit CPU0 at a tm0RCD value of 3 at the time of a power-up sequence. After the request ReqACID1SEQ10 is transferred, the counter C0*trcd* decrements its value by 1 at the rising edge of the clock RqCK0, and, when the counter C0*trcd* has a value of 0, the request output circuit RQOUT can transfer a request including a read and write instruction to the memory M0.

As the ID value of 1 included in the request ReqACID1SEQ10 from the request output circuit RQOUT and the ID value of 1 retained in its own ID register circuit IDR match, the memory M0 confirms that the request is directed to itself. Next, the memory M0 uses the bank active instruction AC, the bank address of BK0, and the page address of ROW63 included in the request ReqACID1SEQ10 to activate a memory cell connected to a row address of 63 in the memory circuit MBank0, and transfers 1 kByte of data to the sense amplifier SenseAmp. Next, the request output circuit RQOUT outputs a request ReqACID2SEQ11 to the memory M1 subsequently to the request ReqACID1SEQ10 to the memory M0. The request ReqACID2SEQ11 includes a request start flag ReqStFlag value of 1, an identification number ID value of 2, a bank active instruction AC, a master number MID value of 2, a variable portion request length VREQL value of 4, a request number ReqN value of 11, a bank address of BK0, and a page address of Row63.

To transfer a request including a read and write instruction to the memory M1 after the request ReqACID2SEQ11 to the memory M1 including the bank active instruction AC is transferred, a time interval trcd1 of a tm1RCD value of three clock cycles at minimum is required. A counter C1*trcd* of the memory M0 in the request output circuit RQOUT is a counter for checking this time interval trcd1. The counter C1*trcd* is initialized by the data processing circuit CPU0 at a tm0RCD value of 3 upon a power-up sequence. After the request ReqACID2SEQ11 is transferred, the counter C1*trcd* decrements its value by 1 at the rising edge of the clock RqCK0. When the counter C1*trcd* has a value of 0, the request output circuit RQOUT can transfer a request including a read and write instruction to the memory M1.

With the ID value of 2 included in the request ReqACID2SEQ11 from the request output circuit RQOUT and the ID value of 1 retained in its own ID register circuit IDR being compared, and, as the ID values are not matching, the memory M0 transfers the request ReqACID2SEQ11 to the memory M1. As the ID value of 2 included in the request ReqACID2SEQ11 from the memory M0 and the ID value of 2 retained in its own ID register circuit IDR match, the memory M1 confirms that the request is directed to itself. Next, the memory M1 uses the bank active instruction AC, the bank address of BK0, and the page address of ROW63 included in the request ReqACID2SEQ11 to activate a memory cell connected to a row address of 63 in the memory circuit NV1BK0, and transfers 1 kByte of data to the data control circuit DataCont.

Next, an operation of outputting, from the request output circuit RQOUT, a request ReqRD8ID1SEQ12 including a read instruction RD8 of eight-byte data to the memory M0 subsequent to the request ReqACID2SEQ11 will be described. The request ReqRD8ID1SEQ12 includes a request start flag ReqStFlag value of 1, an identification number ID value of 1, a read instruction RD8 of eight-byte data, a master number MID value of 3, a variable portion request length VREQL value of 4, a request number ReqN value of 12, a bank address of BK0, and a column address of Col32. When determining that the latest request to the memory M0 is the request ReqRD8ID1SEQ12, the request output circuit RQOUT calculates an initial latency Tlat0 at the beginning of a response ResRD8ID1SEQ12 for the request ReqRD8ID1SEQ12 and an initial latency Blat0 at the ending of the response, and stores each latency in registers RegTlat0 and Reg Blat0.

The latency Tlat0 of the response ResRD8ID1SEQ12 for the request ReqRD8ID1SEQ12 is, although not particularly limited thereto, the initial latency Tlat0=latency m0Lat value=8, and the latency Blat0 can be represented as follows.

The temporal position $Blat0$=(latency $m0Lat$ value)+{
(((the number of bytes $CMNBL$ of the common
response portion $CMNRESF$+the number of
bytes $RDBL$ of the read data)÷the number of
response signals $RsBL$ (in bytes))÷2)−1}

Here, when the latency m0Lat value=8, the number of bytes CMNBL of the common response portion CMNRESF=4, the number of bytes RDBL of the read data=8, and the number of response signals RsBL=1, the initial latency Blat0=8+{(((4+8)÷1)÷2)−1}=13. Therefore, the value of the initial latency Tlat0 of 8 is stored in the register RegTlat0, and the value of the initial latency Blat0 of 13 is stored in the register Reg Blat0.

Next, before outputting the request ReqRD8ID1SEQ12 to the memory M0, the request output circuit RQOUT checks to see whether the counter C0$ds$ value and the counter C0$de$ value are present between the register RegTlat0 value and the register Reg Blat0 value (RegTlat0≤C0$ds$≤RegBlat0 and RegTlat0≤C0$de$≤RegBlat0), checks to see whether the counter C1$ds$ value and the counter C1$de$ value are present between the register RegTlat0 value and the register Reg Blat0 value (RegTlat0≤C1$ds$≤RegBlat0 and RegTlat0≤C1$de$≤RegBlat0), and checks to see whether the counter C2$ds$ value and the counter C2$de$ value are present between the register RegTlat0 value and the register Reg Blat0 value (RegTlat0≤C2$ds$≤RegBlat0 and RegTlat0≤C2$de$≤RegBlat0).

When all of the counter C0$ds$ value, the counter C0$de$ value, the counter C1$ds$ value, the counter C1$de$ value, the counter C2$ds$ value, and the counter C2$de$ value are not between the initial latency Tlat1 and the initial latency Blat1, this means that there is no other response that overlaps with the time frame m0RsDr in which the response ResRD8ID1SEQ12 for the request ReqRD8ID1SEQ12 to the memory M0 appears on the response signal RsMux0. On the other hand, when any of the counter C0$ds$ value, the counter C0$de$ value, the counter C1$ds$ value, the counter C1$de$ value, the counter C2$ds$ value, and the counter C2$de$ value is present between the temporal position latency Tlat0 and the initial latency Blat0, this means that there is a response that overlaps with the time frame m0RsDr in which the response ResRD8ID1SEQ12 for the request ReqRD8ID1SEQ12 to the memory M0 appears on the response signal RsMux0.

In FIG. 24, immediately before the request ReqRD8ID1SEQ12 is output, the counter C0$ds$ value, the counter C0$de$ value, the counter C1$ds$ value, the counter C1$de$ value, the counter C2$ds$ value, and the counter C2$de$ value all indicate 0, and the register RegTlat0 value of the response ResRD8ID1SEQ12 indicates 8, and the register RegBlat0 value thereof indicates 13, and therefore, it can be found that the response ResRD8ID1SEQ12 does not overlap with another response. The request output circuit RQOUT confirms that the response ResRD8ID1SEQ12 does not overlap with another response and the counter C1$trcd$ value indicates 0, and outputs the request ReqRD8ID1SEQ12. Also, when the response ResRD8ID1SEQ12 overlaps with another response, the request output circuit RQOUT does not output the request ReqRD8ID1SEQ12, and becomes in a state of stand-by for a request output. Also, simultaneously with outputting the request ReqRD8ID1SEQ12, the request output circuit RQOUT sets the counter C0$ds$ at the register RegTlat0 value of 8, and sets the counter C0$de$ at the register Reg Blat0 value of 13. Then, the request output circuit RQOUT decrements the value set in the counters C0$ds$ and C0$de$ by 1 at the rising edge of the clock RqCK0 to update the relative time frame m0RsDr in which a response appears on the response signal RsMux0.

The memory M0 receives the request ReqRD8ID1SEQ12 and, as the ID value of 1 included in this request ReqRD8ID1SEQ12 and the ID value of 1 retained in its own ID register circuit IDR match, confirms that the request is directed to itself. Next, the memory M0 uses the read instruction RD8, the bank address of BK0, and the column address of Col32 included in the request ReqRD8ID1SEQ12 to read eight bytes of data from the sense amplifier SenseAmp of the memory bank MBank0 of the memory circuit Mem0 with the column address of 32 being taken as a start address.

For the read eight bytes of data, the response ResRD8ID1SEQ12 is generated to which a common response portion CMNRESF including a response start flag ResStFlag value of 1, an identification number ID value of 1, a read instruction RD8 of data of eight bytes, a master number MID value of 3, a read data length RDL value of 8, and a response number ResN value of 12 (a value equal to the request number ReqN value of 12) are added, and is input from the response signal RsMux0 to the response input circuit RSIN of the memory control circuit DCMC via the response queue RsQo. At this timing, the latency of the response ResRD8ID1SEQ12 has a latency m0Lat value of eight clock cycles.

Next, descriptions will be made to an operation when a request ReqRD8ID2SEQ13 including a read instruction to the memory M1 is output from the request output circuit RQOUT subsequently to the request ReqRD8ID1SEQ12. The request ReqRD8ID2SEQ13 is a request including a read instruction RD8 of data of eight bytes, and includes a request start flag ReqStFlag value of 1, an identification number ID value of 2, a read instruction RD8 of data of eight bytes, a master number MID value of 3, a variable portion request length VREQL value of 4, a request number ReqN value of 13, and a bank address of BK0 and a column address of Col32.

When determining that the latest request to the memory M1 is the request ReqRD8ID2SEQ13, the request output circuit RQOUT calculates an initial latency Tlat1 at the beginning of a response ResRD8ID2SEQ13 for the request ReqRD8ID2SEQ13 and an initial latency Blat1 at the ending of the response, and stores each temporal position in registers RegTlat1 and Reg Blat1. The latency Tlat1 of the response ResRD8ID2SEQ13 for the request ReqRD8ID2SEQ13 is the initial latency Tlat1=latency m1Lat value=18, and the temporal position Blat1 can be represented as follows.

Temporal position $Blat1$=(latency $m1Lat$ value)+{
(((the number of bytes $CMNBL$ of the common
response portion $CMNRESF$+the number of
bytes $RDBL$ of the read data)÷the number of
response signals $RsBL$ (in bytes))÷2)−1}

Here, when the latency m1Lat value=18, the number of bytes CMNBL of the common response portion CMN- RESF=4, the number of bytes RDBL of the read data=8, and the number of response signals RsBL=1, the initial latency Blat1=18+{(((4+8)÷1)÷2)−1}=23. Therefore, the value of the initial latency Tlat1 of 18 is stored in the register RegTlat1, and the value of the initial latency Blat1 of 23 is stored in the register Reg Blat1.

Next, before outputting the request ReqRD8ID2SEQ13 to the memory M1, the request output circuit RQOUT checks to see whether the counter C0$ds$ value and the counter C0$de$ value are present between the register RegTlat1 value and the register Reg Blat1 value (RegTlat1≤C0$ds$≤RegBlat1 and RegTlat1≤C0$de$≤RegBlat1), checks to see whether the counter C1$ds$ value and the counter C1$de$ value are present between the register RegTlat1 value and the register Reg Blat1 value (RegTlat1≤C1$ds$≤RegBlat1 and RegTlat1≤C1$de$≤RegBlat1), and checks to see whether the counter C2$ds$ value and the counter C2$de$ value are present between the register RegTlat1 value and the register Reg Blat1 value (RegTlat1≤C2$ds$≤RegBlat1 and RegTlat1≤C2$de$≤RegBlat1).

When all of the counter C0$ds$ value, the counter C0$de$ value, the counter C1$ds$ value, the counter C1$de$ value, the counter C2$de$ value, and the counter C2$de$ value are not between the initial latency Tlat1 and the initial latency Blat1, this means that there is no other response that overlaps with the time frame m1RsDr in which the response ResRD8ID2SEQ13 for the request ReqRD8ID2SEQ13 to the memory M1 appears on the response signal RsMux0. On the other hand, when any of the counter C0$ds$ value, the counter C0$de$ value, the counter C1$ds$ value, the counter C1$de$ value, the counter C2$ds$ value, and the counter C2$de$ value is between the initial latency Tlat1 and the initial latency Blat1, this means that there is a response that overlaps with the time frame m1RsDr in which the response ResRD8ID2SEQ13 for the request ReqRD8ID2SEQ13 to the memory M1 appears on the response signal RsMux0.

In FIG. 24, immediately before the request ReqRD8ID2SEQ13 is output, the counter C0$ds$ value indicates 5, the counter C0$de$ value indicates 10, and all of the counter C1$ds$ value, the counter C1$de$ value, the counter C2$ds$ value, and the counter C2$de$ value indicate 0, and the register RegTlat1 value of the response ResRD8ID2SEQ13 indicates 18, and the register RegBlat1 value thereof indicates 23. Therefore, it can be found that the response ResRD8ID2SEQ13 does not overlap with another response.

The request output circuit RQOUT confirms that the response ResRD8ID2SEQ13 does not overlap with another response and the counter C1$trcd$ value indicates 0, and outputs the request ReqRD8ID2SEQ13 to the memory M0. Also, when the response ResRD8ID2SEQ13 overlaps with another response, the request output circuit RQOUT does not output the request ReqRD8ID2SEQ13, and becomes in a state of stand-by for outputting a request. Also, simultaneously with outputting the request ReqRD8ID2SEQ13, the request output circuit RQOUT sets the counter C1$ds$ at the register RegTlat1 value of 18, and sets the counter C1$de$ at the register Reg Blat 1 value of 23. Then, the request output circuit RQOUT decrements the value set in the counters C1$ds$ and C1$de$ by 1 at the rising edge of the clock RqCK0 to update the relative time frame m1RsDr in which a response appears on the response signal RsMux0.

The memory M0 receives the request ReqRD8ID2SEQ13, and compares the ID value of 2 included in this request ReqRD8ID2SEQ13 and the ID value of 1 retained in its own ID register circuit IDR. Since these values do not match, the memory M0 transmits the request ReqRD8ID2SEQ13 to the memory M1. The memory M1 receives the request ReqRD8ID2SEQ13 and, as the ID value of 2 included in this request ReqRD8ID2SEQ13 and the ID value of 2 retained in its own ID register circuit IDR are matching, confirms that the request is directed to itself.

Next, the memory Mem1 uses the read instruction RD8, the bank address of BK0, and the column address of Col32 included in the request ReqRD8ID2SEQ13 to read eight bytes of data from the data buffer DataLat of the memory bank NV1Bk0 of the memory circuit Mem1 with the column address of 32 being taken as a start address. For the read eight bytes of data, the response ResRD8ID2SEQ13 is generated to which a common response portion CMNRESF including a response start flag ResStFlag value of 1, an identification number ID value of 2, a read instruction RD8 of data of eight bytes, a master number MID value of 3, a read data length RDL value of 8, and a response number ResN value of 13 (a value equal to the request number ReqN value of 13) is added, and is transmitted from the response signal RsMux1 to the memory M0 via the response queue RsQo of the memory M1.

The response ResRD8ID2SEQ13 is stored in the response queue circuit RsQp of the memory M0, and is input to the response input circuit RSIN of the memory control circuit DCMC via the response signal RsMux0. At this timing, the latency of the response ResRD8ID2SEQ13 has a latency m1Lat value of eighteen clock cycles.

Next, descriptions will be made to an operation when a request ReqRD8ID1SEQ14 including a read instruction to the memory M0 is output from the request output circuit RQOUT subsequently to the request ReqRD8ID2SEQ13. The request ReqRD8ID1SEQ14 includes a request start flag ReqStFlag value of 1, an identification number ID value of 1, a read instruction RD8 for data of eight bytes, a master number MID value of 3, a variable portion request length VREQL value of 4, a request number ReqN value of 14, and a bank address of BK0 and a column address of Col32. When it is determined the last request to the memory M0 is the request ReqRD8ID1SEQ14, the request output circuit RQOUT calculates an initial latency Tlat0 at the beginning of a response ResRD8ID1SEQ14 for the request ReqRD8ID1SEQ14 and an initial latency Blat0 at the ending of the response, and stores each latency in registers RegTlat0 and Reg Blat0. The temporal position Tlat0 of the response ResRD8ID1SEQ14 with respect to the request ReqRD8ID1SEQ14 is the initial latency Tlat0=latency m0Lat value=8, and the latency Blat0 can be represented as follows.

The temporal position *Blat*0=(latency *m0Lat* value)+{
  (((the number of bytes *CMNBL* of the common
  response portion *CMNRESF*+the number of
  bytes *RDBL* of the read data)+the number of
  response signals *RsBL* (in bytes))÷2)−1}

Here, when the latency m0Lat value=8, the number of bytes CMNBL of the common response portion CMNRESF=4, the number of bytes RDBL of the read data=8, and the number of response signals RsBL=1, the initial latency Blat0=8+{(((4+8)÷1)÷2)−1}=13. Therefore, the value of the initial latency Tlat0 of 8 is stored in the register RegTlat0, and the value of the initial latency Blat0 of 13 is stored in the register Reg Blat0.

Next, before outputting the request ReqRD8ID1SEQ14 to the memory M0, the request output circuit RQOUT checks to see whether the counter C0$ds$ value and the counter C0$de$ value are present between the register RegTlat0 value and the register Reg Blat0 value (RegTlat0≤C0$ds$≤RegBlat0 and RegTlat0≤C0$de$≤RegBlat0), checks to see whether the counter C1$ds$ value and the counter C1$de$ value are present between the register RegTlat0 value and the register Reg Blat0 value (RegTlat0≤C1$ds$≤RegBlat0 and RegTlat0≤C1de≤RegBlat0), and checks to see whether the counter C2ds value and the counter C2de value are present between the register RegTlat0 value and the register Reg Blat0 value (RegTlat0≤C2ds≤RegBlat0 and RegTlat0≤C2de≤RegBlat0).

When all of the counter C0ds value, the counter C0de value, the counter C1ds value, the counter C1de value, the counter C2ds value, and the counter C2de value are not between the initial latency Tlat1 and the initial latency Blat1, this means that there is no other response that overlaps with the time frame m0RsDr in which the response ResRD8ID1SEQ14 for the request ReqRD8ID1SEQ14 to the memory M0 appears on the response signal RsMux0. On the other hand, when any of the counter C0ds value, the counter C0de value, the counter C1ds value, the counter C1de value, the counter C2ds value, and the counter C2de value is between the initial latency Tlat0 and the initial latency Blat0, this means that there is a response that overlaps with the time frame m0RsDr in which the response ResRD8ID1SEQ14 for the request ReqRD8ID1SEQ14 to the memory M0 appears on the response signal RsMux0.

In FIG. 24, immediately before the request ReqRD8ID1SEQ14 is output, the counter C0ds value indicates 1, the counter C0de value indicates 6, the counter C1ds value indicates 15, the counter C1de value indicates 20, the counter C2ds value indicates 0, and the counter C2de value indicates 0. The register RegTlat0 value of the response ResRD8ID1SEQ14 indicates 8, and the register RegBlat0 value thereof indicates 13. Therefore, it can be found that the response ResRD8ID1SEQ14 does not overlap with another response. The request output circuit RQOUT confirms that the response ResRD8ID1SEQ14 does not overlap with another response and the counter C1trcd value indicates 0, and outputs the request ReqRD8ID1SEQ14. Also, when the response ResRD8ID1SEQ14 overlaps with another response, the request output circuit RQOUT does not output the request ReqRD8ID1SEQ14, and becomes in a state of waiting for outputting a request. Also, simultaneously with outputting the request ReqRD8ID1SEQ14, the request output circuit RQOUT sets the counter C0ds at the register RegTlat0 value of 8, and sets the counter C0de at the register Reg Blat0 value of 13. Then, the request output circuit RQOUT decrements the value set in the counters C0ds and C0de by 1 at the rising edge of the clock RqCK0 to update the relative time frame m0RsDr in which a response appears on the response signal RsMux0.

The memory M0 receives the request ReqRD8ID1SEQ14 and, as the ID value of 1 included in this request ReqRD8ID1SEQ14 and the ID value of 1 retained in its own ID register circuit IDR are matching, confirms that the request is directed to itself. Next, the memory M0 uses the read instruction RD8, the bank address of BK0, and the column address of Col32 included in the request ReqRD8ID1SEQ14 to read eight bytes of data from the sense amplifier SenseAmp of the memory bank MBank0 of the memory Mem0 with the column address of 32 being taken as a start address. For the read eight bytes of data, the response ResRD8ID1SEQ14 is generated by adding a common response portion CMNRESF including a response start flag ResStFlag value of 1, an identification number ID value of 1, a read instruction RD8 of data of eight bytes, a master number MID value of 3, a read data length RDL value of 8, and a response number ResN value of 14 (a value equal to the request number ReqN value of 14), and is input from the response signal RsMux0 to the response input circuit RSIN of the memory control circuit DCMC via the response queue RsQo.

The response ResRD8ID1SEQ14 is input to the response input circuit RSIN subsequently to the response ResRD8ID1SEQ12 before the response ResRD8ID1SEQ13. At this time, the latency of the response ResRD8ID1SEQ14 is the latency m0Lat value of eight clock cycles.

Next, descriptions will be made to the operation when a request ReqWT16ID1SEQ15 including a write instruction to the memory M0 is output from the request output circuit RQOUT subsequently to a request ReqRD8ID1SEQ14. The request ReqWT16ID1SEQ15 includes a request start flag ReqStFlag value of 1, an identification number ID value of 1, a write instruction WT16 for data of 16 bytes, a master number MID value of 3, a variable portion request length VREQL value of 12, a request number ReqN value of 15, and a bank address of BK1 and a column address of Col32. The request ReqWT16ID1SEQ15 is received at the request queue control circuit RqCT of the memory M0, which confirms that this request is directed to itself with the ID value of 1 included in this request ReqWT16ID1SEQ15 and the ID value of 1 retained in its own register ID register circuit IDR. Next, the request queue control circuit RqCT of the memory M0 uses the write instruction WT16, the bank address of BK1, and the column address of Col32 included in the request ReqWT16ID1SEQ15 to write 16 bytes of data in the memory bank Mbank1 via the sense amplifier SenseAmp of the memory band Mbank1 of the memory circuit Mem0 with the column address of 32 being taken as a start address.

Since the request queue control circuit RqCT and the response queue control circuit RsCT operate independently, even while the response ResRD8ID1SEQ14 and the response ResRD8ID2SEQ13 are being transferred to the data processing device CPU_CHIP, the operation of writing the request ReqWT16ID1SEQ15 can be performed.

As described above, as requests are issued by predicting and managing time frames of responses for the requests to each memory, the responses are transmitted tightly over the response signal RsMux0 so that they do not overlap with each other while achieving low latency, and therefore a high-speed data transfer rate can also be achieved. Furthermore, since a request interface circuit ReIF and a response interface circuit can operate independently, a data read operation and a write operation can be performed simultaneously, and data transfer performance can be improved. While data read and write at the memory M0 has been described in the foregoing, it is needless to say that similar operations can be performed at the other memories M1 and M2. Furthermore, it is needless to say that, since the request interface circuit ReIF and the response interface circuit can operate independently in each memory, even when a data read request and a data write request to a different memory are generated, each request can be processed independently in parallel and data transfer performance can be improved.

<Latency Correcting Operation: Allowable Latency Latrange Value of 0>

Figure 25:
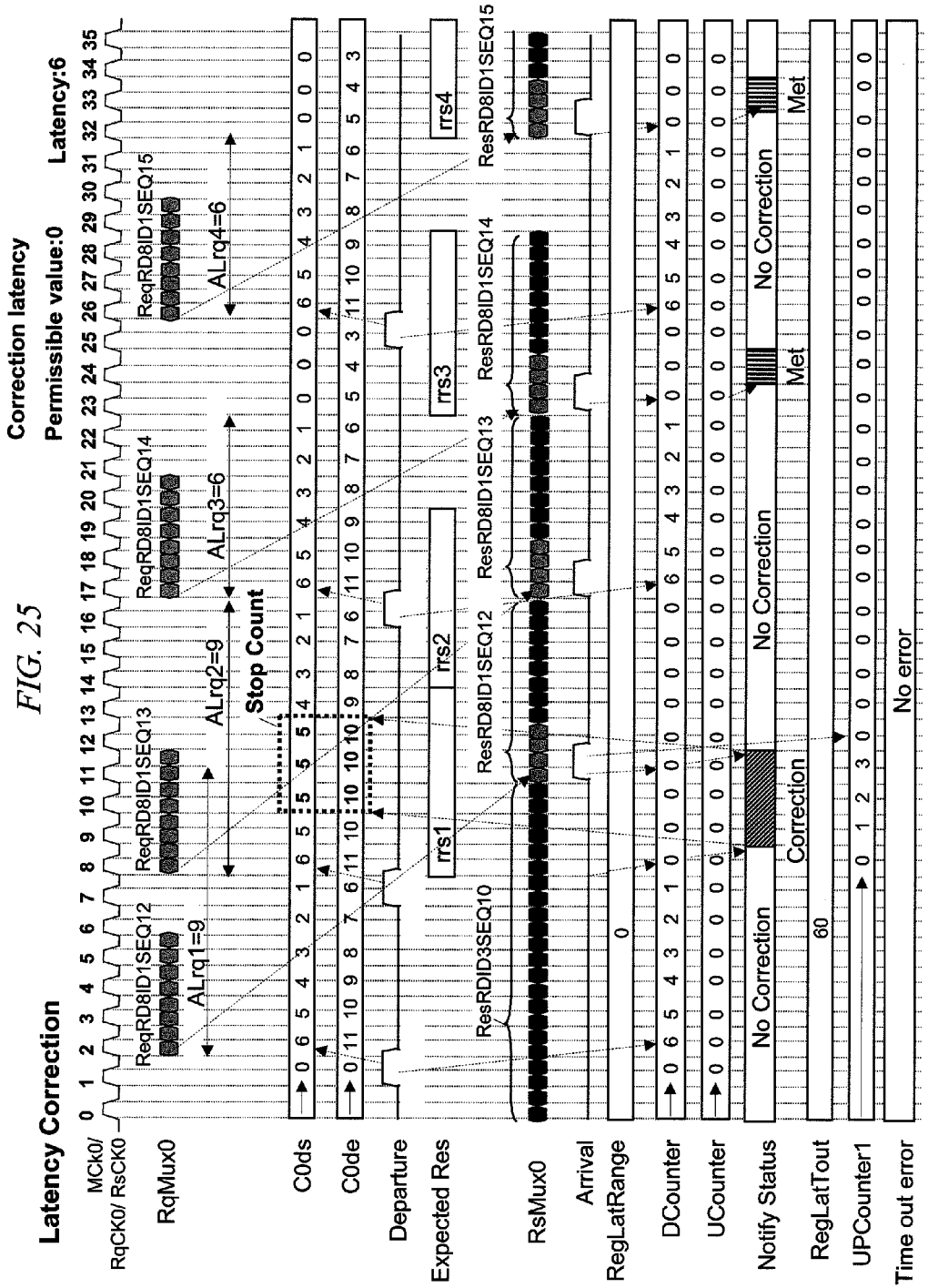
FIG. 25 is a diagram showing one example of operation waveforms of the data processing system to which the present invention is applied.
Figure 29:
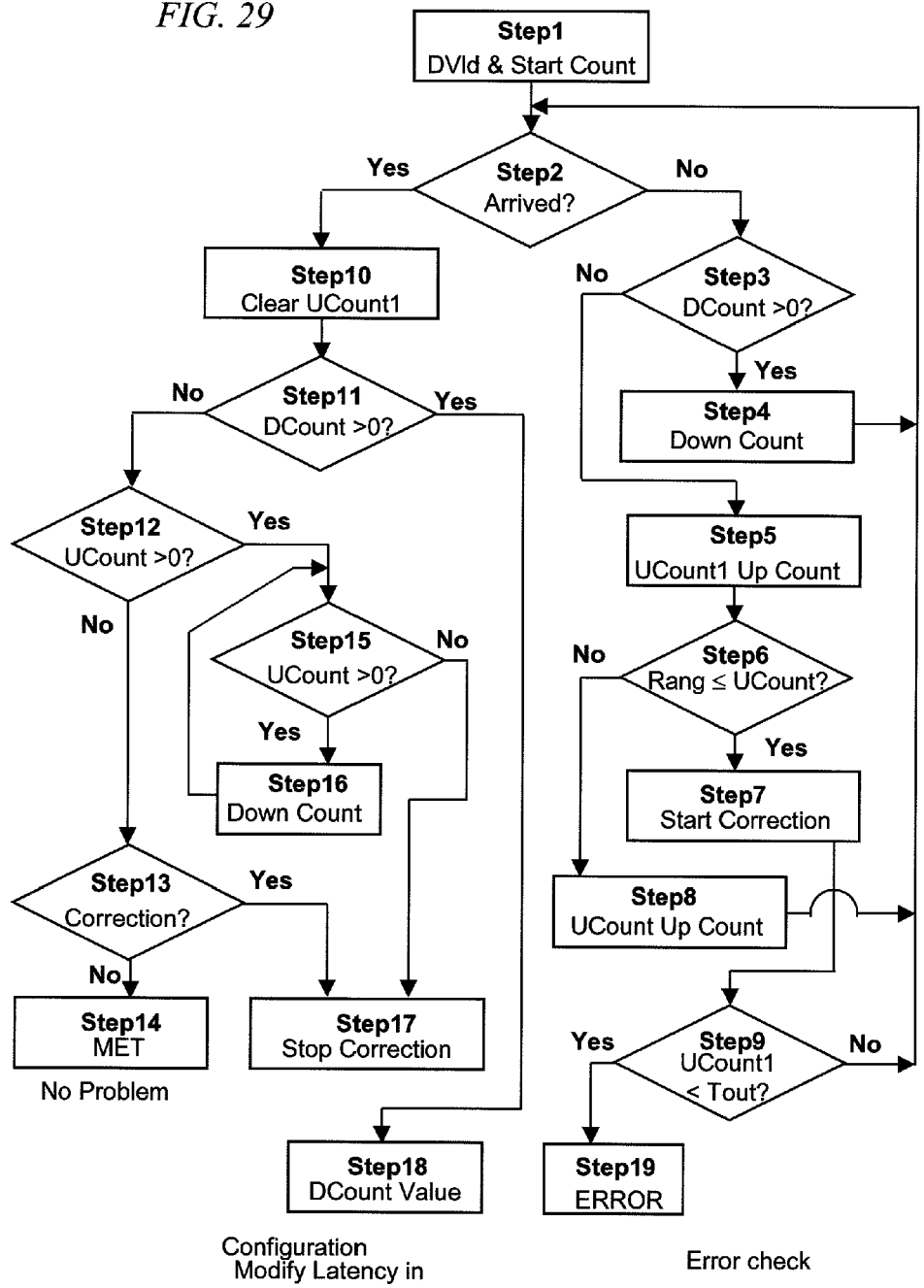
FIG. 29 is a flowchart showing one example of an operation of counters mounted in a latency adjustment circuit.

FIG. 25 shows an example of a latency correcting operation to be performed by the latency adjustment circuit LCHCK when the memory M0 in the latency register LTREG of the memory control circuit DCMC has a latency LatExpID1 value set at 6, an allowable latency LatRange value at 0, and a timeout latency LatTimeOut value at 60 and an actually-measured latency of a response from the memory M0 becomes larger than the latency LatExpID1 value of 6 due to a response from another memory. Also, FIG. 29 is an exemplary flowchart showing an example of an operation of counters the latency adjustment circuit LCHCK is equipped with for a latency correcting operation.

The latency adjustment circuit LCHCK is equipped with a counter DCounter, a counter UCounter, a counter UPCounter1, an allowable latency register RegLatRange, and a timeout latency register RegLatTout. The counter C0$ds$ and the counter C0$de$ regarding the memory M0 are initialized at 0 by the data processing circuit CPU0 at the time of a power-up sequence, although the case is not particularly limited thereto. The counter DCounter and the counters UCounter and UPCounter1 are initialized at 0 by the data processing circuit CPU0 at the time of a power-up sequence, although the case is not particularly limited thereto. Also, the allowable latency register RegLatRange is set at an allowable latency LatRange value of 0 at the time of a power-up sequence, although the case is not particularly limited thereto, and the timeout latency register RegLatTout is initialized at a timeout latency LatTimeOut value of 60 at the time of a power-up sequence, although the case is not particularly limited thereto.

Descriptions will be made to an operation when a request ReqRD8ID1SEQ12, a request ReqRD8ID1SEQ13, a request ReqRD8ID1SEQ14, and a request ReqRD8ID1SEQ15 including a read instruction RD8 for eight-byte data to the memory M0 are output from the request output circuit RQOUT. At the same time when the request ReqRD8ID1SEQ12 is output (FIG. 25: Departure=High), the counter DCounter is set at a register RegTlat0 value of 6 (FIG. 29: Step1), the counter C0$ds$ is set at the register RegTlat0 value of 6, and the counter C0$de$ is set at a register Reg Blat0 value of 11. The request output circuit RQOUT decrements the values set in the counters C0$ds$ and C0$de$ by 1 to update the relative time frame m0RsDr in which a response appears on the response signal RsMux0. The latency adjustment circuit LCHCK checks to see whether a response ResRD8ID1SEQ12 for the request ReqRD8ID1SEQ12 has returned (FIG. 29: Step 2) and, if the response has not yet returned (FIG. 25: Arrival=Low) and the counter DCounter is larger than 0 (FIG. 29: Step 3), decrements the value by 1 at the rising edge of the clock RqCK0 (FIG. 29: Step 4). Also, when the counter C0$ds$ value indicates 1 and the counter C0$de$ value indicates 6 subsequently to the request ReqRD8ID1SEQ12, the request ReqRD8ID1SEQ13 is output (FIG. 25: Departure=High). At the same time, the counter DCounter is set at a register RegTlat0 value of 6 (FIG. 29: Step1), the counter C0$ds$ is set at a register RegTlat0 value of 6, and the counter C0$de$ is set at a register Reg Blat0 value of 11.

If the response ResRD8ID1SEQ12 does not return even when the counter DCounter becomes 0 (FIG. 25: Arrival=Low), the value set in a counter UPCounter1 is incremented by 1 (FIG. 29: Step5), and the allowable latency register RegLatRange value of 0 and the counter UCounter value of 0 are compared (FIG. 29: Step 6). Since the counter UCounter value of 0 is within values equal to or larger than the allowable latency register RegLatRange value of 0, the latency adjustment circuit LCHCK sets a NotifyStatus signal as Correction (FIG. 25: Notify Status=Correction), and notifies the request output circuit RQOUT of a start of latency correction (FIG. 29: Step 7).

Upon receiving the NotifyStatus signal value of Correction, the request output circuit RQOUT stops the counter C0$ds$ and the counter C0$de$ (FIG. 25: Stop Count). When the response ResRD8ID1SEQ12 returns behind a latency LatExpID1 value of 6 by three cycles, the counter UPCounter1 value of 3 and the latency register RegLatTout value of 60 are compared (FIG. 29: Step 9). Since the counter UPCounter1 value of 3 is smaller than the timeout latency register RegLatTout value of 60, the counter UPCounter1 value is cleared to 0 (FIG. 29: Step10). Next, a comparison is made to find whether the counter DCounter value is larger than 0 (FIG. 29: Step11). Since the counter DCounter value is 0, a comparison is made to find whether the counter UCounter value is larger than 0 (FIG. 29: Step12). Since the counter UCounter value indicates 0, it is checked to see whether a latency correcting operation is being performed (FIG. 29: Step13). Since the latency adjustment circuit LCHCK performs a latency correcting operation, with a NotifyStatus signal being set at NOCorrection, and the request output circuit RQOUT is notified of an end of latency correction (FIG. 29: Step17).

Upon receiving the NotifyStatus signal value of NoCorrection, the request output circuit RQOUT operates the counter C0$ds$ and the counter C0$de$ to decrement each of their values by 1. According to the latency correcting operation, the counter C0$ds$ and the counter C0$de$ stops for three cycles with the response ResRD8ID1SEQ12 behind the latency LatExpID1 value of 6. Subsequently to the request ReqRD8ID1SEQ13, when the counter C0$ds$ value indicates 1 and the C0$ds$ value indicates 6, the request ReqRD8ID1SEQ14 is output (FIG. 25: Departure=High), and at the same time, the counter DCounter is set at the register RegTlat0 value of 6 (FIG. 29: Step1), the counter C0$ds$ is set at the register RegTlat0 value of 6, and the counter C0$de$ is set at a Reg Blat0 value of 11. The latency adjustment circuit LCHCK checks to see whether response ResRD8ID1SEQ14 for the request ReqRD8ID1SEQ14 has returned (FIG. 29: Step 2). If it has not yet returned (FIG. 25: Arrival=Low) and the counter DCounter is larger than 0 (FIG. 29: Step1) (FIG. 29: Step 3), the value is decremented by 1 at the rising edge of the clock RqCK0 (FIG. 29: Step 4).

When the response ResRD8ID1SEQ14 returns after six cycles, the counter UPCounter1 value of 0 and the timeout latency register RegLatTout value of 60 are compared (FIG. 29: Step 9). Since the counter UPCounter1 value of 0 is smaller than the timeout latency register RegLatTout value of 60, the counter UPCounter1 value is cleared to 0 (FIG. 29: Step10). Next, a comparison is made to see whether the counter DCounter value is larger than 0 (FIG. 29: Step11). Since the counter DCounter value indicates 0, a comparison is made to see whether the counter UCounter value is larger than 0 (FIG. 29: Step12). Since the counter UCounter indicates 0, it is checked to see whether a latency correcting operation is being performed (FIG. 29: Step13).

Since the latency adjustment circuit LCHCK does not perform a latency correcting operation, the NotifyStatus signal is set as MET, and the request output circuit RQOUT is notified as such (FIG. 29: Step17). The NotifyStatus signal indicates MET, indicating that the response ResRD8ID1SEQ14 for the request ReqRD8ID1SEQ14 has returned after six cycles indicated by a LatExpID1 value. Upon receiving the NotifyStatus signal value of METNo, the request output circuit RQOUT operates the counter C0$ds$ and the counter C0$de$ to decrement each of their values by 1.

As described above, by performing a latency correcting operation of measuring a latency and stopping the counter C0$ds$ and the counter C0$de$ for three cycles with respect to the three cycles behind the latency LatExpID1 of 6, a response to a request subsequent thereto can be equalized to the expectation value latency LatExpID1 value of 6.

<Latency Correcting Operation: Allowable Latency LatRange Value of 1>

Figure 26:
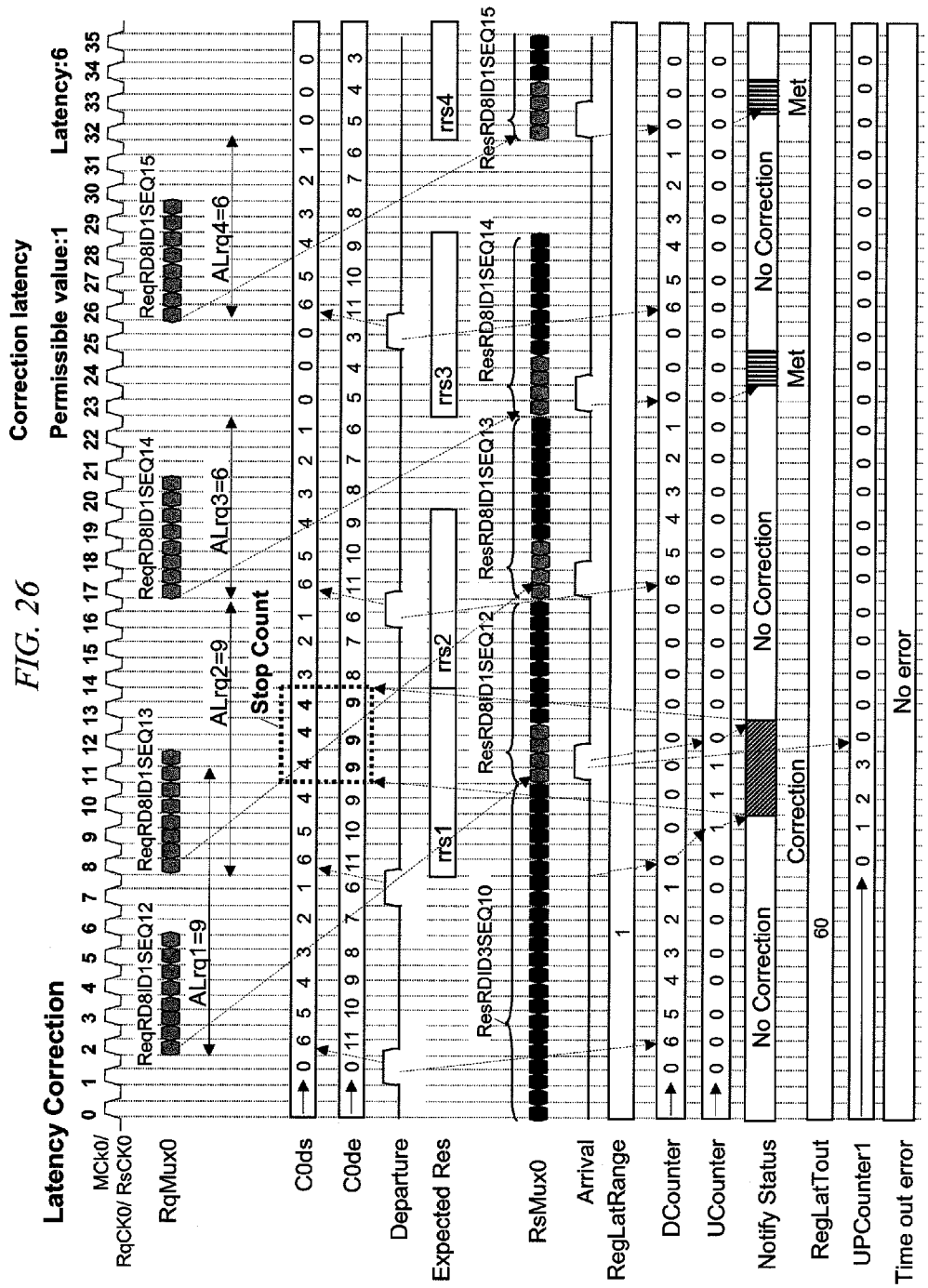
FIG. 26 is a diagram showing one example of operation waveforms of the data processing system to which the present invention is applied.

FIG. 26 shows an example of a latency correcting operation to be performed by the latency adjustment circuit LCHCK when the memory M0 in the latency register LTREG of the memory control circuit DCMC has a latency LatExpID1 value set at 6, an allowable latency LatRange value at 1, and a timeout latency LatTimeOut value at 60, and an actually-measured latency of a response from the memory M0 becomes larger than the latency LatExpID1 value of 6+the allowable latency LatRange value of 1 due to a response from another memory. Also, FIG. 29 is an exemplary flowchart showing an example of an operation of counters the latency adjustment circuit LCHCK is equipped with for a latency correcting operation.

The latency adjustment circuit LCHCK is equipped with a counter DCounter, a counter UCounter, a counter UPCounter1, an allowable latency register RegLatRange, and a timeout latency register RegLatTout. The counter C0$ds$ and the counter C0$de$ regarding the memory M0 are initialized at 0 by the data processing circuit CPU0 at the time of a power-up sequence, although the case is not particularly limited thereto. The counter DCounter and the counters UCounter and UPCounter1 are initialized at 0 by the data processing circuit CPU0 at the time of a power-up sequence, although the case is not particularly limited thereto. Also, the allowable latency register RegLatRange is set at an allowable latency LatRange value of 0 at the time of a power-up sequence, although the case is not particularly limited thereto, and the timeout latency register RegLatTout is initialized at a timeout latency LatTimeOut value of 60 at the time of a power-up sequence, although the case is not particularly limited thereto.

Descriptions will be made to an operation when a request ReqRD8ID1SEQ12, a request ReqRD8ID1SEQ13, a request ReqRD8ID1SEQ14, and a request ReqRD8ID1SEQ15 including a read instruction RD8 for eight-byte data to the memory M0 are output from the request output circuit RQOUT.

At the same time when the request ReqRD8ID1SEQ12 is output (FIG. 26: Departure=High), the counter DCounter is set at a register RegTlat0 value of 6 (FIG. 29: Step1), the counter C0$ds$ is set at the register RegTlat0 value of 6, and the counter C0$de$ is set at a register Reg Blat0 value of 11. The request output circuit RQOUT decrements the values set in the counters C0$ds$ and C0$de$ by 1 to update the relative time frame m0RsDr in which a response appears on the response signal RsMux0. The latency adjustment circuit LCHCK checks to see whether a response ResRD8ID1SEQ12 for the request ReqRD8ID1SEQ12 has returned (FIG. 29: Step 2) and, if the response has not yet returned (FIG. 26: Arrival=Low) and the counter DCounter is larger than 0 (FIG. 29: Step 3), decrements the value by 1 at the rising edge of the clock RqCK0 (FIG. 29: Step 4). Also, when the counter C0$ds$ value indicates 1 and the counter C0$de$ value indicates subsequently to the request ReqRD8ID1SEQ12, the request ReqRD8ID1SEQ13 is output (FIG. 26: Departure=High). At the same time, the counter DCounter is set at a register RegTlat0 value of 6 (FIG. 29: Step1), the counter C0$ds$ is set at a register RegTlat0 value of 6, and the counter C0$de$ is set at a register Reg Blat0 value of 11.

If the response ResRD8ID1SEQ12 does not return even when the counter DCounter becomes 0 (FIG. 26: Arrival=Low), the value set in a counter UPCounter1 is incremented by 1 (FIG. 29: Step 5), and the allowable latency register RegLatRange value of 1 and the counter UCounter value of 0 are compared (FIG. 29: Step 6). Since the counter UCounter value of 0 is smaller than the allowable latency register RegLatRange value of 1, the latency adjustment circuit LCHCK increments the counter UCounter by 1 to set the counter UCounter value at 1 (FIG. 29: Step 8). It is again checked to see whether the response ResRD8ID1SEQ12 has returned (FIG. 29: Step 2) and if the response has not yet returned (FIG. 26: Arrival=Low) and the counter DCounter indicates a value larger than 0 (FIG. 29: Step 3), the value is decremented by 1 at the time of the rising edge of the clock RqCK0 (FIG. 29: Step 4).

When the response ResRD8ID1SEQ12 does not return even if the counter DCounter becomes 0 (FIG. 26: Arrival=Low), the value set in the counter UPCounter1 is incremented by 1 (FIG. 29: Step 5), and the allowable latency register RegLatRange value of 1 and the counter UCounter value of 0 are compared (FIG. 29: Step 6). When the counter UCounter value of 1 is larger than or equal to the allowable latency register RegLatRange value of 1, the latency adjustment circuit LCHCK sets the NotifyStatus signal at Correction (FIG. 26: Notify Status=Correction), and the request output circuit RQOUT is notified of a start of latency correction (FIG. 29: Step 7). Upon receiving the NotifyStatus signal value of Correction, the request output circuit RQOUT stops the operation of the counter C0$ds$ and the counter C0$de$ (FIG. 26: Stop Count). At this time, the counter C0$ds$ value indicates 4, and the counter C0$de$ value indicates 9. When the response ResRD8ID1SEQ12 returns three cycles behind the latency LatExpID1 value of 6, the counter UPCounter1 value of 3 and the timeout latency register RegLatTout value of 60 are compared (FIG. 29: Step 9). Since the counter UPCounter1 value of 3 is smaller than the timeout latency register RegLatTout value of 60, the counter UPCounter1 value is cleared to 0 (FIG. 29: Step10).

Next, a comparison is made to see whether the counter DCounter value is larger than 0 (FIG. 29: Step 11), and, since the counter DCounter value indicates 0, a comparison is made to see whether the counter UCounter value is larger than 0 (FIG. 29: Step12). Since the counter UCounter indicates 0, it is checked to see whether a latency correcting operation is being performed (FIG. 29: Step13). Since the latency adjustment circuit LCHCK is performing a latency correcting operation, the NotifyStatus signal is set as NOCorrection, and notifies the request output circuit RQOUT of an end of latency correction (FIG. 29: Step17). Upon receiving the NotifyStatus signal value of NoCorrection, the request output circuit RQOUT operates the counter C0$ds$ and C0$de$ to decrement each of their values by 1.

According to the latency correcting operation, the counter C0$ds$ and the counter C0$de$ stops for three cycles by which the response ResRD8ID1SEQ12 is behind the latency LatExpID1 value of 6. When the counter C0$ds$ value becomes 1 and the C0$de$ value becomes 6 subsequently to the request ReqRD8ID1SEQ13, the request ReqRD8ID1SEQ14 is output (FIG. 26: Departure=High), and at the same time, the counter DCounter is set at the register RegTlat0 value of 6 (FIG. 29: Step1), the counter C0$ds$ is set at a register RegTlat0 value of 6, and the counter C0$de$ is set at a register Reg Blat0 value of 11. The latency adjustment circuit LCHCK checks to see whether the response ResRD8ID1SEQ14 for the request ReqRD8ID1SEQ14 has returned (FIG. 29: Step 2). If the response has not returned yet (FIG. 26: Arrival=Low) and the counter DCounter indicates a value larger than 0 (FIG. 29: Step 3), the value is decremented by 1 at the rising edge of the clock RqCK (FIG. 29: Step 4). When the response ResRD8ID1SEQ14 returns after six cycles, the counter UPCounter1 value of 0 and the timeout latency register RegLatTout value of 60 are compared (FIG. 29: Step 9). Since the counter UPCounter1 value of 0 is smaller than the timeout latency register RegLatTout value of 60, the counter UPCounter1 value is cleared to 0 (FIG. 29: Step10).

Next, a comparison is made to see whether the counter DCounter value is larger than 0 (FIG. 29: Step11), and, since the counter DCounter value indicates 0, a comparison is made to see whether the counter UCounter value is larger than 0

(FIG. 29: Step12). Since the counter UCounter indicates 0, it is checked to see whether a latency correcting operation is being performed (FIG. 29: Step13). Since the latency adjustment circuit LCHCK is not performing a latency correcting operation, the NotifyStatus signal is set as MET, and the request output circuit RQOUT is notified as such (FIG. 29: Step17). The NotifyStatus signal indicates MET, indicating that the response ResRD8ID1SEQ14 for the request ReqRD8ID1SEQ14 has returned after six cycles indicated by a LatExpID1 value. Upon receiving the NotifyStatus signal value of MET, the request output circuit RQOUT operates the counter C0$ds$ and the counter C0$de$ to decrement each of their values by 1.

As described above, by performing a latency correcting operation of measuring a latency and stopping the counter C0$ds$ and the counter C0$de$ for three cycles with respect to the three cycles behind the latency LatExpID1 of 6 when a delay further occurs from six cycles indicated by the latency LatExpId1 value for one cycle indicated by the allowable latency LatRange value, a response to a subsequent request can be equalized to the expectation value latency LatExpID1 value of 6.

<Latency: Timeout Error>

Figure 27:
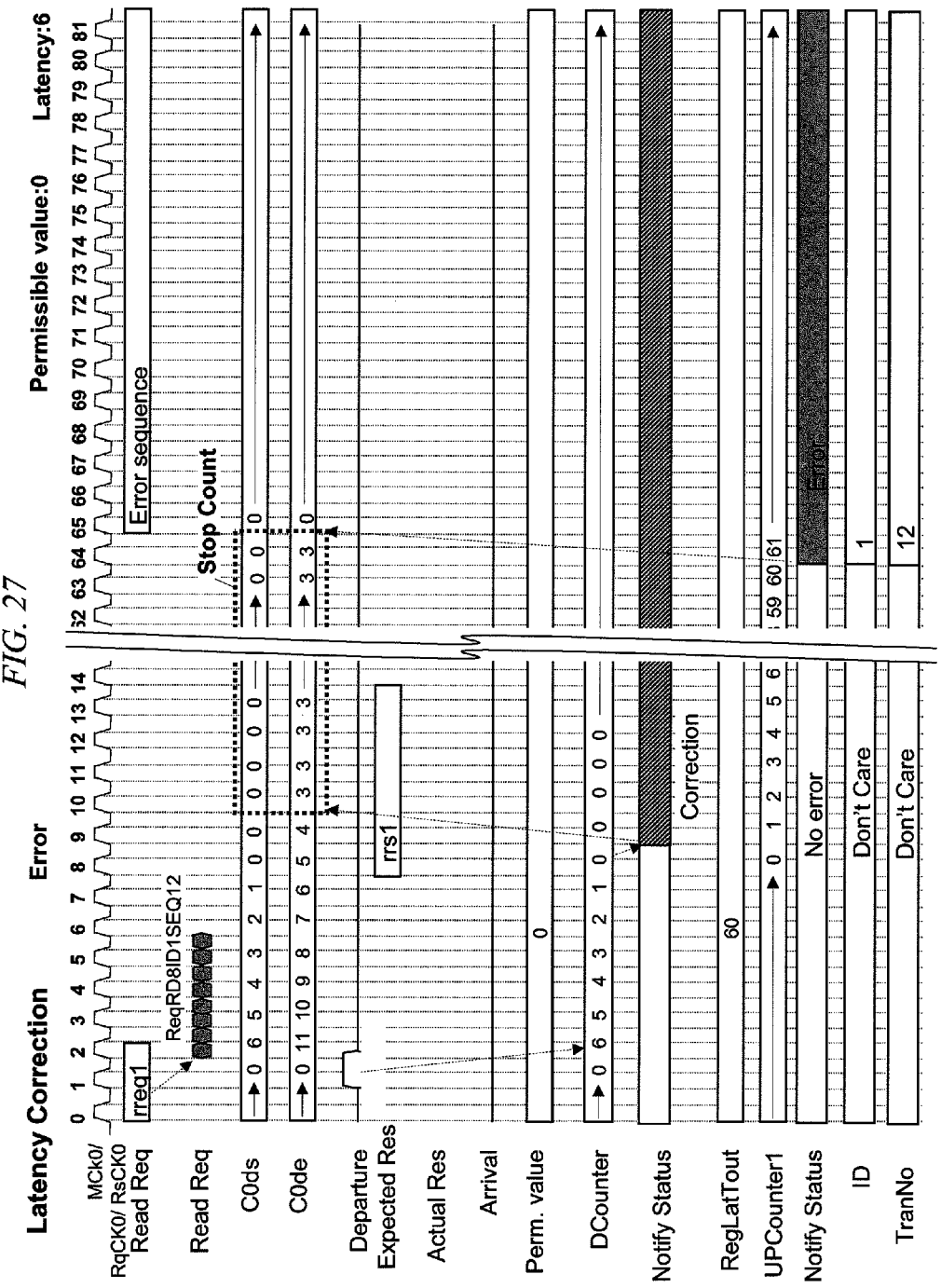
FIG. 27 is a diagram showing one example of operation waveforms of the data processing system to which the present invention is applied.

FIG. 27 depicts an example of an operation to be performed by the latency adjustment circuit LCHCK when the memory M0 in the latency register LTREG of the memory control circuit DCMC has a latency LatExpID1 value set at 6, an allowable latency LatRange value at 0, and a timeout latency LatTimeOut value at 60, and an actually-measured latency of a response from the memory M0 becomes larger than the timeout latency LatTimeOut value of 60. Also, FIG. 29 is an exemplary flowchart showing an example of an operation of counters the latency adjustment circuit LCHCK is equipped with for performing a latency correcting operation.

The latency adjustment circuit LCHCK is equipped with a counter DCounter, a counter UCounter, a counter UPCounter1, an allowable latency register RegLatRange, and a timeout latency register RegLatTout. The counter C0$ds$ and the counter C0$de$ regarding the memory M0 are initialized at 0 by the data processing circuit CPU0 at the time of a power-up sequence, although the case is not particularly limited thereto. The counter DCounter and the counters UCounter and UPCounter1 are initialized at 0 by the data processing circuit CPU0 at the time of a power-up sequence, although the case is not particularly limited thereto.

Also, the allowable latency register RegLatRange is set at an allowable latency LatRange value of 0 at the time of a power-up sequence. The timeout latency register RegLatTout is initialized at a timeout latency LatTimeOut value of 60 at the time of a power-up sequence, although the case is not particularly limited thereto. Description is made to the operation when a request ReqRD8ID1SEQ12 including a read instruction RD8 for eight-byte data to the memory M0 is output from the request output circuit RQOUT. At the same time when the request ReqRD8ID1SEQ12 is output (FIG. 27: Departure=High), the counter DCounter is set at a register RegTlat0 value of 6 (FIG. 29: Step1), the counter C0$ds$ is set at the register RegTlat0 value of 6, and the counter C0$de$ is set at a register Reg Blat0 value of 11. The request output circuit RQOUT decrements the values set in the counters C0$ds$ and C0$de$ by 1 to update the relative time frame m0RsDr in which a response appears on the response signal RsMux0.

The latency adjustment circuit LCHCK checks to see whether a response ResRD8ID1SEQ12 for the request ReqRD8ID1SEQ12 has returned (FIG. 29: Step 2) and, if the response has not yet returned (FIG. 27: Arrival=Low) and the counter DCounter is larger than 0 (FIG. 29: Step 3), decrements the value by 1 at the rising edge of the clock RqCK0 (FIG. 29: Step 4). When the response ResRD8ID1SEQ12 does not return even if the counter DCounter becomes 0 (FIG. 27: Arrival=Low), the value set in the counter UPCounter1 is incremented by 1 (FIG. 29: Step 5), and the allowable latency register RegLatRange value of 0 and the counter UCounter value of 0 are compared (FIG. 29: Step 6). Since the counter UCounter value of 0 is larger than or equal to the allowable latency register RegLatRange value of 0, the latency adjustment circuit LCHCK sets a NotifyStatus signal at Correction (FIG. 27: Notify Status=Correction), and the request output circuit RQOUT is notified of a start of latency correction (FIG. 29: Step 7).

Upon receiving the NotifyStatus signal value of Correction, the request output circuit RQOUT stops the operation of the counter C0$ds$ and the counter C0$de$ (FIG. 27: Stop Count). At this time, the counter C0$ds$ value indicates 0, and the counter C0$de$ indicates 3. Also, the counter UPCounter1 value and the timeout latency LatTimeOut value of 60 are compared (FIG. 29: Step 9). When the counter UPCounter1 value is equal to or smaller than the timeout latency LatTimeOut value of 60, it is again checked to see whether the response ResRD8ID1SEQ12 has returned (FIG. 29: Step 2), and, when the counter UPCounter1 value is larger than the timeout latency LatTimeOut value of 60, the latency adjustment circuit LCHCK sets the NotifyStatus signal at Error (FIG. 27: Notify Status=Error), and notifies the request output circuit RQOUT of the occurrence of a latency timeout error (FIG. 29: Step 9). Furthermore, the request output circuit RQOUT is notified of an ID value of 1 and a request number ReqN value of 12 of a request where a latency error has occurred (FIG. 29: Step 9). Next, the request output circuit RQOUT clears the counter C0$ds$ value and the counter C0$de$ value at 0, performs an error sequence operation at the time of occurrence of an error, and then again outputs the request ReqRD8ID1SEQ12.

As described above, when the measured latency is larger than the timeout latency LatTimeOut value of 60, the latency adjustment circuit LCHCK notifies the request output circuit RQOUT of a latency timeout error. In this manner, the request output circuit RQOUT can output again the request in which a latency timeout error has occurred.

<Latency: Correction>

Figure 28:
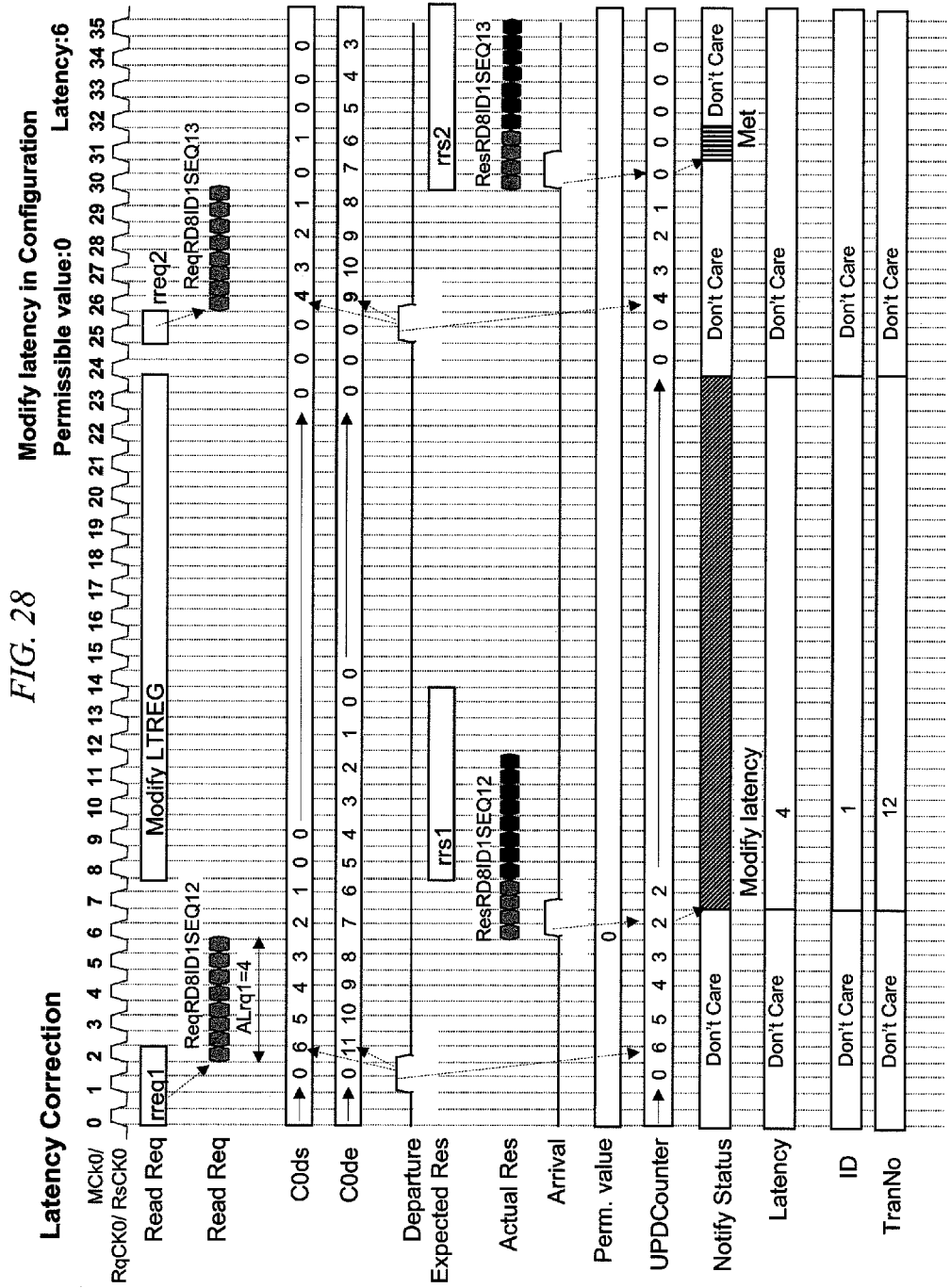
FIG. 28 is a diagram showing one example of operation waveforms of the data processing system to which the present invention is applied.

FIG. 28 shows an example of an operation to be performed by the latency adjustment circuit LCHCK when the memory M0 in the latency register LTREG of the memory control circuit DCMC has a latency LatExpID1 value set at 6, an allowable latency LatRange value at 0, and a timeout latency LatTimeOut value at 60, and an actually-measured latency of a response from the memory M0 becomes larger than the timeout latency LatTimeOut value of 60. Also, FIG. 29 is an exemplary flowchart showing an example of operation of counters the latency adjustment circuit LCHCK is equipped with for performing a latency correcting operation.

The latency adjustment circuit LCHCK is equipped with a counter DCounter, a counter UCounter, a counter UPCounter1, an allowable latency register RegLatRange, and a timeout latency register RegLatTout. The counter C0$ds$ and the counter C0$de$ regarding the memory M0 are initialized at 0 by the data processing circuit CPU0 at the time of a power-up sequence. The counter DCounter and the counters UCounter and UPCounter1 are initialized at 0 by the data processing circuit CPU0 at the time of a power-up sequence, although the case is not particularly limited thereto. Also, the allowable latency register RegLatRange is set at an allowable latency LatRange value of 0 at the time of a power-up sequence, although the case is not particularly limited thereto, and the timeout latency register RegLatTout is initialized at a timeout latency LatTimeOut value of 60 at the time of a power-up sequence, although the case is not particularly limited thereto.

Descriptions will be made to an operation when a request ReqRD8ID1SEQ12 including a read instruction RD8 for eight-byte data to the memory M0 is output from the request output circuit RQOUT. At the same time when the request ReqRD8ID1SEQ12 is output (FIG. 28: Departure=High), the counter DCounter is set at a register RegTlat0 value of 6 (FIG. 29: Step1), the counter C0$ds$ is set at the register RegTlat0 value of 6, and the counter C0$de$ is set at a register Reg Blat0 value of 11. The request output circuit RQOUT decrements the values set in the counters C0$ds$ and C0$de$ by 1 to update the relative time frame m0RsDr in which a response appears on the response signal RsMux0.

The latency adjustment circuit LCHCK checks to see whether a response ResRD8ID1SEQ12 for the request ReqRD8ID1SEQ12 has returned (FIG. 29: Step 2) and, if the response has not yet returned (FIG. 27: Arrival=Low) and the counter DCounter is larger than 0 (FIG. 29: Step 3), decrements the value by 1 at the rising edge of the clock RqCK0 (FIG. 29: Step 4). When the response ResRD8ID1SEQ12 returns (FIG. 29: Step 2), the counter UPCounter1 value is cleared to 0 (FIG. 29: Step10). Next, it is checked to see whether the counter DCounter value is larger than 0 (FIG. 29: Step11). When the counter DCounter value is larger than 0, this means that the response has returned earlier than the latency LatExpID1 value. The latency adjustment circuit LCHCK sets a NotifyStatus signal at Modify latency, and notifies the request output circuit RQOUT of a request for correcting the latency LatExpID1 value, together with an actually-measured latency value of 4 (FIG. 29: Step18). Upon receiving the request for correcting the latency LatExpID1 value, the request output circuit RQOUT corrects the latency LatExpID1 value of the memory M0 in the latency register LTREG to 4 (FIG. 28: Modify LTREG). The actually-measured latency of a response ResRD8ID1SEQ13 for a request ReqRD8ID1SEQ13 after the latency LatExpID1 value is corrected to 4 becomes 4, which is equal to the LatExpID1 value of 4.

As described above, when the measured latency is smaller than the latency LatExpID1 value of the memory M0 in the latency register LTREG, the latency adjustment circuit LCHCK notifies the request output circuit RQOUT of a request for correcting the latency LatExpID1 value. In this manner, the request output circuit RQOUT can correct the latency LatExpID1 value to a correct value.

<Operation of Response Schedule Circuit SCH>

Figure 30:
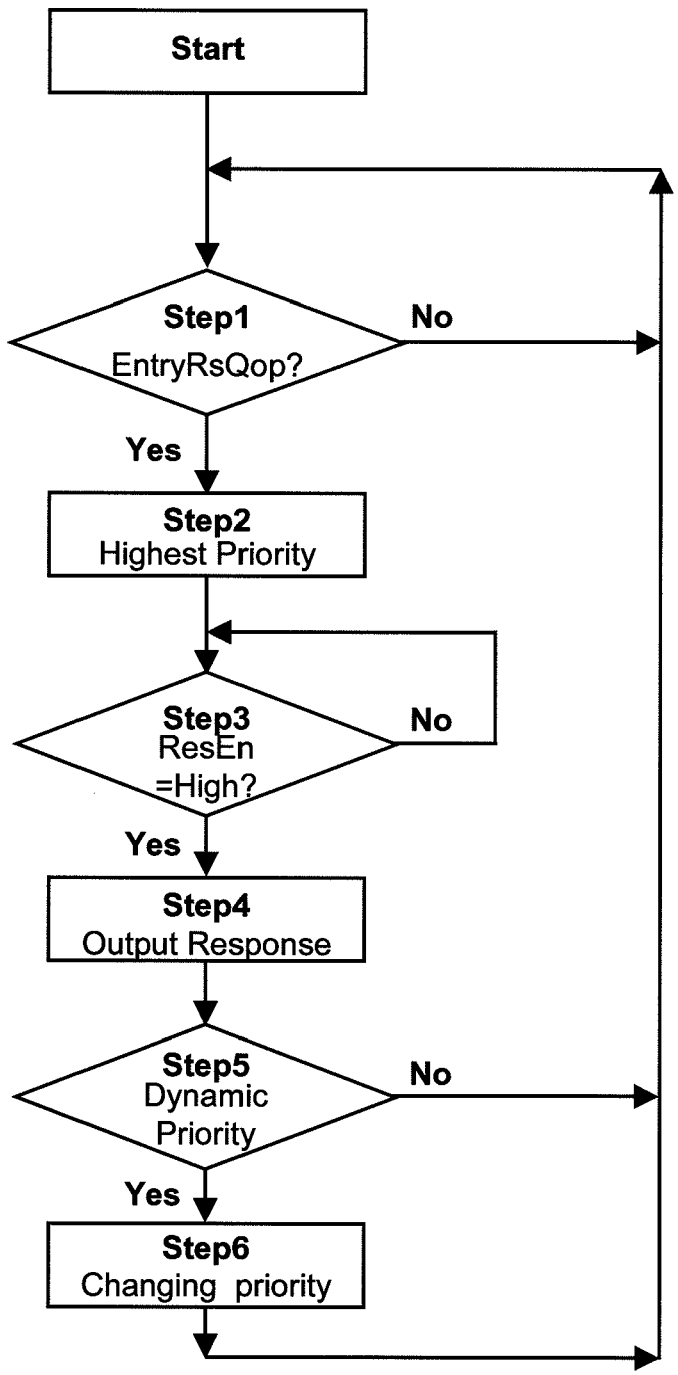
FIG. 30 is a flowchart showing one example of an operation of a response schedule circuit mounted in each memory.

The operation of the response schedule circuit SCH will be described. FIG. 30 is a flowchart showing an example of an operation of the response schedule circuit SCH each memory is equipped with. In the response schedule circuit SCH, it is first checked to see whether a response has been entered to the response queue circuit RSQo and the response queue circuit RsQp (FIG. 30: Step1). When no response has been entered either of the response queue circuit RsQo and the response queue circuit RsQp, any entry to the response queue circuit RsQo and the response queue circuit RsQp is again checked.

If a response has been entered either one of the response queue circuit RsQo and the response queue circuit RsQp, the priority of that response is checked, and transmission of a response having the highest response priority is prepared (FIG. 30: Step 2). Next, a response enable signal RsEn0 is checked (FIG. 30: Step 3), and, when the signal indicates Low, no response is output, and the circuit waits for the response enable signal RsEn0 to become High. When the response enable signal RsEn0 indicates High, the circuit outputs a response having the highest response priority (FIG. 30: Step 4). After the response is output, the output priority control scheme regarding responses specified in each memory is checked (FIG. 30: Step 5). When the output priority control scheme regarding responses is a fixed priority scheme, the output priority regarding responses is not changed; and, when the scheme is a variable priority scheme, the output priority regarding responses is changed (FIG. 30: Step 6). In the fixed priority scheme, possible settings include: a setting in which a response in the response queue circuit RsQp is prioritized over a response in the response queue circuit RsQo, these response queue circuits being provided to each memory; and a setting in which a response in the response queue circuit RsQo is prioritized over a response in the response queue circuit RsQp. Also, in the variable priority scheme, it is possible to change, with a round-robin scheme, the priorities of responses in the response queue circuit RsQp and the response queue circuit RsQo mounted on each memory.

<Effect of First Embodiment>

Hereinafter, the structure and effects of the embodiment described above will be summarized.

(1) Immediately after powering on or when a new memory is inserted or removed, an operation of checking a series connection is performed, so that it can be reliably confirmed that the memories are connected to each other. Furthermore, upon powering on or when a new memory is inserted or removed, an ID is automatically provided to each memory, so that memories as required can be easily connected, and the memory capacity can be expanded.

(2) By adding an identification number ID of the memory to a request, the request is reliably transferred from the data processing device CPU_CHIP to each of the memories M0, M1, and M2. Also, by adding an ID to a response to the data processing device CPU_CHIP, it is possible to confirm that data transfer from each memory has been correctly performed, and by series connection of the data processing device CPU_CHIP and the memories M0, M1, and M2, the data processing device CPU_CHIP can perform a desired process while the number of connection signals are reduced.

(3) With a request number being added to a request and a response number being added to a response, even if the response has been transmitted in the order different from a request input order to improve data transfer performance, the data processing device CPU_CHIP can find to which request the response has been transmitted from the memory, thereby performing a desired process at a high speed.

(4) Since the request interface circuit ReIF and the response interface circuit can operate independently, a data read operation and write operation can be performed simultaneously, thereby improving data transfer performance.

(5) Data that is quickly readable can be immediately read irrespectively of the request input order without waiting for data that is slowly readable, thereby achieving a high speed.

(6) Error detection and correction are performed at the time of reading from the memory M2 and a replacement process is performed on a faulty address where write has not been performed correctly, thereby keeping reliability.

(7) A time frame of a response to a request to each memory is predicted and managed to issue a request, thereby achieving a low latency and a high-speed data transfer rate.

(8) When transmitting a request including a read instruction to each of the memories M0, M1, and M2, the data processing device CPU_CHIP allocates a response queue in a vacant state required for receiving a response to that request, and then transmits the request including a read instruction;

therefore, the response can be transmitted with low latency, achieving a high-speed data transfer.

(9) By actually measuring latency and comparing with an expectation value of latency, it is possible to determine whether the data processing system of the present embodiment is operating normally. Furthermore, a difference between the actually measured latency value and the latency expectation value exceeds an allowable range, a latency correcting operation is performed, thereby allowing an operation always with low latency within the allowable range.

(10) By actually measuring latency and updating the latency register LTREG to this actually-measured latency value, the data processing device CPU_CHIP can perform control using a correct latency and achieve low latency and a high-speed data transfer.

(11) Since each of the values of registers in the configuration circuit CONFIG is programmable, an optimum register value can be set according to various structures and performances of the data processing system, thereby allowing flexible support.

(12) Not only the sense amplifier SenseAmp and the data buffer DataLat for each memory bank in each memory but also the response queue RsQo of each memory are used as cache memories, and therefore, the cache memory size can be increased, a hit ratio of the cache memory can be increased, and each memory can be operated with low latency, at a high speed, and with low power.

Although the example has been described in the present embodiment in which the memory module MEM includes one volatile memory, one NOR flash memory, and one NAND flash memory, it is needless to say that the present invention can also be achieved when the memory module MEM includes a plurality of volatile memories and a plurality of NOR flash memories and NAND flash memories.

(Second Embodiment)

Figure 31:
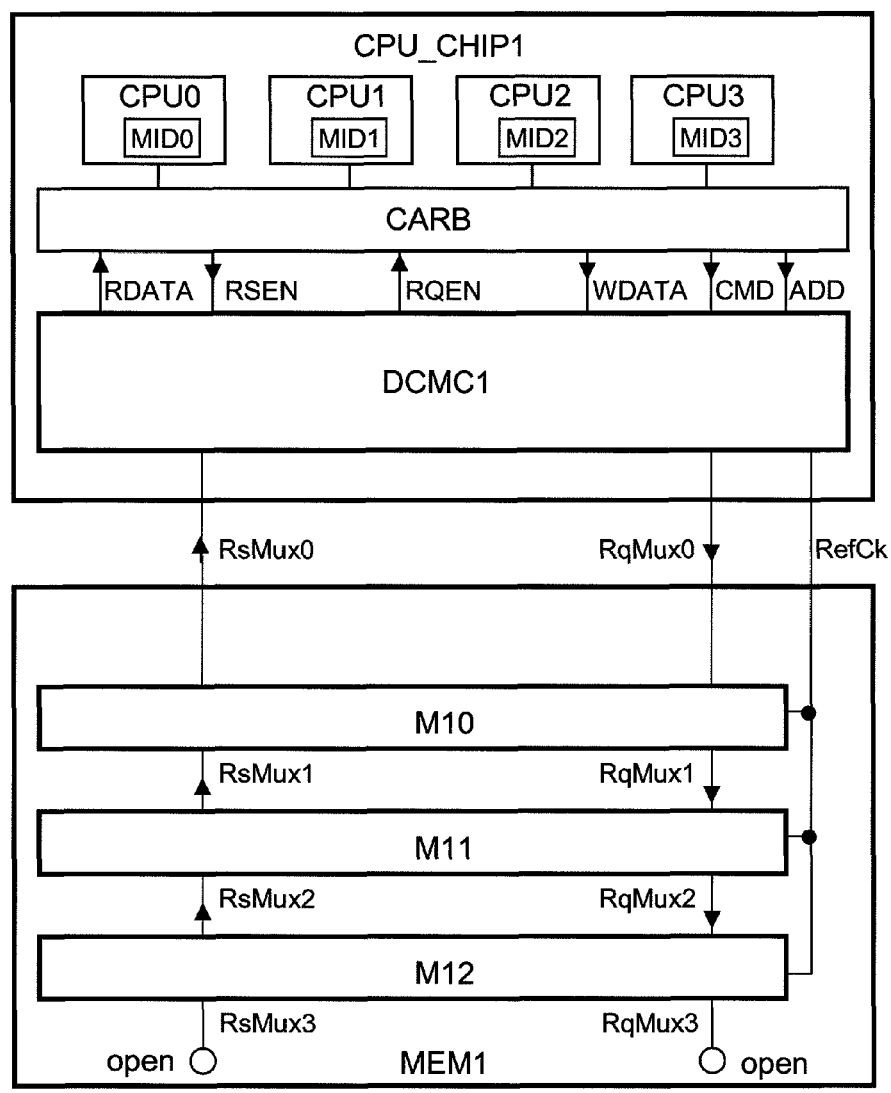
FIG. 31 is a configuration diagram of a data processing system to which the present invention is applied.
Figure 32:
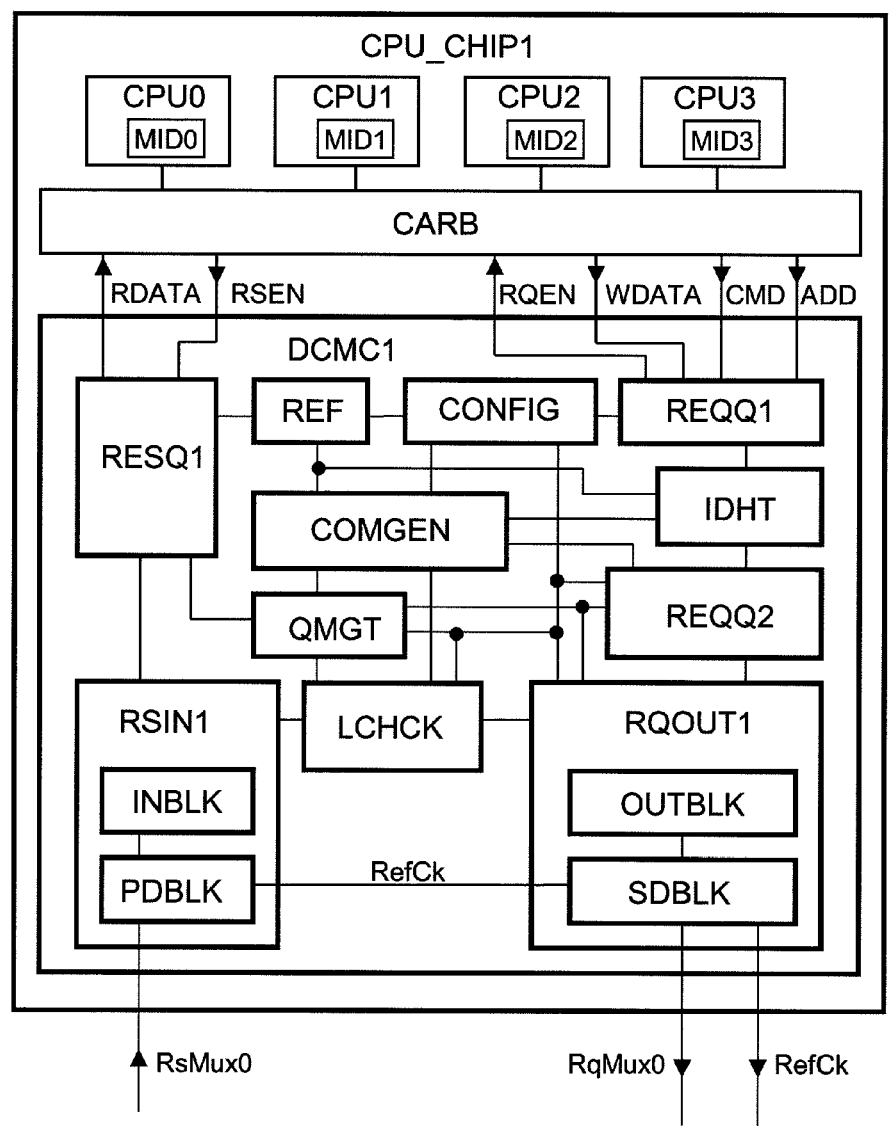
FIG. 32 is a diagram showing one example of a configuration of a data processing device configuring the data processing system to which the present invention is applied.
Figure 33:
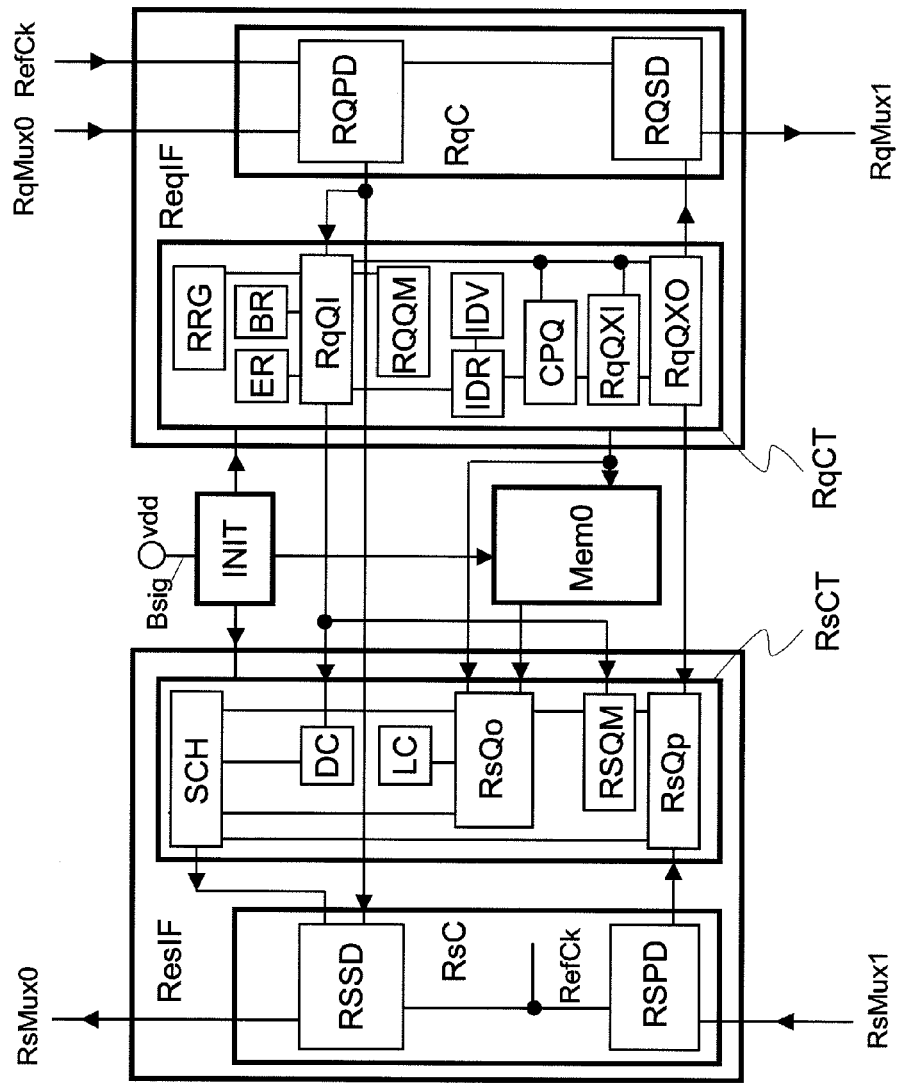
FIG. 33 is a diagram showing one example of a configuration of a memory.
Figure 34:
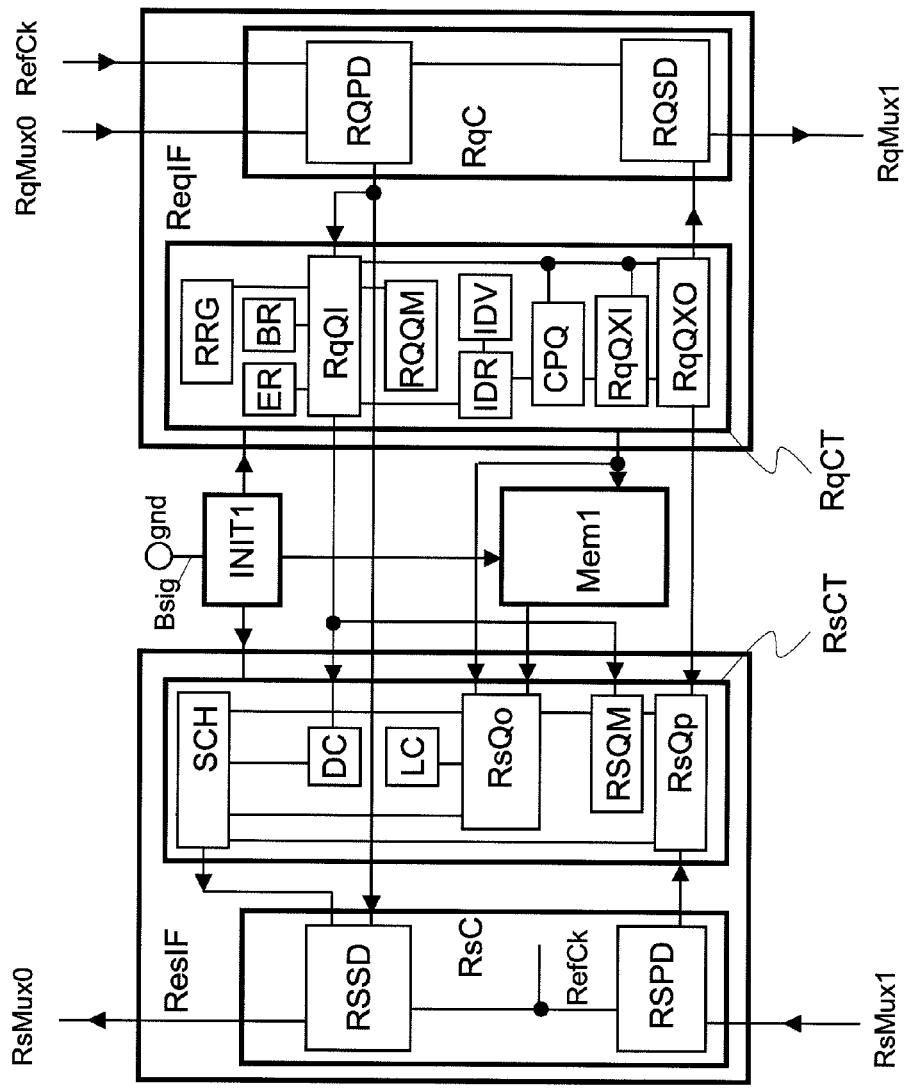
FIG. 34 is a diagram showing one example of a configuration of a memory.
Figure 35:
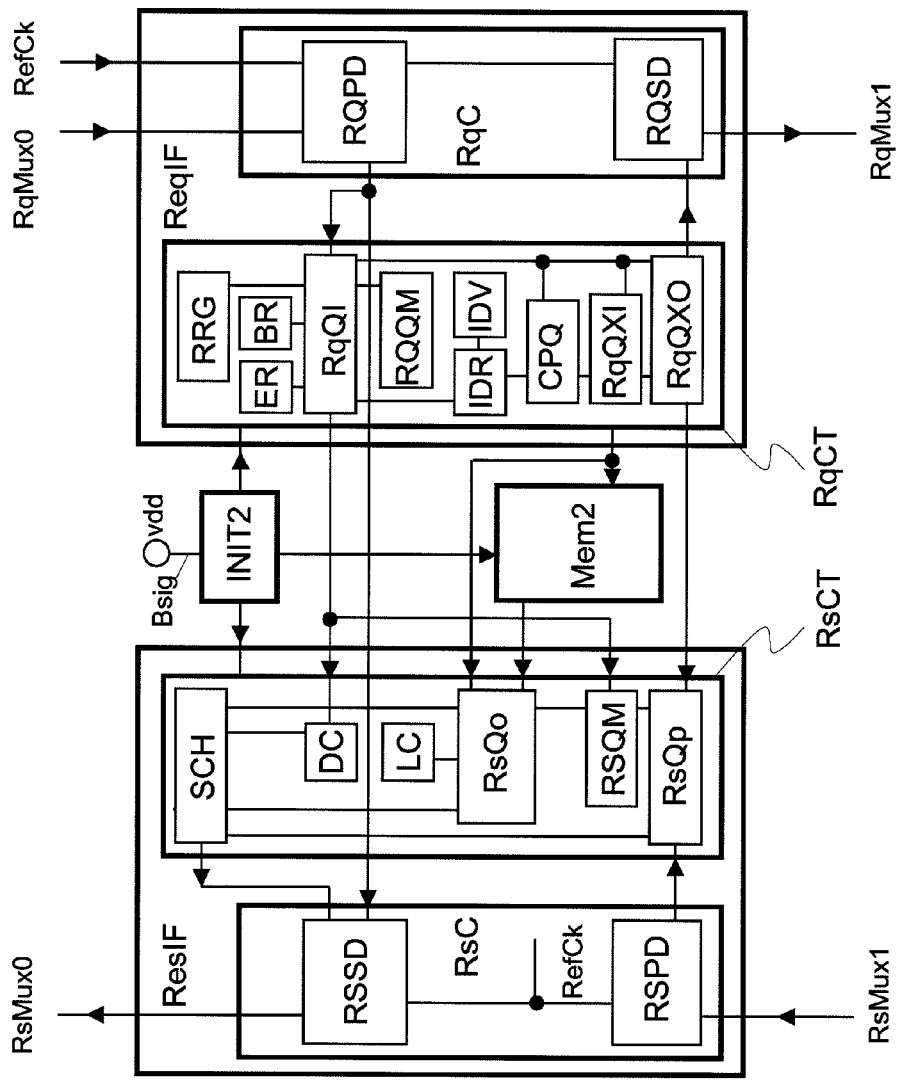
FIG. 35 is a diagram showing one example of a configuration of a memory.

A data processing system of a second embodiment to which the present invention is applied will be described with reference to FIGS. 31 to 35. FIG. 31 is a block diagram showing an example of a structure of a data processing system composed of a data processing device CPU_CHIP1 and a memory module MEM1 in the second embodiment to which the present invention is applied. Also, FIG. 32 is a block diagram showing an example of a structure of the data processing device CPU_CHIP1. The memory module MEM1 includes memories M10, M11, and M12. Also, the data processing device CPU_CHIP1 and the memories M10, M11, and M12 are connected in series. Furthermore, FIG. 33 is a block diagram showing an example of a structure of the memory M10, FIG. 34 is a block diagram showing an example of a structure of the memory M11, and FIG. 35 is a block diagram showing an example of a structure of the memory M12.

Also, as a clock mode for operating the data processing device CPU_CHIP1 and the memory module MEM1, there are a common clock mode, a source synchronous clock mode, an embedded clock mode, and others, and any of the clock modes can be used in the present invention. In the present embodiment, descriptions will be made using an operation in an embedded clock mode as an example. Each of them will be described below.

The data processing device CPU_CHIP1 includes data processing circuits CPU0, CPU1, CPU2, and CPU3, an arbitration circuit CARB, and a memory control circuit DCMC1. The memory module MEM1 includes the memories M10, M11, and M12. Also, the data processing device CPU_CHIP1 and the memories M10, M11, and M12 are connected in series. The data processing circuit CPU0 mounts a master number register MID0, the data processing circuit CPU1 mounts a master number register MID1, the data processing circuit CPU2 mounts a master number register MID2, and the data processing circuit CPU3 is equipped with a master number register MID3.

The data processing circuits CPU0, CPU1, CPU2, and CPU3 are similar to those of FIG. 1, reading data to be processed on an OS, an application program, and an application program from the memory module MEM by way of the arbitration circuit CARB and the memory control circuit DCMC1 for execution. The memory control circuit DCMC includes, although not particularly limited to this, a configuration circuit CONFIG, a request queue REQQ1, a hit determination circuit IDHT, a request queue REQQ2, a command generation circuit COMGEN, a request output circuit RQOUT1, a refresh request circuit REF, a queue management circuit QMGT, a latency adjustment circuit LCHCK, a response input circuit RSIN1, and a response queue RESQ1. Also, the configuration circuit CONFIG includes registers similar to those of FIG. 1 and has similar functions.

The request queue REQQ1, the hit determination circuit IDHT, the request queue REQQ2, the command generation circuit COMGEN, the refresh request circuit REF, the queue management circuit QMGT, the latency adjustment circuit LCHCK, and the response queue RESQ1 have functions similar to those of FIG. 1. The request output circuit RQOUT1 includes an output circuit OUTBLK and a serial data circuit SDBLK. The output circuit OUTBLK is a circuit that has a function identical to that of the request output circuit RQOUT shown in FIG. 1 and transfers a request transmitted from the request queue REQQ2 to the serial data circuit SDBLK.

The serial data circuit SDBLK is a circuit that embeds clock information in a request transmitted from the output circuit OUTBLK, and further makes conversion to serial data for issuance by way of a request signal RqMux0 to the memory module MEM1. Also, the serial data circuit SDBLK transmits a reference clock RefCk to the memory module MEM1. The response input circuit RSIN1 includes an input circuit INBLK and a parallel data circuit PDBLK. The parallel data circuit PDBLK receives a response received from the response signal RsMux0 in a serial data form, uses reference clock RefCk to extract clock data embedded in this response, and converts the data in a serial data form to parallel data for transmission to the input circuit INBLK. The input circuit INBLK has a function similar to that of the request input circuit RSIN shown in FIG. 3 to perform similar operations.

The memory M10 is composed of an initializing circuit INIT, a memory circuit Mem0, a request interface circuit ReqIF, and a response interface circuit ResIF. The request interface circuit ReqIF includes a request signal conversion circuit RqC and a request queue control circuit RqCT. The request conversion circuit RqC includes a parallel data circuit RQPD and a serial data circuit RQSD. The response interface circuit ResIF includes a response queue control circuit RsCT and a response signal conversion circuit RsC. The response signal conversion circuit RsC includes a parallel data circuit RSPD and a serial data circuit RSSD. The parallel data circuit RQPD receives a request input from the request signal RqMux0 in a serial data form, uses the reference clock RefCk to extract clock data embedded in this request, and converts the request in a serial data form to parallel data for transmission to the request queue circuit RqQI of the request queue control circuit RqCT. The serial data circuit RQSD is a circuit that embeds clock data in a request transmitted from a request queue circuit RqQXO of the request queue control circuit RqCT, and further makes conversion to serial data for transmission to the memory M11 by way of the request signal RqMux1.

The parallel data circuit RSPD receives a response input from the response signal RqMux1 in a serial data form, uses the reference clock RefCk to extract clock data embedded in this response, and converts the response in a serial data form to parallel data for transmission to the response queue circuit RsQp of the response queue control circuit RsCT. The serial data circuit RSSD is a circuit that embeds clock data in a response transmitted from a response schedule circuit SCH of the response queue control circuit RsCT, and further makes conversion to serial data for transmission to the response input circuit RSIN1 by way of the response signal RsMux0.

The initializing circuit INIT, the memory circuit Mem0, the request queue control circuit RqCT, and the response queue control circuit RsCT have structures and functions similar to those of the memory M0 shown in FIG. 3. Therefore, the functions and roles of the memory M10 are similar to those of the memory M0 shown in FIGS. 3 and 4.

The memory M11 includes an initializing circuit INIT1, a memory circuit Mem1, a request interface circuit ReqIF, and a response interface circuit ResIF. The request interface circuit ReqIF includes a request signal conversion circuit RqC and a request queue control circuit RqCT. The request conversion circuit RqC includes a parallel data circuit RQPD and a serial data circuit RQSD. The response interface circuit ResIF includes a response queue control circuit RsCT and a response signal conversion circuit RsC. The response signal conversion circuit RsC includes a parallel data circuit RSPD and a serial data circuit RSSD. The parallel data circuit RQPD receives a request in a serial data form input from the request signal RqMux1, uses the reference clock RefCk to extract clock data embedded in this request, and converts the request in a serial data form to parallel data for transmission to the request queue circuit RqQI of the request queue control circuit RqCT.

The serial data circuit RQSD is a circuit that embeds clock data in a request transmitted from a request queue circuit RqQXO of the request queue control circuit RqCT, and further makes conversion to serial data for transmission to the memory M12 by way of the request signal RqMux2. The parallel data circuit RSPD receives a response input from the response signal RqMux2 in a serial data form, uses the reference clock RefCk to extract clock data embedded in this request, and converts the response in a serial data form to parallel data for transmission to the response queue circuit RsQp of the response queue control circuit RsCT.

The serial data circuit RSSD is a circuit that embeds clock data in a response transmitted from a response schedule circuit SCH of the response queue control circuit RsCT, and further makes conversion to serial data for transmission to the memory M10 by way of the response signal RsMux1. The initializing circuit INIT1, the memory circuit Mem1, the request queue control circuit RqCT, and the response queue control circuit RsCT have structures and functions similar to those of the memory M1 shown in FIG. 3. Therefore, the functions and roles of the memory M11 are similar to those of the memory M1 shown in FIGS. 5 and 6.

The memory M12 includes an initializing circuit INIT2, a memory circuit Mem2, a request interface circuit ReqIF, and a response interface circuit ResIF. The request interface circuit ReqIF includes a request signal conversion circuit RqC and a request queue control circuit RqCT. The request conversion circuit RqC is composed of a parallel data circuit RQPD and a serial data circuit RQSD. The response interface circuit ResIF includes a response queue control circuit RsCT and a response signal conversion circuit RsC. The response signal conversion circuit RsC includes a parallel data circuit RSPD and a serial data circuit RSSD.

The parallel data circuit RQPD receives a request input from the request signal RqMux2 in a serial data form, uses the reference clock RefCk to extract clock data embedded in this request, and converts the request in a serial data form to parallel data for transmission to the request queue circuit RqQI of the request queue control circuit RqCT. Since the memory M2 is a memory at the end, the request signal RqMux3 is in an unconnected state, and the serial data circuit RQSD and the parallel data circuit RSPD do not operate. The serial data circuit RSSD is a circuit that embeds clock data in a response transmitted from a response schedule circuit SCH of the response queue control circuit RsCT, and further makes conversion to serial data for transmission to the memory M11 by way of the response signal RsMux2.

The initializing circuit INIT2, the memory circuit Mem2, the request queue control circuit RqCT, and the response queue control circuit RsCT have structures and functions similar to those of the memory M2 shown in FIG. 7. Therefore, the functions and roles of the memory M12 are similar to those of the memory M2 shown in FIGS. 7 and 8.

As described above, in the embedded clock mode of the present embodiment, clock data is embedded by the serial data circuits SDBLK, RQSD, and RSSD in a request or response of parallel data, and the resultant request or response is converted to serial data for transmission. In the present embodiment, in addition to the effects of the first embodiment, a clock signal for request transmission and a clock signal for response transmission can be deleted, thereby allowing further low-power operation. Furthermore, the number of request and response signals can be reduced to minimum 1 bit; and with such a minimum number of signals, a data processing system composed of the data processing device CPU_CHIP1 and the memory module MEM1 can be configured.

(Third Embodiment)

Figure 36:
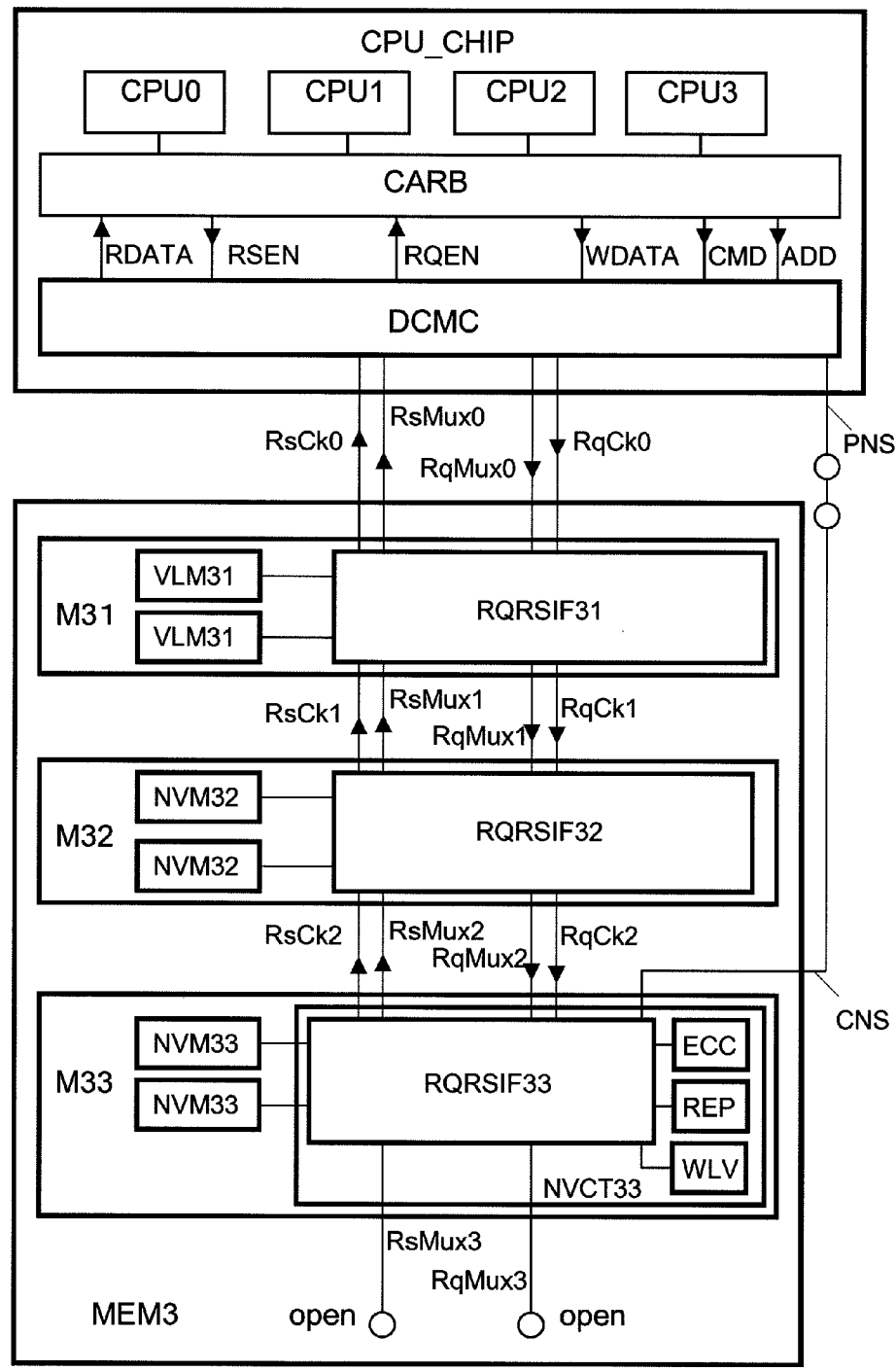
FIG. 36 is a configuration diagram of a data processing system to which the present invention is applied.

FIG. 36 shows a third embodiment of the present invention. This embodiment describes a data processing system including a data processing device CPU_CHIP and a memory module MEM3. In the present embodiment, an example of the data processing system of a source synchronous clock mode is shown. The data processing device CPU_CHIP is similar to that shown in FIGS. 1 and 2. The memory module MEM3 includes a memory M31, a memory M32, and a memory M33. RqCk0, RqCk1, and RqCk2 are request clocks, and RsCk0, RsCk1, and RsCk2 are response clocks. RqMux0, RqMux1, and RqMux2 are request signals, and RsMux0, RsMux1, and RsMux2 are response signals. PNS and CNS are connection check signals between the data processing device CPU_CHIP and the memory M33.

The memory M31 is composed of an interface circuit chip RQRSIF31 and a plurality of volatile memory chips VLM31. The interface circuit chip RQRSIF31 is equipped with functions equivalent to all circuits in the memory described with FIG. 3 except the memory circuit Mem0. As the volatile memory chips VLM31, a memory chip having a function equivalent to that of the memory circuit Mem0 in the memory described with FIG. 3 and a general-purpose dynamic random access memory chip DRAM can be used.

The memory M32 includes an interface circuit chip RQRSIF32 and a plurality of non-volatile memory chips NVM32. The interface circuit chip RQRSIF32 is equipped with functions equivalent to all circuits in the memory described with FIG. 5 except the memory circuit Mem1. As the non-volatile memory chips NVM32, a memory chip having a function equivalent to that of the memory circuit Mem1 in the memory described with FIG. 5 and a general-purpose non-volatile memory chip can be used.

The memory M33 includes a controller circuit chip NVCT33 and a plurality of non-volatile memory chips NVM33. The controller circuit chip NVCT33 includes an interface circuit RQRSIF33, an error correction circuit ECC, a replacement processing circuit REP, and a write count leveling circuit WLV.

The interface circuit RQRSIF33 is equipped with functions equivalent to those of all circuits in the memory described with FIG. 7 except the memory circuit Mem2. As the non-volatile memory chips NVM33, a memory chip having functions equivalent to that of the memory circuit Mem2 in the memory described with FIG. 7 or a general-purpose non-volatile memory chip can be used.

On rare occasions, in the non-volatile memory chips NVM33, as writing is repeated, reliability may decrease, and data written at the time of writing becomes different data at the time of reading and data cannot be written at the time of writing. The error correction circuit ECC checks to see whether data read by the interface circuit RQRSIF33 from the non-volatile memory NAND has an error, and corrects the error if any. The error-corrected data is transmitted from the response signal RsMux2 via the interface circuit RQRSIF33. With the error correction circuit ECC, reliability of the memory M33 can be improved.

The replacement processing circuit REP checks to see whether writing data from the interface circuit RQRSIF33 to the non-volatile memory NAND has been correctly performed. If writing has not been correctly performed, writing is performed on a new address for replacement prepared in advance in the non-volatile memory NAND. With the replacement processing circuit REP, reliability of the memory M33 can be improved.

At the time of writing data from the interface circuit RQRSIF33 to the non-volatile memory NAND, the write count leveling circuit WLV prevents concentration of data writing count at part of addresses of the non-volatile memory NAND but levels the write count. In this manner, the product life of the memory M33 can be extended.

Also, the memory M33 is a removable memory, such as a memory card or SSD (Solid State Drive), and the interface circuit RQRSIF33 mounts a connection check signal CNS for checking a connection state. When the memory M33 is mounted, the connection check signal CNS of the memory M33 and the connection check signal PNS of the data processing device CPU_CHIP are connected together, and the data processing device CPU_CHIP can confirm that the memory M33 is mounted thereon. Also, when the memory M33 is removed, the connection check signal CNS of the memory M33 and the connection check signal PNS of the data processing device CPU_CHIP become in an open state (OPEN), and the data processing device CPU_CHIP can confirm that the memory M33 has been removed.

When confirming the mounting or removal of the memory M33, the data processing device CPU_CHIP automatically provides an identification number ID to each memory. In the present embodiment, in addition to the effects of the first embodiment, a plurality of general-purpose memories are used to easily expand a work area, a copy area, a program area, and a data area, thereby achieving a flexible support according to the system configuration of the portable device. Furthermore, when a new memory is mounted or removed, an ID is automatically provided to each memory, and therefore, memory capacity can be easily expanded by connecting memories as much as required.

(Fourth Embodiment)

Figure 37:
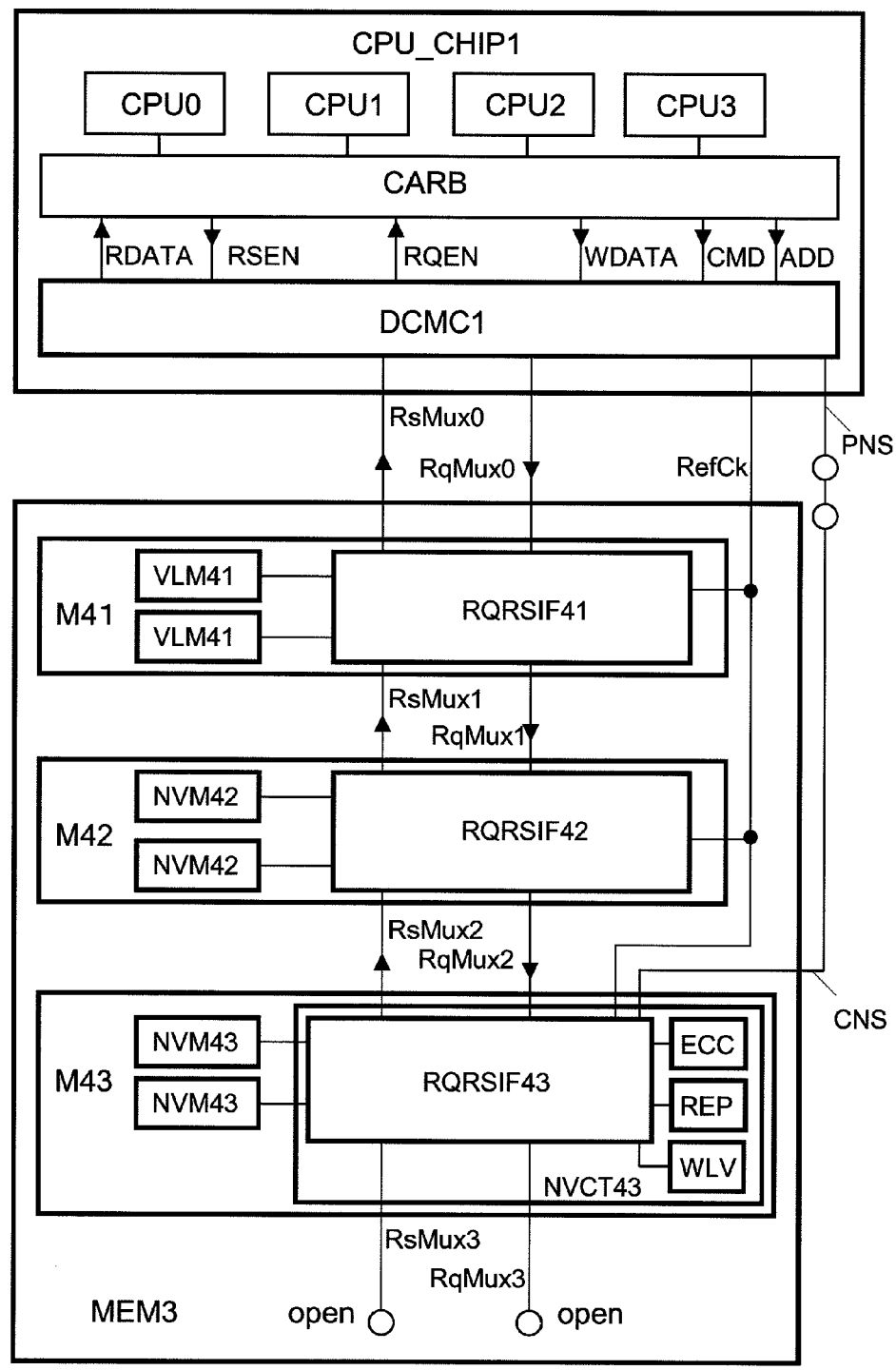
FIG. 37 is a configuration diagram of a data processing system to which the present invention is applied.

FIG. 37 shows a fourth embodiment of the present invention. In this embodiment, an information processing system composed of a data processing device CPU_CHIP1 and a memory module MEM4 is described. In the present embodiment, an example of a data processing system of an embedded clock mode is described. The data processing device CPU_CHIP1 is similar to those shown in FIGS. 31 and 32. The memory module MEM4 is composed of a memory M41, a memory M42 and a memory M43. RefCk is a reference clock. RqMux0, RqMux1, and RqMux2 are request signals, and RsMux0, RsMux1, and RsMux2 are response signals. PNS and CNS are connection check signals between the data processing device CPU_CHIP1 and the memory M43. The memory M41 is composed of an interface circuit chip RQRSIF41 and a plurality of volatile memory chips VLM41. The interface circuit chip RQRSIF41 is equipped with functions equivalent to all circuits in the memories described with FIG. 33 except the memory circuit Mem0. As the volatile memory chips VLM41, a memory chip having a function equivalent to that of the memory circuit Mem0 in the memory described with FIG. 33 and a general-purpose dynamic random access memory chip DRAM can be used.

The memory M42 is composed of an interface circuit chip RQRSIF42 and a plurality of non-volatile memory chips NVM42. The interface circuit chip RQRSIF42 is equipped with functions equivalent to all circuits in the memory described with FIG. 34 except the memory circuit Mem1. As the volatile memory chips NMV42, a memory chip having a function equivalent to that of the memory circuit Mem1 in the memory described with FIG. 34 and a general-purpose non-volatile memory chip can be used.

The memory M43 includes a controller circuit chip NVCT43 and a plurality of non-volatile memory chips NVM43. The controller circuit chip NVCT43 includes an interface circuit RQRSIF43, and error correction circuit ECC, a replacement processing circuit REP, a write count leveling circuit WLV.

The interface circuit RQRSIF43 is equipped with functions equivalent to all circuits in the memory described with FIG. 35 except the memory circuit Mem2. As the non-volatile memory chip NVM43, a memory chip having a function equivalent to that of the memory circuit Mem2 in the memory described with FIG. 35 and a general-purpose non-volatile memory chip can be used. On rare occasions, in the non-volatile memory chips NVM43, as rewriting is repeated, reliability may decrease, and data written at the time of writing becomes different data at the time of reading and data cannot be written at the time of writing. The error correction circuit ECC checks to see whether data read by the interface circuit RQRSIF33 from the non-volatile memory NAND has an error, and corrects the error if any. The error-corrected data is transmitted from the response signal RsMux2 via the interface circuit RQRSIF33. With the error correction circuit ECC, reliability of the memory M43 can be improved. The replacement processing circuit REP checks to see whether writing data from the interface circuit RQRSIF33 to the non-volatile memory NAND has been correctly performed. If writing has not been correctly performed, writing is performed on a new address for replacement prepared in advance in the non-volatile memory NAND. With the replacement processing circuit REP, reliability of the memory M43 can be improved. At the time of writing data from the interface circuit RQRSIF33 to the non-volatile memory NAND, the write count leveling circuit WLV prevents concentration of data writing count at a part of addresses of the non-volatile memory NAND but levels the write count. In this manner, the product life of the memory M43 can be extended.

Also, the memory M43 is a removable memory, such as a memory card or SSD (Solid State Drive), and the interface circuit RQRSIF43 is equipped with a connection check signal CNS for checking a connection state. When the memory M43 is mounted, the connection check signal CNS of the memory M33 and the connection check signal PNS of the data processing device CPU_CHIP are connected together, and the data processing device CPU_CHIP can confirm that the memory M43 is mounted thereon. Also, when the memory M43 is removed, the connection check signal CNS of the memory M43 and the connection check signal PNS of the data processing device CPU_CHIP become in an open state (OPEN), and the data processing device CPU_CHIP can confirm that the memory M43 has been removed. When confirming the mounting or removal of the memory M43, the data processing device CPU_CHIP automatically provides an identification number ID to each memory.

In the present embodiment, in addition to the effects of the first and second embodiments, a plurality of general-purpose memory chips are used to easily expand a work area, a copy area, a program area, and a data area, thereby achieving a flexible support according to the system configuration of the portable device while reducing cost. Furthermore, when a new memory is mounted or removed, an ID is automatically provided to each memory. Therefore, memory capacity can be easily expanded by connecting memories as much as required.

(Fifth Embodiment)

Figure 38A:
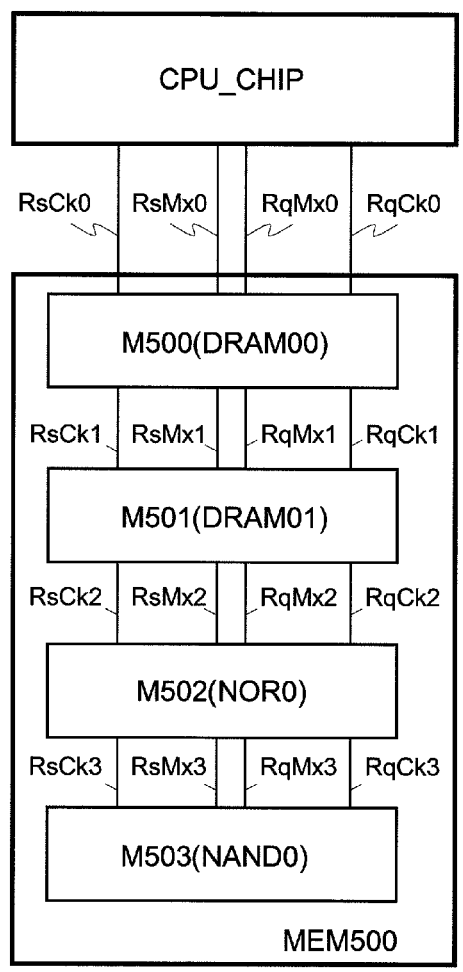
FIG. 38 is a configuration diagram of a data processing system to which the present invention is applied.
Figure 38B:
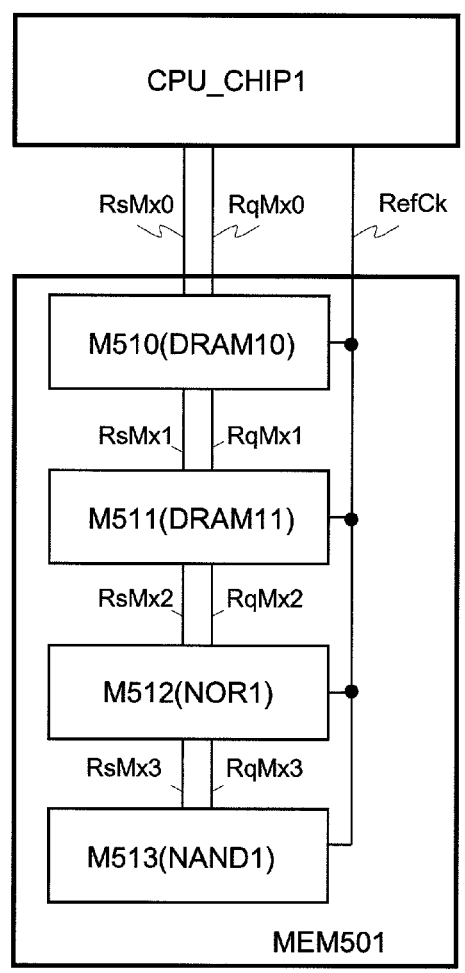

FIGS. 38A and 38B show a fifth embodiment of the present invention. FIG. 38A depicts an embodiment showing a data processing system of a source synchronous clock mode composed of a data processing device CPU_CHIP and a memory module MEM500. FIG. 38B shows an embodiment showing a data processing system of an embedded clock mode including a data processing device CPU_CHIP1 and a memory module 501. RefCk is a reference clock. RqMux0, RqMux1, and RqMux2 are request signals, and RsMux0, RsMux1, and RsMux2 are response signals. The data processing device CPU_CHIP is equivalent to those shown in FIGS. 1 and 2. Also, the data processing device CPU_CHIP1 is equivalent to those shown in FIGS. 31 and 32. The memory module MEM500 is composed of dynamic random access memories DRAM00 and DRAM01, a NOR flash memory NOR0, and a NAND flash memory NAND0. The dynamic random access memories DRAM00 and DRAM01 are equivalent to the memory shown in FIG. 3. The NOR flash memory NOR0 is equivalent to the memory shown in FIG. 5. The NAND flash memory NAND0 is equivalent to the memory shown in FIG. 7. The memory module MEM501 is composed of dynamic random access memories DRAM10 and DRAM11, a NOR flash memory NOR1, and a NAND flash memory NAND1. The dynamic random access memories DRAM10 and DRAM11 are equivalent to the memory shown in FIG. 33. The NOR flash memory NOR1 is equivalent to the memory shown in FIG. 34. The NAND flash memory NAND1 is equivalent to the memory shown in FIG. 35.

In the present embodiment, a plurality of dynamic random access memories DRAM can be easily connected, and the work area and the copy area required by the data processing device CPU_CHIP can be easily expanded. With the work area and the copy area being expanded with the dynamic random access memory DRAM, the size of a program and data stored in the dynamic random access memory DRAM is increased, and the frequency of accesses to the dynamic random access memory closest to the data processing device is increased, thereby allowing a high-speed processing.

In the present embodiment, while connection of a plurality of dynamic random access memories has been described, a plurality of NOR flash memories NOR and NAND flash memories NAND can be connected as required, thereby easily expanding the program area and the data area and achieving a flexible support according to the system configuration of the portable device.

(Sixth Embodiment)

FIGS. 39A and 39B show a sixth embodiment of the present invention. FIG. 39A shows an embodiment showing a data processing system of a source synchronous clock mode including a data processing device CPU_CHIP and a memory module MEM600. FIG. 39B shows an embodiment showing a data processing system of an embedded clock mode composed of a data processing device CPU_CHIP1 and a memory module MEM601. RefCk is a reference clock. RqMux0, RqMux1, and RqMux2 are request signals, and RsMux0, RsMux1, and RsMux2 are response signals. The data processing device CPU_CHIP is equivalent to those shown in FIGS. 1 and 2. Also, the data processing device CPU_CHIP1 is equivalent to those shown in FIGS. 31 and 32. The memory module MEM600 is composed of a NOR flash memory NOR0, a dynamic random access memory DRAM0, and a NAND flash memory NAND0. The dynamic random access memory DRAM0 is equivalent to the memory shown in FIG. 3. The NOR flash memory NOR0 is equivalent to the memory shown in FIG. 5. The NAND flash memory NAND0 is equivalent to the memory shown in FIG. 7. The memory module MEM601 is composed of a NOR flash memory NOR1, a dynamic random access memory DRAM1, and a NAND flash memory NAND1. The dynamic random access memory DRAM1 is equivalent to the memory shown in FIG. 33. The NOR flash memory NOR1 is equivalent to the memory shown in FIG. 34. The NAND flash memory NAND1 is equivalent to the memory shown in FIG. 35.

In each of the memory modules MEM600 and MEM601, the memories configuring the memory module are connected in the order of the NOR flash memory NOR using a NOR flash memory cell, the dynamic random access memory DRAM using a dynamic memory cell, and a NAND flash memory NAND using a NAND flash memory cell, the order in which the memories are away from the data processing device CPU_CHIP. In a mobile phone, during a telephone call or standby, intermittent accesses to the NOR flash memory NOR having an OS and a program for communication stored therein are dominant. Therefore, in the present embodiment in which the NOR flash memory NOR, which is a non-volatile memory, is most closely connected to the data processing device CPU_CHIP, the dynamic random access memory DRAM is caused to be in a self refreshing state, and only the NOR flash memory NOR can be operated, thereby reducing power consumption during a call or standby.

(Seventh Embodiment)

Figure 40A:
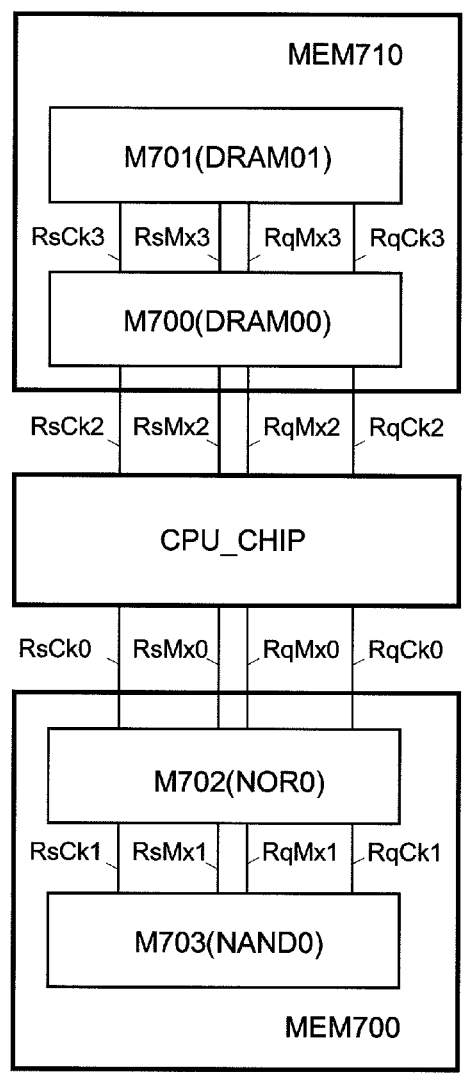
FIG. 40 is a configuration diagram of a data processing system to which the present invention is applied.
Figure 40B:
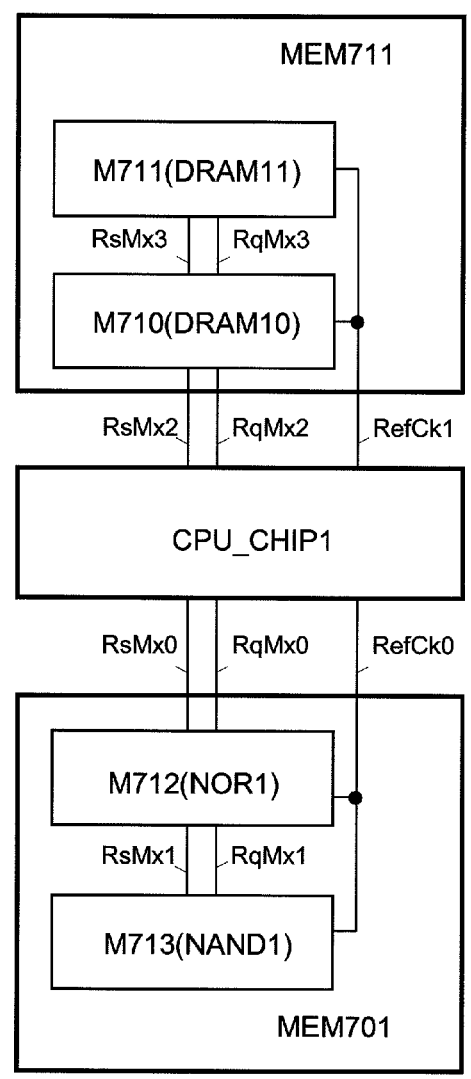

FIGS. 40A and 40B show a seventh embodiment of the present invention. FIG. 40A depicts an embodiment showing a data processing system of a source synchronous clock mode composed of a data processing device CPU_CHIP and memory modules MEM700 and MEM710. FIG. 40B depicts an embodiment showing a data processing system of an embedded clock mode composed of a data processing device CPU_CHIP1 and memory modules MEM701 and MEM711. RefCk0 and RefCk1 are reference clocks. RqMux0, RqMux1, RqMux2, and RqMux3 are request signals, and RsMux0, RsMux1, RsMux2, and RsMux3 are response signals. The data processing device CPU_CHIP is equivalent to those shown in FIGS. 1 and 2. Also, the data processing device CPU_CHIP1 is equivalent to those shown in FIGS. 31 and 32. The memory module MEM700 is composed of a NOR flash memory NOR0 and a NAND flash memory NAND0. The memory module MEM710 is composed of dynamic random access memories DRAM00 and DRAM01. As the dynamic access memories DRAM00 and DRAM01, any of the memory M0 shown in FIG. 3 and the memory M31 shown in FIG. 36 can be used. As the NOR flash memory NOR0, any of the memory M1 shown in FIG. 5 and the memory M32 shown in FIG. 36 can be used. As the NAND flash memory NAND0, any of the memory M2 shown in FIG. 7 and the memory M33 shown in FIG. 36 can be used. The memory module MEM701 is composed of a NOR flash memory NOR1 and a NAND flash memory NAND1. The memory module MEM711 includes dynamic random access memories DRAM10 and DRAM11. As the dynamic random access memories DRAM10 and DRAM11, any of the memory M10 shown in FIG. 33 and the memory M41 shown in FIG. 37 can be used. As the NOR flash memory NOR0, any of the memory M11 shown in FIG. 34 and the memory M42 shown in FIG. 37 can be used. As the NAND flash memory NAND0, any of the memory M12 shown in FIG. 35 and the memory M43 shown in FIG. 37 can be used.

In the present embodiment, the memory module formed of the dynamic random access memories and the memory module formed of the non-volatile memories are connected separately to the data processing device. In a mobile phone, during a telephone call or standby, intermittent accesses to the NOR flash memory NOR having an OS and a program for communication stored therein are dominant. Therefore, in the present embodiment in which the NOR flash memory, which is a non-volatile memory, is most closely connected to the data processing device CPU_CHIP, the memory module formed of the dynamic random access memories is caused to be in a self refreshing state. Furthermore, the request clocks RqCk2 and RqCk3, the response clocks RsCk2 and RsCk3 and the reference clock RefCk1 are stopped, and only the NOR flash memory NOR can be operated, thereby reducing power consumption during call or standby.

(Eighth Embodiment)

FIGS. 41A and 41B show an eighth embodiment of the present invention. FIG. 41A shows an embodiment showing a data processing system of a source synchronous clock mode composed of a data processing device CPU_CHIP and a memory module MEM900. FIG. 41(B) depicts an embodiment showing a data processing system of an embedded clock mode including a data processing device CPU_CHIP1 and a memory module MEM901. RefCk is a reference clock. RqMux0, RqMux1, and RqMux2 are request signals, and RsMux0, RsMux1, and RsMux2 are response signals. The data processing device CPU_CHIP is equivalent to those shown in FIGS. 1 and 2. Also, the data processing device CPU_CHIP1 is equivalent to those shown in FIGS. 31 and 32. The memory module MEM900 is composed of a dynamic random access memory DRAM0 and NAND flash memories NAND00 and NAND01. As the dynamic access memory DRAM0, any of the memory M0 shown in FIG. 3 and the memory M31 shown in FIG. 36 can be used. As the NAND flash memories NAND00 and NAND01, any of the memory M2 shown in FIG. 7 and the memory M33 shown in FIG. 36 can be used. The memory module MEM901 is composed of a dynamic random access memory DRAM1 and NAND flash memories NAND10 and NAND11. As the dynamic random access memory DRAM1, any of the memory M10 shown in FIG. 33 and the memory M41 shown in FIG. 37 can be used. As the NAND flash memories NAND10 and NAND11, any of the memory M12 shown in FIG. 35 and the memory M43 shown in FIG. 37 can be used.

The NAND flash memory is a memory that can achieve larger capacity and lower cost than those of the NOR flash memory. By using the NAND flash memory in place of the NOR flash memory, an OS and an application program can be stored in the NAND flash memory NAND0, thereby achieving a large-capacity low-cost data processing system. Furthermore, by transferring the OS and the application program stored in the NAND flash memory NAND0 to a dynamic random access memory DRAM in advance, the performance of the data processing system can be improved.

(Ninth Embodiment)

Figure 42A:
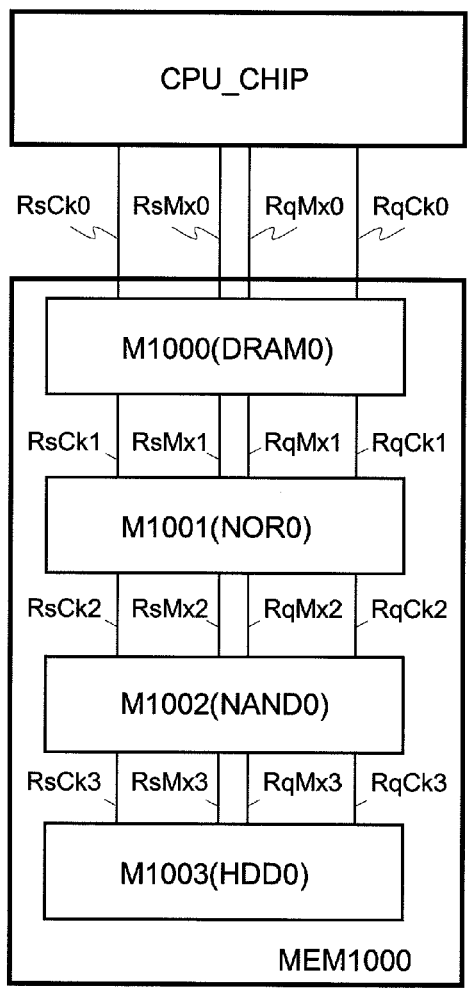
FIG. 42 is a configuration diagram of a data processing system to which the present invention is applied.
Figure 42B:
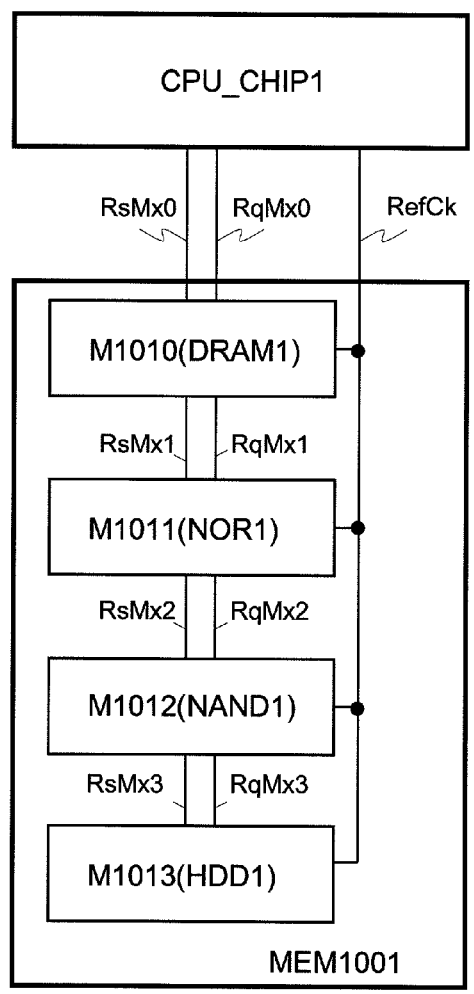

FIGS. 42A and 42B show a ninth embodiment of the present invention. FIG. 42A shows an embodiment showing a data processing system of a source synchronous clock mode composed of a data processing device CPU_CHIP and a memory module MEM1000. FIG. 42B shows an embodiment showing a data processing system of an embedded clock mode including a data processing device CPU_CHIP1 and a memory module MEM1001. RefCk is a reference clock. RqMux0, RqMux1, and RqMux2 are request signals, and RsMux0, RsMux1, and RsMux2 are response signals. The data processing device CPU_CHIP is equivalent to those shown in FIGS. 1 and 2. Also, the data processing device CPU_CHIP1 is equivalent to those shown in FIGS. 31 and 32. The memory module MEM1000 is composed of a dynamic random access memory DRAM0, a NOR flash memory NOR0, a NAND flash memory NAND0, and a hard disk drive HDD0. As the dynamic random access memory DRAM0, any of the memory M0 shown in FIG. 3 and the memory M31 shown in FIG. 36 can be used. As the NOR flash memory NOR0, any of the memory M1 shown in FIG. 5 and the memory M32 shown in FIG. 36 can be used. As the NAND flash memory NAND0, any of the memory M2 shown in FIG. 7 and the memory M33 shown in FIG. 36 can be used. The memory module MEM1001 includes a dynamic random access memory DRAM1, a NOR flash memory NOR1, and a NAND flash memory NAND1, and a hard disk drive HDD1. As the dynamic access memory DRAM1, any of the memory M10 shown in FIG. 33 and the memory M41 shown in FIG. 37 can be used. As the NOR flash memory NOR0, any of the memory M1 shown in FIG. 34 and the memory M32 shown in FIG. 37 can be used. As the NAND flash memory NAND10 and NAND11, any of the memory M12 shown in FIG. 35 and the memory M43 shown in FIG. 37 can be used.

The hard disk HDD is a memory achieving larger capacity and lower cost than those of the NAND flash memory NAND. As for a data read unit, an address managing method, and an error detecting and correcting method, the data read unit, address managing method, and an error detecting and correcting method originally achieved on the hard disk HDD are carried on to the flash memory, and thus, with the hard disk HDD easily added for connection, a large-capacity and low-cost memory module can be achieved.

(Tenth Embodiment)

FIGS. 43A and 43B show a tenth embodiment of the present invention. FIG. 43A shows an embodiment showing a data processing system of a source synchronous clock mode composed of a data processing device CPU_CHIP and a memory module MEM1100. FIG. 43B shows an embodiment showing a data processing system of an embedded clock mode composed of a data processing device CPU_CHIP1 and a memory module MEM1101. RefCk is a reference clock. RqMux0, RqMux1, and RqMux2 are request signals, and RsMux0, RsMux1, and RsMux2 are response signals. The data processing device CPU_CHIP is equivalent to those shown in FIGS. 1 and 2. Also, the data processing device CPU_CHIP1 is equivalent to those shown in FIGS. 31 and 32.

The memory module MEM1100 is composed of a first non-volatile memory MRAM0, a second non-volatile memory NVM20, and a third non-volatile memory NVM30. The first non-volatile memory MRAM0 may be a magnetic random access memory MRAM with the memory circuit Mem0 of the memory M0 shown in FIG. 3 formed of a non-volatile magnetic memory cell, or a memory with the dynamic random access memory DRAM of the memory M31 shown in FIG. 36 being replaced with a magnetic random access memory MRAM. As the second non-volatile memory NVM20, any of the memory M1 shown in FIG. 5 and the memory M11 shown in FIG. 34 can be used. As the third non-volatile memory NVM30, any of the memory M2 shown in FIG. 7 and the memory M11 shown in FIG. 35 can be used. The memory module MEM1101 includes a first non-volatile memory MRAM1, a second non-volatile memory NVM21, and a third non-volatile memory NVM31. The first non-volatile memory MRAM1 may be a magnetic random access memory MRAM with the memory circuit Mem0 of the memory M10 shown in FIG. 33 formed of a non-volatile magnetic memory cell, or a memory with the dynamic random access memory DRAM of the memory M31 shown in FIG. 37 being replaced with a magnetic random access memory MRAM. As the second non-volatile memory NVM21, any of the memory M1 shown in FIG. 34 and the memory M32 shown in FIG. 37 can be used. As the third non-volatile memory NVM31, any of the memory M12 shown in FIG. 35 and the memory M43 shown in FIG. 37 can be used.

In place of volatile dynamic random access memories DRAM, non-volatile magnetic random access memories MRAM are used, so that it is not required to regularly perform a data retaining operation in the memory circuit, thereby achieving low power. Also, the second non-volatile memory NVM20 may be a phase-change memory PCM in which the memory circuit Mem1 shown in FIG. 5 is formed of a non-volatile phase-change memory cell, or a memory in which the NOR flash memory NOR of the memory M32 shown in FIG. 36 is replaced with a phase-change memory PCM. Also, the second non-volatile memory NVM21 may be a phase-change memory PCM in which the memory circuit Mem1 shown in FIG. 34 is formed of a non-volatile phase-change memory cell, or a memory in which the NOR flash memory NOR of the memory M42 shown in FIG. 37 is replaced with a phase-change memory PCM.

(Eleventh Embodiment)

Figure 44A:
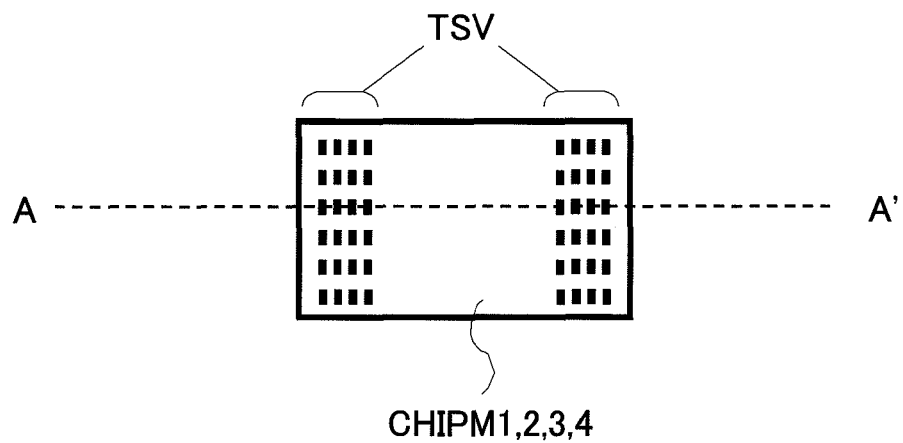
FIG. 44 is a diagram showing one example of a mount style of a data processing system according to the present invention.
Figure 44B:
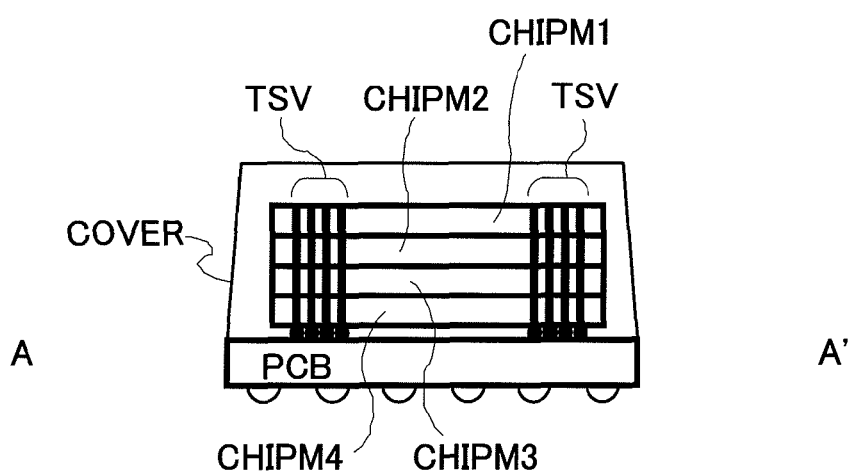

FIGS. 44A and 44B show a data processing system of an eleventh embodiment of the present invention. FIG. 44A is a top view, and FIG. 44B is a sectional view of a portion along an A-A' line shown in the top view. In a memory module of the present embodiment, CHIPM1, CHIPM2, CHIPM2, and CHIPM4 are mounted on a substrate (for example, a printed circuit board formed of a glass epoxy substrate) PCB implemented on the device with a ball grid array (BGA). CHIPM1 and CHIPM2 are non-volatile memories, and CHIPM3 is a random access memory, although the memories are not particularly limited thereto. CHIPM4 is the data processing device CPU_CHIP. CHIPM1, CHIPM2, CHIPM3, and CHIPM4 are connected to each other via through silicon vias (wirings) TSV each penetrating through each chip. Also, CHIPM1 and the substrate PCB are connected via a through silicon via TSV, CHIPM2 and the substrate PCB are connected via a through silicon via TSV, CHIPM3 and the substrate PCB are connected via a through silicon via TSV, and CHIPM4 and the substrate PCB are connected via a through silicon via TSV and the ball grid array (BGA).

In the present implementation method, the data processing system shown in FIG. 1, the data processing system shown in FIG. 31, the data processing system shown in FIG. 39, the data processing system shown in FIG. 40, the data processing system shown in FIG. 41, and the data processing system shown in FIG. 43 can be integrated into a single sealed package.

In the present embodiment, bear chips are multilayered on the printed circuit board PCB, and each chip has a wiring by the through silicon via TSV, and does not require the use of bonding wiring. Therefore, a memory module with a small implementation area can be configured. Furthermore, since the through silicon via TSV can shorten an inter-chip wiring length, a multichip module having higher performance and higher reliability can be achieved.

(Twelfth Embodiment)

Figure 45:
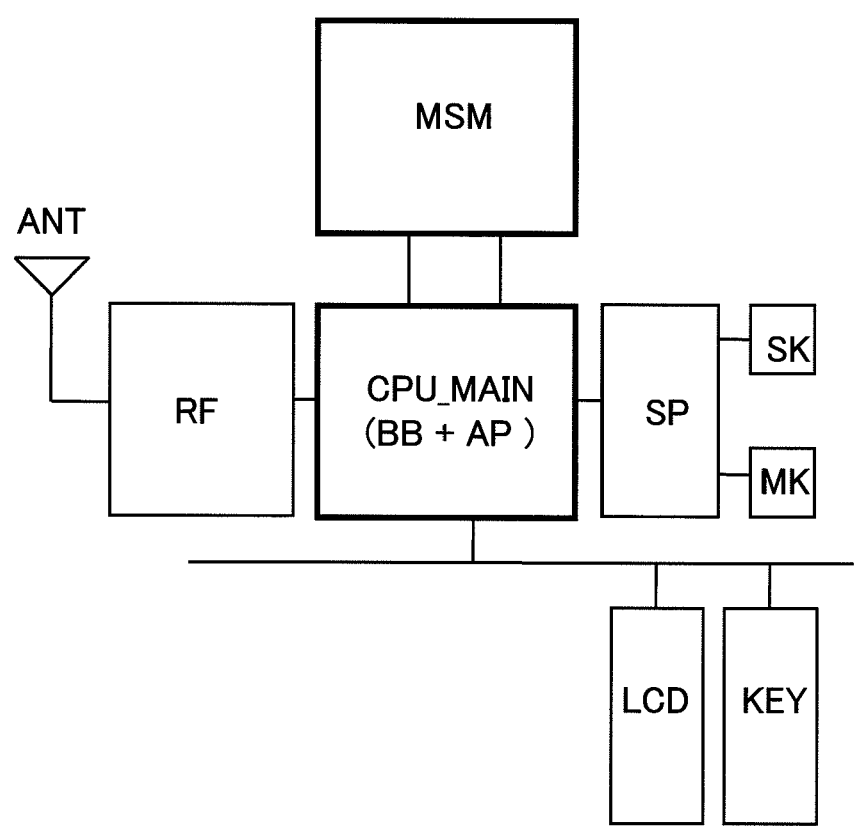
FIG. 45 is a block diagram showing a configuration example of a mobile phone using a data processing system of the present invention.

FIG. 45 shows a mobile phone according to a twelfth embodiment of the invention using a data processing system according to the invention. The mobile phone is composed of an antenna ANT, a radio frequency block RF, an audio codec block SP, a speaker SK, a microphone MK, a data processing unit CPU, a liquid crystal display LCD, a keyboard KEY, and a memory module MEM according to the invention. The data processing unit CPU_MAIN includes a plurality of data processing circuits, and a data processing circuit CPU0 thereof operates as a baseband processing circuit BB, and, one of the other, at least one data processing circuit CPU1 operates as an application processor AP.

An operation during call will be described. Voice received through the antenna ANT is amplified by the radio frequency block RF to be input to the data processing circuit CPU0. The data processing circuit CPU0 converts an audio analog signal to a digital signal and performs error correction and decoding to output to the audio codec block SP. The audio codec block converts the digital signal into an analog signal to output it to the speaker SK, as a result, the voice of the other party on the line can be heard from the speaker. The a series of operations, downloading music data by accessing a web site on the Internet through the mobile phone, reproducing, listening, and finally, saving the downloaded music data will be described.

The memory module MEM stores an OS, application programs (E-mail program, Web browser, a music play program, moving picture play program, a game program, etc.), music data, still image data, moving picture data, and the like. When a Web browser boot instruction is executed through the keyboard, a Web browser program stored in the NOR flash memory in the memory module MSM is read and executed by the data processing circuit CPU1, and the Web browser appears on the liquid crystal display LCD. Then, with an access to a desired website, downloading of favorite music data is instructed through the keyboard KEY, the music data is received through the antenna ANT, is amplified by the radio frequency block RF, and is then input to the data processing circuit CPU0. The data processing circuit CPU0 converts an analog signal of the music data into a digital signal and performs error correction and decoding thereof. The music data converted into a digital signal is temporarily stored in a dynamic random access memory DRAM in the memory module MSM, and is finally transferred to a NAND flash memory of the memory module MEM and stored therein.

Next, when an instruction to boot the music play program is executed from the keyboard KEY, the music play program stored in the NOR flash memory in the memory module MSM is read and executed by the data processing circuit CPU1, and therefore, the music play program appears on the liquid crystal display LCD. When an instruction to listen to the music data downloaded in the NAND flash memory in the memory module is executed from the keyboard KEY, the data processing circuit CPU1 executes the music play program and processes the music data stored in the NAND flash memory, and finally, music can be heard from the speaker SK. The NOR flash memory in the memory module MSM according to the present embodiment stores a plurality of programs, such as a Web browser, a music play program, and an E-mail program, and the data processing unit CPU_MAIN has the plurality of data processing circuits CPU0 to CPU3, and therefore, a plurality of programs can be executed simultaneously. During the standby for a call or E-mail, the data processing unit CPU_MAIN allows a clock to the memory module MSM to operate at a minimum frequency, so that power consumption can be extremely reduced.

As described above, by utilizing the memory module according to the invention, a large amount of E-mails, a music play program, application program, music data, still picture data, moving picture data, and the like can be stored, and further, a plurality of programs can be executed simultaneously.

(Thirteenth Embodiment)

Figure 46:
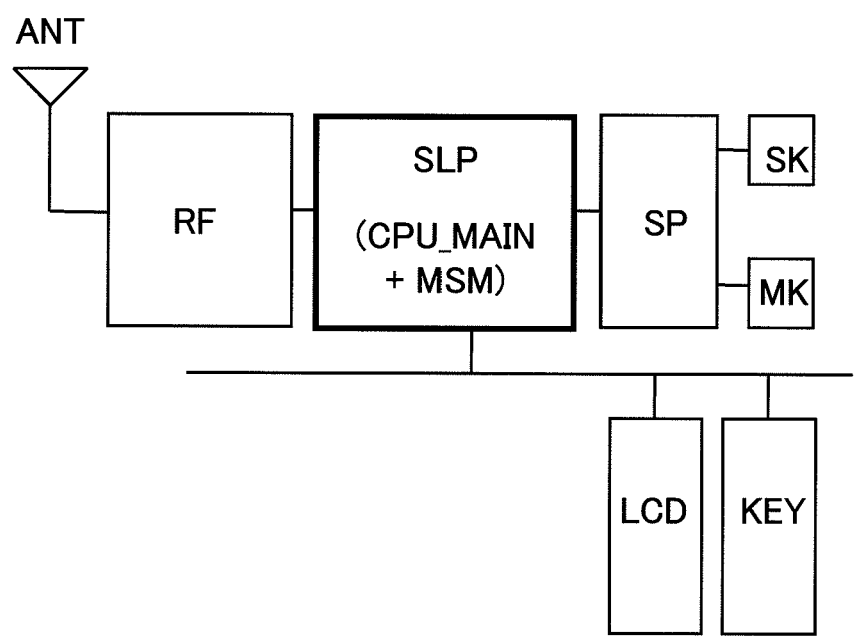
FIG. 46 is a block diagram showing a configuration example of a mobile phone using a data processing system of the present invention.

FIG. 46 shows a mobile phone according to a thirteenth embodiment utilizing a data processing system according to the present invention. The mobile phone is composed of the antenna ANT, the radio frequency block RF, the audio codec block SP, the speaker SK, the microphone MK, the liquid crystal display unit LCD, the keyboard KEY, and a data processing system SLP according to the present invention in which the memory module MSM and the data processing unit CPU_MAIN are integrated into a single sealed package.

By using the data processing system SLP according to the present invention, component count can be reduced, and therefore cost can be reduced and reliability of the mobile phone is improved, and, since the mounting area for the components composing the mobile phone can be made small, the mobile phone can be miniaturized.

(Fourteenth Embodiment)

Figure 47:
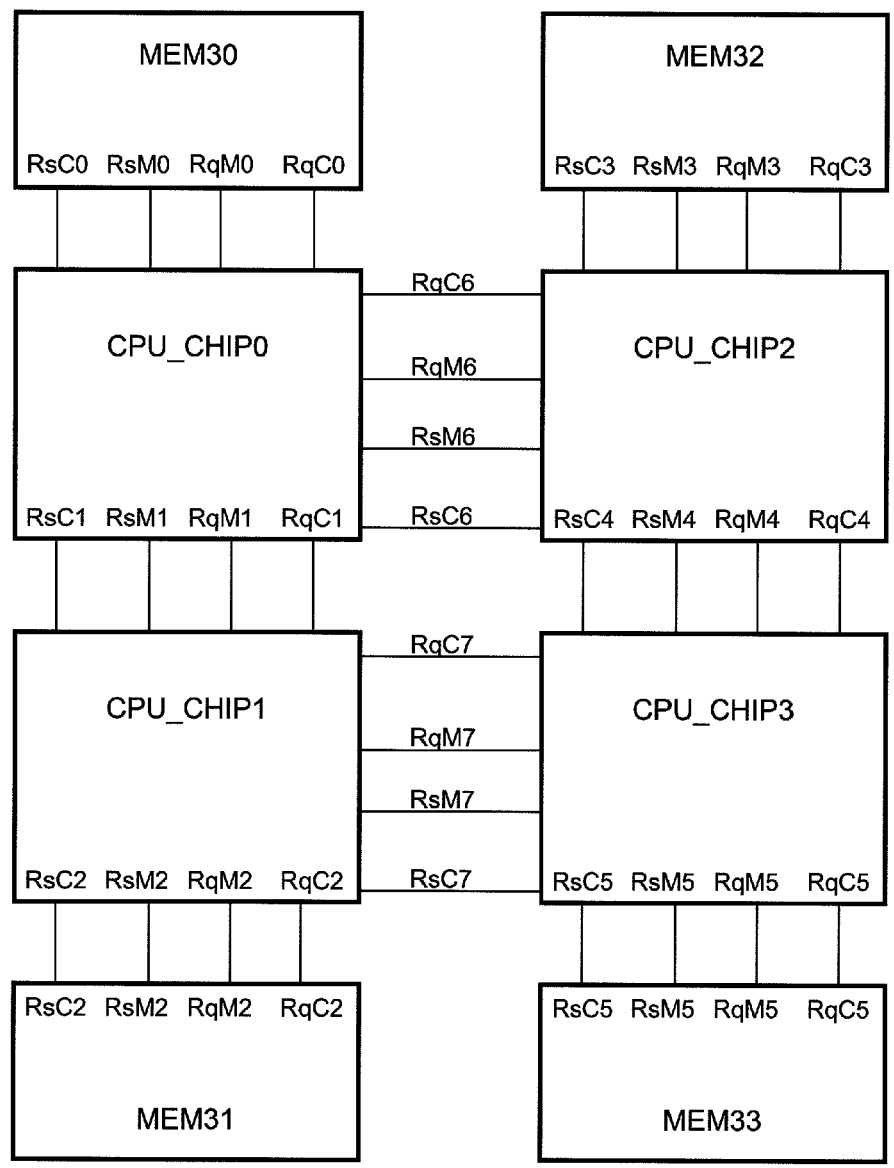
FIG. 47 is a configuration diagram of a data processing system to which the present invention is applied.

FIG. 47 is a fourteenth embodiment of the present invention. The fourteenth embodiment describes a data processing system including data processing devices CPU_CHIP0, CPU_CHIP1, CPU_CHIP2, and CPU_CHIP3, and memory modules MEM30, MEM31, MEM32, and MEM33. The data processing devices CPU_CHIP0, CPU_CHIP1, CPU_CHIP2, and CPU_CHIP3 are equivalent to the data processing device CPU_CHIP shown in FIG. 1. The memory modules MEM30, MEM31, MEM32, and MEM33 are equivalent to the memory module MEM shown in FIG. 1. RqC0 to RqC7 are request clocks, and RsC0 to RsC7 are response clocks. RqM0 to RqM7 are request signals, and RsM0 to RsM1 are response signals. In the present embodiment, a plurality of data processing devices can be easily connected to achieve high speed processing. Furthermore, the data processing devices and the memory modules can be flexibly connected according to the system configuration of a portable device and required performance.

(Fifteenth Embodiment)

Figure 48:
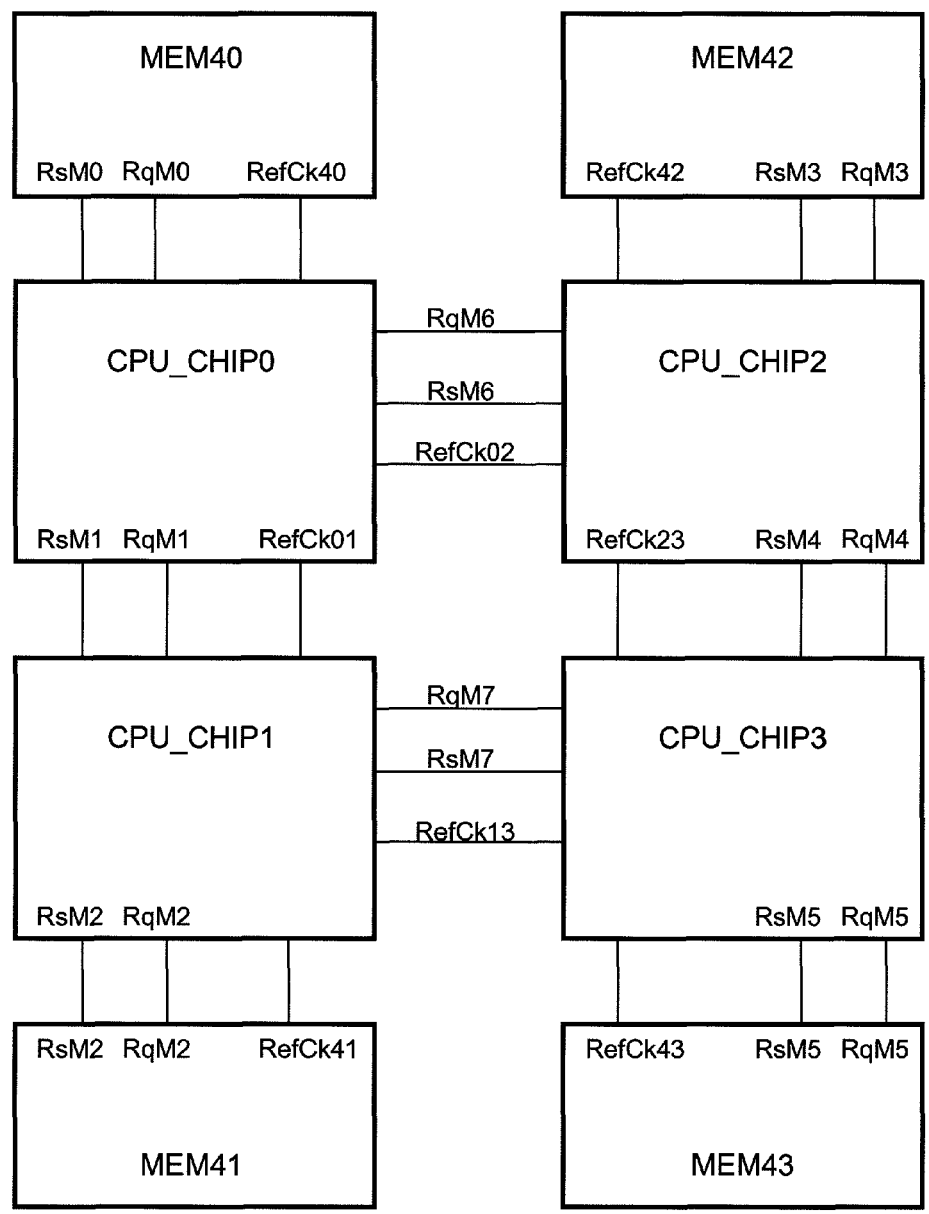
FIG. 48 is a configuration diagram of a data processing system to which the present invention is applied.

FIG. 48 is a fifteenth embodiment of the present invention. The fifteenth embodiment describes a data processing system including data processing devices CPU_CHIP0, CPU_CHIP1, CPU_CHIP2, and CPU_CHIP3 and memory modules MEM40, MEM41, MEM42, and MEM43. The data processing devices CPU_CHIP0, CPU_CHIP1, CPU_CHIP2, and CPU_CHIP3 are equivalent to the data processing device CPU_CHIP1 shown in FIG. 31. The memory modules MEM40, MEM41, MEM42, and MEM43 are equivalent to the memory module MEM1 shown in FIG. 31. RefCk40, RefCk41, RefCk42, RefCk43, RefCk01, RefCk02, RefCk13, and RefCk23 are reference clocks; RqM0 to RqM7 are request signals; and RsM0 to RsM1 are response signals. In the present embodiment, a plurality of data processing devices can be easily connected to achieve high speed processing. Furthermore, the data processing devices and memory modules can be flexibly connected according to the system configuration of a portable device and required performance.

<Gist of the Effect of the Invention Shown in Each Embodiment>

As described above, main effects obtained by the invention disclosed in the specification are as follows.

First, immediately after powering on or when a new memory is attached or removed, an operation of checking a series connection is performed, so that it can be reliably confirmed that the memories are connected to each other. Furthermore, upon powering on or when a new memory is attached or removed, an ID is automatically provided to each memory, so that memories as much as required can be easily connected, and the memory capacity can be expanded.

Second, by adding an identification number ID of the memory to a request, the request is reliably transferred from the data processing device CPU_CHIP to each of the memories M0, M1, and M2. Also, by adding an ID to a response to the data processing device CPU_CHIP, it is possible to confirm that data transfer from each memory has been correctly performed, and, by the series connection of the data processing device CPU_CHIP and the memories M0, M1, and M2, the data processing device CPU_CHIP can perform a desired process while the number of connection signals are reduced.

Third, by adding a request number being added to a request and a response number to a response, even if the response has been transmitted in the order different from a request input order to improve data transfer performance, the data processing device CPU_CHIP can find to which request the response has been transmitted from the memory, thereby performing a desired process at high speed.

Fourth, since the request interface circuit ReIF and the response interface circuit can operate independently, a data read operation and write operation can be performed simultaneously, thereby improving data transfer performance.

Fifth, data that is quickly readable can be immediately read irrespectively of the request input order without waiting for data that is slowly readable, thereby achieving a high speed.

Sixth, error detection and correction are performed at the time of reading from the memory M2 and a replacement process is performed on a faulty address where write has not been performed correctly, thereby keeping reliability.

Seventh, a time frame of a response to a request to each memory is predicted and managed to issue a request, thereby achieving low latency and a high-speed data transfer rate.

Eighth, when the data processing device CPU_CHIP and each of the memories M0, M1, and M2 transmit a request including a read instruction, a response queue in a vacant state required for receiving a response to that request is allocated, and then the request including a read instruction is transmitted, and therefore, the response can be transmitted with low latency, achieving a high-speed data transfer.

Ninth, by actually measuring latency and comparing it with an expectation value of latency, it is possible to determine whether the data processing system of the present embodiment normally operates. Furthermore, when a difference between the actually-measured value of latency and the expectation value of latency exceeds an allowable range, a latency correcting operation is performed, thereby causing the system to always operate with low latency within the allowable range.

Tenth, by actually measuring latency of each memory and updating the latency register LTREG to this actually-measured latency value, the data processing device CPU_CHIP can perform control using correct latency and achieve low latency and a high-speed data transfer.

Eleventh, since the value of each register in the configuration circuit CONFIG is programmable, an optimum register value can be set according to various structures and performances of the data processing system, thereby allowing flexible support.

Twelfth, not only the sense amplifier SenseAmp and the data buffer DataLat for each memory bank in each memory but also the response queue RsQo of each memory are utilized as cache memories, and therefore, the cache memory size can be increased, a hit ratio of the cache memory can be increased, and each memory can be operated with low latency, at high speed, and with low power.

Thirteenth, by implementing a plurality of semiconductor chips into one sealed package, a system memory module and data processing system with a small implementation area can be provided.

INDUSTRIAL APPLICABILITY

The present invention relates to a semiconductor device technology and, in particular, is applicable to a method of controlling a data processing system including a non-volatile memory and data processing device, and a memory module.
Symbols CPU_CHIP . . . Data processing device (data processing unit); CPU0, CPU1, CPU2, and CPU3 . . . Data processing circuit; CARB Arbitration circuit; DCMC . . . Memory control circuit; MEM . . . Memory module; M1, M1, and M2 . . . Memory; MID0, MID1, MID2, and MID3 Master number register; CONFIG . . . Configuration circuit; REQQ1 and REQQ2 . . . Request queue; IDHT . . . Hit determination circuit; COMGEN . . . Command generation circuit; RQOUT . . . Request output circuit; REF . . . Refresh request circuit; QMGT . . . Queue management circuit; LCHCK . . . Latency adjustment circuit; RSIN . . . Response input circuit; RESQ1 . . . Response queue; ReqIF . . . Request interface circuit; ResIF . . . Response interface circuit; INIT, INIT1, and INIT2 . . . Initial setting circuit; Mem0, Mem1, and Mem2 . . . Memory circuit; RqCkC . . . Request clock control circuit; Drv1 . . . Clock driver; Div1 . . . Clock frequency divider circuit; RqCT . . . Request queue control circuit; RqQ1, RqQXI and RqQXO . . . Request queue circuit; IDR . . . ID register circuit; CPQ ID comparator circuit; RsQo and RsQp . . . Response queue circuit; RRG . . . Response priority setting register; RQQM . . . Request queue check circuit; IDV . . . ID valid bit; BR . . . Boot device flag register; ER . . . End device flag register; RsCkC . . . Response clock control circuit; RsCT Response queue control circuit; Drv2 . . . Clock driver; Div2 . . . Clock driver; Div2 . . . Clock frequency divider; RsCT . . . Response queue control circuit; RSQM . . . Response queue check circuit; SCH Response schedule circuit; LC . . . Latency code register; DC . . . Device code register; Bsig . . . Boot device identifying signal; RqCk0, RqCk1, and RqCk2 . . . Request clock; RsCk0, RsCk1, and RsCk2 . . . Response clock; RuMux0, RqMux1, and RqMux2 . . . Request signal; RsMux0, RsMux1, and RsMux2 . . . Response signal; ck1, ck2, ck3, and ck4 . . . Clock signal; CmdDec . . . Demand decoder; ContLogic . . . Control circuit; RaddLat . . . Row address buffer; CaddLat . . . Column address buffer; RefC . . . Reflesh counter; Thmo . . . Thermometer; WDataLat . . . Write data Buffer; RDataLat . . . Read data buffer; Rowdec . . . Row decoder; ColDec . . . Column decoder; SenseAmp . . . Sense amplifier; DataCont . . . Data control circuit; BANK0, BANK1, BANK2, BANK3, BANK4, BANK5, BANK6, and BANK7 . . . Memory bank; MBank0, MBank1, MBank2, MBank3, MBank4, MBank5, MBank6, and MBank7 . . . Memory circuit; BotID . . . Boot device ID value; NV1BANK0, NV1BANK2, NV1BANK3, NV1BANK4, NVBANK5, NVBANK6, and NV1BANK7 . . . Memory bank; PadLat . . . Page address buffer; PageDec . . . Page decoder; NV1Bk0, NV1Bk1, NV1Bk2, NV1Bk3, NV1Bk4, NV1Bk5, NV1Bk6, and NV1Bk7 . . . Memory circuit; ECC . . . Error detection/correction circuit; NV2BANK0, NV2BANK1, NV2BANK2, NV2BANK3, NV2BANK4, NV2BANK5, NV2BANK6, and NV2BANK7 . . . Memory bank; NV2Bk0, NV2Bk1, NV2Bk2, NV2Bk3, NV2Bk4, NV2Bk5, NV2Bk6, and NV2Bk7 . . . Memory circuit; CFRG-AREA . . . Configuration area; IO-AREA . . . IO area; BotID-AERA . . . Boot device ID storage area; InitPR-AREA . . . Initial program area; OSAP-AERA . . . Program storage area; COPY-AREA . . . Copy area; WORK-AREA . . . Work area; DATA-AREA . . . Data area; REP-AREA . . . Replacement area; CPU_CHIP1 . . . Data processing device; DCMC1 . . . Memory control circuit; MEM1 . . . Memory module; M10, M11, and M12 . . . Memory; RQOUT1 . . . Request output circuit; OUTBLK . . . Output circuit; SDBLK . . . Serial data circuit; RSIN1 . . . Response input circuit; INBLK . . . Input circuit; PDBLK . . . Parallel data circuit; RqC . . . Request signal conversion circuit; RQPD and RSPD . . . Parallel data circuit; RQSD, RSSD . . . Serial data circuit; DRAM, DRAM00, DRAM01, DRAM10, and DRAM11 . . . Dynamic random access memory; NOR, NOR0, and NOR1 . . . NOR flash memory; NAND, NAND0, and NAND1 . . . NAND flash memory; HDD0 and HDD1 . . . Hard disk; MRAM0 and MRAM1 . . . Magnetic random access memory; NVM20, NVM21, NVM30, and NVM31 . . . Non-volatile memory; CHIPM1, CHIPM2, CHIPM3, and CHIPM4 . . . Semiconductor chip; PCB . . . Printed circuit board; COVER . . . Sealing cover of module; TSV . . . Through silicon via; ANT . . . Antenna; RF . . . Radio frequency block; SP . . . Voice codec block; SK . . . Speaker; MK . . . Microphone; CPU . . . Processor; DRAM . . . Dynamic random access memory; LCD . . . Liquid crystal display; KEY . . . Keyboard; MSM . . . Memory module; CPU_MAIN . . . data processing unit; and SLP . . . Data processing system.

The invention claimed is:

1. A semiconductor device comprising:
a request transmitting circuit which issues an access request to outside;
a response receiving circuit which receives a response to the access request issued by the request transmitting circuit from outside;
a measuring circuit which measures a response time from a timing when the access request is issued by the request transmitting circuit to a timing when the response receiving circuit receives the response to the access request; and
a circuit which retains an expectation value of the response time for the access request,
wherein the request transmitting circuit compares a first expectation value of the response time for a first access request with a first measured value of the response time for the first access request when issuing a second access request subsequent to issuing the first access request, and delays issuance of the second access request by the request transmitting circuit when the first measured value is larger than the first expectation value, wherein the semiconductor device retains an allowable time for the expectation value of the response time for the access request, and wherein the request transmitting circuit compares a sum of the first expectation value and a first allowable time for the first expectation value with the first measured value when issuing the second access request subsequent to issuing the first access request, and delays issuance of the second access request by the request transmitting circuit when the first measured value is larger than the sum of the first expectation value and the first allowable value.

2. The semiconductor device according to claim 1, wherein the semiconductor device issues, to each of a plurality of memories connected in series to the device, a request to set an ID of the corresponding memory.

3. The semiconductor device according to claim 2, wherein one or more requests to set an ID is made upon powering on or when a new memory is connected.

4. The semiconductor device according to claim 2, wherein the access request includes an ID of a memory of an access request destination, and the response to the access request includes an ID of a memory having made the response to the access request.

5. The semiconductor device according to claim 1, wherein the access request includes a request number, and the response to the access request includes a response number corresponding to the request number.

* * * * *